(12) United States Patent
Nell et al.

(10) Patent No.: US 12,223,282 B2
(45) Date of Patent: Feb. 11, 2025

(54) INTELLIGENT AUTOMATED ASSISTANT IN A HOME ENVIRONMENT

(71) Applicant: Apple Inc., Cupertino, CA (US)

(72) Inventors: Garett R. Nell, Seattle, WA (US); Roshni Malani, Sunnyvale, CA (US); Sean P. Brown, Saratoga, CA (US); Benjamin L Brumbaugh, San Jose, CA (US)

(73) Assignee: Apple Inc., Cupertino, CA (US)

( * ) Notice: Subject to any disclaimer, the term of this patent is extended or adjusted under 35 U.S.C. 154(b) by 78 days.

(21) Appl. No.: 17/497,797

(22) Filed: Oct. 8, 2021

(65) Prior Publication Data

US 2022/0043986 A1    Feb. 10, 2022

Related U.S. Application Data

(63) Continuation of application No. 15/994,795, filed on May 31, 2018, now abandoned, which is a
(Continued)

(51) Int. Cl.
*G06F 40/35* (2020.01)
*G06F 3/16* (2006.01)
(Continued)

(52) U.S. Cl.
CPC .............. *G06F 40/35* (2020.01); *G06F 3/167* (2013.01); *G10L 15/1822* (2013.01);
(Continued)

(58) Field of Classification Search
None
See application file for complete search history.

(56) References Cited

U.S. PATENT DOCUMENTS 7,865,817 B2    1/2011   Ryan et al.
7,869,998 B1    1/2011   Fabbrizio et al.
(Continued)

FOREIGN PATENT DOCUMENTS

AU    2014100581 B4    9/2014
AU    2015203483 A1    7/2015
(Continued)

OTHER PUBLICATIONS

João Bártolo Gomes; Mohamed Medhat Gaber; Pedro A. C. Sousa; Ernesta Menasalvas; Mining Recurring Concepts in a Dynamic Feature Space; Jul. 2013; URL: https://ieeexplore.ieee.org/stamp/stamp.jsp?tp=&arnumber=6572821&tag=1 (Year: 2013).*
(Continued)

*Primary Examiner* — Richa Sonifrank
(74) *Attorney, Agent, or Firm* — DLA Piper LLP (US)

(57) ABSTRACT

Systems and processes for operating an intelligent automated assistant are provided. In one example process, discourse input representing a user request is received. The process determines whether the discourse input relates to a device of an established location. In response to determining that the discourse input relates to a device of an established location, a data structure representing a set of devices of the established location is retrieved. The process determines, using the data structure, a user intent corresponding to the discourse input, the user intent associated with an action to be performed by a device of the set of devices, and a criterion to be satisfied prior to performing the action. The action and the device are stored in association with the criterion, where, in accordance with a determination that the criterion is satisfied, the action is performed by the device.

45 Claims, 18 Drawing Sheets

Related U.S. Application Data continuation of application No. 15/274,859, filed on Sep. 23, 2016, now Pat. No. 10,354,011.

(60) Provisional application No. 62/348,015, filed on Jun. 9, 2016.

(51) Int. Cl.
*G06F 40/284* (2020.01)
*G10L 15/18* (2013.01)
*G10L 15/22* (2006.01)
*H04L 12/28* (2006.01)

(52) U.S. Cl.
CPC ............ *G10L 15/22* (2013.01); *H04L 12/282* (2013.01); *H04L 12/2823* (2013.01); *G06F 40/284* (2020.01); *G10L 2015/223* (2013.01); *G10L 2015/226* (2013.01)

(56) References Cited

U.S. PATENT DOCUMENTS

| | | | |
|---|---|---|---|
| 7,869,999 B2 | 1/2011 | Amato et al. |
| 7,870,118 B2 | 1/2011 | Jiang et al. |
| 7,870,133 B2 | 1/2011 | Krishnamoorthy et al. |
| 7,873,149 B2 | 1/2011 | Schultz et al. |
| 7,873,519 B2 | 1/2011 | Bennett |
| 7,873,523 B2 | 1/2011 | Potter et al. |
| 7,873,584 B2 | 1/2011 | Asher et al. |
| 7,873,654 B2 | 1/2011 | Bernard |
| 7,877,705 B2 | 1/2011 | Chambers et al. |
| 7,880,730 B2 | 2/2011 | Robinson et al. |
| 7,881,283 B2 | 2/2011 | Cormier et al. |
| 7,881,936 B2 | 2/2011 | Longe et al. |
| 7,885,390 B2 | 2/2011 | Chaudhuri et al. |
| 7,885,844 B1 | 2/2011 | Cohen et al. |
| 7,886,233 B2 | 2/2011 | Rainisto et al. |
| 7,889,101 B2 | 2/2011 | Yokota |
| 7,889,184 B2 | 2/2011 | Blumenberg et al. |
| 7,889,185 B2 | 2/2011 | Blumenberg et al. |
| 7,890,329 B2 | 2/2011 | Wu et al. |
| 7,890,330 B2 | 2/2011 | Ozkaragoz et al. |
| 7,890,652 B2 | 2/2011 | Bull et al. |
| 7,895,039 B2 | 2/2011 | Braho et al. |
| 7,895,531 B2 | 2/2011 | Radtke et al. |
| 7,899,666 B2 | 3/2011 | Varone |
| 7,904,297 B2 | 3/2011 | Mirkovic et al. |
| 7,908,287 B1 | 3/2011 | Katragadda |
| 7,912,289 B2 | 3/2011 | Kansal et al. |
| 7,912,699 B1 | 3/2011 | Saraclar et al. |
| 7,912,702 B2 | 3/2011 | Bennett |
| 7,912,720 B1 | 3/2011 | Hakkani-Tur et al. |
| 7,912,828 B2 | 3/2011 | Bonnet et al. |
| 7,913,185 B1 | 3/2011 | Benson et al. |
| 7,916,979 B2 | 3/2011 | Simmons |
| 7,917,364 B2 | 3/2011 | Yacoub |
| 7,917,367 B2 | 3/2011 | Di Cristo et al. |
| 7,917,497 B2 | 3/2011 | Harrison et al. |
| 7,920,678 B2 | 4/2011 | Cooper et al. |
| 7,920,682 B2 | 4/2011 | Byrne et al. |
| 7,920,857 B2 | 4/2011 | Lau et al. |
| 7,924,286 B2 | 4/2011 | Ostermann et al. |
| 7,925,525 B2 | 4/2011 | Chin |
| 7,925,610 B2 | 4/2011 | Elbaz et al. |
| 7,929,805 B2 | 4/2011 | Wang et al. |
| 7,930,168 B2 | 4/2011 | Weng et al. |
| 7,930,183 B2 | 4/2011 | Odell et al. |
| 7,930,197 B2 | 4/2011 | Ozzie et al. |
| 7,933,399 B2 | 4/2011 | Knott et al. |
| 7,936,339 B2 | 5/2011 | Marggraff et al. |
| 7,936,861 B2 | 5/2011 | Knott et al. |
| 7,936,863 B2 | 5/2011 | John et al. |
| 7,937,075 B2 | 5/2011 | Zellner |
| 7,941,009 B2 | 5/2011 | Li et al. |
| 7,945,294 B2 | 5/2011 | Zhang et al. |
| 7,945,470 B1 | 5/2011 | Cohen et al. |
| 7,949,109 B2 | 5/2011 | Ostermann et al. |
| 7,949,529 B2 | 5/2011 | Weider et al. |
| 7,949,534 B2 | 5/2011 | Davis et al. |
| 7,949,752 B2 | 5/2011 | White et al. |
| 7,953,679 B2 | 5/2011 | Chidlovskii et al. |
| 7,957,975 B2 | 6/2011 | Burns et al. |
| 7,958,136 B1 | 6/2011 | Curtis et al. |
| 7,962,179 B2 | 6/2011 | Huang |
| 7,974,835 B2 | 7/2011 | Balchandran et al. |
| 7,974,844 B2 | 7/2011 | Sumita |
| 7,974,972 B2 | 7/2011 | Cao |
| 7,975,216 B2 | 7/2011 | Woolf et al. |
| 7,983,478 B2 | 7/2011 | Liu et al. |
| 7,983,915 B2 | 7/2011 | Knight et al. |
| 7,983,917 B2 | 7/2011 | Kennewick et al. |
| 7,983,919 B2 | 7/2011 | Conkie |
| 7,983,997 B2 | 7/2011 | Allen et al. |
| 7,984,062 B2 | 7/2011 | Dunning et al. |
| 7,986,431 B2 | 7/2011 | Emori et al. |
| 7,987,151 B2 | 7/2011 | Schott et al. |
| 7,987,176 B2 | 7/2011 | Latzina et al. |
| 7,987,244 B1 | 7/2011 | Lewis et al. |
| 7,991,614 B2 | 8/2011 | Washio et al. |
| 7,992,085 B2 | 8/2011 | Wang-Aryattanwanich et al. |
| 7,996,228 B2 | 8/2011 | Miller et al. |
| 7,996,589 B2 | 8/2011 | Schultz et al. |
| 7,996,769 B2 | 8/2011 | Fux et al. |
| 7,996,792 B2 | 8/2011 | Anzures et al. |
| 7,999,669 B2 | 8/2011 | Singh et al. |
| 8,000,453 B2 | 8/2011 | Cooper et al. |
| 8,001,125 B1 | 8/2011 | Magdalin et al. |
| 8,005,664 B2 | 8/2011 | Hanumanthappa |
| 8,005,679 B2 | 8/2011 | Jordan et al. |
| 8,006,180 B2 | 8/2011 | Tunning et al. |
| 8,010,367 B2 | 8/2011 | Muschett et al. |
| 8,010,614 B1 | 8/2011 | Musat et al. |
| 8,014,308 B2 | 9/2011 | Gates, III et al. |
| 8,015,006 B2 | 9/2011 | Kennewick et al. |
| 8,015,011 B2 | 9/2011 | Nagano et al. |
| 8,015,144 B2 | 9/2011 | Zheng et al. |
| 8,018,431 B1 | 9/2011 | Zehr et al. |
| 8,018,455 B2 | 9/2011 | Shuster |
| 8,019,271 B1 | 9/2011 | Izdepski |
| 8,019,604 B2 | 9/2011 | Ma |
| 8,020,104 B2 | 9/2011 | Robarts et al. |
| 8,024,195 B2 | 9/2011 | Mozer et al. |
| 8,024,415 B2 | 9/2011 | Horvitz et al. |
| 8,027,836 B2 | 9/2011 | Baker et al. |
| 8,031,943 B2 | 10/2011 | Chen et al. |
| 8,032,383 B1 | 10/2011 | Bhardwaj et al. |
| 8,032,409 B1 | 10/2011 | Mikurak |
| 8,036,901 B2 | 10/2011 | Mozer |
| 8,037,034 B2 | 10/2011 | Plachta et al. |
| 8,041,557 B2 | 10/2011 | Liu |
| 8,041,570 B2 | 10/2011 | Mirkovic et al. |
| 8,041,611 B2 | 10/2011 | Kleinrock et al. |
| 8,042,053 B2 | 10/2011 | Darwish et al. |
| 8,046,231 B2 | 10/2011 | Hirota et al. |
| 8,046,363 B2 | 10/2011 | Cha et al. |
| 8,046,374 B1 | 10/2011 | Bromwich |
| 8,050,500 B1 | 11/2011 | Batty et al. |
| 8,050,919 B2 | 11/2011 | Das |
| 8,054,180 B1 | 11/2011 | Scofield et al. |
| 8,055,296 B1 | 11/2011 | Persson et al. |
| 8,055,502 B2 | 11/2011 | Clark et al. |
| 8,055,708 B2 | 11/2011 | Chitsaz et al. |
| 8,056,070 B2 | 11/2011 | Goller et al. |
| 8,060,824 B2 | 11/2011 | Brownrigg, Jr. et al. |
| 8,064,753 B2 | 11/2011 | Freeman |
| 8,065,143 B2 | 11/2011 | Yanagihara |
| 8,065,155 B1 | 11/2011 | Gazdzinski |
| 8,065,156 B2 | 11/2011 | Gazdzinski |
| 8,068,604 B2 | 11/2011 | Leeds et al. |
| 8,069,046 B2 | 11/2011 | Kennewick et al. |
| 8,069,422 B2 | 11/2011 | Sheshagiri et al. |
| 8,073,681 B2 | 12/2011 | Baldwin et al. |
| 8,073,695 B1 | 12/2011 | Hendricks et al. |
| 8,077,153 B2 | 12/2011 | Benko et al. |

(56) References Cited

U.S. PATENT DOCUMENTS

| | | |
|---|---|---|
| 8,078,473 B1 | 12/2011 | Gazdzinski |
| 8,078,978 B2 | 12/2011 | Perry et al. |
| 8,082,153 B2 | 12/2011 | Coffman et al. |
| 8,082,498 B2 | 12/2011 | Salamon et al. |
| 8,086,751 B1 | 12/2011 | Ostermann et al. |
| 8,090,571 B2 | 1/2012 | Elshishiny et al. |
| 8,095,364 B2 | 1/2012 | Longe et al. |
| 8,099,289 B2 | 1/2012 | Mozer et al. |
| 8,099,395 B2 | 1/2012 | Pabla et al. |
| 8,099,418 B2 | 1/2012 | Inoue et al. |
| 8,103,510 B2 | 1/2012 | Sato |
| 8,103,947 B2 | 1/2012 | Lunt et al. |
| 8,107,401 B2 | 1/2012 | John et al. |
| 8,112,275 B2 | 2/2012 | Kennewick et al. |
| 8,112,280 B2 | 2/2012 | Lu |
| 8,115,772 B2 | 2/2012 | Ostermann et al. |
| 8,117,026 B2 | 2/2012 | Lee et al. |
| 8,117,037 B2 | 2/2012 | Gazdzinski |
| 8,117,542 B2 | 2/2012 | Radtke et al. |
| 8,121,413 B2 | 2/2012 | Hwang et al. |
| 8,121,837 B2 | 2/2012 | Agapi et al. |
| 8,122,094 B1 | 2/2012 | Kotab |
| 8,122,353 B2 | 2/2012 | Bouta |
| 8,130,929 B2 | 3/2012 | Wilkes et al. |
| 8,131,557 B2 | 3/2012 | Davis et al. |
| 8,135,115 B1 | 3/2012 | Hogg, Jr. et al. |
| 8,138,912 B2 | 3/2012 | Singh et al. |
| 8,140,330 B2 | 3/2012 | Cevik et al. |
| 8,140,335 B2 | 3/2012 | Kennewick et al. |
| 8,140,368 B2 | 3/2012 | Eggenberger et al. |
| 8,140,567 B2 | 3/2012 | Padovitz et al. |
| 8,145,489 B2 | 3/2012 | Freeman et al. |
| 8,150,694 B2 | 4/2012 | Kennewick et al. |
| 8,150,700 B2 | 4/2012 | Shin et al. |
| 8,155,956 B2 | 4/2012 | Cho et al. |
| 8,156,005 B2 | 4/2012 | Vieri |
| 8,156,060 B2 | 4/2012 | Borzestowski et al. |
| 8,160,877 B1 | 4/2012 | Nucci et al. |
| 8,160,883 B2 | 4/2012 | Lecoeuche |
| 8,165,321 B2 | 4/2012 | Paquier et al. |
| 8,165,886 B1 | 4/2012 | Gagnon et al. |
| 8,166,019 B1 | 4/2012 | Lee et al. |
| 8,166,032 B2 | 4/2012 | Sommer et al. |
| 8,170,790 B2 | 5/2012 | Lee et al. |
| 8,170,966 B1 | 5/2012 | Musat et al. |
| 8,171,137 B1 | 5/2012 | Parks et al. |
| 8,175,872 B2 | 5/2012 | Kristjansson et al. |
| 8,175,876 B2 | 5/2012 | Bou-Ghazale et al. |
| 8,179,370 B1 | 5/2012 | Yamasani et al. |
| 8,188,856 B2 | 5/2012 | Singh et al. |
| 8,190,359 B2 | 5/2012 | Bourne |
| 8,190,596 B2 | 5/2012 | Nambiar et al. |
| 8,194,827 B2 | 6/2012 | Jaiswal et al. |
| 8,195,460 B2 | 6/2012 | Degani et al. |
| 8,195,467 B2 | 6/2012 | Mozer et al. |
| 8,195,468 B2 | 6/2012 | Weider et al. |
| 8,200,489 B1 | 6/2012 | Baggenstoss |
| 8,200,495 B2 | 6/2012 | Braho et al. |
| 8,201,109 B2 | 6/2012 | Van Os et al. |
| 8,204,238 B2 | 6/2012 | Mozer |
| 8,205,788 B1 | 6/2012 | Gazdzinski et al. |
| 8,209,177 B2 | 6/2012 | Sakuma et al. |
| 8,209,183 B1 | 6/2012 | Patel et al. |
| 8,213,911 B2 | 7/2012 | Williams et al. |
| 8,219,115 B1 | 7/2012 | Nelissen |
| 8,219,406 B2 | 7/2012 | Yu et al. |
| 8,219,407 B1 | 7/2012 | Roy et al. |
| 8,219,555 B1 | 7/2012 | Mianji |
| 8,219,608 B2 | 7/2012 | alSafadi et al. |
| 8,224,649 B2 | 7/2012 | Chaudhari et al. |
| 8,224,757 B2 | 7/2012 | Bohle |
| 8,228,299 B1 | 7/2012 | Maloney et al. |
| 8,233,919 B2 | 7/2012 | Haag et al. |
| 8,234,111 B2 | 7/2012 | Lloyd et al. |
| 8,239,206 B1 | 8/2012 | LeBeau et al. |
| 8,239,207 B2 | 8/2012 | Seligman et al. |
| 8,244,545 B2 | 8/2012 | Paek et al. |
| 8,244,712 B2 | 8/2012 | Serlet et al. |
| 8,250,071 B1 | 8/2012 | Killalea et al. |
| 8,254,829 B1 | 8/2012 | Kindred et al. |
| 8,255,216 B2 | 8/2012 | White |
| 8,255,217 B2 | 8/2012 | Stent et al. |
| 8,260,117 B1 | 9/2012 | Xu et al. |
| 8,260,247 B2 | 9/2012 | Lazaridis et al. |
| 8,260,617 B2 | 9/2012 | Dhanakshirur et al. |
| 8,260,619 B1 | 9/2012 | Bansal et al. |
| 8,270,933 B2 | 9/2012 | Riemer et al. |
| 8,271,287 B1 | 9/2012 | Kermani |
| 8,275,621 B2 | 9/2012 | Alewine et al. |
| 8,275,736 B2 | 9/2012 | Guo et al. |
| 8,279,171 B2 | 10/2012 | Hirai et al. |
| 8,280,438 B2 | 10/2012 | Barbera |
| 8,285,546 B2 | 10/2012 | Reich |
| 8,285,551 B2 | 10/2012 | Gazdzinski |
| 8,285,553 B2 | 10/2012 | Gazdzinski |
| 8,285,737 B1 | 10/2012 | Lynn et al. |
| 8,290,274 B2 | 10/2012 | Mori et al. |
| 8,290,777 B1 | 10/2012 | Nguyen et al. |
| 8,290,778 B2 | 10/2012 | Gazdzinski |
| 8,290,781 B2 | 10/2012 | Gazdzinski |
| 8,296,124 B1 | 10/2012 | Holsztynska et al. |
| 8,296,145 B2 | 10/2012 | Clark et al. |
| 8,296,146 B2 | 10/2012 | Gazdzinski |
| 8,296,153 B2 | 10/2012 | Gazdzinski |
| 8,296,380 B1 | 10/2012 | Kelly et al. |
| 8,296,383 B2 | 10/2012 | Lindahl |
| 8,300,776 B2 | 10/2012 | Davies et al. |
| 8,300,801 B2 | 10/2012 | Sweeney et al. |
| 8,301,456 B2 | 10/2012 | Gazdzinski |
| 8,311,189 B2 | 11/2012 | Champlin et al. |
| 8,311,834 B1 | 11/2012 | Gazdzinski |
| 8,311,835 B2 | 11/2012 | Lecoeuche |
| 8,311,838 B2 | 11/2012 | Lindahl et al. |
| 8,312,017 B2 | 11/2012 | Martin et al. |
| 8,321,786 B2 | 11/2012 | Lunati |
| 8,326,627 B2 | 12/2012 | Kennewick et al. |
| 8,332,205 B2 | 12/2012 | Krishnan et al. |
| 8,332,218 B2 | 12/2012 | Cross, Jr. et al. |
| 8,332,224 B2 | 12/2012 | Di Cristo et al. |
| 8,332,748 B1 | 12/2012 | Karam |
| 8,335,689 B2 | 12/2012 | Wittenstein et al. |
| 8,340,975 B1 | 12/2012 | Rosenberger |
| 8,345,665 B2 | 1/2013 | Vieri et al. |
| 8,346,563 B1 | 1/2013 | Hjelm et al. |
| 8,346,757 B1 | 1/2013 | Lamping et al. |
| 8,352,183 B2 | 1/2013 | Thota et al. |
| 8,352,268 B2 | 1/2013 | Naik et al. |
| 8,352,272 B2 | 1/2013 | Rogers et al. |
| 8,355,919 B2 | 1/2013 | Silverman et al. |
| 8,359,234 B2 | 1/2013 | Vieri |
| 8,370,145 B2 | 2/2013 | Endo et al. |
| 8,370,158 B2 | 2/2013 | Gazdzinski |
| 8,371,503 B2 | 2/2013 | Gazdzinski |
| 8,374,871 B2 | 2/2013 | Ehsani et al. |
| 8,375,320 B2 | 2/2013 | Kotler et al. |
| 8,380,504 B1 | 2/2013 | Peden et al. |
| 8,380,507 B2 | 2/2013 | Herman et al. |
| 8,381,107 B2 | 2/2013 | Rottler et al. |
| 8,381,135 B2 | 2/2013 | Hotelling et al. |
| 8,386,485 B2 | 2/2013 | Kerschberg et al. |
| 8,386,926 B1 | 2/2013 | Matsuoka et al. |
| 8,391,844 B2 | 3/2013 | Novick et al. |
| 8,392,717 B2 | 3/2013 | Chai et al. |
| 8,396,295 B2 | 3/2013 | Gao et al. |
| 8,396,714 B2 | 3/2013 | Rogers et al. |
| 8,396,715 B2 | 3/2013 | Odell et al. |
| 8,401,163 B1 | 3/2013 | Kirchhoff et al. |
| 8,406,745 B1 | 3/2013 | Upadhyay et al. |
| 8,407,239 B2 | 3/2013 | Dean et al. |
| 8,423,288 B2 | 4/2013 | Stahl et al. |
| 8,428,758 B2 | 4/2013 | Naik et al. |
| 8,433,572 B2 | 4/2013 | Caskey et al. |
| 8,433,778 B1 | 4/2013 | Shreesha et al. |
| 8,434,133 B2 | 4/2013 | Kulkarni et al. |

(56) References Cited

U.S. PATENT DOCUMENTS

| | | |
|---|---|---|
| 8,442,821 B1 | 5/2013 | Vanhoucke |
| 8,447,612 B2 | 5/2013 | Gazdzinski |
| 8,452,597 B2 | 5/2013 | Bringert et al. |
| 8,452,602 B1 | 5/2013 | Bringert et al. |
| 8,453,058 B1 | 5/2013 | Coccaro et al. |
| 8,457,959 B2 | 6/2013 | Kaiser |
| 8,458,115 B2 | 6/2013 | Cai et al. |
| 8,458,278 B2 | 6/2013 | Christie et al. |
| 8,463,592 B2 | 6/2013 | Lu et al. |
| 8,464,150 B2 | 6/2013 | Davidson et al. |
| 8,473,289 B2 | 6/2013 | Jitkoff et al. |
| 8,473,485 B2 | 6/2013 | Wong et al. |
| 8,477,323 B2 | 7/2013 | Low et al. |
| 8,478,816 B2 | 7/2013 | Parks et al. |
| 8,479,122 B2 | 7/2013 | Hotelling et al. |
| 8,484,027 B1 | 7/2013 | Murphy |
| 8,489,599 B2 | 7/2013 | Bellotti |
| 8,498,670 B2 | 7/2013 | Cha et al. |
| 8,498,857 B2 | 7/2013 | Kopparapu et al. |
| 8,514,197 B2 | 8/2013 | Shahraray et al. |
| 8,515,736 B1 | 8/2013 | Duta |
| 8,515,750 B1 | 8/2013 | Lei et al. |
| 8,521,513 B2 | 8/2013 | Millett et al. |
| 8,521,526 B1 | 8/2013 | Lloyd et al. |
| 8,521,531 B1 | 8/2013 | Kim |
| 8,521,533 B1 | 8/2013 | Ostermann et al. |
| 8,527,276 B1 | 9/2013 | Senior et al. |
| 8,533,266 B2 | 9/2013 | Koulomzin et al. |
| 8,537,033 B2 | 9/2013 | Gueziec |
| 8,539,342 B1 | 9/2013 | Lewis |
| 8,543,375 B2 | 9/2013 | Hong |
| 8,543,397 B1 | 9/2013 | Nguyen |
| 8,543,398 B1 | 9/2013 | Strope et al. |
| 8,560,229 B1 | 10/2013 | Park et al. |
| 8,560,366 B2 | 10/2013 | Mikurak |
| 8,571,528 B1 | 10/2013 | Channakeshava |
| 8,571,851 B1 | 10/2013 | Tickner et al. |
| 8,577,683 B2 | 11/2013 | Dewitt |
| 8,583,416 B2 | 11/2013 | Huang et al. |
| 8,583,511 B2 | 11/2013 | Hendrickson |
| 8,583,638 B2 | 11/2013 | Donelli |
| 8,589,156 B2 | 11/2013 | Burke et al. |
| 8,589,161 B2 | 11/2013 | Kennewick et al. |
| 8,589,374 B2 | 11/2013 | Chaudhari |
| 8,589,869 B2 | 11/2013 | Wolfram |
| 8,589,911 B1 | 11/2013 | Sharkey et al. |
| 8,595,004 B2 | 11/2013 | Koshinaka |
| 8,595,642 B1 | 11/2013 | Lagassey |
| 8,600,743 B2 | 12/2013 | Lindahl et al. |
| 8,600,746 B1 | 12/2013 | Lei et al. |
| 8,600,930 B2 | 12/2013 | Sata et al. |
| 8,606,090 B2 | 12/2013 | Eyer |
| 8,606,568 B1 | 12/2013 | Tickner et al. |
| 8,606,576 B1 | 12/2013 | Barr et al. |
| 8,606,577 B1 | 12/2013 | Stewart et al. |
| 8,615,221 B1 | 12/2013 | Cosenza et al. |
| 8,620,659 B2 | 12/2013 | Di Cristo et al. |
| 8,620,662 B2 | 12/2013 | Bellegarda |
| 8,626,681 B1 | 1/2014 | Jurca et al. |
| 8,630,841 B2 | 1/2014 | Van Caldwell et al. |
| 8,635,073 B2 | 1/2014 | Chang |
| 8,638,363 B2 | 1/2014 | King et al. |
| 8,639,516 B2 | 1/2014 | Lindahl et al. |
| 8,645,128 B1 | 2/2014 | Agiomyrgiannakis |
| 8,645,137 B2 | 2/2014 | Bellegarda et al. |
| 8,645,138 B1 | 2/2014 | Weinstein et al. |
| 8,654,936 B1 | 2/2014 | Eslambolchi et al. |
| 8,655,646 B2 | 2/2014 | Lee et al. |
| 8,655,901 B1 | 2/2014 | Li et al. |
| 8,660,843 B2 | 2/2014 | Falcon et al. |
| 8,660,849 B2 | 2/2014 | Gruber et al. |
| 8,660,924 B2 | 2/2014 | Hoch et al. |
| 8,660,970 B1 | 2/2014 | Fiedorowicz |
| 8,661,112 B2 | 2/2014 | Creamer et al. |
| 8,661,340 B2 | 2/2014 | Goldsmith et al. |
| 8,670,979 B2 | 3/2014 | Gruber et al. |
| 8,675,084 B2 | 3/2014 | Bolton et al. |
| 8,676,273 B1 | 3/2014 | Fujisaki |
| 8,676,583 B2 | 3/2014 | Gupta et al. |
| 8,676,904 B2 | 3/2014 | Lindahl |
| 8,677,377 B2 | 3/2014 | Cheyer et al. |
| 8,681,950 B2 | 3/2014 | Vlack et al. |
| 8,682,667 B2 | 3/2014 | Haughay |
| 8,687,777 B1 | 4/2014 | Lavian et al. |
| 8,688,446 B2 | 4/2014 | Yanagihara |
| 8,688,453 B2 | 4/2014 | Joshi et al. |
| 8,689,135 B2 | 4/2014 | Portele et al. |
| 8,694,322 B2 | 4/2014 | Snitkovskiy et al. |
| 8,695,074 B2 | 4/2014 | Saraf et al. |
| 8,696,364 B2 | 4/2014 | Cohen |
| 8,706,472 B2 | 4/2014 | Ramerth et al. |
| 8,706,474 B2 | 4/2014 | Blume et al. |
| 8,706,503 B2 | 4/2014 | Cheyer et al. |
| 8,707,195 B2 | 4/2014 | Fleizach et al. |
| 8,712,778 B1 | 4/2014 | Thenthiruperai |
| 8,713,119 B2 | 4/2014 | Lindahl et al. |
| 8,713,418 B2 | 4/2014 | King et al. |
| 8,719,006 B2 | 5/2014 | Bellegarda |
| 8,719,014 B2 | 5/2014 | Wagner |
| 8,719,039 B1 | 5/2014 | Sharifi |
| 8,731,610 B2 | 5/2014 | Appaji |
| 8,731,912 B1 | 5/2014 | Tickner et al. |
| 8,731,942 B2 | 5/2014 | Cheyer et al. |
| 8,739,208 B2 | 5/2014 | Davis et al. |
| 8,744,852 B1 | 6/2014 | Seymour et al. |
| 8,751,971 B2 | 6/2014 | Fleizach et al. |
| 8,760,537 B2 | 6/2014 | Johnson et al. |
| 8,762,145 B2 | 6/2014 | Ouchi et al. |
| 8,762,156 B2 | 6/2014 | Chen |
| 8,762,469 B2 | 6/2014 | Lindahl |
| 8,768,693 B2 | 7/2014 | Somekh et al. |
| 8,768,702 B2 | 7/2014 | Mason et al. |
| 8,775,154 B2 | 7/2014 | Clinchant et al. |
| 8,775,177 B1 | 7/2014 | Heigold et al. |
| 8,775,341 B1 | 7/2014 | Commons |
| 8,775,931 B2 | 7/2014 | Fux et al. |
| 8,781,456 B2 | 7/2014 | Prociw |
| 8,781,841 B1 | 7/2014 | Wang |
| 8,793,301 B2 | 7/2014 | Wegenkittl et al. |
| 8,798,255 B2 | 8/2014 | Lubowich et al. |
| 8,798,995 B1 | 8/2014 | Edara |
| 8,799,000 B2 | 8/2014 | Guzzoni et al. |
| 8,805,690 B1 | 8/2014 | Lebeau et al. |
| 8,812,299 B1 | 8/2014 | Su |
| 8,812,302 B2 | 8/2014 | Xiao et al. |
| 8,812,321 B2 | 8/2014 | Gilbert et al. |
| 8,823,507 B1 | 9/2014 | Touloumtzis |
| 8,823,793 B2 | 9/2014 | Clayton et al. |
| 8,831,947 B2 | 9/2014 | Wasserblat et al. |
| 8,831,949 B1 | 9/2014 | Smith et al. |
| 8,838,457 B2 | 9/2014 | Cerra et al. |
| 8,855,915 B2 | 10/2014 | Furuhata et al. |
| 8,861,925 B1 | 10/2014 | Ohme |
| 8,862,252 B2 | 10/2014 | Rottler et al. |
| 8,868,111 B1 | 10/2014 | Kahn et al. |
| 8,868,409 B1 | 10/2014 | Mengibar et al. |
| 8,868,469 B2 | 10/2014 | Xu et al. |
| 8,868,529 B2 | 10/2014 | Lerenc |
| 8,880,405 B2 | 11/2014 | Cerra et al. |
| 8,886,534 B2 | 11/2014 | Nakano et al. |
| 8,886,540 B2 | 11/2014 | Cerra et al. |
| 8,886,541 B2 | 11/2014 | Friedlander |
| 8,892,446 B2 | 11/2014 | Cheyer et al. |
| 8,893,023 B2 | 11/2014 | Perry et al. |
| 8,897,822 B2 | 11/2014 | Martin |
| 8,898,064 B1 | 11/2014 | Thomas et al. |
| 8,898,568 B2 | 11/2014 | Bull et al. |
| 8,903,716 B2 | 12/2014 | Chen et al. |
| 8,909,693 B2 | 12/2014 | Frissora et al. |
| 8,918,321 B2 | 12/2014 | Czahor |
| 8,922,485 B1 | 12/2014 | Lloyd |
| 8,930,176 B2 | 1/2015 | Li et al. |
| 8,930,191 B2 | 1/2015 | Gruber et al. |
| 8,938,394 B1 | 1/2015 | Faaborg et al. |

(56) References Cited

U.S. PATENT DOCUMENTS

| | | |
|---|---|---|
| 8,938,450 B2 | 1/2015 | Spivack et al. |
| 8,938,688 B2 | 1/2015 | Bradford et al. |
| 8,942,986 B2 | 1/2015 | Cheyer et al. |
| 8,943,423 B2 | 1/2015 | Merrill et al. |
| 8,964,947 B1 | 2/2015 | Noolu et al. |
| 8,972,240 B2 | 3/2015 | Brockett et al. |
| 8,972,432 B2 | 3/2015 | Shaw et al. |
| 8,972,878 B2 | 3/2015 | Mohler et al. |
| 8,976,063 B1 | 3/2015 | Hawkins et al. |
| 8,976,108 B2 | 3/2015 | Hawkins et al. |
| 8,977,255 B2 | 3/2015 | Freeman et al. |
| 8,983,383 B1 | 3/2015 | Haskin |
| 8,983,846 B2 | 3/2015 | Di Profio et al. |
| 8,984,098 B1 | 3/2015 | Tomkins et al. |
| 8,989,713 B2 | 3/2015 | Doulton |
| 8,990,235 B2 | 3/2015 | King et al. |
| 8,994,660 B2 | 3/2015 | Neels et al. |
| 8,995,972 B1 | 3/2015 | Cronin |
| 8,996,350 B1 | 3/2015 | Dub et al. |
| 8,996,376 B2 | 3/2015 | Fleizach et al. |
| 8,996,381 B2 | 3/2015 | Mozer et al. |
| 8,996,639 B1 | 3/2015 | Faaborg et al. |
| 9,002,714 B2 | 4/2015 | Kim et al. |
| 9,009,046 B1 | 4/2015 | Stewart |
| 9,015,036 B2 | 4/2015 | Karov Zangvil et al. |
| 9,020,804 B2 | 4/2015 | Barbaiani et al. |
| 9,026,425 B2 | 5/2015 | Nikoulina et al. |
| 9,026,426 B2 | 5/2015 | Wu et al. |
| 9,031,834 B2 | 5/2015 | Coorman et al. |
| 9,031,970 B1 | 5/2015 | Das et al. |
| 9,037,967 B1 | 5/2015 | Al-jefri et al. |
| 9,043,208 B2 | 5/2015 | Koch et al. |
| 9,043,211 B2 | 5/2015 | Haiut et al. |
| 9,046,932 B2 | 6/2015 | Medlock et al. |
| 9,049,255 B2 | 6/2015 | Macfarlane et al. |
| 9,049,295 B1 | 6/2015 | Cooper et al. |
| 9,053,706 B2 | 6/2015 | Jitkoff et al. |
| 9,058,105 B2 | 6/2015 | Drory et al. |
| 9,058,332 B1 | 6/2015 | Darby et al. |
| 9,058,811 B2 | 6/2015 | Wang et al. |
| 9,063,979 B2 | 6/2015 | Chiu et al. |
| 9,064,495 B1 | 6/2015 | Torok et al. |
| 9,065,660 B2 | 6/2015 | Ellis et al. |
| 9,070,247 B2 | 6/2015 | Kuhn et al. |
| 9,070,366 B1 | 6/2015 | Mathias et al. |
| 9,071,701 B2 | 6/2015 | Donaldson et al. |
| 9,075,435 B1 | 7/2015 | Noble et al. |
| 9,075,824 B2 | 7/2015 | Gordo et al. |
| 9,076,448 B2 | 7/2015 | Bennett et al. |
| 9,076,450 B1 | 7/2015 | Sadek et al. |
| 9,081,411 B2 | 7/2015 | Kalns et al. |
| 9,081,482 B1 | 7/2015 | Zhai et al. |
| 9,082,402 B2 | 7/2015 | Yadgar et al. |
| 9,083,581 B1 | 7/2015 | Addepalli et al. |
| 9,094,636 B1 | 7/2015 | Sanders et al. |
| 9,098,467 B1 | 8/2015 | Blanksteen et al. |
| 9,101,279 B2 | 8/2015 | Ritchey et al. |
| 9,112,984 B2 | 8/2015 | Sejnoha et al. |
| 9,117,212 B2 | 8/2015 | Sheets et al. |
| 9,117,447 B2 | 8/2015 | Gruber et al. |
| 9,123,338 B1 | 9/2015 | Sanders et al. |
| 9,143,907 B1 | 9/2015 | Caldwell et al. |
| 9,159,319 B1 | 10/2015 | Hoffmeister |
| 9,164,983 B2 | 10/2015 | Liu et al. |
| 9,171,541 B2 | 10/2015 | Kennewick et al. |
| 9,171,546 B1 | 10/2015 | Pike |
| 9,183,845 B1 | 11/2015 | Gopalakrishnan et al. |
| 9,190,062 B2 | 11/2015 | Haughay |
| 9,208,153 B1 | 12/2015 | Zaveri et al. |
| 9,213,754 B1 | 12/2015 | Zhan et al. |
| 9,218,122 B2 | 12/2015 | Thoma et al. |
| 9,218,809 B2 | 12/2015 | Bellegard et al. |
| 9,218,819 B1 | 12/2015 | Stekkelpa et al. |
| 9,223,537 B2 | 12/2015 | Brown et al. |
| 9,230,561 B2 | 1/2016 | Ostermann et al. |
| 9,232,293 B1 | 1/2016 | Hanson |
| 9,236,047 B2 | 1/2016 | Rasmussen |
| 9,241,073 B1 | 1/2016 | Rensburg et al. |
| 9,245,151 B2 | 1/2016 | LeBeau et al. |
| 9,251,713 B1 | 2/2016 | Giovanniello et al. |
| 9,251,787 B1 | 2/2016 | Hart et al. |
| 9,255,812 B2 | 2/2016 | Maeoka et al. |
| 9,258,604 B1 | 2/2016 | Bilobrov et al. |
| 9,262,412 B2 | 2/2016 | Yang et al. |
| 9,262,612 B2 | 2/2016 | Cheyer |
| 9,263,058 B2 | 2/2016 | Huang et al. |
| 9,280,535 B2 | 3/2016 | Varma et al. |
| 9,282,211 B2 | 3/2016 | Osawa |
| 9,286,910 B1 | 3/2016 | Li et al. |
| 9,292,487 B1 | 3/2016 | Weber |
| 9,292,489 B1 | 3/2016 | Sak et al. |
| 9,292,492 B2 | 3/2016 | Sarikaya et al. |
| 9,299,344 B2 | 3/2016 | Braho et al. |
| 9,300,718 B2 | 3/2016 | Khanna |
| 9,301,256 B2 | 3/2016 | Mohan et al. |
| 9,305,543 B2 | 4/2016 | Fleizach et al. |
| 9,305,548 B2 | 4/2016 | Kennewick et al. |
| 9,311,308 B2 | 4/2016 | Sankarasubramaniam et al. |
| 9,311,912 B1 | 4/2016 | Swietlinski et al. |
| 9,313,317 B1 | 4/2016 | LeBeau et al. |
| 9,318,108 B2 | 4/2016 | Gruber et al. |
| 9,325,809 B1 | 4/2016 | Barros et al. |
| 9,325,842 B1 | 4/2016 | Siddiqi et al. |
| 9,330,659 B2 | 5/2016 | Ju et al. |
| 9,330,668 B2 | 5/2016 | Nanavati et al. |
| 9,330,720 B2 | 5/2016 | Lee |
| 9,335,983 B2 | 5/2016 | Breiner et al. |
| 9,338,493 B2 | 5/2016 | Van Os et al. |
| 9,342,829 B2 | 5/2016 | Zhou et al. |
| 9,342,930 B1 | 5/2016 | Kraft et al. |
| 9,349,368 B1 | 5/2016 | Lebeau et al. |
| 9,355,472 B2 | 5/2016 | Kocienda et al. |
| 9,361,084 B1 | 6/2016 | Costa |
| 9,367,541 B1 | 6/2016 | Servan et al. |
| 9,368,114 B2 | 6/2016 | Larson et al. |
| 9,377,871 B2 | 6/2016 | Waddell et al. |
| 9,378,456 B2 | 6/2016 | White et al. |
| 9,378,740 B1 | 6/2016 | Rosen et al. |
| 9,380,155 B1 | 6/2016 | Reding et al. |
| 9,383,827 B1 | 7/2016 | Faaborg et al. |
| 9,384,185 B2 | 7/2016 | Medlock et al. |
| 9,390,726 B1 | 7/2016 | Smus et al. |
| 9,396,722 B2 | 7/2016 | Chung et al. |
| 9,401,140 B1 | 7/2016 | Weber et al. |
| 9,401,147 B2 | 7/2016 | Jitkoff et al. |
| 9,406,224 B1 | 8/2016 | Sanders et al. |
| 9,406,299 B2 | 8/2016 | Gollan et al. |
| 9,408,182 B1 | 8/2016 | Hurley et al. |
| 9,412,392 B2 | 8/2016 | Lindahl |
| 9,418,650 B2 | 8/2016 | Bharadwaj et al. |
| 9,423,266 B2 | 8/2016 | Clark et al. |
| 9,424,246 B2 | 8/2016 | Spencer et al. |
| 9,424,840 B1 | 8/2016 | Hart et al. |
| 9,431,021 B1 | 8/2016 | Scalise et al. |
| 9,432,499 B2 | 8/2016 | Hajdu et al. |
| 9,436,918 B2 | 9/2016 | Pantel et al. |
| 9,437,186 B1 | 9/2016 | Liu et al. |
| 9,437,189 B2 | 9/2016 | Epstein et al. |
| 9,442,687 B2 | 9/2016 | Park et al. |
| 9,443,527 B1 | 9/2016 | Watanabe et al. |
| 9,454,599 B2 | 9/2016 | Golden et al. |
| 9,454,957 B1 | 9/2016 | Mathias et al. |
| 9,465,798 B2 | 10/2016 | Lin |
| 9,465,833 B2 | 10/2016 | Aravamudan et al. |
| 9,465,864 B2 | 10/2016 | Hu et al. |
| 9,466,027 B2 | 10/2016 | Byrne et al. |
| 9,466,294 B1 | 10/2016 | Tunstall-Pedoe et al. |
| 9,471,566 B1 | 10/2016 | Zhang et al. |
| 9,472,196 B1 | 10/2016 | Wang et al. |
| 9,483,388 B2 | 11/2016 | Sankaranarasimhan et al. |
| 9,483,461 B2 | 11/2016 | Fleizach et al. |
| 9,483,529 B1 | 11/2016 | Pasoi et al. |
| 9,484,021 B1 | 11/2016 | Mairesse et al. |
| 9,485,286 B1 | 11/2016 | Sellier et al. |

(56) References Cited

U.S. PATENT DOCUMENTS

| | | |
|---|---|---|
| 9,495,129 B2 | 11/2016 | Fleizach et al. |
| 9,501,741 B2 | 11/2016 | Cheyer et al. |
| 9,502,025 B2 | 11/2016 | Kennewick et al. |
| 9,508,028 B2 | 11/2016 | Bannister et al. |
| 9,510,044 B1 | 11/2016 | Pereira et al. |
| 9,514,470 B2 | 12/2016 | Topatan et al. |
| 9,516,014 B2 | 12/2016 | Zafiroglu et al. |
| 9,519,453 B2 | 12/2016 | Perkuhn et al. |
| 9,524,355 B2 | 12/2016 | Forbes et al. |
| 9,529,500 B1 | 12/2016 | Gauci et al. |
| 9,531,862 B1 | 12/2016 | Vadodaria |
| 9,535,906 B2 | 1/2017 | Lee et al. |
| 9,536,527 B1 | 1/2017 | Carlson |
| 9,536,544 B2 | 1/2017 | Osterman et al. |
| 9,547,647 B2 | 1/2017 | Badaskar |
| 9,548,050 B2 | 1/2017 | Gruber et al. |
| 9,548,979 B1 | 1/2017 | Johnson et al. |
| 9,569,549 B1 | 2/2017 | Jenkins et al. |
| 9,575,964 B2 | 2/2017 | Yadgar et al. |
| 9,576,575 B2 | 2/2017 | Heide |
| 9,578,173 B2 | 2/2017 | Sanghavi et al. |
| 9,607,612 B2 | 3/2017 | Deleeuw |
| 9,612,999 B2 | 4/2017 | Prakah-Asante et al. |
| 9,619,200 B2 | 4/2017 | Chakladar et al. |
| 9,620,113 B2 | 4/2017 | Kennewick et al. |
| 9,620,126 B2 | 4/2017 | Chiba |
| 9,626,955 B2 | 4/2017 | Fleizach et al. |
| 9,633,004 B2 | 4/2017 | Giuli et al. |
| 9,633,191 B2 | 4/2017 | Fleizach et al. |
| 9,633,660 B2 | 4/2017 | Haughay |
| 9,633,674 B2 | 4/2017 | Sinha |
| 9,646,313 B2 | 5/2017 | Kim et al. |
| 9,648,107 B1 | 5/2017 | Penilla et al. |
| 9,652,453 B2 | 5/2017 | Mathur et al. |
| 9,658,746 B2 | 5/2017 | Cohn et al. |
| 9,659,002 B2 | 5/2017 | Medlock et al. |
| 9,659,298 B2 | 5/2017 | Lynch et al. |
| 9,665,567 B2 | 5/2017 | Li et al. |
| 9,665,662 B1 | 5/2017 | Gautam et al. |
| 9,668,121 B2 | 5/2017 | Naik et al. |
| 9,672,725 B2 | 6/2017 | Dotan-Cohen et al. |
| 9,672,822 B2 | 6/2017 | Brown et al. |
| 9,690,542 B2 | 6/2017 | Reddy et al. |
| 9,691,161 B1 | 6/2017 | Yalniz et al. |
| 9,691,378 B1 | 6/2017 | Meyers et al. |
| 9,697,016 B2 | 7/2017 | Jacob |
| 9,697,822 B1 | 7/2017 | Naik et al. |
| 9,697,827 B1 | 7/2017 | Lilly et al. |
| 9,698,999 B2 | 7/2017 | Mutagi |
| 9,720,907 B2 | 8/2017 | Bangalore et al. |
| 9,721,566 B2 | 8/2017 | Newendorp et al. |
| 9,721,570 B1 | 8/2017 | Beal et al. |
| 9,723,130 B2 | 8/2017 | Rand |
| 9,734,817 B1 | 8/2017 | Putrycz |
| 9,734,839 B1 | 8/2017 | Adams |
| 9,741,343 B1 | 8/2017 | Miles et al. |
| 9,747,083 B1 | 8/2017 | Roman et al. |
| 9,747,093 B2 | 8/2017 | Latino et al. |
| 9,755,605 B1 | 9/2017 | Li et al. |
| 9,760,566 B2 | 9/2017 | Heck et al. |
| 9,767,710 B2 | 9/2017 | Lee et al. |
| 9,772,994 B2 | 9/2017 | Karov et al. |
| 9,786,271 B1 | 10/2017 | Combs et al. |
| 9,792,907 B2 | 10/2017 | Bocklet et al. |
| 9,798,719 B2 | 10/2017 | Karov et al. |
| 9,812,128 B2 | 11/2017 | Mixter et al. |
| 9,813,882 B1 | 11/2017 | Masterman |
| 9,818,400 B2 | 11/2017 | Paulik et al. |
| 9,823,811 B2 | 11/2017 | Brown et al. |
| 9,823,828 B2 | 11/2017 | Zambetti et al. |
| 9,824,379 B2 | 11/2017 | Khandelwal et al. |
| 9,824,691 B1 | 11/2017 | Montero et al. |
| 9,830,044 B2 | 11/2017 | Brown et al. |
| 9,830,449 B1 | 11/2017 | Wagner |
| 9,842,168 B2 | 12/2017 | Heck et al. |
| 9,842,584 B1 | 12/2017 | Hart et al. |
| 9,846,685 B2 | 12/2017 | Li |
| 9,846,836 B2 | 12/2017 | Gao et al. |
| 9,858,925 B2 | 1/2018 | Gruber et al. |
| 9,858,927 B2 | 1/2018 | Williams et al. |
| 9,886,953 B2 | 2/2018 | Lemay et al. |
| 9,887,949 B2 | 2/2018 | Shepherd et al. |
| 9,911,415 B2 | 3/2018 | Vanblon et al. |
| 9,916,839 B1 | 3/2018 | Scalise et al. |
| 9,922,642 B2 | 3/2018 | Pitschel et al. |
| 9,934,777 B1 | 4/2018 | Joseph et al. |
| 9,934,785 B1 | 4/2018 | Hulaud |
| 9,946,862 B2 | 4/2018 | Yun et al. |
| 9,948,728 B2 | 4/2018 | Linn et al. |
| 9,959,129 B2 | 5/2018 | Kannan et al. |
| 9,959,506 B1 | 5/2018 | Karppanen |
| 9,966,065 B2 | 5/2018 | Gruber et al. |
| 9,966,068 B2 | 5/2018 | Cash et al. |
| 9,967,381 B1 | 5/2018 | Kashimba et al. |
| 9,971,495 B2 | 5/2018 | Shetty et al. |
| 9,984,686 B1 | 5/2018 | Mutagi et al. |
| 9,986,419 B2 | 5/2018 | Naik et al. |
| 9,990,129 B2 | 6/2018 | Yang et al. |
| 9,990,176 B1 | 6/2018 | Gray |
| 9,996,626 B1 | 6/2018 | Bailey et al. |
| 9,998,552 B1 | 6/2018 | Ledet |
| 10,001,817 B2 | 6/2018 | Zambetti et al. |
| 10,013,416 B1 | 7/2018 | Bhardwaj et al. |
| 10,013,654 B1 | 7/2018 | Levy et al. |
| 10,013,979 B1 | 7/2018 | Roma et al. |
| 10,019,436 B2 | 7/2018 | Huang |
| 10,027,662 B1 | 7/2018 | Mutagi et al. |
| 10,032,451 B1 | 7/2018 | Mamkina et al. |
| 10,032,455 B2 | 7/2018 | Newman et al. |
| 10,037,758 B2 | 7/2018 | Jing et al. |
| 10,043,516 B2 | 8/2018 | Saddler et al. |
| 10,049,161 B2 | 8/2018 | Kaneko |
| 10,049,663 B2 | 8/2018 | Orr et al. |
| 10,049,668 B2 | 8/2018 | Huang et al. |
| 10,055,390 B2 | 8/2018 | Sharifi et al. |
| 10,055,681 B2 | 8/2018 | Brown et al. |
| 10,074,360 B2 | 9/2018 | Kim |
| 10,074,371 B1 | 9/2018 | Wang et al. |
| 10,078,487 B2 | 9/2018 | Gruber et al. |
| 10,083,213 B1 | 9/2018 | Podgorny et al. |
| 10,083,690 B2 | 9/2018 | Giuli et al. |
| 10,088,972 B2 | 10/2018 | Brown et al. |
| 10,089,072 B2 | 10/2018 | Piersol et al. |
| 10,096,319 B1 | 10/2018 | Jin et al. |
| 10,101,887 B2 | 10/2018 | Bernstein et al. |
| 10,102,359 B2 | 10/2018 | Cheyer |
| 10,115,055 B2 | 10/2018 | Weiss et al. |
| 10,127,901 B2 | 11/2018 | Zhao et al. |
| 10,127,908 B1 | 11/2018 | Deller et al. |
| 10,134,425 B1 | 11/2018 | Johnson, Jr. |
| 10,135,965 B2 | 11/2018 | Woolsey et al. |
| 10,146,923 B2 | 12/2018 | Pitkänen et al. |
| 10,169,329 B2 | 1/2019 | Futrell et al. |
| 10,170,123 B2 | 1/2019 | Orr et al. |
| 10,170,135 B1 | 1/2019 | Pearce et al. |
| 10,175,879 B2 | 1/2019 | Missig et al. |
| 10,176,167 B2 | 1/2019 | Evermann |
| 10,176,802 B1 | 1/2019 | Ladhak et al. |
| 10,176,808 B1 | 1/2019 | Lovitt et al. |
| 10,178,301 B1 | 1/2019 | Welbourne et al. |
| 10,185,542 B2 | 1/2019 | Carson et al. |
| 10,186,254 B2 | 1/2019 | Williams et al. |
| 10,186,266 B1 | 1/2019 | Devaraj et al. |
| 10,191,627 B2 | 1/2019 | Cieplinski et al. |
| 10,191,646 B2 | 1/2019 | Zambetti et al. |
| 10,191,718 B2 | 1/2019 | Rhee et al. |
| 10,192,546 B1 | 1/2019 | Piersol et al. |
| 10,192,552 B2 | 1/2019 | Raitio et al. |
| 10,192,557 B2 | 1/2019 | Lee et al. |
| 10,199,051 B2 | 2/2019 | Binder et al. |
| 10,200,824 B2 | 2/2019 | Gross et al. |
| 10,210,860 B1 | 2/2019 | Ward et al. |
| 10,216,351 B2 | 2/2019 | Yang |
| 10,216,832 B2 | 2/2019 | Bangalore et al. |

(56) References Cited

U.S. PATENT DOCUMENTS

| | | |
|---|---|---|
| 10,223,066 B2 | 3/2019 | Martel et al. |
| 10,225,711 B2 | 3/2019 | Parks et al. |
| 10,229,356 B1 | 3/2019 | Liu et al. |
| 10,237,711 B2 | 3/2019 | Linn et al. |
| 10,242,501 B1 | 3/2019 | Pusch et al. |
| 10,248,308 B2 | 4/2019 | Karunamuni et al. |
| 10,249,300 B2 | 4/2019 | Booker et al. |
| 10,255,922 B1 | 4/2019 | Sharifi et al. |
| 10,261,830 B2 | 4/2019 | Gupta et al. |
| 10,269,345 B2 | 4/2019 | Castillo Sanchez et al. |
| 10,275,513 B1 | 4/2019 | Cowan et al. |
| 10,289,205 B1 | 5/2019 | Sumter et al. |
| 10,296,160 B2 | 5/2019 | Shah et al. |
| 10,297,253 B2 | 5/2019 | Walker, II et al. |
| 10,303,772 B2 | 5/2019 | Hosn et al. |
| 10,304,463 B2 | 5/2019 | Mixter et al. |
| 10,311,482 B2 | 6/2019 | Baldwin |
| 10,311,871 B2 | 6/2019 | Newendorp et al. |
| 10,325,598 B2 | 6/2019 | Basye et al. |
| 10,332,513 B1 | 6/2019 | D'Souza et al. |
| 10,332,518 B2 | 6/2019 | Garg et al. |
| 10,339,224 B2 | 7/2019 | Fukuoka |
| 10,346,540 B2 | 7/2019 | Karov et al. |
| 10,346,753 B2 | 7/2019 | Soon-Shiong et al. |
| 10,346,878 B1 | 7/2019 | Ostermann et al. |
| 10,353,975 B2 | 7/2019 | Oh et al. |
| 10,354,168 B2 | 7/2019 | Bluche |
| 10,354,677 B2 | 7/2019 | Mohamed et al. |
| 10,356,243 B2 | 7/2019 | Sanghavi et al. |
| 10,360,716 B1 | 7/2019 | Van Der Meulen et al. |
| 10,365,887 B1 | 7/2019 | Mulherkar |
| 10,366,160 B2 | 7/2019 | Castelli et al. |
| 10,366,692 B1 | 7/2019 | Adams et al. |
| 10,372,814 B2 | 8/2019 | Gliozzo et al. |
| 10,372,881 B2 | 8/2019 | Ingrassia, Jr. et al. |
| 10,389,876 B2 | 8/2019 | Engelke et al. |
| 10,402,066 B2 | 9/2019 | Kawana |
| 10,403,283 B1 | 9/2019 | Schramm et al. |
| 10,409,454 B2 | 9/2019 | Kagan et al. |
| 10,410,637 B2 | 9/2019 | Paulik et al. |
| 10,417,037 B2 | 9/2019 | Gruber et al. |
| 10,417,344 B2 | 9/2019 | Futrell et al. |
| 10,417,554 B2 | 9/2019 | Scheffler |
| 10,437,928 B2 | 10/2019 | Bhaya et al. |
| 10,446,142 B2 | 10/2019 | Lim et al. |
| 10,453,117 B1 | 10/2019 | Reavely et al. |
| 10,469,665 B1 | 11/2019 | Bell et al. |
| 10,474,961 B2 | 11/2019 | Brigham et al. |
| 10,482,875 B2 | 11/2019 | Henry |
| 10,496,364 B2 | 12/2019 | Yao |
| 10,496,705 B1 | 12/2019 | Irani et al. |
| 10,497,365 B2 | 12/2019 | Gruber et al. |
| 10,504,518 B1 | 12/2019 | Irani et al. |
| 10,512,750 B1 | 12/2019 | Lewin et al. |
| 10,515,133 B1 | 12/2019 | Sharifi |
| 10,521,946 B1 | 12/2019 | Roche et al. |
| 10,528,386 B2 | 1/2020 | Yu |
| 10,540,976 B2 | 1/2020 | Van Os et al. |
| 10,558,893 B2 | 2/2020 | Bluche |
| 10,566,007 B2 | 2/2020 | Fawaz et al. |
| 10,568,032 B2 | 2/2020 | Freeman et al. |
| 10,580,409 B2 | 3/2020 | Walker, II et al. |
| 10,582,355 B1 | 3/2020 | Lebeau et al. |
| 10,585,957 B2 | 3/2020 | Heck et al. |
| 10,586,369 B1 | 3/2020 | Roche et al. |
| 10,599,449 B1 | 3/2020 | Chatzipanagiotis et al. |
| 10,629,186 B1 | 4/2020 | Slifka |
| 10,630,795 B2 | 4/2020 | Aoki et al. |
| 10,642,934 B2 | 5/2020 | Heck et al. |
| 10,659,851 B2 | 5/2020 | Lister et al. |
| 10,671,428 B2 | 6/2020 | Zeitlin |
| 10,706,841 B2 | 7/2020 | Gruber et al. |
| 10,721,190 B2 | 7/2020 | Zhao et al. |
| 10,732,708 B1 | 8/2020 | Roche et al. |
| 10,748,546 B2 | 8/2020 | Kim et al. |
| 10,755,032 B2 | 8/2020 | Douglas et al. |
| 10,757,499 B1 | 8/2020 | Vautrin et al. |
| 10,769,385 B2 | 9/2020 | Evermann |
| 10,783,151 B1 | 9/2020 | Bushkin et al. |
| 10,783,883 B2 | 9/2020 | Mixter et al. |
| 10,789,945 B2 | 9/2020 | Acero et al. |
| 10,791,176 B2 | 9/2020 | Phipps et al. |
| 10,795,944 B2 | 10/2020 | Brown et al. |
| 10,796,100 B2 | 10/2020 | Bangalore et al. |
| 10,803,255 B2 | 10/2020 | Dubyak et al. |
| 10,811,013 B1 | 10/2020 | Secker-Walker et al. |
| 10,842,968 B1 | 11/2020 | Kahn et al. |
| 10,846,618 B2 | 11/2020 | Ravi et al. |
| 10,860,629 B1 | 12/2020 | Gangadharaiah et al. |
| 10,880,668 B1 | 12/2020 | Robinson et al. |
| 10,885,277 B2 | 1/2021 | Ravi et al. |
| 10,909,459 B2 | 2/2021 | Tsatsin et al. |
| 10,944,859 B2 | 3/2021 | Weinstein et al. |
| 10,957,311 B2 | 3/2021 | Solomon et al. |
| 10,974,139 B2 | 4/2021 | Feder et al. |
| 10,978,056 B1 | 4/2021 | Challa et al. |
| 10,978,090 B2 | 4/2021 | Binder et al. |
| 10,983,971 B2 | 4/2021 | Carvalho et al. |
| 11,037,565 B2 | 6/2021 | Kudurshian et al. |
| 11,061,543 B1 | 7/2021 | Blatz et al. |
| 11,076,039 B2 | 7/2021 | Weinstein et al. |
| 2005/0075875 A1 | 4/2005 | Shozakai et al. |
| 2006/0184370 A1 | 8/2006 | Kwak et al. |
| 2007/0055529 A1 | 3/2007 | Kanevsky et al. |
| 2008/0048908 A1 | 2/2008 | Sato |
| 2008/0189110 A1 | 8/2008 | Freeman et al. |
| 2009/0234655 A1 | 9/2009 | Kwon |
| 2009/0252305 A1 | 10/2009 | Rohde et al. |
| 2010/0127854 A1 | 5/2010 | Helvick et al. |
| 2010/0332235 A1 | 12/2010 | David |
| 2011/0002487 A1 | 1/2011 | Panther et al. |
| 2011/0004475 A1 | 1/2011 | Bellegarda |
| 2011/0004642 A1 | 1/2011 | Schnitzer |
| 2011/0006876 A1 | 1/2011 | Moberg et al. |
| 2011/0009107 A1 | 1/2011 | Guba et al. |
| 2011/0010178 A1 | 1/2011 | Lee et al. |
| 2011/0010644 A1 | 1/2011 | Merrill et al. |
| 2011/0015928 A1 | 1/2011 | Odell et al. |
| 2011/0016150 A1 | 1/2011 | Engstrom et al. |
| 2011/0016421 A1 | 1/2011 | Krupka et al. |
| 2011/0018695 A1 | 1/2011 | Bells et al. |
| 2011/0018870 A1 | 1/2011 | Shuster |
| 2011/0021211 A1 | 1/2011 | Ohki |
| 2011/0021213 A1 | 1/2011 | Carr |
| 2011/0022292 A1 | 1/2011 | Shen et al. |
| 2011/0022388 A1 | 1/2011 | Wu et al. |
| 2011/0022393 A1 | 1/2011 | Wäller et al. |
| 2011/0022394 A1 | 1/2011 | Wide |
| 2011/0022472 A1 | 1/2011 | Zon |
| 2011/0022952 A1 | 1/2011 | Wu et al. |
| 2011/0028083 A1 | 2/2011 | Soitis |
| 2011/0029616 A1 | 2/2011 | Wang et al. |
| 2011/0029637 A1 | 2/2011 | Morse |
| 2011/0030067 A1 | 2/2011 | Wilson |
| 2011/0033064 A1 | 2/2011 | Johnson et al. |
| 2011/0034183 A1 | 2/2011 | Haag et al. |
| 2011/0035144 A1 | 2/2011 | Okamoto et al. |
| 2011/0035434 A1 | 2/2011 | Lockwood |
| 2011/0038489 A1 | 2/2011 | Visser et al. |
| 2011/0039584 A1 | 2/2011 | Merrett |
| 2011/0040707 A1 | 2/2011 | Theisen et al. |
| 2011/0045841 A1 | 2/2011 | Kuhlke et al. |
| 2011/0047072 A1 | 2/2011 | Ciurea |
| 2011/0047149 A1 | 2/2011 | Vaananen |
| 2011/0047161 A1 | 2/2011 | Myaeng et al. |
| 2011/0047246 A1 | 2/2011 | Frissora et al. |
| 2011/0047266 A1 | 2/2011 | Yu et al. |
| 2011/0047605 A1 | 2/2011 | Sontag et al. |
| 2011/0050591 A1 | 3/2011 | Kim et al. |
| 2011/0050592 A1 | 3/2011 | Kim et al. |
| 2011/0054647 A1 | 3/2011 | Chipchase |
| 2011/0054894 A1 | 3/2011 | Phillips et al. |
| 2011/0054901 A1 | 3/2011 | Qin et al. |
| 2011/0055244 A1 | 3/2011 | Donelli |

(56) References Cited

U.S. PATENT DOCUMENTS

| | | |
|---|---|---|
| 2011/0055256 A1 | 3/2011 | Phillips et al. |
| 2011/0060584 A1 | 3/2011 | Ferrucci et al. |
| 2011/0060587 A1 | 3/2011 | Phillips et al. |
| 2011/0060589 A1 | 3/2011 | Weinberg |
| 2011/0060807 A1 | 3/2011 | Martin et al. |
| 2011/0060812 A1 | 3/2011 | Middleton |
| 2011/0064378 A1 | 3/2011 | Gharaat et al. |
| 2011/0064387 A1 | 3/2011 | Mendeloff et al. |
| 2011/0064388 A1 | 3/2011 | Brown et al. |
| 2011/0065456 A1 | 3/2011 | Brennan et al. |
| 2011/0066366 A1 | 3/2011 | Ellanti et al. |
| 2011/0066436 A1 | 3/2011 | Bezar |
| 2011/0066468 A1 | 3/2011 | Huang et al. |
| 2011/0066602 A1 | 3/2011 | Studer et al. |
| 2011/0066634 A1 | 3/2011 | Phillips et al. |
| 2011/0072033 A1 | 3/2011 | White et al. |
| 2011/0072114 A1 | 3/2011 | Hoffert et al. |
| 2011/0072492 A1 | 3/2011 | Mohler et al. |
| 2011/0075818 A1 | 3/2011 | Vance et al. |
| 2011/0076994 A1 | 3/2011 | Kim et al. |
| 2011/0077943 A1 | 3/2011 | Miki et al. |
| 2011/0080260 A1 | 4/2011 | Wang et al. |
| 2011/0081889 A1 | 4/2011 | Gao et al. |
| 2011/0082688 A1 | 4/2011 | Kim et al. |
| 2011/0083079 A1 | 4/2011 | Farrell et al. |
| 2011/0086631 A1 | 4/2011 | Park et al. |
| 2011/0087491 A1 | 4/2011 | Wittenstein et al. |
| 2011/0087685 A1 | 4/2011 | Lin et al. |
| 2011/0090078 A1 | 4/2011 | Kim et al. |
| 2011/0092187 A1 | 4/2011 | Miller |
| 2011/0093261 A1 | 4/2011 | Angott |
| 2011/0093265 A1 | 4/2011 | Stent et al. |
| 2011/0093271 A1 | 4/2011 | Bernard |
| 2011/0093272 A1 | 4/2011 | Isobe et al. |
| 2011/0099000 A1 | 4/2011 | Rai et al. |
| 2011/0099157 A1 | 4/2011 | LeBeau et al. |
| 2011/0102161 A1 | 5/2011 | Heubel et al. |
| 2011/0103682 A1 | 5/2011 | Chidlovskii et al. |
| 2011/0105097 A1 | 5/2011 | Tadayon et al. |
| 2011/0106534 A1 | 5/2011 | Lebeau et al. |
| 2011/0106536 A1 | 5/2011 | Klappert |
| 2011/0106736 A1 | 5/2011 | Aharonson et al. |
| 2011/0106878 A1 | 5/2011 | Cho et al. |
| 2011/0106892 A1 | 5/2011 | Nelson et al. |
| 2011/0110502 A1 | 5/2011 | Daye et al. |
| 2011/0111724 A1 | 5/2011 | Baptiste |
| 2011/0112825 A1 | 5/2011 | Bellegarda |
| 2011/0112827 A1 | 5/2011 | Kennewick et al. |
| 2011/0112837 A1 | 5/2011 | Kurki-Suonio et al. |
| 2011/0112838 A1 | 5/2011 | Adibi |
| 2011/0112921 A1 | 5/2011 | Kennewick et al. |
| 2011/0116480 A1 | 5/2011 | Li et al. |
| 2011/0116610 A1 | 5/2011 | Shaw et al. |
| 2011/0119049 A1 | 5/2011 | Ylonen |
| 2011/0119051 A1 | 5/2011 | Li et al. |
| 2011/0119623 A1 | 5/2011 | Kim |
| 2011/0119713 A1 | 5/2011 | Chang et al. |
| 2011/0119715 A1 | 5/2011 | Chang et al. |
| 2011/0123004 A1 | 5/2011 | Chang et al. |
| 2011/0123100 A1 | 5/2011 | Carroll et al. |
| 2011/0125498 A1 | 5/2011 | Pickering et al. |
| 2011/0125540 A1 | 5/2011 | Jang et al. |
| 2011/0125701 A1 | 5/2011 | Nair et al. |
| 2011/0130958 A1 | 6/2011 | Stahl et al. |
| 2011/0131036 A1 | 6/2011 | DiCristo et al. |
| 2011/0131038 A1 | 6/2011 | Oyaizu et al. |
| 2011/0131045 A1 | 6/2011 | Cristo et al. |
| 2011/0137636 A1 | 6/2011 | Srihari et al. |
| 2011/0137664 A1 | 6/2011 | Kho et al. |
| 2011/0141141 A1 | 6/2011 | Kankainen |
| 2011/0143718 A1 | 6/2011 | Engelhart, Sr. |
| 2011/0143726 A1 | 6/2011 | de Silva |
| 2011/0143811 A1 | 6/2011 | Rodriguez |
| 2011/0144857 A1 | 6/2011 | Wingrove et al. |
| 2011/0144901 A1 | 6/2011 | Wang |
| 2011/0144973 A1 | 6/2011 | Bocchieri et al. |
| 2011/0144999 A1 | 6/2011 | Jang et al. |
| 2011/0145718 A1 | 6/2011 | Ketola et al. |
| 2011/0151415 A1 | 6/2011 | Darling et al. |
| 2011/0151830 A1 | 6/2011 | Blanda, Jr. et al. |
| 2011/0153209 A1 | 6/2011 | Geelen |
| 2011/0153322 A1 | 6/2011 | Kwak et al. |
| 2011/0153324 A1 | 6/2011 | Ballinger et al. |
| 2011/0153325 A1 | 6/2011 | Ballinger et al. |
| 2011/0153329 A1 | 6/2011 | Moorer |
| 2011/0153330 A1 | 6/2011 | Yazdani et al. |
| 2011/0153373 A1 | 6/2011 | Dantzig et al. |
| 2011/0153734 A1 | 6/2011 | Kawakami et al. |
| 2011/0154193 A1 | 6/2011 | Creutz et al. |
| 2011/0154418 A1 | 6/2011 | Cherifi et al. |
| 2011/0157029 A1 | 6/2011 | Tseng |
| 2011/0161072 A1 | 6/2011 | Terao et al. |
| 2011/0161076 A1 | 6/2011 | Davis et al. |
| 2011/0161079 A1 | 6/2011 | Gruhn et al. |
| 2011/0161309 A1 | 6/2011 | Lung et al. |
| 2011/0161852 A1 | 6/2011 | Vainio et al. |
| 2011/0166851 A1 | 7/2011 | LeBeau et al. |
| 2011/0166855 A1 | 7/2011 | Vermeulen et al. |
| 2011/0166862 A1 | 7/2011 | Eshed et al. |
| 2011/0167350 A1 | 7/2011 | Hoellwarth |
| 2011/0173003 A1 | 7/2011 | Levanon et al. |
| 2011/0173537 A1 | 7/2011 | Hemphill |
| 2011/0175810 A1 | 7/2011 | Markovic et al. |
| 2011/0178804 A1 | 7/2011 | Inoue et al. |
| 2011/0179002 A1 | 7/2011 | Dumitru et al. |
| 2011/0179372 A1 | 7/2011 | Moore et al. |
| 2011/0183627 A1 | 7/2011 | Ueda et al. |
| 2011/0183650 A1 | 7/2011 | McKee |
| 2011/0184721 A1 | 7/2011 | Subramanian et al. |
| 2011/0184730 A1 | 7/2011 | LeBeau et al. |
| 2011/0184736 A1 | 7/2011 | Slotznick |
| 2011/0184737 A1 | 7/2011 | Nakano et al. |
| 2011/0184768 A1 | 7/2011 | Norton et al. |
| 2011/0184789 A1 | 7/2011 | Kirsch |
| 2011/0185288 A1 | 7/2011 | Gupta et al. |
| 2011/0191105 A1 | 8/2011 | Spears |
| 2011/0191108 A1 | 8/2011 | Friedlander |
| 2011/0191271 A1 | 8/2011 | Baker et al. |
| 2011/0191344 A1 | 8/2011 | Jin et al. |
| 2011/0195758 A1 | 8/2011 | Damale et al. |
| 2011/0196670 A1 | 8/2011 | Dang et al. |
| 2011/0196872 A1 | 8/2011 | Sims et al. |
| 2011/0197128 A1 | 8/2011 | Assadollahi |
| 2011/0199312 A1 | 8/2011 | Okuta |
| 2011/0201385 A1 | 8/2011 | Higginbotham |
| 2011/0201387 A1 | 8/2011 | Paek et al. |
| 2011/0202526 A1 | 8/2011 | Lee et al. |
| 2011/0202594 A1 | 8/2011 | Ricci |
| 2011/0202874 A1 | 8/2011 | Ramer et al. |
| 2011/0205149 A1 | 8/2011 | Tom |
| 2011/0208511 A1 | 8/2011 | Sikstrom et al. |
| 2011/0208524 A1 | 8/2011 | Haughay |
| 2011/0209088 A1 | 8/2011 | Hinckley et al. |
| 2011/0212717 A1 | 9/2011 | Rhoads et al. |
| 2011/0214149 A1 | 9/2011 | Schlacht |
| 2011/0216093 A1 | 9/2011 | Griffin |
| 2011/0218806 A1 | 9/2011 | Alewine et al. |
| 2011/0218855 A1 | 9/2011 | Cao et al. |
| 2011/0219018 A1 | 9/2011 | Bailey et al. |
| 2011/0223893 A1 | 9/2011 | Lau et al. |
| 2011/0224972 A1 | 9/2011 | Millett et al. |
| 2011/0228913 A1 | 9/2011 | Cochinwala et al. |
| 2011/0231182 A1 | 9/2011 | Weider et al. |
| 2011/0231184 A1 | 9/2011 | Kerr |
| 2011/0231188 A1 | 9/2011 | Kennewick et al. |
| 2011/0231189 A1 | 9/2011 | Anastasiadis et al. |
| 2011/0231218 A1 | 9/2011 | Tovar |
| 2011/0231432 A1 | 9/2011 | Sata et al. |
| 2011/0231474 A1 | 9/2011 | Locker et al. |
| 2011/0238191 A1 | 9/2011 | Kristjansson et al. |
| 2011/0238407 A1 | 9/2011 | Kent |
| 2011/0238408 A1 | 9/2011 | Larcheveque et al. |
| 2011/0238676 A1 | 9/2011 | Liu et al. |
| 2011/0239111 A1 | 9/2011 | Grover |

(56) References Cited

U.S. PATENT DOCUMENTS

| | | |
|---|---|---|
| 2011/0242007 A1 | 10/2011 | Gray et al. |
| 2011/0243448 A1 | 10/2011 | Kawabuchi et al. |
| 2011/0244888 A1 | 10/2011 | Ohki |
| 2011/0246471 A1 | 10/2011 | Rakib |
| 2011/0246891 A1 | 10/2011 | Schubert et al. |
| 2011/0249144 A1 | 10/2011 | Chang |
| 2011/0250570 A1 | 10/2011 | Mack |
| 2011/0252108 A1 | 10/2011 | Morris et al. |
| 2011/0257966 A1 | 10/2011 | Rychlik |
| 2011/0258188 A1 | 10/2011 | Abdalmageed et al. |
| 2011/0260829 A1 | 10/2011 | Lee |
| 2011/0260861 A1 | 10/2011 | Singh et al. |
| 2011/0264530 A1 | 10/2011 | Santangelo et al. |
| 2011/0264643 A1 | 10/2011 | Cao |
| 2011/0264999 A1 | 10/2011 | Bells et al. |
| 2011/0270604 A1 | 11/2011 | Qi et al. |
| 2011/0274303 A1 | 11/2011 | Filson et al. |
| 2011/0276595 A1 | 11/2011 | Kirkland et al. |
| 2011/0276598 A1 | 11/2011 | Kozempel |
| 2011/0276944 A1 | 11/2011 | Bergman et al. |
| 2011/0279368 A1 | 11/2011 | Klein et al. |
| 2011/0280143 A1 | 11/2011 | Li et al. |
| 2011/0282663 A1 | 11/2011 | Talwar et al. |
| 2011/0282888 A1 | 11/2011 | Koperski et al. |
| 2011/0282903 A1 | 11/2011 | Zhang |
| 2011/0282906 A1 | 11/2011 | Wong |
| 2011/0283189 A1 | 11/2011 | McCarty |
| 2011/0283190 A1 | 11/2011 | Poltorak |
| 2011/0288852 A1 | 11/2011 | Dymetman et al. |
| 2011/0288855 A1 | 11/2011 | Roy |
| 2011/0288861 A1 | 11/2011 | Kurzwei et al. |
| 2011/0288863 A1 | 11/2011 | Rasmussen |
| 2011/0288866 A1 | 11/2011 | Rasmussen |
| 2011/0288917 A1 | 11/2011 | Wanek et al. |
| 2011/0289530 A1 | 11/2011 | Dureau et al. |
| 2011/0295590 A1 | 12/2011 | Lloyd et al. |
| 2011/0298585 A1 | 12/2011 | Barry |
| 2011/0301943 A1 | 12/2011 | Patch |
| 2011/0302162 A1 | 12/2011 | Xiao et al. |
| 2011/0302645 A1 | 12/2011 | Headley |
| 2011/0306426 A1 | 12/2011 | Novak et al. |
| 2011/0307241 A1 | 12/2011 | Waibel et al. |
| 2011/0307254 A1 | 12/2011 | Hunt et al. |
| 2011/0307491 A1 | 12/2011 | Fisk et al. |
| 2011/0307810 A1 | 12/2011 | Hilerio et al. |
| 2011/0311141 A1 | 12/2011 | Gao et al. |
| 2011/0313775 A1 | 12/2011 | Laligand et al. |
| 2011/0313803 A1 | 12/2011 | Friend et al. |
| 2011/0314003 A1 | 12/2011 | Ju et al. |
| 2011/0314032 A1 | 12/2011 | Bennett et al. |
| 2011/0314404 A1 | 12/2011 | Kotler et al. |
| 2011/0314539 A1 | 12/2011 | Horton |
| 2011/0320187 A1 | 12/2011 | Motik et al. |
| 2011/0320969 A1 | 12/2011 | Hwang et al. |
| 2012/0002820 A1 | 1/2012 | Leichter |
| 2012/0005602 A1 | 1/2012 | Anttila et al. |
| 2012/0008754 A1 | 1/2012 | Mukherjee et al. |
| 2012/0010886 A1 | 1/2012 | Razavilar |
| 2012/0011138 A1 | 1/2012 | Dunning et al. |
| 2012/0013609 A1 | 1/2012 | Reponen et al. |
| 2012/0015629 A1 | 1/2012 | Olsen et al. |
| 2012/0016658 A1 | 1/2012 | Wu et al. |
| 2012/0016678 A1 | 1/2012 | Gruber et al. |
| 2012/0019400 A1 | 1/2012 | Patel et al. |
| 2012/0020490 A1 | 1/2012 | Leichter |
| 2012/0020503 A1 | 1/2012 | Endo et al. |
| 2012/0022787 A1 | 1/2012 | LeBeau et al. |
| 2012/0022857 A1 | 1/2012 | Baldwin et al. |
| 2012/0022860 A1 | 1/2012 | Lloyd et al. |
| 2012/0022868 A1 | 1/2012 | LeBeau et al. |
| 2012/0022869 A1 | 1/2012 | Lloyd et al. |
| 2012/0022870 A1 | 1/2012 | Kristjansson et al. |
| 2012/0022872 A1 | 1/2012 | Gruber et al. |
| 2012/0022874 A1 | 1/2012 | Lloyd et al. |
| 2012/0022876 A1 | 1/2012 | LeBeau et al. |
| 2012/0022967 A1 | 1/2012 | Bachman et al. |
| 2012/0023088 A1 | 1/2012 | Cheng et al. |
| 2012/0023095 A1 | 1/2012 | Wadycki et al. |
| 2012/0023462 A1 | 1/2012 | Rosing et al. |
| 2012/0026395 A1 | 2/2012 | Jin et al. |
| 2012/0029661 A1 | 2/2012 | Jones et al. |
| 2012/0029910 A1 | 2/2012 | Medlock et al. |
| 2012/0034904 A1 | 2/2012 | LeBeau et al. |
| 2012/0035907 A1 | 2/2012 | Lebeau et al. |
| 2012/0035908 A1 | 2/2012 | Lebeau et al. |
| 2012/0035924 A1 | 2/2012 | Jitkoff et al. |
| 2012/0035925 A1 | 2/2012 | Friend et al. |
| 2012/0035926 A1 | 2/2012 | Ambler |
| 2012/0035931 A1 | 2/2012 | LeBeau et al. |
| 2012/0035932 A1 | 2/2012 | Jitkoff et al. |
| 2012/0035935 A1 | 2/2012 | Park et al. |
| 2012/0036556 A1 | 2/2012 | LeBeau et al. |
| 2012/0039539 A1 | 2/2012 | Boiman et al. |
| 2012/0039578 A1 | 2/2012 | Issa et al. |
| 2012/0041752 A1 | 2/2012 | Wang et al. |
| 2012/0041756 A1 | 2/2012 | Hanazawa et al. |
| 2012/0041759 A1 | 2/2012 | Barker et al. |
| 2012/0042014 A1 | 2/2012 | Desai et al. |
| 2012/0042343 A1 | 2/2012 | Laligand et al. |
| 2012/0052945 A1 | 3/2012 | Miyamoto et al. |
| 2012/0053815 A1 | 3/2012 | Montanari et al. |
| 2012/0053829 A1 | 3/2012 | Agarwal et al. |
| 2012/0053945 A1 | 3/2012 | Gupta et al. |
| 2012/0055253 A1 | 3/2012 | Sinha |
| 2012/0056815 A1 | 3/2012 | Mehra |
| 2012/0058783 A1 | 3/2012 | Kim et al. |
| 2012/0059655 A1 | 3/2012 | Cartales |
| 2012/0059813 A1 | 3/2012 | Sejnoha et al. |
| 2012/0060052 A1 | 3/2012 | White et al. |
| 2012/0062473 A1 | 3/2012 | Xiao et al. |
| 2012/0064975 A1 | 3/2012 | Gault et al. |
| 2012/0065972 A1 | 3/2012 | Strifler et al. |
| 2012/0066212 A1 | 3/2012 | Jennings |
| 2012/0066581 A1 | 3/2012 | Spalink |
| 2012/0075054 A1 | 3/2012 | Ge et al. |
| 2012/0075184 A1 | 3/2012 | Madhvanath |
| 2012/0077479 A1 | 3/2012 | Sabotta et al. |
| 2012/0078611 A1 | 3/2012 | Soltani et al. |
| 2012/0078624 A1 | 3/2012 | Yook et al. |
| 2012/0078627 A1 | 3/2012 | Wagner |
| 2012/0078635 A1 | 3/2012 | Rothkopf et al. |
| 2012/0078747 A1 | 3/2012 | Chakrabarti et al. |
| 2012/0082317 A1 | 4/2012 | Pance et al. |
| 2012/0083286 A1 | 4/2012 | Kim et al. |
| 2012/0084086 A1 | 4/2012 | Gilbert et al. |
| 2012/0084087 A1 | 4/2012 | Yang et al. |
| 2012/0084089 A1 | 4/2012 | Lloyd et al. |
| 2012/0084251 A1 | 4/2012 | Lingenfelder et al. |
| 2012/0084634 A1 | 4/2012 | Wong et al. |
| 2012/0088219 A1 | 4/2012 | Briscoe et al. |
| 2012/0089331 A1 | 4/2012 | Schmidt et al. |
| 2012/0089659 A1 | 4/2012 | Halevi et al. |
| 2012/0094645 A1 | 4/2012 | Jeffrey |
| 2012/0101823 A1 | 4/2012 | Weng et al. |
| 2012/0105257 A1 | 5/2012 | Murillo et al. |
| 2012/0108166 A1 | 5/2012 | Hymel |
| 2012/0108221 A1 | 5/2012 | Thomas et al. |
| 2012/0109632 A1 | 5/2012 | Sugiura et al. |
| 2012/0109753 A1 | 5/2012 | Kennewick et al. |
| 2012/0109997 A1 | 5/2012 | Sparks et al. |
| 2012/0110456 A1 | 5/2012 | Larco et al. |
| 2012/0114108 A1 | 5/2012 | Katis et al. |
| 2012/0116770 A1 | 5/2012 | Chen et al. |
| 2012/0117499 A1 | 5/2012 | Mori et al. |
| 2012/0117590 A1 | 5/2012 | Agnihotri et al. |
| 2012/0124126 A1 | 5/2012 | Alcazar et al. |
| 2012/0124177 A1 | 5/2012 | Sparks |
| 2012/0124178 A1 | 5/2012 | Sparks |
| 2012/0128322 A1 | 5/2012 | Shaffer et al. |
| 2012/0130709 A1 | 5/2012 | Bocchieri et al. |
| 2012/0130995 A1 | 5/2012 | Risvik et al. |
| 2012/0135714 A1 | 5/2012 | King, II |
| 2012/0136529 A1 | 5/2012 | Curtis et al. |
| 2012/0136572 A1 | 5/2012 | Norton |

(56) References Cited

U.S. PATENT DOCUMENTS

| | | |
|---|---|---|
| 2012/0136649 A1 | 5/2012 | Freising et al. |
| 2012/0136658 A1 | 5/2012 | Shrum, Jr. et al. |
| 2012/0136855 A1 | 5/2012 | Ni et al. |
| 2012/0136985 A1 | 5/2012 | Popescu et al. |
| 2012/0137367 A1 | 5/2012 | Dupont et al. |
| 2012/0287067 A1 | 5/2012 | Ikegami |
| 2012/0148077 A1 | 6/2012 | Aldaz et al. |
| 2012/0149342 A1 | 6/2012 | Cohen et al. |
| 2012/0149394 A1 | 6/2012 | Singh et al. |
| 2012/0150532 A1 | 6/2012 | Mirowski et al. |
| 2012/0150544 A1 | 6/2012 | McLoughlin et al. |
| 2012/0150580 A1 | 6/2012 | Norton |
| 2012/0158293 A1 | 6/2012 | Burnham |
| 2012/0158399 A1 | 6/2012 | Tremblay et al. |
| 2012/0158422 A1 | 6/2012 | Burnham et al. |
| 2012/0159380 A1 | 6/2012 | Kocienda et al. |
| 2012/0162540 A1 | 6/2012 | Ouchi et al. |
| 2012/0163710 A1 | 6/2012 | Skaff et al. |
| 2012/0166177 A1 | 6/2012 | Beld et al. |
| 2012/0166196 A1 | 6/2012 | Ju et al. |
| 2012/0166429 A1 | 6/2012 | Moore et al. |
| 2012/0166942 A1 | 6/2012 | Ramerth et al. |
| 2012/0166959 A1 | 6/2012 | Hilerio et al. |
| 2012/0166998 A1 | 6/2012 | Cotterill et al. |
| 2012/0173222 A1 | 7/2012 | Wang et al. |
| 2012/0173244 A1 | 7/2012 | Kwak et al. |
| 2012/0173464 A1 | 7/2012 | Tur et al. |
| 2012/0174121 A1 | 7/2012 | Treat et al. |
| 2012/0176255 A1 | 7/2012 | Choi et al. |
| 2012/0179457 A1 | 7/2012 | Newman et al. |
| 2012/0179467 A1 | 7/2012 | Williams et al. |
| 2012/0179471 A1 | 7/2012 | Newman et al. |
| 2012/0185237 A1 | 7/2012 | Gajic et al. |
| 2012/0185480 A1 | 7/2012 | Ni et al. |
| 2012/0185781 A1 | 7/2012 | Guzman et al. |
| 2012/0185803 A1 | 7/2012 | Wang et al. |
| 2012/0191461 A1 | 7/2012 | Lin et al. |
| 2012/0192096 A1 | 7/2012 | Bowman et al. |
| 2012/0197743 A1 | 8/2012 | Grigg et al. |
| 2012/0197967 A1 | 8/2012 | Sivavakeesar |
| 2012/0197995 A1 | 8/2012 | Caruso |
| 2012/0197998 A1 | 8/2012 | Kessel et al. |
| 2012/0200489 A1 | 8/2012 | Miyashita et al. |
| 2012/0201362 A1 | 8/2012 | Crossan et al. |
| 2012/0203767 A1 | 8/2012 | Williams et al. |
| 2012/0209454 A1 | 8/2012 | Miller et al. |
| 2012/0209654 A1 | 8/2012 | Romagnino et al. |
| 2012/0209853 A1 | 8/2012 | Desai et al. |
| 2012/0209874 A1 | 8/2012 | Wong et al. |
| 2012/0210266 A1 | 8/2012 | Jiang et al. |
| 2012/0210378 A1 | 8/2012 | Mccoy et al. |
| 2012/0214141 A1 | 8/2012 | Raya et al. |
| 2012/0214517 A1 | 8/2012 | Singh et al. |
| 2012/0215640 A1 | 8/2012 | Ramer et al. |
| 2012/0215762 A1 | 8/2012 | Hall et al. |
| 2012/0221339 A1 | 8/2012 | Wang et al. |
| 2012/0221552 A1 | 8/2012 | Reponen et al. |
| 2012/0223889 A1 | 9/2012 | Medlock et al. |
| 2012/0223936 A1 | 9/2012 | Aughey et al. |
| 2012/0232885 A1 | 9/2012 | Barbosa et al. |
| 2012/0232886 A1 | 9/2012 | Capuozzo et al. |
| 2012/0232906 A1 | 9/2012 | Lindahl |
| 2012/0233207 A1 | 9/2012 | Mohajer |
| 2012/0233266 A1 | 9/2012 | Hassan et al. |
| 2012/0233280 A1 | 9/2012 | Ebara |
| 2012/0239403 A1 | 9/2012 | Cano et al. |
| 2012/0239661 A1 | 9/2012 | Giblin |
| 2012/0239761 A1 | 9/2012 | Linner et al. |
| 2012/0242482 A1 | 9/2012 | Elumalai et al. |
| 2012/0245719 A1 | 9/2012 | Story, Jr. et al. |
| 2012/0245939 A1 | 9/2012 | Braho et al. |
| 2012/0245941 A1 | 9/2012 | Cheyer |
| 2012/0245944 A1 | 9/2012 | Gruber et al. |
| 2012/0246064 A1 | 9/2012 | Balkow |
| 2012/0250858 A1 | 10/2012 | Iqbal et al. |
| 2012/0252367 A1 | 10/2012 | Gaglio et al. |
| 2012/0252540 A1 | 10/2012 | Kirigaya |
| 2012/0253785 A1 | 10/2012 | Hamid et al. |
| 2012/0253791 A1 | 10/2012 | Heck et al. |
| 2012/0254143 A1 | 10/2012 | Varma et al. |
| 2012/0254152 A1 | 10/2012 | Park et al. |
| 2012/0254290 A1 | 10/2012 | Naaman |
| 2012/0259615 A1 | 10/2012 | Morin et al. |
| 2012/0259638 A1 | 10/2012 | Kalinli |
| 2012/0262296 A1 | 10/2012 | Bezar |
| 2012/0265482 A1 | 10/2012 | Grokop et al. |
| 2012/0265528 A1 | 10/2012 | Gruber et al. |
| 2012/0265535 A1 | 10/2012 | Bryant-Rich et al. |
| 2012/0265787 A1 | 10/2012 | Hsu et al. |
| 2012/0265806 A1 | 10/2012 | Blanchflower et al. |
| 2012/0271625 A1 | 10/2012 | Bernard |
| 2012/0271634 A1 | 10/2012 | Lenke |
| 2012/0271635 A1 | 10/2012 | Ljolje |
| 2012/0271640 A1 | 10/2012 | Basir |
| 2012/0271676 A1 | 10/2012 | Aravamudan et al. |
| 2012/0275377 A1 | 11/2012 | Lehane et al. |
| 2012/0278744 A1 | 11/2012 | Kozitsyn et al. |
| 2012/0278812 A1 | 11/2012 | Wang |
| 2012/0284015 A1 | 11/2012 | Drewes |
| 2012/0284027 A1 | 11/2012 | Mallett et al. |
| 2012/0290291 A1 | 11/2012 | Shelley et al. |
| 2012/0290300 A1 | 11/2012 | Lee et al. |
| 2012/0290657 A1 | 11/2012 | Parks et al. |
| 2012/0290680 A1 | 11/2012 | Hwang |
| 2012/0295708 A1 | 11/2012 | Hernandez-Abrego et al. |
| 2012/0296638 A1 | 11/2012 | Patwa |
| 2012/0296649 A1 | 11/2012 | Bansal et al. |
| 2012/0296654 A1 | 11/2012 | Hendrickson et al. |
| 2012/0296891 A1 | 11/2012 | Rangan |
| 2012/0297341 A1 | 11/2012 | Glazer et al. |
| 2012/0297348 A1 | 11/2012 | Santoro |
| 2012/0303369 A1 | 11/2012 | Brush et al. |
| 2012/0303371 A1 | 11/2012 | Labsky et al. |
| 2012/0304124 A1 | 11/2012 | Chen et al. |
| 2012/0304239 A1 | 11/2012 | Shahraray et al. |
| 2012/0309363 A1 | 12/2012 | Gruber et al. |
| 2012/0310642 A1 | 12/2012 | Cao et al. |
| 2012/0310649 A1 | 12/2012 | Cannistraro et al. |
| 2012/0310652 A1 | 12/2012 | O'Sullivan |
| 2012/0310922 A1 | 12/2012 | Johnson et al. |
| 2012/0311478 A1 | 12/2012 | Van Os et al. |
| 2012/0311583 A1 | 12/2012 | Gruber et al. |
| 2012/0311584 A1 | 12/2012 | Gruber et al. |
| 2012/0311585 A1 | 12/2012 | Gruber et al. |
| 2012/0316774 A1 | 12/2012 | Yariv et al. |
| 2012/0316862 A1 | 12/2012 | Sultan et al. |
| 2012/0316875 A1 | 12/2012 | Nyquist et al. |
| 2012/0316878 A1 | 12/2012 | Singleton et al. |
| 2012/0316955 A1 | 12/2012 | Panguluri et al. |
| 2012/0317194 A1 | 12/2012 | Tian |
| 2012/0317498 A1 | 12/2012 | Logan et al. |
| 2012/0321112 A1 | 12/2012 | Schubert et al. |
| 2012/0323560 A1 | 12/2012 | Cortes et al. |
| 2012/0323933 A1 | 12/2012 | He et al. |
| 2012/0324391 A1 | 12/2012 | Tocci |
| 2012/0327009 A1 | 12/2012 | Fleizach |
| 2012/0329529 A1 | 12/2012 | van der Raadt |
| 2012/0330660 A1 | 12/2012 | Jaiswal |
| 2012/0330661 A1 | 12/2012 | Lindahl |
| 2012/0330990 A1 | 12/2012 | Chen et al. |
| 2013/0002716 A1 | 1/2013 | Walker et al. |
| 2013/0005405 A1 | 1/2013 | Prociw |
| 2013/0006633 A1 | 1/2013 | Grokop et al. |
| 2013/0006637 A1 | 1/2013 | Kanevsky et al. |
| 2013/0006638 A1 | 1/2013 | Lindahl |
| 2013/0007240 A1 | 1/2013 | Qiu et al. |
| 2013/0007648 A1 | 1/2013 | Gamon et al. |
| 2013/0009858 A1 | 1/2013 | Lacey |
| 2013/0010575 A1 | 1/2013 | He et al. |
| 2013/0013313 A1 | 1/2013 | Shechtman et al. |
| 2013/0013319 A1 | 1/2013 | Grant et al. |
| 2013/0014026 A1 | 1/2013 | Beringer et al. |
| 2013/0014143 A1 | 1/2013 | Bhatia et al. |
| 2013/0018659 A1 | 1/2013 | Chi |

(56) References Cited

U.S. PATENT DOCUMENTS

| | | |
|---|---|---|
| 2013/0018863 A1 | 1/2013 | Regan et al. |
| 2013/0024277 A1 | 1/2013 | Tuchman et al. |
| 2013/0024576 A1 | 1/2013 | Dishneau et al. |
| 2013/0027875 A1 | 1/2013 | Zhu et al. |
| 2013/0028404 A1 | 1/2013 | Omalley et al. |
| 2013/0030787 A1 | 1/2013 | Cancedda et al. |
| 2013/0030789 A1 | 1/2013 | Dalce |
| 2013/0030804 A1 | 1/2013 | Zavaliagkos et al. |
| 2013/0030815 A1 | 1/2013 | Madhvanath et al. |
| 2013/0030904 A1 | 1/2013 | Aidasani et al. |
| 2013/0030913 A1 | 1/2013 | Zhu et al. |
| 2013/0030955 A1 | 1/2013 | David |
| 2013/0031162 A1 | 1/2013 | Willis et al. |
| 2013/0031476 A1 | 1/2013 | Coin et al. |
| 2013/0176208 A1 | 1/2013 | Tanaka et al. |
| 2013/0033643 A1 | 2/2013 | Kim et al. |
| 2013/0035086 A1 | 2/2013 | Chardon et al. |
| 2013/0035942 A1 | 2/2013 | Kim et al. |
| 2013/0035961 A1 | 2/2013 | Yegnanarayanan |
| 2013/0035994 A1 | 2/2013 | Pattan et al. |
| 2013/0036200 A1 | 2/2013 | Roberts et al. |
| 2013/0038437 A1 | 2/2013 | Talati et al. |
| 2013/0038618 A1 | 2/2013 | Urbach |
| 2013/0041647 A1 | 2/2013 | Ramerth et al. |
| 2013/0041654 A1 | 2/2013 | Walker et al. |
| 2013/0041661 A1 | 2/2013 | Lee et al. |
| 2013/0041665 A1 | 2/2013 | Jang et al. |
| 2013/0041667 A1 | 2/2013 | Longe et al. |
| 2013/0041968 A1 | 2/2013 | Cohen et al. |
| 2013/0046544 A1 | 2/2013 | Kay et al. |
| 2013/0047178 A1 | 2/2013 | Moon et al. |
| 2013/0050089 A1 | 2/2013 | Neels et al. |
| 2013/0054550 A1 | 2/2013 | Bolohan |
| 2013/0054609 A1 | 2/2013 | Rajput et al. |
| 2013/0054613 A1 | 2/2013 | Bishop |
| 2013/0054631 A1 | 2/2013 | Govani et al. |
| 2013/0054675 A1 | 2/2013 | Jenkins et al. |
| 2013/0054706 A1 | 2/2013 | Graham et al. |
| 2013/0054945 A1 | 2/2013 | Free et al. |
| 2013/0055099 A1 | 2/2013 | Yao et al. |
| 2013/0055147 A1 | 2/2013 | Vasudev et al. |
| 2013/0060571 A1 | 3/2013 | Soemo et al. |
| 2013/0060807 A1 | 3/2013 | Rambhia et al. |
| 2013/0061139 A1 | 3/2013 | Mahkovec et al. |
| 2013/0063611 A1 | 3/2013 | Papakipos et al. |
| 2013/0066832 A1 | 3/2013 | Sheehan et al. |
| 2013/0067307 A1 | 3/2013 | Tian et al. |
| 2013/0067312 A1 | 3/2013 | Rose |
| 2013/0067421 A1 | 3/2013 | Osman et al. |
| 2013/0069769 A1 | 3/2013 | Pennington et al. |
| 2013/0073286 A1 | 3/2013 | Bastea-Forte et al. |
| 2013/0073293 A1 | 3/2013 | Jang et al. |
| 2013/0073346 A1 | 3/2013 | Chun et al. |
| 2013/0073580 A1 | 3/2013 | Mehanna et al. |
| 2013/0073676 A1 | 3/2013 | Cockcroft |
| 2013/0078930 A1 | 3/2013 | Chen et al. |
| 2013/0080152 A1 | 3/2013 | Brun et al. |
| 2013/0080162 A1 | 3/2013 | Chang et al. |
| 2013/0080167 A1 | 3/2013 | Mozer |
| 2013/0080177 A1 | 3/2013 | Chen |
| 2013/0080178 A1 | 3/2013 | Kang et al. |
| 2013/0080251 A1 | 3/2013 | Dempski |
| 2013/0082967 A1 | 4/2013 | Hillis et al. |
| 2013/0084882 A1 | 4/2013 | Khorashadi et al. |
| 2013/0085755 A1 | 4/2013 | Bringert et al. |
| 2013/0085761 A1 | 4/2013 | Bringert et al. |
| 2013/0086609 A1 | 4/2013 | Levy et al. |
| 2013/0090921 A1 | 4/2013 | Liu et al. |
| 2013/0091090 A1 | 4/2013 | Spivack et al. |
| 2013/0095805 A1 | 4/2013 | LeBeau et al. |
| 2013/0096909 A1 | 4/2013 | Brun et al. |
| 2013/0096911 A1 | 4/2013 | Beaufort et al. |
| 2013/0096917 A1 | 4/2013 | Edgar et al. |
| 2013/0097566 A1 | 4/2013 | Berglund |
| 2013/0097682 A1 | 4/2013 | Zeljkovic et al. |
| 2013/0100017 A1 | 4/2013 | Papakipos et al. |
| 2013/0100268 A1 | 4/2013 | Mihailidis et al. |
| 2013/0103391 A1 | 4/2013 | Millmore et al. |
| 2013/0103405 A1 | 4/2013 | Namba et al. |
| 2013/0106742 A1 | 5/2013 | Lee et al. |
| 2013/0107053 A1 | 5/2013 | Ozaki |
| 2013/0109412 A1 | 5/2013 | Nguyen et al. |
| 2013/0110505 A1 | 5/2013 | Gruber et al. |
| 2013/0110515 A1 | 5/2013 | Guzzoni et al. |
| 2013/0110518 A1 | 5/2013 | Gruber et al. |
| 2013/0110519 A1 | 5/2013 | Cheyer et al. |
| 2013/0110520 A1 | 5/2013 | Cheyer et al. |
| 2013/0110943 A1 | 5/2013 | Menon et al. |
| 2013/0111330 A1 | 5/2013 | Staikos et al. |
| 2013/0111348 A1 | 5/2013 | Gruber et al. |
| 2013/0111365 A1 | 5/2013 | Chen et al. |
| 2013/0111487 A1 | 5/2013 | Cheyer et al. |
| 2013/0111581 A1 | 5/2013 | Griffin et al. |
| 2013/0115927 A1 | 5/2013 | Gruber et al. |
| 2013/0117022 A1 | 5/2013 | Chen et al. |
| 2013/0124189 A1 | 5/2013 | Baldwin et al. |
| 2013/0124672 A1 | 5/2013 | Pan |
| 2013/0125168 A1 | 5/2013 | Agnihotri et al. |
| 2013/0130669 A1 | 5/2013 | Xiao et al. |
| 2013/0132081 A1 | 5/2013 | Ryu et al. |
| 2013/0132084 A1 | 5/2013 | Stonehocker et al. |
| 2013/0132089 A1 | 5/2013 | Fanty et al. |
| 2013/0132871 A1 | 5/2013 | Zeng et al. |
| 2013/0138440 A1 | 5/2013 | Strope et al. |
| 2013/0141551 A1 | 6/2013 | Kim |
| 2013/0142317 A1 | 6/2013 | Reynolds |
| 2013/0142345 A1 | 6/2013 | Waldmann |
| 2013/0144594 A1 | 6/2013 | Bangalore et al. |
| 2013/0144616 A1 | 6/2013 | Bangalore |
| 2013/0151258 A1 | 6/2013 | Chandrasekar et al. |
| 2013/0151339 A1 | 6/2013 | Kim et al. |
| 2013/0152092 A1 | 6/2013 | Yadgar |
| 2013/0154811 A1 | 6/2013 | Ferren et al. |
| 2013/0155948 A1 | 6/2013 | Pinheiro et al. |
| 2013/0156198 A1 | 6/2013 | Kim et al. |
| 2013/0157629 A1 | 6/2013 | Lee et al. |
| 2013/0158977 A1 | 6/2013 | Senior |
| 2013/0159847 A1 | 6/2013 | Banke et al. |
| 2013/0159861 A1 | 6/2013 | Rottler et al. |
| 2013/0165232 A1 | 6/2013 | Nelson et al. |
| 2013/0166278 A1 | 6/2013 | James et al. |
| 2013/0166303 A1 | 6/2013 | Chang et al. |
| 2013/0166332 A1 | 6/2013 | Hammad |
| 2013/0166442 A1 | 6/2013 | Nakajima et al. |
| 2013/0167242 A1 | 6/2013 | Paliwal |
| 2013/0170738 A1 | 7/2013 | Capuozzo et al. |
| 2013/0172022 A1 | 7/2013 | Seymour et al. |
| 2013/0173258 A1 | 7/2013 | Liu et al. |
| 2013/0173268 A1 | 7/2013 | Weng et al. |
| 2013/0173513 A1 | 7/2013 | Chu et al. |
| 2013/0173610 A1 | 7/2013 | Hu et al. |
| 2013/0173614 A1 | 7/2013 | Ismalon |
| 2013/0174034 A1 | 7/2013 | Brown et al. |
| 2013/0176147 A1 | 7/2013 | Anderson et al. |
| 2013/0176244 A1 | 7/2013 | Yamamoto et al. |
| 2013/0176592 A1 | 7/2013 | Sasaki |
| 2013/0179168 A1 | 7/2013 | Bae et al. |
| 2013/0179172 A1 | 7/2013 | Nakamura et al. |
| 2013/0179440 A1 | 7/2013 | Gordon |
| 2013/0179806 A1 | 7/2013 | Bastide et al. |
| 2013/0183942 A1 | 7/2013 | Novick et al. |
| 2013/0183944 A1 | 7/2013 | Mozer et al. |
| 2013/0185059 A1 | 7/2013 | Riccardi |
| 2013/0185066 A1 | 7/2013 | Tzirkel-Hancock et al. |
| 2013/0185074 A1 | 7/2013 | Gruber et al. |
| 2013/0185081 A1 | 7/2013 | Cheyer et al. |
| 2013/0185336 A1 | 7/2013 | Singh et al. |
| 2013/0187850 A1 | 7/2013 | Schulz et al. |
| 2013/0187857 A1 | 7/2013 | Griffin et al. |
| 2013/0190021 A1 | 7/2013 | Vieri et al. |
| 2013/0191117 A1 | 7/2013 | Atti et al. |
| 2013/0191408 A1 | 7/2013 | Volkert |
| 2013/0197911 A1 | 8/2013 | Wei et al. |
| 2013/0197914 A1 | 8/2013 | Yelvington et al. |

(56) References Cited

U.S. PATENT DOCUMENTS

| | | |
|---|---|---|
| 2013/0198159 A1 | 8/2013 | Hendry |
| 2013/0198841 A1 | 8/2013 | Poulson |
| 2013/0204813 A1 | 8/2013 | Master et al. |
| 2013/0204897 A1 | 8/2013 | McDougall |
| 2013/0204967 A1 | 8/2013 | Seo et al. |
| 2013/0207898 A1 | 8/2013 | Sullivan et al. |
| 2013/0210410 A1 | 8/2013 | Xu |
| 2013/0210492 A1 | 8/2013 | You et al. |
| 2013/0212501 A1 | 8/2013 | Anderson et al. |
| 2013/0218553 A1 | 8/2013 | Fujii et al. |
| 2013/0218560 A1 | 8/2013 | Hsiao et al. |
| 2013/0218574 A1 | 8/2013 | Falcon et al. |
| 2013/0218899 A1 | 8/2013 | Raghavan et al. |
| 2013/0219333 A1 | 8/2013 | Palwe et al. |
| 2013/0222249 A1 | 8/2013 | Pasquero et al. |
| 2013/0223279 A1 | 8/2013 | Tinnakornsrisuphap et al. |
| 2013/0225128 A1 | 8/2013 | Gomar |
| 2013/0226935 A1 | 8/2013 | Bai et al. |
| 2013/0226996 A1 | 8/2013 | Itagaki et al. |
| 2013/0231917 A1 | 9/2013 | Naik |
| 2013/0234947 A1 | 9/2013 | Kristensson et al. |
| 2013/0235987 A1 | 9/2013 | Arroniz-Escobar |
| 2013/0238326 A1 | 9/2013 | Kim et al. |
| 2013/0238540 A1 | 9/2013 | O'donoghue et al. |
| 2013/0238647 A1 | 9/2013 | Thompson |
| 2013/0238729 A1 | 9/2013 | Holzman et al. |
| 2013/0244615 A1 | 9/2013 | Miller |
| 2013/0246048 A1 | 9/2013 | Nagase et al. |
| 2013/0246050 A1 | 9/2013 | Yu et al. |
| 2013/0246329 A1 | 9/2013 | Pasquero et al. |
| 2013/0253911 A1 | 9/2013 | Petri et al. |
| 2013/0253912 A1 | 9/2013 | Medlock et al. |
| 2013/0260739 A1 | 10/2013 | Saino |
| 2013/0262168 A1 | 10/2013 | Makanawala et al. |
| 2013/0268263 A1 | 10/2013 | Park et al. |
| 2013/0268956 A1 | 10/2013 | Recco |
| 2013/0275117 A1 | 10/2013 | Winer |
| 2013/0275136 A1 | 10/2013 | Czahor |
| 2013/0275138 A1 | 10/2013 | Gruber et al. |
| 2013/0275164 A1 | 10/2013 | Gruber et al. |
| 2013/0275199 A1 | 10/2013 | Proctor, Jr. et al. |
| 2013/0275625 A1 | 10/2013 | Taivalsaari et al. |
| 2013/0275875 A1 | 10/2013 | Gruber et al. |
| 2013/0275899 A1 | 10/2013 | Schubert et al. |
| 2013/0279724 A1 | 10/2013 | Stafford et al. |
| 2013/0282709 A1 | 10/2013 | Zhu et al. |
| 2013/0283168 A1 | 10/2013 | Brown et al. |
| 2013/0283199 A1 | 10/2013 | Selig et al. |
| 2013/0283283 A1 | 10/2013 | Wang et al. |
| 2013/0285913 A1 | 10/2013 | Griffin et al. |
| 2013/0288722 A1 | 10/2013 | Ramanujam et al. |
| 2013/0289991 A1 | 10/2013 | Eshwar et al. |
| 2013/0289993 A1 | 10/2013 | Rao |
| 2013/0289994 A1 | 10/2013 | Newman et al. |
| 2013/0290222 A1 | 10/2013 | Gordo et al. |
| 2013/0290905 A1 | 10/2013 | Luvogt et al. |
| 2013/0291015 A1 | 10/2013 | Pan |
| 2013/0297078 A1 | 11/2013 | Kolavennu |
| 2013/0297198 A1 | 11/2013 | Velde et al. |
| 2013/0297317 A1 | 11/2013 | Lee et al. |
| 2013/0297319 A1 | 11/2013 | Kim |
| 2013/0297348 A1 | 11/2013 | Cardoza et al. |
| 2013/0300645 A1 | 11/2013 | Fedorov |
| 2013/0300648 A1 | 11/2013 | Kim et al. |
| 2013/0303106 A1 | 11/2013 | Martin |
| 2013/0304476 A1 | 11/2013 | Kim et al. |
| 2013/0304479 A1 | 11/2013 | Teller et al. |
| 2013/0304758 A1 | 11/2013 | Gruber et al. |
| 2013/0304815 A1 | 11/2013 | Puente et al. |
| 2013/0305119 A1 | 11/2013 | Kern et al. |
| 2013/0307855 A1 | 11/2013 | Lamb et al. |
| 2013/0307997 A1 | 11/2013 | O'Keefe et al. |
| 2013/0308922 A1 | 11/2013 | Sano et al. |
| 2013/0311179 A1 | 11/2013 | Wagner |
| 2013/0311184 A1 | 11/2013 | Badavne et al. |
| 2013/0311487 A1 | 11/2013 | Moore et al. |
| 2013/0311997 A1 | 11/2013 | Gruber et al. |
| 2013/0315038 A1 | 11/2013 | Ferren et al. |
| 2013/0316679 A1 | 11/2013 | Miller et al. |
| 2013/0316746 A1 | 11/2013 | Miller et al. |
| 2013/0317921 A1 | 11/2013 | Havas |
| 2013/0318478 A1 | 11/2013 | Ogura |
| 2013/0321267 A1 | 12/2013 | Bhatti et al. |
| 2013/0322634 A1 | 12/2013 | Bennett et al. |
| 2013/0322665 A1 | 12/2013 | Bennett et al. |
| 2013/0325340 A1 | 12/2013 | Forstall et al. |
| 2013/0325436 A1 | 12/2013 | Wang et al. |
| 2013/0325443 A1 | 12/2013 | Begeja et al. |
| 2013/0325447 A1 | 12/2013 | Levien et al. |
| 2013/0325448 A1 | 12/2013 | Levien et al. |
| 2013/0325460 A1 | 12/2013 | Kim et al. |
| 2013/0325480 A1 | 12/2013 | Lee et al. |
| 2013/0325481 A1 | 12/2013 | Van Os et al. |
| 2013/0325484 A1 | 12/2013 | Chakladar et al. |
| 2013/0325844 A1 | 12/2013 | Plaisant |
| 2013/0325967 A1 | 12/2013 | Parks et al. |
| 2013/0325970 A1 | 12/2013 | Roberts et al. |
| 2013/0325979 A1 | 12/2013 | Mansfield et al. |
| 2013/0326576 A1 | 12/2013 | Zhang et al. |
| 2013/0328809 A1 | 12/2013 | Smith |
| 2013/0329023 A1 | 12/2013 | Suplee, III et al. |
| 2013/0331127 A1 | 12/2013 | Sabatelli et al. |
| 2013/0332113 A1 | 12/2013 | Piemonte et al. |
| 2013/0332159 A1 | 12/2013 | Federighi et al. |
| 2013/0332162 A1 | 12/2013 | Keen |
| 2013/0332164 A1 | 12/2013 | Nalk |
| 2013/0332168 A1 | 12/2013 | Kim et al. |
| 2013/0332172 A1 | 12/2013 | Prakash et al. |
| 2013/0332400 A1 | 12/2013 | González |
| 2013/0332538 A1 | 12/2013 | Clark et al. |
| 2013/0332721 A1 | 12/2013 | Chaudhri et al. |
| 2013/0339256 A1 | 12/2013 | Shroff |
| 2013/0339454 A1 | 12/2013 | Walker et al. |
| 2013/0339991 A1 | 12/2013 | Ricci |
| 2013/0342672 A1 | 12/2013 | Gray et al. |
| 2013/0343584 A1 | 12/2013 | Bennett et al. |
| 2013/0343721 A1 | 12/2013 | Abecassis |
| 2013/0346065 A1 | 12/2013 | Davidson et al. |
| 2013/0346068 A1 | 12/2013 | Solem et al. |
| 2013/0346347 A1 | 12/2013 | Patterson et al. |
| 2013/0346488 A1 | 12/2013 | Lunt et al. |
| 2013/0347018 A1 | 12/2013 | Limp et al. |
| 2013/0347029 A1 | 12/2013 | Tang et al. |
| 2013/0347102 A1 | 12/2013 | Shi |
| 2013/0347117 A1 | 12/2013 | Parks et al. |
| 2014/0001255 A1 | 1/2014 | Anthoine |
| 2014/0002338 A1 | 1/2014 | Raffa et al. |
| 2014/0006012 A1 | 1/2014 | Zhou et al. |
| 2014/0006025 A1 | 1/2014 | Krishnan et al. |
| 2014/0006027 A1 | 1/2014 | Kim et al. |
| 2014/0006028 A1 | 1/2014 | Hu |
| 2014/0006030 A1 | 1/2014 | Fleizach et al. |
| 2014/0006153 A1 | 1/2014 | Thangam et al. |
| 2014/0006191 A1 | 1/2014 | Shankar et al. |
| 2014/0006483 A1 | 1/2014 | Garmark et al. |
| 2014/0006496 A1 | 1/2014 | Dearman et al. |
| 2014/0006562 A1 | 1/2014 | Handa et al. |
| 2014/0006947 A1 | 1/2014 | Garmark et al. |
| 2014/0006951 A1 | 1/2014 | Hunter |
| 2014/0006955 A1 | 1/2014 | Greenzeiger et al. |
| 2014/0008163 A1 | 1/2014 | Mikonaho et al. |
| 2014/0012574 A1 | 1/2014 | Pasupalak et al. |
| 2014/0012580 A1 | 1/2014 | Ganong, III et al. |
| 2014/0012586 A1 | 1/2014 | Rubin et al. |
| 2014/0012587 A1 | 1/2014 | Park |
| 2014/0019116 A1 | 1/2014 | Lundberg et al. |
| 2014/0019133 A1 | 1/2014 | Bao et al. |
| 2014/0019460 A1 | 1/2014 | Sambrani et al. |
| 2014/0028029 A1 | 1/2014 | Jochman |
| 2014/0028477 A1 | 1/2014 | Michalske |
| 2014/0028735 A1 | 1/2014 | Williams et al. |
| 2014/0032453 A1 | 1/2014 | Eustice et al. |
| 2014/0032678 A1 | 1/2014 | Koukoumidis et al. |
| 2014/0033071 A1 | 1/2014 | Gruber et al. |

(56) References Cited

U.S. PATENT DOCUMENTS

| | | |
|---|---|---|
| 2014/0035823 A1 | 2/2014 | Khoe et al. |
| 2014/0037075 A1 | 2/2014 | Bouzid et al. |
| 2014/0039888 A1 | 2/2014 | Taubman et al. |
| 2014/0039893 A1 | 2/2014 | Weiner et al. |
| 2014/0039894 A1 | 2/2014 | Shostak |
| 2014/0040274 A1 | 2/2014 | Aravamudan et al. |
| 2014/0040748 A1 | 2/2014 | Lemay et al. |
| 2014/0040754 A1 | 2/2014 | Donelli |
| 2014/0040801 A1 | 2/2014 | Patel et al. |
| 2014/0040918 A1 | 2/2014 | Li |
| 2014/0040961 A1 | 2/2014 | Green et al. |
| 2014/0046922 A1 | 2/2014 | Crook et al. |
| 2014/0046934 A1 | 2/2014 | Zhou et al. |
| 2014/0047001 A1 | 2/2014 | Phillips et al. |
| 2014/0052451 A1 | 2/2014 | Cheong et al. |
| 2014/0052680 A1 | 2/2014 | Nitz et al. |
| 2014/0052791 A1 | 2/2014 | Chakra et al. |
| 2014/0053082 A1 | 2/2014 | Park |
| 2014/0053101 A1 | 2/2014 | Buehler et al. |
| 2014/0053210 A1 | 2/2014 | Cheong et al. |
| 2014/0057610 A1 | 2/2014 | Olincy et al. |
| 2014/0059030 A1 | 2/2014 | Hakkani-Tur et al. |
| 2014/0067361 A1 | 3/2014 | Nikoulina et al. |
| 2014/0067371 A1 | 3/2014 | Liensberger |
| 2014/0067402 A1 | 3/2014 | Kim |
| 2014/0067738 A1 | 3/2014 | Kingsbury |
| 2014/0068751 A1 | 3/2014 | Last |
| 2014/0074454 A1 | 3/2014 | Brown et al. |
| 2014/0074466 A1 | 3/2014 | Sharifi et al. |
| 2014/0074470 A1 | 3/2014 | Jansche et al. |
| 2014/0074472 A1 | 3/2014 | Lin et al. |
| 2014/0074482 A1 | 3/2014 | Ohno |
| 2014/0074483 A1 | 3/2014 | Van Os |
| 2014/0074589 A1 | 3/2014 | Nielsen et al. |
| 2014/0074815 A1 | 3/2014 | Plimton |
| 2014/0075453 A1 | 3/2014 | Bellessort et al. |
| 2014/0078065 A1 | 3/2014 | Akkok |
| 2014/0079195 A1 | 3/2014 | Srivastava et al. |
| 2014/0080410 A1 | 3/2014 | Jung et al. |
| 2014/0080428 A1 | 3/2014 | Rhoads et al. |
| 2014/0081619 A1 | 3/2014 | Solntseva et al. |
| 2014/0081633 A1 | 3/2014 | Badaskar |
| 2014/0081635 A1 | 3/2014 | Yanagihara |
| 2014/0081829 A1 | 3/2014 | Milne |
| 2014/0081941 A1 | 3/2014 | Bai et al. |
| 2014/0082500 A1 | 3/2014 | Wilensky et al. |
| 2014/0082501 A1 | 3/2014 | Bae et al. |
| 2014/0082545 A1 | 3/2014 | Zhai et al. |
| 2014/0082715 A1 | 3/2014 | Grajek et al. |
| 2014/0086458 A1 | 3/2014 | Rogers |
| 2014/0087711 A1 | 3/2014 | Geyer et al. |
| 2014/0088952 A1 | 3/2014 | Fife et al. |
| 2014/0088961 A1 | 3/2014 | Woodward et al. |
| 2014/0088964 A1 | 3/2014 | Bellegarda |
| 2014/0088970 A1 | 3/2014 | Kang |
| 2014/0092007 A1 | 4/2014 | Kim et al. |
| 2014/0095171 A1 | 4/2014 | Lynch et al. |
| 2014/0095172 A1 | 4/2014 | Cabaco et al. |
| 2014/0095173 A1 | 4/2014 | Lynch et al. |
| 2014/0095432 A1 | 4/2014 | Trumbull et al. |
| 2014/0095601 A1 | 4/2014 | Abuelsaad et al. |
| 2014/0095965 A1 | 4/2014 | Li |
| 2014/0096077 A1 | 4/2014 | Jacob et al. |
| 2014/0096209 A1 | 4/2014 | Saraf et al. |
| 2014/0098247 A1 | 4/2014 | Rao et al. |
| 2014/0100847 A1 | 4/2014 | Ishii et al. |
| 2014/0101127 A1 | 4/2014 | Simhon et al. |
| 2014/0104175 A1 | 4/2014 | Ouyang et al. |
| 2014/0108017 A1 | 4/2014 | Mason et al. |
| 2014/0108391 A1 | 4/2014 | Volkert |
| 2014/0112556 A1 | 4/2014 | Kalinli-Akbacak |
| 2014/0114554 A1 | 4/2014 | Lagassey |
| 2014/0115062 A1 | 4/2014 | Liu et al. |
| 2014/0115114 A1 | 4/2014 | Garmark et al. |
| 2014/0118155 A1 | 5/2014 | Bowers et al. |
| 2014/0118624 A1 | 5/2014 | Jang et al. |
| 2014/0120961 A1 | 5/2014 | Buck |
| 2014/0122059 A1 | 5/2014 | Patel et al. |
| 2014/0122085 A1 | 5/2014 | Piety et al. |
| 2014/0122086 A1 | 5/2014 | Kapur et al. |
| 2014/0122136 A1 | 5/2014 | Jayanthi |
| 2014/0122153 A1 | 5/2014 | Truitt |
| 2014/0123022 A1 | 5/2014 | Lee et al. |
| 2014/0128021 A1 | 5/2014 | Walker et al. |
| 2014/0129006 A1 | 5/2014 | Chen et al. |
| 2014/0129226 A1 | 5/2014 | Lee et al. |
| 2014/0132935 A1 | 5/2014 | Kim et al. |
| 2014/0134983 A1 | 5/2014 | Jung et al. |
| 2014/0135036 A1 | 5/2014 | Bonanni et al. |
| 2014/0136013 A1 | 5/2014 | Wolverton et al. |
| 2014/0136187 A1 | 5/2014 | Wolverton et al. |
| 2014/0136195 A1 | 5/2014 | Abdossalami et al. |
| 2014/0136212 A1 | 5/2014 | Kwon et al. |
| 2014/0136946 A1 | 5/2014 | Matas |
| 2014/0136987 A1 | 5/2014 | Rodriguez |
| 2014/0142922 A1 | 5/2014 | Liang et al. |
| 2014/0142923 A1 | 5/2014 | Jones et al. |
| 2014/0142935 A1 | 5/2014 | Lindahl et al. |
| 2014/0142953 A1 | 5/2014 | Kim et al. |
| 2014/0143550 A1 | 5/2014 | Ganong, III et al. |
| 2014/0143721 A1 | 5/2014 | Suzuki et al. |
| 2014/0143784 A1 | 5/2014 | Mistry et al. |
| 2014/0146200 A1 | 5/2014 | Scott et al. |
| 2014/0149118 A1 | 5/2014 | Lee et al. |
| 2014/0152577 A1 | 6/2014 | Yuen et al. |
| 2014/0153709 A1 | 6/2014 | Byrd et al. |
| 2014/0155031 A1 | 6/2014 | Lee et al. |
| 2014/0156262 A1 | 6/2014 | Yuen et al. |
| 2014/0156279 A1 | 6/2014 | Okamoto et al. |
| 2014/0157319 A1 | 6/2014 | Kimura et al. |
| 2014/0157422 A1 | 6/2014 | Livshits et al. |
| 2014/0163751 A1 | 6/2014 | Davis et al. |
| 2014/0163951 A1 | 6/2014 | Nikoulina et al. |
| 2014/0163953 A1 | 6/2014 | Parikh |
| 2014/0163954 A1 | 6/2014 | Joshi et al. |
| 2014/0163962 A1 | 6/2014 | Castelli et al. |
| 2014/0163976 A1 | 6/2014 | Park et al. |
| 2014/0163977 A1 | 6/2014 | Hoffmeister et al. |
| 2014/0163978 A1 | 6/2014 | Basye et al. |
| 2014/0163981 A1 | 6/2014 | Cook et al. |
| 2014/0163995 A1 | 6/2014 | Burns et al. |
| 2014/0164305 A1 | 6/2014 | Lynch et al. |
| 2014/0164312 A1 | 6/2014 | Lynch et al. |
| 2014/0164476 A1 | 6/2014 | Thomson |
| 2014/0164508 A1 | 6/2014 | Lynch et al. |
| 2014/0164532 A1 | 6/2014 | Lynch et al. |
| 2014/0164533 A1 | 6/2014 | Lynch et al. |
| 2014/0164953 A1 | 6/2014 | Lynch et al. |
| 2014/0169795 A1 | 6/2014 | Clough |
| 2014/0171064 A1 | 6/2014 | Das |
| 2014/0172412 A1 | 6/2014 | Viegas et al. |
| 2014/0172878 A1 | 6/2014 | Clark et al. |
| 2014/0173445 A1 | 6/2014 | Grassiotto |
| 2014/0173460 A1 | 6/2014 | Kim |
| 2014/0176814 A1 | 6/2014 | Ahn |
| 2014/0179295 A1 | 6/2014 | Luebbers et al. |
| 2014/0180499 A1 | 6/2014 | Cooper et al. |
| 2014/0180689 A1 | 6/2014 | Kim |
| 2014/0180697 A1 | 6/2014 | Torok et al. |
| 2014/0181865 A1 | 6/2014 | Koganei |
| 2014/0188460 A1 | 7/2014 | Ouyang et al. |
| 2014/0188477 A1 | 7/2014 | Zhang |
| 2014/0188478 A1 | 7/2014 | Zhang |
| 2014/0188485 A1 | 7/2014 | Kim et al. |
| 2014/0188835 A1 | 7/2014 | Zhang et al. |
| 2014/0195226 A1 | 7/2014 | Yun et al. |
| 2014/0195230 A1 | 7/2014 | Han et al. |
| 2014/0195233 A1 | 7/2014 | Bapat et al. |
| 2014/0195244 A1 | 7/2014 | Cha et al. |
| 2014/0195251 A1 | 7/2014 | Zeinstra et al. |
| 2014/0195252 A1 | 7/2014 | Gruber et al. |
| 2014/0198048 A1 | 7/2014 | Unruh et al. |
| 2014/0203939 A1 | 7/2014 | Harrington et al. |
| 2014/0205076 A1 | 7/2014 | Kumar et al. |

(56) References Cited

U.S. PATENT DOCUMENTS

| | | |
|---|---|---|
| 2014/0207439 A1 | 7/2014 | Venkatapathy et al. |
| 2014/0207446 A1 | 7/2014 | Klein et al. |
| 2014/0207447 A1 | 7/2014 | Jiang et al. |
| 2014/0207466 A1 | 7/2014 | Smadi |
| 2014/0207468 A1 | 7/2014 | Bartnik |
| 2014/0207582 A1 | 7/2014 | Flinn et al. |
| 2014/0211944 A1 | 7/2014 | Hayward et al. |
| 2014/0214429 A1 | 7/2014 | Pantel |
| 2014/0214537 A1 | 7/2014 | Yoo et al. |
| 2014/0215367 A1 | 7/2014 | Kim et al. |
| 2014/0215513 A1 | 7/2014 | Ramer et al. |
| 2014/0218372 A1 | 8/2014 | Missig et al. |
| 2014/0222435 A1 | 8/2014 | Li et al. |
| 2014/0222436 A1 | 8/2014 | Binder et al. |
| 2014/0222678 A1 | 8/2014 | Sheets et al. |
| 2014/0222967 A1 | 8/2014 | Harrang et al. |
| 2014/0223377 A1 | 8/2014 | Shaw et al. |
| 2014/0223481 A1 | 8/2014 | Fundament |
| 2014/0226503 A1 | 8/2014 | Cooper et al. |
| 2014/0229158 A1 | 8/2014 | Zweig et al. |
| 2014/0229184 A1 | 8/2014 | Shires |
| 2014/0230055 A1 | 8/2014 | Boehl |
| 2014/0232570 A1 | 8/2014 | Skinder et al. |
| 2014/0232656 A1 | 8/2014 | Pasquero et al. |
| 2014/0236595 A1 | 8/2014 | Gray |
| 2014/0236986 A1 | 8/2014 | Guzman |
| 2014/0237042 A1 | 8/2014 | Ahmed et al. |
| 2014/0237366 A1 | 8/2014 | Poulos et al. |
| 2014/0244248 A1 | 8/2014 | Arisoy et al. |
| 2014/0244249 A1 | 8/2014 | Mohamed et al. |
| 2014/0244254 A1 | 8/2014 | Ju et al. |
| 2014/0244257 A1 | 8/2014 | Colibro et al. |
| 2014/0244258 A1 | 8/2014 | Song et al. |
| 2014/0244263 A1 | 8/2014 | Pontual et al. |
| 2014/0244266 A1 | 8/2014 | Brown et al. |
| 2014/0244268 A1 | 8/2014 | Abdelsamie et al. |
| 2014/0244270 A1 | 8/2014 | Han et al. |
| 2014/0244271 A1 | 8/2014 | Lindahl |
| 2014/0244712 A1 | 8/2014 | Walters et al. |
| 2014/0245140 A1 | 8/2014 | Brown et al. |
| 2014/0247383 A1 | 9/2014 | Dave et al. |
| 2014/0247926 A1 | 9/2014 | Gainsboro et al. |
| 2014/0249812 A1 | 9/2014 | Bou-Ghazale et al. |
| 2014/0249816 A1 | 9/2014 | Pickering et al. |
| 2014/0249817 A1 | 9/2014 | Hart et al. |
| 2014/0249820 A1 | 9/2014 | Hsu et al. |
| 2014/0249821 A1 | 9/2014 | Kennewick et al. |
| 2014/0250046 A1 | 9/2014 | Winn et al. |
| 2014/0257809 A1 | 9/2014 | Goel et al. |
| 2014/0257815 A1 | 9/2014 | Zhao et al. |
| 2014/0257902 A1 | 9/2014 | Moore et al. |
| 2014/0258324 A1 | 9/2014 | Mauro et al. |
| 2014/0258357 A1 | 9/2014 | Singh et al. |
| 2014/0258857 A1 | 9/2014 | Dykstra-Erickson et al. |
| 2014/0258905 A1 | 9/2014 | Lee et al. |
| 2014/0267022 A1 | 9/2014 | Kim |
| 2014/0267599 A1 | 9/2014 | Drouin et al. |
| 2014/0267933 A1 | 9/2014 | Young |
| 2014/0272821 A1 | 9/2014 | Pitschel et al. |
| 2014/0273979 A1 | 9/2014 | Van Os et al. |
| 2014/0274005 A1 | 9/2014 | Luna et al. |
| 2014/0274203 A1 | 9/2014 | Ganong, III et al. |
| 2014/0274211 A1 | 9/2014 | Sejnoha et al. |
| 2014/0278051 A1 | 9/2014 | Mcgavran et al. |
| 2014/0278343 A1 | 9/2014 | Tran |
| 2014/0278349 A1 | 9/2014 | Grieves et al. |
| 2014/0278379 A1 | 9/2014 | Coccaro et al. |
| 2014/0278390 A1 | 9/2014 | Kingsbury et al. |
| 2014/0278391 A1 | 9/2014 | Braho et al. |
| 2014/0278394 A1 | 9/2014 | Bastyr et al. |
| 2014/0278406 A1 | 9/2014 | Tsumura et al. |
| 2014/0278413 A1 | 9/2014 | Pitschel et al. |
| 2014/0278426 A1 | 9/2014 | Jost et al. |
| 2014/0278429 A1 | 9/2014 | Ganong, III |
| 2014/0278435 A1 | 9/2014 | Ganong, III et al. |
| 2014/0278436 A1 | 9/2014 | Khanna et al. |
| 2014/0278438 A1 | 9/2014 | Hart et al. |
| 2014/0278443 A1 | 9/2014 | Gunn et al. |
| 2014/0278444 A1 | 9/2014 | Larson et al. |
| 2014/0278513 A1 | 9/2014 | Prakash et al. |
| 2014/0279622 A1 | 9/2014 | Lamoureux et al. |
| 2014/0279739 A1 | 9/2014 | Elkington et al. |
| 2014/0279787 A1 | 9/2014 | Cheng et al. |
| 2014/0280072 A1 | 9/2014 | Coleman |
| 2014/0280107 A1 | 9/2014 | Heymans et al. |
| 2014/0280138 A1 | 9/2014 | Li et al. |
| 2014/0280292 A1 | 9/2014 | Skinder |
| 2014/0280353 A1 | 9/2014 | Delaney et al. |
| 2014/0280450 A1 | 9/2014 | Luna |
| 2014/0280757 A1 | 9/2014 | Tran |
| 2014/0281944 A1 | 9/2014 | Winer |
| 2014/0281983 A1 | 9/2014 | Xian et al. |
| 2014/0281997 A1 | 9/2014 | Fleizach et al. |
| 2014/0282003 A1 | 9/2014 | Gruber et al. |
| 2014/0282007 A1 | 9/2014 | Fleizach |
| 2014/0282045 A1 | 9/2014 | Ayanam et al. |
| 2014/0282178 A1 | 9/2014 | Borzello et al. |
| 2014/0282201 A1 | 9/2014 | Pasquero et al. |
| 2014/0282203 A1 | 9/2014 | Pasquero et al. |
| 2014/0282559 A1 | 9/2014 | Verduzco et al. |
| 2014/0282586 A1 | 9/2014 | Shear et al. |
| 2014/0282743 A1 | 9/2014 | Howard et al. |
| 2014/0288990 A1 | 9/2014 | Moore et al. |
| 2014/0289508 A1 | 9/2014 | Wang |
| 2014/0297267 A1 | 10/2014 | Spencer et al. |
| 2014/0297281 A1 | 10/2014 | Togawa et al. |
| 2014/0297284 A1 | 10/2014 | Gruber et al. |
| 2014/0297288 A1 | 10/2014 | Yu et al. |
| 2014/0298395 A1 | 10/2014 | Yang et al. |
| 2014/0304086 A1 | 10/2014 | Dasdan et al. |
| 2014/0304605 A1 | 10/2014 | Ohmura et al. |
| 2014/0309990 A1 | 10/2014 | Gandrabur et al. |
| 2014/0309996 A1 | 10/2014 | Zhang |
| 2014/0310001 A1 | 10/2014 | Kalns et al. |
| 2014/0310002 A1 | 10/2014 | Nitz et al. |
| 2014/0310348 A1 | 10/2014 | Keskitalo et al. |
| 2014/0310365 A1 | 10/2014 | Sample et al. |
| 2014/0310595 A1 | 10/2014 | Acharya et al. |
| 2014/0313007 A1 | 10/2014 | Harding |
| 2014/0315492 A1 | 10/2014 | Woods |
| 2014/0316585 A1 | 10/2014 | Boesveld et al. |
| 2014/0317030 A1 | 10/2014 | Shen et al. |
| 2014/0317502 A1 | 10/2014 | Brown et al. |
| 2014/0324429 A1* | 10/2014 | Weilhammer et al. ..................... G10L 15/1815 704/244 |
| 2014/0324884 A1 | 10/2014 | Lindahl et al. |
| 2014/0330560 A1 | 11/2014 | Venkatesha et al. |
| 2014/0330569 A1 | 11/2014 | Kolavennu et al. |
| 2014/0330951 A1 | 11/2014 | Sukoff et al. |
| 2014/0335823 A1 | 11/2014 | Heredia et al. |
| 2014/0337037 A1 | 11/2014 | Chi |
| 2014/0337048 A1 | 11/2014 | Brown et al. |
| 2014/0337266 A1 | 11/2014 | Wolverton et al. |
| 2014/0337370 A1 | 11/2014 | Aravamudan et al. |
| 2014/0337371 A1 | 11/2014 | Li |
| 2014/0337438 A1 | 11/2014 | Govande et al. |
| 2014/0337621 A1 | 11/2014 | Nakhimov |
| 2014/0337751 A1 | 11/2014 | Lim et al. |
| 2014/0337814 A1 | 11/2014 | Kalns et al. |
| 2014/0342762 A1 | 11/2014 | Hajdu et al. |
| 2014/0343834 A1 | 11/2014 | Demerchant et al. |
| 2014/0343943 A1 | 11/2014 | Al-Telmissani |
| 2014/0343946 A1 | 11/2014 | Torok et al. |
| 2014/0344205 A1 | 11/2014 | Luna et al. |
| 2014/0344627 A1 | 11/2014 | Schaub et al. |
| 2014/0344687 A1 | 11/2014 | Durham et al. |
| 2014/0347181 A1 | 11/2014 | Luna et al. |
| 2014/0350847 A1 | 11/2014 | Ichinokawa |
| 2014/0350924 A1 | 11/2014 | Zurek et al. |
| 2014/0350933 A1 | 11/2014 | Bak et al. |
| 2014/0351741 A1 | 11/2014 | Medlock et al. |
| 2014/0351760 A1 | 11/2014 | Skory et al. |
| 2014/0358519 A1 | 12/2014 | Mirkin et al. |

(56) References Cited

U.S. PATENT DOCUMENTS

| | | |
|---|---|---|
| 2014/0358521 A1 | 12/2014 | Mikutel et al. |
| 2014/0358523 A1 | 12/2014 | Sheth et al. |
| 2014/0358549 A1 | 12/2014 | O'connor et al. |
| 2014/0359637 A1 | 12/2014 | Yan |
| 2014/0359709 A1 | 12/2014 | Nassar et al. |
| 2014/0361973 A1 | 12/2014 | Raux et al. |
| 2014/0363074 A1 | 12/2014 | Dolfing et al. |
| 2014/0364149 A1 | 12/2014 | Marti et al. |
| 2014/0365209 A1 | 12/2014 | Evermann |
| 2014/0365214 A1 | 12/2014 | Bayley |
| 2014/0365216 A1 | 12/2014 | Gruber et al. |
| 2014/0365226 A1 | 12/2014 | Sinha |
| 2014/0365227 A1 | 12/2014 | Cash et al. |
| 2014/0365407 A1 | 12/2014 | Brown et al. |
| 2014/0365505 A1 | 12/2014 | Clark et al. |
| 2014/0365880 A1 | 12/2014 | Bellegarda |
| 2014/0365885 A1 | 12/2014 | Carson et al. |
| 2014/0365895 A1 | 12/2014 | Magahern et al. |
| 2014/0365922 A1 | 12/2014 | Yang |
| 2014/0365945 A1 | 12/2014 | Karunamuni et al. |
| 2014/0370817 A1 | 12/2014 | Luna |
| 2014/0370841 A1 | 12/2014 | Roberts et al. |
| 2014/0372112 A1 | 12/2014 | Xue et al. |
| 2014/0372356 A1 | 12/2014 | Bilal et al. |
| 2014/0372468 A1 | 12/2014 | Collins et al. |
| 2014/0372931 A1 | 12/2014 | Zhai et al. |
| 2014/0379334 A1 | 12/2014 | Fry |
| 2014/0379341 A1 | 12/2014 | Seo et al. |
| 2014/0379798 A1 | 12/2014 | Bunner et al. |
| 2014/0380285 A1 | 12/2014 | Gabel et al. |
| 2015/0003797 A1 | 1/2015 | Schmidt |
| 2015/0004958 A1 | 1/2015 | Wang et al. |
| 2015/0006148 A1 | 1/2015 | Goldszmit et al. |
| 2015/0006157 A1 | 1/2015 | Silva et al. |
| 2015/0006167 A1 | 1/2015 | Kato et al. |
| 2015/0006176 A1 | 1/2015 | Pogue et al. |
| 2015/0006178 A1 | 1/2015 | Peng et al. |
| 2015/0006184 A1 | 1/2015 | Marti et al. |
| 2015/0006199 A1 | 1/2015 | Snider et al. |
| 2015/0012271 A1 | 1/2015 | Peng et al. |
| 2015/0012862 A1 | 1/2015 | Ikeda et al. |
| 2015/0019219 A1 | 1/2015 | Tzirkel-Hancock et al. |
| 2015/0019221 A1 | 1/2015 | Lee et al. |
| 2015/0019944 A1 | 1/2015 | Kalgi |
| 2015/0019954 A1 | 1/2015 | Dalal et al. |
| 2015/0019974 A1 | 1/2015 | Doi et al. |
| 2015/0025405 A1 | 1/2015 | Vairavan et al. |
| 2015/0025890 A1 | 1/2015 | Jagatheesan et al. |
| 2015/0026620 A1 | 1/2015 | Kwon et al. |
| 2015/0027178 A1 | 1/2015 | Scalisi |
| 2015/0031416 A1 | 1/2015 | Labowicz et al. |
| 2015/0032443 A1 | 1/2015 | Karov et al. |
| 2015/0032457 A1 | 1/2015 | Koo et al. |
| 2015/0033219 A1 | 1/2015 | Breiner et al. |
| 2015/0033275 A1 | 1/2015 | Natani et al. |
| 2015/0034855 A1 | 2/2015 | Shen |
| 2015/0038161 A1 | 2/2015 | Jakobson et al. |
| 2015/0039292 A1 | 2/2015 | Suleman et al. |
| 2015/0039295 A1 | 2/2015 | Soschen |
| 2015/0039299 A1 | 2/2015 | Weinstein et al. |
| 2015/0039305 A1 | 2/2015 | Huang |
| 2015/0039606 A1 | 2/2015 | Salaka et al. |
| 2015/0040012 A1 | 2/2015 | Faaborg et al. |
| 2015/0045003 A1 | 2/2015 | Vora et al. |
| 2015/0045007 A1 | 2/2015 | Cash |
| 2015/0045068 A1 | 2/2015 | Soffer et al. |
| 2015/0046434 A1 | 2/2015 | Lim et al. |
| 2015/0046537 A1 | 2/2015 | Rakib |
| 2015/0046828 A1 | 2/2015 | Desai et al. |
| 2015/0050633 A1 | 2/2015 | Christmas et al. |
| 2015/0050923 A1 | 2/2015 | Tu et al. |
| 2015/0051754 A1 | 2/2015 | Kwon et al. |
| 2015/0053779 A1 | 2/2015 | Adamek et al. |
| 2015/0053781 A1 | 2/2015 | Nelson et al. |
| 2015/0055879 A1 | 2/2015 | Yang |
| 2015/0058013 A1 | 2/2015 | Pakhomov et al. |
| 2015/0058018 A1 | 2/2015 | Georges et al. |
| 2015/0058720 A1 | 2/2015 | Smadja et al. |
| 2015/0058785 A1 | 2/2015 | Ookawara |
| 2015/0065149 A1 | 3/2015 | Russell et al. |
| 2015/0065200 A1 | 3/2015 | Namgung et al. |
| 2015/0066494 A1 | 3/2015 | Salvador et al. |
| 2015/0066496 A1 | 3/2015 | Deoras et al. |
| 2015/0066506 A1 | 3/2015 | Romano et al. |
| 2015/0066516 A1 | 3/2015 | Nishikawa et al. |
| 2015/0066817 A1 | 3/2015 | Slayton et al. |
| 2015/0067485 A1 | 3/2015 | Kim et al. |
| 2015/0067819 A1 | 3/2015 | Shribman et al. |
| 2015/0067822 A1 | 3/2015 | Randall |
| 2015/0071121 A1 | 3/2015 | Patil et al. |
| 2015/0073788 A1 | 3/2015 | Sak et al. |
| 2015/0073804 A1 | 3/2015 | Senior et al. |
| 2015/0074524 A1 | 3/2015 | Nicholson et al. |
| 2015/0074615 A1 | 3/2015 | Han et al. |
| 2015/0081295 A1 | 3/2015 | Yun et al. |
| 2015/0082180 A1 | 3/2015 | Ames et al. |
| 2015/0082229 A1 | 3/2015 | Ouyang et al. |
| 2015/0086174 A1 | 3/2015 | Abecassis et al. |
| 2015/0088511 A1 | 3/2015 | Bharadwaj et al. |
| 2015/0088514 A1 | 3/2015 | Typrin |
| 2015/0088518 A1 | 3/2015 | Kim et al. |
| 2015/0088522 A1 | 3/2015 | Hendrickson et al. |
| 2015/0088523 A1 | 3/2015 | Schuster |
| 2015/0088998 A1 | 3/2015 | Isensee et al. |
| 2015/0092520 A1 | 4/2015 | Robison et al. |
| 2015/0094834 A1 | 4/2015 | Vega et al. |
| 2015/0095031 A1 | 4/2015 | Conkie et al. |
| 2015/0095268 A1 | 4/2015 | Greenzeiger et al. |
| 2015/0095278 A1 | 4/2015 | Flinn et al. |
| 2015/0100144 A1 | 4/2015 | Lee et al. |
| 2015/0100313 A1 | 4/2015 | Sharma |
| 2015/0100316 A1 | 4/2015 | Williams et al. |
| 2015/0100537 A1 | 4/2015 | Grieves et al. |
| 2015/0100983 A1 | 4/2015 | Pan |
| 2015/0106061 A1 | 4/2015 | Yang et al. |
| 2015/0106085 A1 | 4/2015 | Lindahl |
| 2015/0106093 A1 | 4/2015 | Weeks et al. |
| 2015/0106737 A1 | 4/2015 | Montoy-Wilson et al. |
| 2015/0113407 A1 | 4/2015 | Hoffert et al. |
| 2015/0113435 A1 | 4/2015 | Phillips |
| 2015/0120296 A1 | 4/2015 | Stern et al. |
| 2015/0120641 A1 | 4/2015 | Soon-Shiong et al. |
| 2015/0120723 A1 | 4/2015 | Deshmukh et al. |
| 2015/0121216 A1 | 4/2015 | Brown et al. |
| 2015/0123898 A1 | 5/2015 | Kim et al. |
| 2015/0127337 A1 | 5/2015 | Heigold et al. |
| 2015/0127348 A1 | 5/2015 | Follis |
| 2015/0127350 A1 | 5/2015 | Agiomyrgiannakis |
| 2015/0128058 A1 | 5/2015 | Anajwala |
| 2015/0133049 A1 | 5/2015 | Lee et al. |
| 2015/0133109 A1 | 5/2015 | Freeman et al. |
| 2015/0134318 A1 | 5/2015 | Cuthbert et al. |
| 2015/0134322 A1 | 5/2015 | Cuthbert et al. |
| 2015/0134323 A1 | 5/2015 | Cuthbert et al. |
| 2015/0134334 A1 | 5/2015 | Sachidanandam et al. |
| 2015/0135085 A1 | 5/2015 | Shoham et al. |
| 2015/0135123 A1 | 5/2015 | Carr et al. |
| 2015/0140934 A1 | 5/2015 | Abdurrahman et al. |
| 2015/0140990 A1 | 5/2015 | Kim et al. |
| 2015/0141150 A1 | 5/2015 | Zha |
| 2015/0142420 A1 | 5/2015 | Sarikaya et al. |
| 2015/0142438 A1 | 5/2015 | Dai et al. |
| 2015/0142440 A1 | 5/2015 | Parkinson et al. |
| 2015/0142447 A1 | 5/2015 | Kennewick et al. |
| 2015/0142851 A1 | 5/2015 | Gupta et al. |
| 2015/0143419 A1 | 5/2015 | Bhagwat et al. |
| 2015/0148013 A1 | 5/2015 | Baldwin et al. |
| 2015/0149177 A1 | 5/2015 | Kalns et al. |
| 2015/0149182 A1 | 5/2015 | Kalns et al. |
| 2015/0149354 A1 | 5/2015 | Mccoy |
| 2015/0149469 A1 | 5/2015 | Xu et al. |
| 2015/0149899 A1 | 5/2015 | Bernstein et al. |
| 2015/0149964 A1 | 5/2015 | Bernstein et al. |
| 2015/0154001 A1 | 6/2015 | Knox et al. |

(56) References Cited

U.S. PATENT DOCUMENTS

| | | |
|---|---|---|
| 2015/0154185 A1 | 6/2015 | Waibel |
| 2015/0154976 A1 | 6/2015 | Mutagi |
| 2015/0160855 A1 | 6/2015 | Bi |
| 2015/0161291 A1 | 6/2015 | Gur et al. |
| 2015/0161370 A1 | 6/2015 | North et al. |
| 2015/0161521 A1 | 6/2015 | Shah et al. |
| 2015/0161989 A1 | 6/2015 | Hsu et al. |
| 2015/0162000 A1 | 6/2015 | Di Censo et al. |
| 2015/0162001 A1 | 6/2015 | Kar et al. |
| 2015/0162006 A1 | 6/2015 | Kummer |
| 2015/0163558 A1 | 6/2015 | Wheatley |
| 2015/0169081 A1 | 6/2015 | Neels et al. |
| 2015/0169284 A1 | 6/2015 | Quast et al. |
| 2015/0169336 A1 | 6/2015 | Harper et al. |
| 2015/0169696 A1 | 6/2015 | Krishnappa et al. |
| 2015/0170073 A1 | 6/2015 | Baker |
| 2015/0170664 A1 | 6/2015 | Doherty et al. |
| 2015/0172262 A1 | 6/2015 | Ortiz, Jr. et al. |
| 2015/0172463 A1 | 6/2015 | Quast et al. |
| 2015/0178388 A1 | 6/2015 | Winnemoeller et al. |
| 2015/0178785 A1 | 6/2015 | Salonen |
| 2015/0179168 A1 | 6/2015 | Hakkani-Tur et al. |
| 2015/0179176 A1 | 6/2015 | Ryu et al. |
| 2015/0181285 A1 | 6/2015 | Zhang et al. |
| 2015/0185964 A1 | 7/2015 | Stout |
| 2015/0185993 A1 | 7/2015 | Wheatley et al. |
| 2015/0185996 A1 | 7/2015 | Brown et al. |
| 2015/0186012 A1 | 7/2015 | Coleman et al. |
| 2015/0186110 A1 | 7/2015 | Kannan |
| 2015/0186154 A1 | 7/2015 | Brown et al. |
| 2015/0186155 A1 | 7/2015 | Brown et al. |
| 2015/0186156 A1 | 7/2015 | Brown et al. |
| 2015/0186351 A1 | 7/2015 | Hicks et al. |
| 2015/0186538 A1 | 7/2015 | Yan et al. |
| 2015/0186783 A1 | 7/2015 | Byrne et al. |
| 2015/0186892 A1 | 7/2015 | Zhang et al. |
| 2015/0187355 A1 | 7/2015 | Parkinson et al. |
| 2015/0187369 A1 | 7/2015 | Dadu et al. |
| 2015/0189362 A1 | 7/2015 | Lee et al. |
| 2015/0193379 A1 | 7/2015 | Mehta |
| 2015/0193391 A1 | 7/2015 | Khvostichenko et al. |
| 2015/0193392 A1 | 7/2015 | Greenblatt et al. |
| 2015/0194152 A1 | 7/2015 | Katuri et al. |
| 2015/0194165 A1 | 7/2015 | Faaborg et al. |
| 2015/0195379 A1 | 7/2015 | Zhang et al. |
| 2015/0195606 A1 | 7/2015 | McDevitt |
| 2015/0199077 A1 | 7/2015 | Zuger et al. |
| 2015/0199960 A1 | 7/2015 | Huo et al. |
| 2015/0199965 A1 | 7/2015 | Leak et al. |
| 2015/0199967 A1 | 7/2015 | Reddy et al. |
| 2015/0201064 A1 | 7/2015 | Bells et al. |
| 2015/0201077 A1 | 7/2015 | Konig et al. |
| 2015/0205425 A1 | 7/2015 | Kuscher et al. |
| 2015/0205568 A1 | 7/2015 | Matsuoka |
| 2015/0205632 A1 | 7/2015 | Gaster |
| 2015/0205858 A1 | 7/2015 | Xie et al. |
| 2015/0206529 A1 | 7/2015 | Kwon et al. |
| 2015/0208226 A1 | 7/2015 | Kuusilinna et al. |
| 2015/0212791 A1 | 7/2015 | Kumar et al. |
| 2015/0213140 A1 | 7/2015 | Volkert |
| 2015/0213796 A1 | 7/2015 | Waltermann et al. |
| 2015/0215258 A1 | 7/2015 | Nowakowski et al. |
| 2015/0215350 A1 | 7/2015 | Slayton et al. |
| 2015/0217870 A1 | 8/2015 | Mccullough et al. |
| 2015/0220264 A1 | 8/2015 | Lewis et al. |
| 2015/0220507 A1 | 8/2015 | Mohajer et al. |
| 2015/0220715 A1 | 8/2015 | Kim et al. |
| 2015/0220972 A1 | 8/2015 | Subramanya et al. |
| 2015/0221302 A1 | 8/2015 | Han et al. |
| 2015/0221304 A1 | 8/2015 | Stewart |
| 2015/0221307 A1 | 8/2015 | Shah et al. |
| 2015/0222586 A1 | 8/2015 | Ebersman et al. |
| 2015/0224848 A1 | 8/2015 | Eisenhour |
| 2015/0227505 A1 | 8/2015 | Morimoto |
| 2015/0227633 A1 | 8/2015 | Shapira |
| 2015/0228274 A1 | 8/2015 | Leppanen et al. |
| 2015/0228275 A1 | 8/2015 | Watanabe et al. |
| 2015/0228281 A1 | 8/2015 | Raniere |
| 2015/0228283 A1 | 8/2015 | Ehsani et al. |
| 2015/0228292 A1 | 8/2015 | Goldstein et al. |
| 2015/0230095 A1 | 8/2015 | Smith et al. |
| 2015/0234556 A1 | 8/2015 | Shaofeng et al. |
| 2015/0234636 A1 | 8/2015 | Barnes, Jr. |
| 2015/0234800 A1 | 8/2015 | Patrick et al. |
| 2015/0235434 A1 | 8/2015 | Miller et al. |
| 2015/0237301 A1 | 8/2015 | Shi et al. |
| 2015/0242091 A1 | 8/2015 | Lu et al. |
| 2015/0242385 A1 | 8/2015 | Bao et al. |
| 2015/0243278 A1 | 8/2015 | Kibre et al. |
| 2015/0243279 A1 | 8/2015 | Morse et al. |
| 2015/0243283 A1 | 8/2015 | Halash et al. |
| 2015/0244665 A1 | 8/2015 | Choi et al. |
| 2015/0245154 A1 | 8/2015 | Dadu et al. |
| 2015/0248651 A1 | 9/2015 | Akutagawa et al. |
| 2015/0248886 A1 | 9/2015 | Sarikaya et al. |
| 2015/0249715 A1 | 9/2015 | Helvik et al. |
| 2015/0253146 A1 | 9/2015 | Annapureddy et al. |
| 2015/0253885 A1 | 9/2015 | Kagan et al. |
| 2015/0254057 A1 | 9/2015 | Klein et al. |
| 2015/0254058 A1 | 9/2015 | Klein et al. |
| 2015/0254333 A1 | 9/2015 | Fife et al. |
| 2015/0255071 A1 | 9/2015 | Chiba |
| 2015/0256873 A1 | 9/2015 | Klein et al. |
| 2015/0261298 A1 | 9/2015 | Li |
| 2015/0261496 A1 | 9/2015 | Faaborg et al. |
| 2015/0261850 A1 | 9/2015 | Mittal |
| 2015/0262583 A1 | 9/2015 | Kanda et al. |
| 2015/0269139 A1 | 9/2015 | McAteer et al. |
| 2015/0269617 A1 | 9/2015 | Mikurak |
| 2015/0269677 A1 | 9/2015 | Milne |
| 2015/0269943 A1 | 9/2015 | VanBlon et al. |
| 2015/0277574 A1 | 10/2015 | Jain et al. |
| 2015/0278199 A1 | 10/2015 | Hazen et al. |
| 2015/0278348 A1 | 10/2015 | Paruchuri et al. |
| 2015/0278370 A1 | 10/2015 | Stratvert et al. |
| 2015/0278737 A1 | 10/2015 | Chen Huebscher et al. |
| 2015/0279358 A1 | 10/2015 | Kingsbury et al. |
| 2015/0279360 A1 | 10/2015 | Mengibar et al. |
| 2015/0279366 A1 | 10/2015 | Krestnikov et al. |
| 2015/0281380 A1 | 10/2015 | Wang et al. |
| 2015/0281401 A1 | 10/2015 | Le et al. |
| 2015/0286627 A1 | 10/2015 | Chang et al. |
| 2015/0286716 A1 | 10/2015 | Snibbe et al. |
| 2015/0286937 A1 | 10/2015 | Hildebrand |
| 2015/0287401 A1 | 10/2015 | Lee et al. |
| 2015/0287409 A1 | 10/2015 | Jang |
| 2015/0287411 A1 | 10/2015 | Kojima et al. |
| 2015/0288629 A1 | 10/2015 | Choi et al. |
| 2015/0294086 A1 | 10/2015 | Kare et al. |
| 2015/0294377 A1 | 10/2015 | Chow |
| 2015/0294516 A1 | 10/2015 | Chiang |
| 2015/0294670 A1 | 10/2015 | Roblek et al. |
| 2015/0295915 A1 | 10/2015 | Xiu |
| 2015/0301796 A1 | 10/2015 | Visser et al. |
| 2015/0302316 A1 | 10/2015 | Buryak et al. |
| 2015/0302855 A1 | 10/2015 | Kim et al. |
| 2015/0302856 A1 | 10/2015 | Kim et al. |
| 2015/0302857 A1 | 10/2015 | Yamada |
| 2015/0302870 A1 | 10/2015 | Burke et al. |
| 2015/0308470 A1 | 10/2015 | Graham et al. |
| 2015/0309691 A1 | 10/2015 | Seo et al. |
| 2015/0309997 A1 | 10/2015 | Lee et al. |
| 2015/0310114 A1 | 10/2015 | Ryger et al. |
| 2015/0310858 A1 | 10/2015 | Li et al. |
| 2015/0310862 A1 | 10/2015 | Dauphin et al. |
| 2015/0310879 A1 | 10/2015 | Buchanan et al. |
| 2015/0310888 A1 | 10/2015 | Chen |
| 2015/0312182 A1 | 10/2015 | Langholz |
| 2015/0312409 A1 | 10/2015 | Czarnecki et al. |
| 2015/0314454 A1 | 11/2015 | Breazeal et al. |
| 2015/0317069 A1 | 11/2015 | Clements et al. |
| 2015/0317310 A1 | 11/2015 | Eiche et al. |
| 2015/0319411 A1 | 11/2015 | Kasmir et al. |
| 2015/0324041 A1 | 11/2015 | Varley et al. |

(56) References Cited

U.S. PATENT DOCUMENTS

| | | |
|---|---|---|
| 2015/0324334 A1 | 11/2015 | Lee et al. |
| 2015/0324362 A1 | 11/2015 | Glass et al. |
| 2015/0331664 A1 | 11/2015 | Osawa et al. |
| 2015/0331711 A1 | 11/2015 | Huang et al. |
| 2015/0332667 A1 | 11/2015 | Mason |
| 2015/0334346 A1 | 11/2015 | Cheatham, III et al. |
| 2015/0339049 A1 | 11/2015 | Kasemset et al. |
| 2015/0339391 A1 | 11/2015 | Kang et al. |
| 2015/0340033 A1 | 11/2015 | Di Fabbrizio et al. |
| 2015/0340034 A1 | 11/2015 | Schalkwyk et al. |
| 2015/0340040 A1 | 11/2015 | Mun et al. |
| 2015/0340042 A1 | 11/2015 | Sejnoha et al. |
| 2015/0341717 A1 | 11/2015 | Song et al. |
| 2015/0346845 A1 | 12/2015 | Di Censo et al. |
| 2015/0347086 A1 | 12/2015 | Liedholm et al. |
| 2015/0347381 A1 | 12/2015 | Bellegarda |
| 2015/0347382 A1 | 12/2015 | Dolfing et al. |
| 2015/0347383 A1 | 12/2015 | Willmore et al. |
| 2015/0347385 A1 | 12/2015 | Flor et al. |
| 2015/0347393 A1 | 12/2015 | Futrell et al. |
| 2015/0347552 A1 | 12/2015 | Habouzit et al. |
| 2015/0347733 A1 | 12/2015 | Tsou et al. |
| 2015/0347985 A1 | 12/2015 | Gross et al. |
| 2015/0348533 A1 | 12/2015 | Saddler et al. |
| 2015/0348547 A1 | 12/2015 | Paulik et al. |
| 2015/0348548 A1 | 12/2015 | Piernot et al. |
| 2015/0348549 A1 | 12/2015 | Giuli et al. |
| 2015/0348551 A1 | 12/2015 | Gruber et al. |
| 2015/0348554 A1 | 12/2015 | Orr et al. |
| 2015/0348555 A1 | 12/2015 | Sugita |
| 2015/0348565 A1 | 12/2015 | Rhoten et al. |
| 2015/0349934 A1 | 12/2015 | Pollack et al. |
| 2015/0350031 A1 | 12/2015 | Burks et al. |
| 2015/0350342 A1 | 12/2015 | Thorpe et al. |
| 2015/0350594 A1 | 12/2015 | Mate et al. |
| 2015/0352999 A1 | 12/2015 | Bando et al. |
| 2015/0355879 A1 | 12/2015 | Beckhardt et al. |
| 2015/0356410 A1 | 12/2015 | Faith et al. |
| 2015/0363587 A1 | 12/2015 | Ahn et al. |
| 2015/0364128 A1 | 12/2015 | Zhao et al. |
| 2015/0364140 A1 | 12/2015 | Thörn |
| 2015/0365251 A1 | 12/2015 | Kinoshita et al. |
| 2015/0370531 A1 | 12/2015 | Faaborg |
| 2015/0370780 A1 | 12/2015 | Wang et al. |
| 2015/0370787 A1 | 12/2015 | Akbacak et al. |
| 2015/0370884 A1 | 12/2015 | Hurley et al. |
| 2015/0371215 A1 | 12/2015 | Zhou et al. |
| 2015/0371529 A1 | 12/2015 | Dolecki |
| 2015/0371639 A1 | 12/2015 | Foerster et al. |
| 2015/0371663 A1 | 12/2015 | Gustafson et al. |
| 2015/0371664 A1 | 12/2015 | Bar-Or et al. |
| 2015/0371665 A1 | 12/2015 | Naik et al. |
| 2015/0373183 A1 | 12/2015 | Woolsey et al. |
| 2015/0379118 A1 | 12/2015 | Wickenkamp et al. |
| 2015/0379414 A1 | 12/2015 | Yeh et al. |
| 2015/0379993 A1 | 12/2015 | Subhojit et al. |
| 2015/0381923 A1 | 12/2015 | Wickenkamp et al. |
| 2015/0382047 A1 | 12/2015 | Van Os et al. |
| 2015/0382079 A1 | 12/2015 | Lister et al. |
| 2015/0382147 A1 | 12/2015 | Clark et al. |
| 2016/0004499 A1 | 1/2016 | Kim et al. |
| 2016/0004690 A1 | 1/2016 | Bangalore et al. |
| 2016/0005320 A1 | 1/2016 | deCharms et al. |
| 2016/0006795 A1 | 1/2016 | Yunten |
| 2016/0012038 A1 | 1/2016 | Edwards et al. |
| 2016/0014476 A1 | 1/2016 | Caliendo, Jr. et al. |
| 2016/0018872 A1 | 1/2016 | Tu et al. |
| 2016/0018900 A1 | 1/2016 | Tu et al. |
| 2016/0018959 A1 | 1/2016 | Yamashita et al. |
| 2016/0019886 A1 | 1/2016 | Hong |
| 2016/0021414 A1 | 1/2016 | Padi et al. |
| 2016/0026258 A1 | 1/2016 | Ou et al. |
| 2016/0027431 A1 | 1/2016 | Kurzweil et al. |
| 2016/0028666 A1 | 1/2016 | Li |
| 2016/0028802 A1 | 1/2016 | Balasingh et al. |
| 2016/0029316 A1 | 1/2016 | Mohan et al. |
| 2016/0034042 A1 | 2/2016 | Joo |
| 2016/0034811 A1 | 2/2016 | Paulik et al. |
| 2016/0036953 A1 | 2/2016 | Lee et al. |
| 2016/0041809 A1 | 2/2016 | Clayton et al. |
| 2016/0042735 A1 | 2/2016 | Vibbert et al. |
| 2016/0042748 A1 | 2/2016 | Jain et al. |
| 2016/0043905 A1 | 2/2016 | Fiedler |
| 2016/0048666 A1 | 2/2016 | Dey et al. |
| 2016/0050254 A1 | 2/2016 | Rao et al. |
| 2016/0055422 A1 | 2/2016 | Li |
| 2016/0061623 A1 | 3/2016 | Pahwa et al. |
| 2016/0062605 A1 | 3/2016 | Agarwal et al. |
| 2016/0063094 A1 | 3/2016 | Udupa et al. |
| 2016/0063998 A1 | 3/2016 | Krishnamoorthy et al. |
| 2016/0065155 A1 | 3/2016 | Bharj et al. |
| 2016/0065626 A1 | 3/2016 | Jain et al. |
| 2016/0066020 A1 | 3/2016 | Mountain |
| 2016/0070581 A1 | 3/2016 | Soon-Shiong |
| 2016/0071516 A1 | 3/2016 | Lee et al. |
| 2016/0071517 A1 | 3/2016 | Beaver et al. |
| 2016/0071521 A1 | 3/2016 | Haughay |
| 2016/0072940 A1 | 3/2016 | Cronin |
| 2016/0077794 A1 | 3/2016 | Kim et al. |
| 2016/0078359 A1 | 3/2016 | Csurka et al. |
| 2016/0078860 A1 | 3/2016 | Paulik et al. |
| 2016/0080165 A1 | 3/2016 | Ehsani et al. |
| 2016/0080475 A1 | 3/2016 | Singh et al. |
| 2016/0085295 A1 | 3/2016 | Shimy et al. |
| 2016/0085827 A1 | 3/2016 | Chadha et al. |
| 2016/0086116 A1 | 3/2016 | Rao et al. |
| 2016/0086599 A1 | 3/2016 | Kurata et al. |
| 2016/0088335 A1 | 3/2016 | Zucchetta |
| 2016/0091871 A1 | 3/2016 | Marti et al. |
| 2016/0091967 A1 | 3/2016 | Prokofieva et al. |
| 2016/0092074 A1 | 3/2016 | Raux et al. |
| 2016/0092434 A1 | 3/2016 | Bellegarda |
| 2016/0092447 A1 | 3/2016 | Pathurudeen et al. |
| 2016/0092766 A1 | 3/2016 | Sainath et al. |
| 2016/0093291 A1 | 3/2016 | Kim |
| 2016/0093298 A1 | 3/2016 | Naik et al. |
| 2016/0093301 A1 | 3/2016 | Bellegarda et al. |
| 2016/0093304 A1 | 3/2016 | Kim et al. |
| 2016/0094700 A1 | 3/2016 | Lee et al. |
| 2016/0094889 A1 | 3/2016 | Venkataraman et al. |
| 2016/0094979 A1 | 3/2016 | Naik et al. |
| 2016/0098991 A1 | 4/2016 | Luo et al. |
| 2016/0098992 A1 | 4/2016 | Renard et al. |
| 2016/0099892 A1 | 4/2016 | Palakovich et al. |
| 2016/0099984 A1 | 4/2016 | Karagiannis et al. |
| 2016/0104480 A1 | 4/2016 | Sharifi |
| 2016/0104486 A1 | 4/2016 | Penilla et al. |
| 2016/0111091 A1 | 4/2016 | Bakish |
| 2016/0112746 A1 | 4/2016 | Zhang et al. |
| 2016/0112792 A1 | 4/2016 | Lee et al. |
| 2016/0117386 A1 | 4/2016 | Ajmera et al. |
| 2016/0118048 A1 | 4/2016 | Heide |
| 2016/0119338 A1 | 4/2016 | Cheyer |
| 2016/0125048 A1 | 5/2016 | Hamada |
| 2016/0125071 A1 | 5/2016 | Gabbai |
| 2016/0132046 A1 | 5/2016 | Beoughter et al. |
| 2016/0132290 A1 | 5/2016 | Raux |
| 2016/0132484 A1 | 5/2016 | Nauze et al. |
| 2016/0132488 A1 | 5/2016 | Clark et al. |
| 2016/0133254 A1 | 5/2016 | Vogel et al. |
| 2016/0139662 A1 | 5/2016 | Dabhade |
| 2016/0140951 A1 | 5/2016 | Agiomyrgiannakis et al. |
| 2016/0140962 A1 | 5/2016 | Sharifi |
| 2016/0147725 A1 | 5/2016 | Patten et al. |
| 2016/0148610 A1 | 5/2016 | Kennewick, Jr. et al. |
| 2016/0148612 A1 | 5/2016 | Guo et al. |
| 2016/0149966 A1 | 5/2016 | Remash et al. |
| 2016/0150020 A1 | 5/2016 | Farmer et al. |
| 2016/0151668 A1 | 6/2016 | Barnes et al. |
| 2016/0154624 A1 | 6/2016 | Son et al. |
| 2016/0154880 A1 | 6/2016 | Hoarty |
| 2016/0155442 A1 | 6/2016 | Kannan et al. |
| 2016/0155443 A1 | 6/2016 | Khan et al. |
| 2016/0156574 A1 | 6/2016 | Hum et al. |

(56) References Cited

U.S. PATENT DOCUMENTS

| | | |
|---|---|---|
| 2016/0162456 A1 | 6/2016 | Munro et al. |
| 2016/0163311 A1 | 6/2016 | Crook et al. |
| 2016/0163312 A1 | 6/2016 | Naik et al. |
| 2016/0170710 A1 | 6/2016 | Kim et al. |
| 2016/0170966 A1 | 6/2016 | Kolo |
| 2016/0171980 A1 | 6/2016 | Liddell et al. |
| 2016/0173578 A1 | 6/2016 | Sharma et al. |
| 2016/0173617 A1 | 6/2016 | Allinson |
| 2016/0173960 A1 | 6/2016 | Snibbe et al. |
| 2016/0179462 A1 | 6/2016 | Bjorkengren |
| 2016/0179464 A1 | 6/2016 | Reddy et al. |
| 2016/0179787 A1 | 6/2016 | Deleeuw |
| 2016/0180840 A1 | 6/2016 | Siddiq et al. |
| 2016/0180844 A1 | 6/2016 | Vanblon et al. |
| 2016/0182410 A1 | 6/2016 | Janakiraman et al. |
| 2016/0182709 A1 | 6/2016 | Kim et al. |
| 2016/0188181 A1 | 6/2016 | Smith |
| 2016/0188738 A1 | 6/2016 | Gruber et al. |
| 2016/0189198 A1 | 6/2016 | Daniel et al. |
| 2016/0189715 A1 | 6/2016 | Nishikawa |
| 2016/0189717 A1 | 6/2016 | Kannan et al. |
| 2016/0196110 A1 | 7/2016 | Yehoshua et al. |
| 2016/0198319 A1 | 7/2016 | Huang et al. |
| 2016/0203002 A1 | 7/2016 | Kannan et al. |
| 2016/0203193 A1 | 7/2016 | Kevin et al. |
| 2016/0210551 A1 | 7/2016 | Lee et al. |
| 2016/0210981 A1 | 7/2016 | Lee |
| 2016/0212206 A1 | 7/2016 | Wu et al. |
| 2016/0212208 A1 | 7/2016 | Kulkarni et al. |
| 2016/0212488 A1 | 7/2016 | Os et al. |
| 2016/0217784 A1 | 7/2016 | Gelfenbeyn et al. |
| 2016/0217794 A1 | 7/2016 | Imoto et al. |
| 2016/0224540 A1 | 8/2016 | Stewart et al. |
| 2016/0224559 A1 | 8/2016 | Hicks et al. |
| 2016/0224774 A1 | 8/2016 | Pender |
| 2016/0225372 A1 | 8/2016 | Cheung et al. |
| 2016/0227107 A1 | 8/2016 | Beaumont |
| 2016/0232500 A1 | 8/2016 | Wang et al. |
| 2016/0239645 A1 | 8/2016 | Heo et al. |
| 2016/0240187 A1 | 8/2016 | Fleizach et al. |
| 2016/0240189 A1 | 8/2016 | Lee et al. |
| 2016/0240192 A1 | 8/2016 | Raghuvir |
| 2016/0247061 A1 | 8/2016 | Trask et al. |
| 2016/0249319 A1 | 8/2016 | Dotan-Cohen et al. |
| 2016/0253312 A1 | 9/2016 | Rhodes |
| 2016/0253528 A1 | 9/2016 | Gao et al. |
| 2016/0259623 A1 | 9/2016 | Sumner et al. |
| 2016/0259656 A1 | 9/2016 | Sumner et al. |
| 2016/0259779 A1 | 9/2016 | Labský et al. |
| 2016/0260431 A1 | 9/2016 | Newendorp et al. |
| 2016/0260433 A1 | 9/2016 | Sumner et al. |
| 2016/0260434 A1 | 9/2016 | Gelfenbeyn et al. |
| 2016/0260436 A1 | 9/2016 | Lemay et al. |
| 2016/0262442 A1 | 9/2016 | Davila et al. |
| 2016/0266871 A1 | 9/2016 | Schmid et al. |
| 2016/0267904 A1 | 9/2016 | Biadsy et al. |
| 2016/0274938 A1 | 9/2016 | Strinati et al. |
| 2016/0275941 A1 | 9/2016 | Bellegarda et al. |
| 2016/0275947 A1 | 9/2016 | Li et al. |
| 2016/0282824 A1 | 9/2016 | Smallwood et al. |
| 2016/0282956 A1 | 9/2016 | Ouyang et al. |
| 2016/0283185 A1 | 9/2016 | Mclaren et al. |
| 2016/0284005 A1 | 9/2016 | Daniel et al. |
| 2016/0284199 A1 | 9/2016 | Dotan-Cohen et al. |
| 2016/0285808 A1 | 9/2016 | Franklin et al. |
| 2016/0286045 A1 | 9/2016 | Shaltiel et al. |
| 2016/0293157 A1 | 10/2016 | Chen et al. |
| 2016/0293168 A1 | 10/2016 | Chen |
| 2016/0294755 A1 | 10/2016 | Prabhu |
| 2016/0299685 A1 | 10/2016 | Zhai et al. |
| 2016/0299882 A1 | 10/2016 | Hegerty et al. |
| 2016/0299883 A1 | 10/2016 | Zhu et al. |
| 2016/0299977 A1 | 10/2016 | Hreha |
| 2016/0300571 A1 | 10/2016 | Foerster et al. |
| 2016/0301639 A1 | 10/2016 | Liu et al. |
| 2016/0306683 A1 | 10/2016 | Standley et al. |
| 2016/0307566 A1 | 10/2016 | Bellegarda |
| 2016/0308799 A1 | 10/2016 | Schubert et al. |
| 2016/0309035 A1 | 10/2016 | Li |
| 2016/0313906 A1 | 10/2016 | Kilchenko et al. |
| 2016/0314788 A1 | 10/2016 | Jitkoff et al. |
| 2016/0314789 A1 | 10/2016 | Marcheret et al. |
| 2016/0314792 A1 | 10/2016 | Alvarez et al. |
| 2016/0315996 A1 | 10/2016 | Ha et al. |
| 2016/0317924 A1 | 11/2016 | Tanaka et al. |
| 2016/0321239 A1 | 11/2016 | Iso-Sipilä et al. |
| 2016/0321261 A1 | 11/2016 | Spasojevic et al. |
| 2016/0321358 A1 | 11/2016 | Kanani et al. |
| 2016/0322043 A1 | 11/2016 | Bellegarda |
| 2016/0322044 A1 | 11/2016 | Jung et al. |
| 2016/0322045 A1 | 11/2016 | Hatfield et al. |
| 2016/0322048 A1 | 11/2016 | Amano et al. |
| 2016/0322050 A1 | 11/2016 | Wang et al. |
| 2016/0328147 A1 | 11/2016 | Zhang et al. |
| 2016/0328205 A1 | 11/2016 | Agrawal et al. |
| 2016/0328893 A1 | 11/2016 | Cordova et al. |
| 2016/0329060 A1 | 11/2016 | Ito et al. |
| 2016/0334973 A1 | 11/2016 | Reckhow et al. |
| 2016/0335138 A1 | 11/2016 | Surti et al. |
| 2016/0335139 A1 | 11/2016 | Hurley et al. |
| 2016/0335532 A1 | 11/2016 | Sanghavi et al. |
| 2016/0336007 A1 | 11/2016 | Hanazawa et al. |
| 2016/0336010 A1 | 11/2016 | Lindahl |
| 2016/0336011 A1 | 11/2016 | Koll et al. |
| 2016/0336024 A1 | 11/2016 | Choi et al. |
| 2016/0337299 A1 | 11/2016 | Lane et al. |
| 2016/0337301 A1 | 11/2016 | Rollins et al. |
| 2016/0342317 A1 | 11/2016 | Lim et al. |
| 2016/0342685 A1 | 11/2016 | Basu et al. |
| 2016/0342781 A1 | 11/2016 | Jeon |
| 2016/0350650 A1 | 12/2016 | Leeman-Munk et al. |
| 2016/0351190 A1 | 12/2016 | Piernot et al. |
| 2016/0352567 A1 | 12/2016 | Robbins et al. |
| 2016/0352924 A1 | 12/2016 | Senarath et al. |
| 2016/0357304 A1 | 12/2016 | Hatori et al. |
| 2016/0357728 A1 | 12/2016 | Bellegarda et al. |
| 2016/0357790 A1 | 12/2016 | Elkington et al. |
| 2016/0357861 A1 | 12/2016 | Carlhian et al. |
| 2016/0357870 A1 | 12/2016 | Hentschel et al. |
| 2016/0358598 A1 | 12/2016 | Williams et al. |
| 2016/0358600 A1 | 12/2016 | Nallasamy et al. |
| 2016/0358619 A1 | 12/2016 | Ramprashad et al. |
| 2016/0359771 A1 | 12/2016 | Sridhar |
| 2016/0360039 A1 | 12/2016 | Sanghavi et al. |
| 2016/0360336 A1 | 12/2016 | Gross et al. |
| 2016/0360382 A1 | 12/2016 | Gross et al. |
| 2016/0364378 A1 | 12/2016 | Futrell et al. |
| 2016/0365101 A1 | 12/2016 | Foy et al. |
| 2016/0371250 A1 | 12/2016 | Rhodes |
| 2016/0372112 A1 | 12/2016 | Miller et al. |
| 2016/0372119 A1 | 12/2016 | Sak et al. |
| 2016/0378747 A1 | 12/2016 | Orr et al. |
| 2016/0379091 A1 | 12/2016 | Lin et al. |
| 2016/0379626 A1 | 12/2016 | Deisher et al. |
| 2016/0379632 A1 | 12/2016 | Hoffmeister et al. |
| 2016/0379633 A1 | 12/2016 | Lehman et al. |
| 2016/0379639 A1 | 12/2016 | Weinstein et al. |
| 2016/0379641 A1 | 12/2016 | Liu et al. |
| 2017/0000348 A1 | 1/2017 | Karsten et al. |
| 2017/0003931 A1 | 1/2017 | Dvortsov et al. |
| 2017/0004824 A1 | 1/2017 | Yoo et al. |
| 2017/0005818 A1 | 1/2017 | Gould |
| 2017/0006329 A1 | 1/2017 | Jang et al. |
| 2017/0011091 A1 | 1/2017 | Chehreghani |
| 2017/0011279 A1 | 1/2017 | Soldevila et al. |
| 2017/0011303 A1 | 1/2017 | Annapureddy et al. |
| 2017/0011742 A1 | 1/2017 | Jing et al. |
| 2017/0013124 A1 | 1/2017 | Havelka et al. |
| 2017/0013331 A1 | 1/2017 | Watanabe et al. |
| 2017/0018271 A1 | 1/2017 | Khan et al. |
| 2017/0019987 A1 | 1/2017 | Dragone et al. |
| 2017/0023963 A1 | 1/2017 | Davis et al. |
| 2017/0025124 A1 | 1/2017 | Mixter et al. |
| 2017/0026318 A1 | 1/2017 | Daniel et al. |

(56) References Cited

U.S. PATENT DOCUMENTS

| | | |
|---|---|---|
| 2017/0026509 A1 | 1/2017 | Rand |
| 2017/0027522 A1 | 2/2017 | Van Hasselt et al. |
| 2017/0031576 A1 | 2/2017 | Saoji et al. |
| 2017/0032783 A1 | 2/2017 | Lord et al. |
| 2017/0032787 A1 | 2/2017 | Dayal |
| 2017/0032791 A1 | 2/2017 | Elson et al. |
| 2017/0039283 A1 | 2/2017 | Bennett et al. |
| 2017/0039475 A1 | 2/2017 | Cheyer et al. |
| 2017/0040002 A1 | 2/2017 | Basson et al. |
| 2017/0041388 A1 | 2/2017 | Tal et al. |
| 2017/0047063 A1 | 2/2017 | Ohmura et al. |
| 2017/0052760 A1 | 2/2017 | Johnson et al. |
| 2017/0053652 A1 | 2/2017 | Choi et al. |
| 2017/0055895 A1 | 3/2017 | Jardins et al. |
| 2017/0060853 A1 | 3/2017 | Lee et al. |
| 2017/0061423 A1 | 3/2017 | Bryant et al. |
| 2017/0068423 A1 | 3/2017 | Napolitano et al. |
| 2017/0068513 A1 | 3/2017 | Stasior et al. |
| 2017/0068550 A1 | 3/2017 | Zeitlin |
| 2017/0068670 A1 | 3/2017 | Orr et al. |
| 2017/0069308 A1 | 3/2017 | Aleksic et al. |
| 2017/0075653 A1 | 3/2017 | Dawidowsky et al. |
| 2017/0076720 A1 | 3/2017 | Gopalan et al. |
| 2017/0076721 A1 | 3/2017 | Bargetzi et al. |
| 2017/0078490 A1 | 3/2017 | Kaminsky et al. |
| 2017/0083179 A1 | 3/2017 | Gruber et al. |
| 2017/0083285 A1 | 3/2017 | Meyers et al. |
| 2017/0083504 A1 | 3/2017 | Huang |
| 2017/0084277 A1 | 3/2017 | Sharifi |
| 2017/0085547 A1 | 3/2017 | De Aguiar et al. |
| 2017/0090428 A1 | 3/2017 | Oohara |
| 2017/0090569 A1 | 3/2017 | Levesque |
| 2017/0091168 A1 | 3/2017 | Bellegarda et al. |
| 2017/0091169 A1 | 3/2017 | Bellegarda et al. |
| 2017/0091612 A1 | 3/2017 | Gruber et al. |
| 2017/0092259 A1 | 3/2017 | Jeon |
| 2017/0092270 A1 | 3/2017 | Newendorp et al. |
| 2017/0092278 A1 | 3/2017 | Evermann et al. |
| 2017/0093356 A1 | 3/2017 | Cudak et al. |
| 2017/0097743 A1 | 4/2017 | Hameed et al. |
| 2017/0102837 A1 | 4/2017 | Toumpelis |
| 2017/0102915 A1 | 4/2017 | Kuscher et al. |
| 2017/0103749 A1 | 4/2017 | Zhao et al. |
| 2017/0103752 A1 | 4/2017 | Senior et al. |
| 2017/0105190 A1 | 4/2017 | Logan et al. |
| 2017/0110117 A1 | 4/2017 | Chakladar et al. |
| 2017/0110125 A1 | 4/2017 | Xu et al. |
| 2017/0116177 A1 | 4/2017 | Walia |
| 2017/0116982 A1 | 4/2017 | Gelfenbeyn et al. |
| 2017/0116987 A1 | 4/2017 | Kang et al. |
| 2017/0116989 A1 | 4/2017 | Yadgar et al. |
| 2017/0124190 A1 | 5/2017 | Wang et al. |
| 2017/0124311 A1 | 5/2017 | Li et al. |
| 2017/0125016 A1 | 5/2017 | Wang |
| 2017/0127124 A9 | 5/2017 | Wilson et al. |
| 2017/0131778 A1 | 5/2017 | Iyer |
| 2017/0132019 A1 | 5/2017 | Karashchuk et al. |
| 2017/0132199 A1 | 5/2017 | Vescovi et al. |
| 2017/0133007 A1 | 5/2017 | Drewes |
| 2017/0140041 A1 | 5/2017 | Dotan-Cohen et al. |
| 2017/0140052 A1 | 5/2017 | Bufe, III et al. |
| 2017/0140644 A1 | 5/2017 | Hwang et al. |
| 2017/0140760 A1 | 5/2017 | Sachdev |
| 2017/0147722 A1 | 5/2017 | Greenwood |
| 2017/0147841 A1 | 5/2017 | Stagg et al. |
| 2017/0148044 A1 | 5/2017 | Fukuda et al. |
| 2017/0154033 A1 | 6/2017 | Lee |
| 2017/0154055 A1 | 6/2017 | Dimson et al. |
| 2017/0155940 A1 | 6/2017 | Jin et al. |
| 2017/0155965 A1 | 6/2017 | Ward |
| 2017/0161018 A1 | 6/2017 | Lemay et al. |
| 2017/0161268 A1 | 6/2017 | Badaskar |
| 2017/0161293 A1 | 6/2017 | Ionescu et al. |
| 2017/0161393 A1 | 6/2017 | Oh et al. |
| 2017/0161500 A1 | 6/2017 | Yang |
| 2017/0162191 A1 | 6/2017 | Grost et al. |
| 2017/0162202 A1 | 6/2017 | Anthony et al. |
| 2017/0162203 A1 | 6/2017 | Huang et al. |
| 2017/0169506 A1 | 6/2017 | Wishne et al. |
| 2017/0169818 A1 | 6/2017 | Vanblon et al. |
| 2017/0169819 A1 | 6/2017 | Mese et al. |
| 2017/0177547 A1 | 6/2017 | Ciereszko et al. |
| 2017/0178619 A1 | 6/2017 | Naik et al. |
| 2017/0178620 A1 | 6/2017 | Fleizach et al. |
| 2017/0178626 A1 | 6/2017 | Gruber et al. |
| 2017/0180499 A1 | 6/2017 | Gelfenbeyn et al. |
| 2017/0185375 A1 | 6/2017 | Martel et al. |
| 2017/0185581 A1 | 6/2017 | Bojja et al. |
| 2017/0186429 A1 | 6/2017 | Giuli et al. |
| 2017/0187711 A1 | 6/2017 | Joo et al. |
| 2017/0193083 A1 | 7/2017 | Bhatt et al. |
| 2017/0195493 A1 | 7/2017 | Sudarsan et al. |
| 2017/0195495 A1 | 7/2017 | Deora et al. |
| 2017/0195636 A1 | 7/2017 | Child et al. |
| 2017/0199870 A1 | 7/2017 | Zheng et al. |
| 2017/0199874 A1 | 7/2017 | Patel et al. |
| 2017/0200066 A1 | 7/2017 | Wang et al. |
| 2017/0201609 A1 | 7/2017 | Salmenkaita et al. |
| 2017/0201613 A1 | 7/2017 | Engelke et al. |
| 2017/0206899 A1 | 7/2017 | Bryant et al. |
| 2017/0215052 A1 | 7/2017 | Koum et al. |
| 2017/0221486 A1 | 8/2017 | Kurata et al. |
| 2017/0223189 A1 | 8/2017 | Meredith et al. |
| 2017/0227935 A1 | 8/2017 | Su et al. |
| 2017/0228367 A1 | 8/2017 | Pasupalak et al. |
| 2017/0228382 A1 | 8/2017 | Haviv et al. |
| 2017/0230429 A1 | 8/2017 | Garmark et al. |
| 2017/0230497 A1 | 8/2017 | Kim et al. |
| 2017/0230709 A1 | 8/2017 | Van Os et al. |
| 2017/0235361 A1 | 8/2017 | Rigazio et al. |
| 2017/0235618 A1 | 8/2017 | Lin et al. |
| 2017/0235721 A1 | 8/2017 | Almosallam et al. |
| 2017/0236512 A1 | 8/2017 | Williams et al. |
| 2017/0236514 A1 | 8/2017 | Nelson |
| 2017/0238039 A1 | 8/2017 | Sabattini |
| 2017/0242478 A1 | 8/2017 | Ma |
| 2017/0242653 A1* | 8/2017 | Lang et al. ............ H04R 27/00 |
| 2017/0242657 A1 | 8/2017 | Jarvis et al. |
| 2017/0242840 A1 | 8/2017 | Lu et al. |
| 2017/0243468 A1 | 8/2017 | Dotan-Cohen et al. |
| 2017/0243576 A1 | 8/2017 | Millington et al. |
| 2017/0243586 A1 | 8/2017 | Civelli et al. |
| 2017/0249309 A1 | 8/2017 | Sarikaya |
| 2017/0256256 A1 | 9/2017 | Wang et al. |
| 2017/0262051 A1 | 9/2017 | Tall et al. |
| 2017/0263247 A1 | 9/2017 | Kang et al. |
| 2017/0263248 A1 | 9/2017 | Gruber et al. |
| 2017/0263249 A1 | 9/2017 | Akbacak et al. |
| 2017/0263254 A1 | 9/2017 | Dewan et al. |
| 2017/0264451 A1 | 9/2017 | Yu et al. |
| 2017/0264711 A1 | 9/2017 | Natarajan et al. |
| 2017/0270822 A1 | 9/2017 | Cohen |
| 2017/0270912 A1 | 9/2017 | Levit et al. |
| 2017/0278514 A1 | 9/2017 | Mathias et al. |
| 2017/0285915 A1 | 10/2017 | Napolitano et al. |
| 2017/0286397 A1 | 10/2017 | Gonzalez |
| 2017/0287472 A1 | 10/2017 | Ogawa et al. |
| 2017/0289305 A1 | 10/2017 | Liensberger et al. |
| 2017/0295446 A1 | 10/2017 | Shivappa |
| 2017/0301348 A1 | 10/2017 | Chen et al. |
| 2017/0308552 A1 | 10/2017 | Soni et al. |
| 2017/0308609 A1 | 10/2017 | Berkhin et al. |
| 2017/0311005 A1 | 10/2017 | Lin |
| 2017/0316775 A1 | 11/2017 | Le et al. |
| 2017/0316782 A1 | 11/2017 | Haughay |
| 2017/0319123 A1 | 11/2017 | Voss et al. |
| 2017/0323637 A1 | 11/2017 | Naik |
| 2017/0329466 A1 | 11/2017 | Krenkler et al. |
| 2017/0329490 A1 | 11/2017 | Esinovskaya et al. |
| 2017/0329572 A1 | 11/2017 | Shah et al. |
| 2017/0329630 A1 | 11/2017 | Jann et al. |
| 2017/0330567 A1 | 11/2017 | Van Wissen et al. |
| 2017/0336920 A1 | 11/2017 | Chan et al. |
| 2017/0337035 A1 | 11/2017 | Choudhary et al. |

(56) References Cited

U.S. PATENT DOCUMENTS

| | | |
|---|---|---|
| 2017/0337478 A1 | 11/2017 | Sarikaya et al. |
| 2017/0345411 A1 | 11/2017 | Raitio et al. |
| 2017/0345420 A1 | 11/2017 | Barnett, Jr. |
| 2017/0345429 A1 | 11/2017 | Hardee et al. |
| 2017/0346949 A1 | 11/2017 | Sanghavi et al. |
| 2017/0351487 A1 | 12/2017 | Avilés-Casco et al. |
| 2017/0352346 A1 | 12/2017 | Paulik et al. |
| 2017/0352350 A1 | 12/2017 | Booker et al. |
| 2017/0357478 A1 | 12/2017 | Piersol et al. |
| 2017/0357529 A1 | 12/2017 | Venkatraman et al. |
| 2017/0357632 A1 | 12/2017 | Pagallo et al. |
| 2017/0357633 A1 | 12/2017 | Wang et al. |
| 2017/0357637 A1 | 12/2017 | Nell et al. |
| 2017/0357640 A1 | 12/2017 | Bellegarda et al. |
| 2017/0357716 A1 | 12/2017 | Bellegarda et al. |
| 2017/0358300 A1 | 12/2017 | Laurens et al. |
| 2017/0358301 A1 | 12/2017 | Raitio et al. |
| 2017/0358302 A1 | 12/2017 | Orr et al. |
| 2017/0358303 A1 | 12/2017 | Walker, II et al. |
| 2017/0358304 A1 | 12/2017 | Castillo et al. |
| 2017/0358305 A1 | 12/2017 | Kudurshian et al. |
| 2017/0358317 A1 | 12/2017 | James |
| 2017/0359680 A1 | 12/2017 | Ledvina et al. |
| 2017/0365251 A1 | 12/2017 | Park et al. |
| 2017/0371509 A1 | 12/2017 | Jung et al. |
| 2017/0371885 A1 | 12/2017 | Aggarwal et al. |
| 2017/0374093 A1 | 12/2017 | Dhar et al. |
| 2017/0374176 A1 | 12/2017 | Agrawal et al. |
| 2018/0004396 A1 | 1/2018 | Ying |
| 2018/0005112 A1 | 1/2018 | Iso-Sipila et al. |
| 2018/0007060 A1 | 1/2018 | Leblang et al. |
| 2018/0007096 A1 | 1/2018 | Levin et al. |
| 2018/0007538 A1 | 1/2018 | Naik et al. |
| 2018/0012596 A1 | 1/2018 | Piernot et al. |
| 2018/0018248 A1 | 1/2018 | Bhargava et al. |
| 2018/0018590 A1 | 1/2018 | Szeto et al. |
| 2018/0018814 A1 | 1/2018 | Patrik et al. |
| 2018/0024985 A1 | 1/2018 | Asano |
| 2018/0025124 A1 | 1/2018 | Mohr et al. |
| 2018/0025287 A1 | 1/2018 | Mathew et al. |
| 2018/0028918 A1 | 2/2018 | Tang et al. |
| 2018/0033431 A1 | 2/2018 | Newendorp et al. |
| 2018/0033435 A1 | 2/2018 | Jacobs, II |
| 2018/0033436 A1 | 2/2018 | Zhou |
| 2018/0046340 A1 | 2/2018 | Mall |
| 2018/0047201 A1 | 2/2018 | Filev et al. |
| 2018/0047391 A1 | 2/2018 | Baik et al. |
| 2018/0047393 A1 | 2/2018 | Tian et al. |
| 2018/0047406 A1 | 2/2018 | Park |
| 2018/0052909 A1 | 2/2018 | Sharifi et al. |
| 2018/0054505 A1 | 2/2018 | Hart et al. |
| 2018/0060032 A1 | 3/2018 | Boesen |
| 2018/0060301 A1 | 3/2018 | Li et al. |
| 2018/0060312 A1 | 3/2018 | Won |
| 2018/0060555 A1 | 3/2018 | Boesen |
| 2018/0061400 A1 | 3/2018 | Carbune et al. |
| 2018/0061401 A1 | 3/2018 | Sarikaya et al. |
| 2018/0062691 A1 | 3/2018 | Barnett, Jr. |
| 2018/0063308 A1 | 3/2018 | Crystal et al. |
| 2018/0063324 A1 | 3/2018 | Van Meter, II |
| 2018/0063624 A1 | 3/2018 | Boesen |
| 2018/0067904 A1 | 3/2018 | Li |
| 2018/0067914 A1 | 3/2018 | Chen et al. |
| 2018/0067918 A1 | 3/2018 | Bellegarda et al. |
| 2018/0068074 A1 | 3/2018 | Shen |
| 2018/0069743 A1 | 3/2018 | Bakken et al. |
| 2018/0075847 A1 | 3/2018 | Lee et al. |
| 2018/0075849 A1 | 3/2018 | Khoury et al. |
| 2018/0077095 A1 | 3/2018 | Deyle et al. |
| 2018/0082692 A1 | 3/2018 | Khoury et al. |
| 2018/0088969 A1 | 3/2018 | Vanblon et al. |
| 2018/0089166 A1 | 3/2018 | Meyer et al. |
| 2018/0089588 A1 | 3/2018 | Ravi et al. |
| 2018/0090143 A1 | 3/2018 | Saddler et al. |
| 2018/0091604 A1 | 3/2018 | Yamashita et al. |
| 2018/0091847 A1 | 3/2018 | Wu et al. |
| 2018/0096683 A1 | 4/2018 | James et al. |
| 2018/0096690 A1 | 4/2018 | Mixter et al. |
| 2018/0101599 A1 | 4/2018 | Kenneth et al. |
| 2018/0101925 A1 | 4/2018 | Brinig et al. |
| 2018/0102914 A1 | 4/2018 | Kawachi et al. |
| 2018/0107917 A1 | 4/2018 | Hewavitharana et al. |
| 2018/0107945 A1 | 4/2018 | Gao et al. |
| 2018/0108346 A1 | 4/2018 | Paulik et al. |
| 2018/0108357 A1 | 4/2018 | Liu |
| 2018/0113673 A1 | 4/2018 | Sheynblat |
| 2018/0314362 A1 | 4/2018 | Kim et al. |
| 2018/0121432 A1 | 5/2018 | Parson et al. |
| 2018/0122376 A1 | 5/2018 | Kojima |
| 2018/0122378 A1 | 5/2018 | Mixter et al. |
| 2018/0126260 A1 | 5/2018 | Chansoriya et al. |
| 2018/0129967 A1 | 5/2018 | Herreshoff |
| 2018/0130470 A1 | 5/2018 | Lemay et al. |
| 2018/0130471 A1 | 5/2018 | Trufinescu et al. |
| 2018/0137856 A1 | 5/2018 | Gilbert |
| 2018/0137857 A1 | 5/2018 | Zhou et al. |
| 2018/0137865 A1 | 5/2018 | Ling |
| 2018/0143967 A1 | 5/2018 | Anbazhagan et al. |
| 2018/0144465 A1 | 5/2018 | Hsieh et al. |
| 2018/0144615 A1 | 5/2018 | Kinney et al. |
| 2018/0144746 A1 | 5/2018 | Mishra et al. |
| 2018/0144748 A1 | 5/2018 | Leong |
| 2018/0146089 A1 | 5/2018 | Rauenbuehler et al. |
| 2018/0150744 A1 | 5/2018 | Orr et al. |
| 2018/0152557 A1 | 5/2018 | White et al. |
| 2018/0157372 A1 | 6/2018 | Kurabayashi |
| 2018/0157992 A1 | 6/2018 | Susskind et al. |
| 2018/0158548 A1 | 6/2018 | Taheri et al. |
| 2018/0158552 A1 | 6/2018 | Liu et al. |
| 2018/0165857 A1 | 6/2018 | Lee et al. |
| 2018/0166076 A1 | 6/2018 | Higuchi et al. |
| 2018/0167884 A1 | 6/2018 | Dawid et al. |
| 2018/0173403 A1 | 6/2018 | Carbune et al. |
| 2018/0173542 A1 | 6/2018 | Chan et al. |
| 2018/0174406 A1 | 6/2018 | Arashi et al. |
| 2018/0174576 A1 | 6/2018 | Soltau et al. |
| 2018/0174597 A1 | 6/2018 | Lee et al. |
| 2018/0182376 A1 | 6/2018 | Gysel et al. |
| 2018/0188840 A1 | 7/2018 | Tamura et al. |
| 2018/0188948 A1 | 7/2018 | Ouyang et al. |
| 2018/0189267 A1 | 7/2018 | Takiel |
| 2018/0190263 A1 | 7/2018 | Calef, III |
| 2018/0190273 A1 | 7/2018 | Karimli et al. |
| 2018/0190279 A1 | 7/2018 | Anderson et al. |
| 2018/0191670 A1 | 7/2018 | Suyama |
| 2018/0196683 A1 | 7/2018 | Radebaugh et al. |
| 2018/0210874 A1 | 7/2018 | Fuxman et al. |
| 2018/0213448 A1 | 7/2018 | Segal et al. |
| 2018/0218735 A1 | 8/2018 | Hunt et al. |
| 2018/0221783 A1 | 8/2018 | Gamero |
| 2018/0225131 A1 | 8/2018 | Tommy et al. |
| 2018/0225274 A1 | 8/2018 | Tommy et al. |
| 2018/0232203 A1 | 8/2018 | Gelfenbeyn et al. |
| 2018/0232688 A1 | 8/2018 | Pike et al. |
| 2018/0233132 A1 | 8/2018 | Herold et al. |
| 2018/0233140 A1 | 8/2018 | Koishida et al. |
| 2018/0247065 A1 | 8/2018 | Rhee et al. |
| 2018/0253209 A1 | 9/2018 | Jaygarl et al. |
| 2018/0253652 A1 | 9/2018 | Palzer et al. |
| 2018/0260680 A1 | 9/2018 | Finkelstein et al. |
| 2018/0268023 A1 | 9/2018 | Korpusik et al. |
| 2018/0268106 A1 | 9/2018 | Velaga |
| 2018/0270343 A1 | 9/2018 | Rout et al. |
| 2018/0275839 A1 | 9/2018 | Kocienda et al. |
| 2018/0276197 A1 | 9/2018 | Nell et al. |
| 2018/0277113 A1 | 9/2018 | Hartung et al. |
| 2018/0278740 A1 | 9/2018 | Choi et al. |
| 2018/0285056 A1 | 10/2018 | Cutler et al. |
| 2018/0293984 A1 | 10/2018 | Lindahl |
| 2018/0293988 A1 | 10/2018 | Huang et al. |
| 2018/0293989 A1 | 10/2018 | De et al. |
| 2018/0299878 A1 | 10/2018 | Cella et al. |
| 2018/0300317 A1 | 10/2018 | Bradbury |
| 2018/0300400 A1 | 10/2018 | Paulus |

(56) References Cited

U.S. PATENT DOCUMENTS

| | | |
|---|---|---|
| 2018/0300608 A1 | 10/2018 | Sevrens et al. |
| 2018/0308470 A1 | 10/2018 | Park et al. |
| 2018/0308477 A1 | 10/2018 | Nagasaka |
| 2018/0308480 A1 | 10/2018 | Jang et al. |
| 2018/0308485 A1 | 10/2018 | Kudurshian et al. |
| 2018/0308486 A1 | 10/2018 | Saddler et al. |
| 2018/0314552 A1 | 11/2018 | Kim et al. |
| 2018/0315416 A1 | 11/2018 | Berthelsen et al. |
| 2018/0322112 A1 | 11/2018 | Bellegarda et al. |
| 2018/0322881 A1 | 11/2018 | Min et al. |
| 2018/0324518 A1 | 11/2018 | Dusan et al. |
| 2018/0329677 A1 | 11/2018 | Gruber et al. |
| 2018/0329957 A1 | 11/2018 | Frazzingaro et al. |
| 2018/0329982 A1 | 11/2018 | Patel et al. |
| 2018/0329998 A1 | 11/2018 | Thomson et al. |
| 2018/0330714 A1 | 11/2018 | Paulik et al. |
| 2018/0330721 A1 | 11/2018 | Thomson et al. |
| 2018/0330722 A1 | 11/2018 | Newendorp et al. |
| 2018/0330723 A1 | 11/2018 | Acero et al. |
| 2018/0330729 A1 | 11/2018 | Golipour et al. |
| 2018/0330730 A1 | 11/2018 | Garg et al. |
| 2018/0330731 A1 | 11/2018 | Zeitlin et al. |
| 2018/0330733 A1 | 11/2018 | Orr et al. |
| 2018/0330737 A1 | 11/2018 | Paulik et al. |
| 2018/0332118 A1 | 11/2018 | Phipps et al. |
| 2018/0332389 A1 | 11/2018 | Ekkizogloy et al. |
| 2018/0336049 A1 | 11/2018 | Mukherjee et al. |
| 2018/0336184 A1 | 11/2018 | Bellegarda et al. |
| 2018/0336197 A1 | 11/2018 | Skilling et al. |
| 2018/0336275 A1 | 11/2018 | Graham et al. |
| 2018/0336439 A1 | 11/2018 | Kliger et al. |
| 2018/0336449 A1 | 11/2018 | Adan et al. |
| 2018/0336885 A1 | 11/2018 | Mukherjee et al. |
| 2018/0336892 A1 | 11/2018 | Kim et al. |
| 2018/0336894 A1 | 11/2018 | Graham et al. |
| 2018/0336904 A1 | 11/2018 | Piercy et al. |
| 2018/0336905 A1 | 11/2018 | Kim et al. |
| 2018/0336911 A1 | 11/2018 | Dahl et al. |
| 2018/0336920 A1 | 11/2018 | Bastian et al. |
| 2018/0338191 A1 | 11/2018 | Van Scheltinga et al. |
| 2018/0341643 A1 | 11/2018 | Alders et al. |
| 2018/0343557 A1 | 11/2018 | Naik et al. |
| 2018/0349084 A1* | 12/2018 | Nagasaka et al. ...... G06F 40/30 |
| 2018/0349346 A1 | 12/2018 | Hatori et al. |
| 2018/0349349 A1 | 12/2018 | Bellegarda et al. |
| 2018/0349447 A1 | 12/2018 | Maccartney et al. |
| 2018/0349472 A1 | 12/2018 | Kohlschuetter et al. |
| 2018/0349728 A1 | 12/2018 | Wang et al. |
| 2018/0350345 A1 | 12/2018 | Naik |
| 2018/0350353 A1 | 12/2018 | Gruber et al. |
| 2018/0357073 A1 | 12/2018 | Johnson et al. |
| 2018/0357308 A1 | 12/2018 | Cheyer |
| 2018/0358015 A1 | 12/2018 | Cash et al. |
| 2018/0358019 A1 | 12/2018 | Mont-Reynaud |
| 2018/0365653 A1 | 12/2018 | Cleaver et al. |
| 2018/0366105 A1 | 12/2018 | Kim |
| 2018/0373487 A1 | 12/2018 | Gruber et al. |
| 2018/0373493 A1 | 12/2018 | Watson et al. |
| 2018/0373796 A1 | 12/2018 | Rathod |
| 2018/0374484 A1 | 12/2018 | Huang et al. |
| 2019/0005024 A1 | 1/2019 | Somech et al. |
| 2019/0012141 A1 | 1/2019 | Piersol et al. |
| 2019/0012449 A1 | 1/2019 | Cheyer |
| 2019/0012599 A1 | 1/2019 | El Kaliouby et al. |
| 2019/0013018 A1 | 1/2019 | Rekstad |
| 2019/0013025 A1 | 1/2019 | Alcorn et al. |
| 2019/0014450 A1 | 1/2019 | Gruber et al. |
| 2019/0019077 A1 | 1/2019 | Griffin et al. |
| 2019/0027152 A1 | 1/2019 | Huang et al. |
| 2019/0034040 A1 | 1/2019 | Shah et al. |
| 2019/0034826 A1 | 1/2019 | Ahmad et al. |
| 2019/0035405 A1 | 1/2019 | Haughay |
| 2019/0037258 A1 | 1/2019 | Justin et al. |
| 2019/0042059 A1 | 2/2019 | Baer |
| 2019/0042627 A1 | 2/2019 | Osotio et al. |
| 2019/0043507 A1 | 2/2019 | Huang et al. |
| 2019/0044854 A1 | 2/2019 | Yang et al. |
| 2019/0045040 A1 | 2/2019 | Lee et al. |
| 2019/0051309 A1 | 2/2019 | Kim et al. |
| 2019/0057697 A1 | 2/2019 | Giuli et al. |
| 2019/0065144 A1 | 2/2019 | Sumner et al. |
| 2019/0065993 A1 | 2/2019 | Srinivasan et al. |
| 2019/0066674 A1 | 2/2019 | Jaygarl et al. |
| 2019/0068810 A1 | 2/2019 | Okamoto et al. |
| 2019/0173996 A1 | 2/2019 | Butcher et al. |
| 2019/0073607 A1 | 3/2019 | Jia et al. |
| 2019/0073998 A1 | 3/2019 | Leblang et al. |
| 2019/0074009 A1 | 3/2019 | Kim et al. |
| 2019/0074015 A1 | 3/2019 | Orr et al. |
| 2019/0074016 A1 | 3/2019 | Orr et al. |
| 2019/0079476 A1 | 3/2019 | Funes |
| 2019/0080685 A1 | 3/2019 | Johnson, Jr. |
| 2019/0080698 A1 | 3/2019 | Miller |
| 2019/0082044 A1 | 3/2019 | Olivia et al. |
| 2019/0087412 A1 | 3/2019 | Seyed Ibrahim et al. |
| 2019/0087455 A1 | 3/2019 | He et al. |
| 2019/0095050 A1 | 3/2019 | Gruber et al. |
| 2019/0095171 A1 | 3/2019 | Carson et al. |
| 2019/0102145 A1 | 4/2019 | Wilberding et al. |
| 2019/0102378 A1 | 4/2019 | Piernot et al. |
| 2019/0102381 A1 | 4/2019 | Futrell et al. |
| 2019/0103103 A1 | 4/2019 | Ni et al. |
| 2019/0103112 A1 | 4/2019 | Walker et al. |
| 2019/0116264 A1 | 4/2019 | Sanghavi et al. |
| 2019/0122666 A1 | 4/2019 | Raitio et al. |
| 2019/0122692 A1 | 4/2019 | Binder et al. |
| 2019/0124019 A1 | 4/2019 | Leon et al. |
| 2019/0129499 A1 | 5/2019 | Li |
| 2019/0129615 A1 | 5/2019 | Sundar et al. |
| 2019/0132694 A1 | 5/2019 | Hanes et al. |
| 2019/0134501 A1 | 5/2019 | Feder et al. |
| 2019/0138704 A1 | 5/2019 | Shrivastava et al. |
| 2019/0139541 A1 | 5/2019 | Andersen et al. |
| 2019/0139563 A1 | 5/2019 | Chen et al. |
| 2019/0141494 A1 | 5/2019 | Gross et al. |
| 2019/0147052 A1 | 5/2019 | Lu et al. |
| 2019/0147369 A1 | 5/2019 | Gupta et al. |
| 2019/0147880 A1 | 5/2019 | Booker et al. |
| 2019/0149972 A1 | 5/2019 | Parks et al. |
| 2019/0156830 A1 | 5/2019 | Devaraj et al. |
| 2019/0158994 A1 | 5/2019 | Gross et al. |
| 2019/0164546 A1 | 5/2019 | Piernot et al. |
| 2019/0172467 A1 | 6/2019 | Kim et al. |
| 2019/0179607 A1 | 6/2019 | Thangarathnam et al. |
| 2019/0179890 A1 | 6/2019 | Evermann |
| 2019/0180770 A1 | 6/2019 | Kothari et al. |
| 2019/0182176 A1 | 6/2019 | Niewczas |
| 2019/0187787 A1 | 6/2019 | White et al. |
| 2019/0188326 A1 | 6/2019 | Daianu et al. |
| 2019/0188328 A1 | 6/2019 | Oyenan et al. |
| 2019/0189118 A1 | 6/2019 | Piernot et al. |
| 2019/0189125 A1 | 6/2019 | Van Os et al. |
| 2019/0197053 A1 | 6/2019 | Graham et al. |
| 2019/0213601 A1 | 7/2019 | Hackman et al. |
| 2019/0213774 A1 | 7/2019 | Jiao et al. |
| 2019/0213999 A1 | 7/2019 | Grupen et al. |
| 2019/0214024 A1 | 7/2019 | Gruber et al. |
| 2019/0220245 A1 | 7/2019 | Martel et al. |
| 2019/0220246 A1 | 7/2019 | Orr et al. |
| 2019/0220247 A1 | 7/2019 | Lemay et al. |
| 2019/0220727 A1 | 7/2019 | Dohrmann et al. |
| 2019/0222684 A1 | 7/2019 | Li et al. |
| 2019/0230215 A1 | 7/2019 | Zhu et al. |
| 2019/0236130 A1 | 8/2019 | Li et al. |
| 2019/0236459 A1 | 8/2019 | Cheyer et al. |
| 2019/0244618 A1 | 8/2019 | Newendorp et al. |
| 2019/0251167 A1 | 8/2019 | Krishnapura Subbaraya et al. |
| 2019/0251339 A1 | 8/2019 | Hawker |
| 2019/0251960 A1 | 8/2019 | Maker et al. |
| 2019/0259386 A1 | 8/2019 | Kudurshian et al. |
| 2019/0272825 A1 | 9/2019 | O'Malley et al. |
| 2019/0272831 A1 | 9/2019 | Kajarekar |
| 2019/0273963 A1 | 9/2019 | Jobanputra et al. |
| 2019/0278841 A1 | 9/2019 | Pusateri et al. |

(56) References Cited

U.S. PATENT DOCUMENTS

| | | |
|---|---|---|
| 2019/0287012 A1 | 9/2019 | Asli et al. |
| 2019/0287522 A1 | 9/2019 | Lambourne et al. |
| 2019/0295544 A1 | 9/2019 | Garcia et al. |
| 2019/0303442 A1 | 10/2019 | Peitz et al. |
| 2019/0310765 A1 | 10/2019 | Napolitano et al. |
| 2019/0311708 A1 | 10/2019 | Bengio et al. |
| 2019/0318725 A1 | 10/2019 | Le Roux et al. |
| 2019/0318739 A1 | 10/2019 | Garg et al. |
| 2019/0339784 A1 | 11/2019 | Lemay et al. |
| 2019/0341027 A1 | 11/2019 | Vescovi et al. |
| 2019/0341056 A1 | 11/2019 | Paulik et al. |
| 2019/0347063 A1 | 11/2019 | Liu et al. |
| 2019/0348022 A1 | 11/2019 | Park et al. |
| 2019/0354548 A1 | 11/2019 | Orr et al. |
| 2019/0355346 A1 | 11/2019 | Bellegarda |
| 2019/0355384 A1 | 11/2019 | Sereshki et al. |
| 2019/0361729 A1 | 11/2019 | Gruber et al. |
| 2019/0369748 A1 | 12/2019 | Hindi et al. |
| 2019/0369842 A1 | 12/2019 | Dolbakian et al. |
| 2019/0369868 A1 | 12/2019 | Jin et al. |
| 2019/0370292 A1 | 12/2019 | Irani et al. |
| 2019/0370323 A1 | 12/2019 | Davidson et al. |
| 2019/0371315 A1 | 12/2019 | Newendorp et al. |
| 2019/0371316 A1 | 12/2019 | Weinstein et al. |
| 2019/0371317 A1 | 12/2019 | Irani et al. |
| 2019/0371331 A1 | 12/2019 | Schramm et al. |
| 2019/0372902 A1 | 12/2019 | Piersol |
| 2019/0373102 A1 | 12/2019 | Weinstein et al. |
| 2019/0385418 A1 | 12/2019 | Mixter et al. |
| 2020/0019609 A1 | 1/2020 | Yu et al. |
| 2020/0020326 A1 | 1/2020 | Srinivasan et al. |
| 2020/0042334 A1 | 2/2020 | Radebaugh et al. |
| 2020/0043482 A1 | 2/2020 | Gruber et al. |
| 2020/0043489 A1 | 2/2020 | Bradley et al. |
| 2020/0044485 A1 | 2/2020 | Smith et al. |
| 2020/0051583 A1 | 2/2020 | Wu et al. |
| 2020/0053218 A1 | 2/2020 | Gray |
| 2020/0058299 A1 | 2/2020 | Lee et al. |
| 2020/0065601 A1 | 2/2020 | Andreassen |
| 2020/0073629 A1 | 3/2020 | Lee et al. |
| 2020/0075018 A1 | 3/2020 | Chen |
| 2020/0076538 A1 | 3/2020 | Soultan et al. |
| 2020/0081615 A1 | 3/2020 | Yi et al. |
| 2020/0090393 A1 | 3/2020 | Shin et al. |
| 2020/0091958 A1 | 3/2020 | Curtis et al. |
| 2020/0092625 A1 | 3/2020 | Raffle |
| 2020/0098362 A1 | 3/2020 | Piernot et al. |
| 2020/0098368 A1 | 3/2020 | Lemay et al. |
| 2020/0104357 A1 | 4/2020 | Bellegarda et al. |
| 2020/0104362 A1 | 4/2020 | Yang et al. |
| 2020/0104369 A1 | 4/2020 | Bellegarda |
| 2020/0104668 A1 | 4/2020 | Sanghavi et al. |
| 2020/0105260 A1 | 4/2020 | Piernot et al. |
| 2020/0118566 A1 | 4/2020 | Zhou |
| 2020/0118568 A1 | 4/2020 | Kudurshian et al. |
| 2020/0125820 A1 | 4/2020 | Kim et al. |
| 2020/0127988 A1 | 4/2020 | Bradley et al. |
| 2020/0135180 A1 | 4/2020 | Mukherjee et al. |
| 2020/0135209 A1 | 4/2020 | Delfarah et al. |
| 2020/0137230 A1 | 4/2020 | Spohrer |
| 2020/0143812 A1 | 5/2020 | Walker, II et al. |
| 2020/0143819 A1 | 5/2020 | Delcroix et al. |
| 2020/0152186 A1 | 5/2020 | Koh et al. |
| 2020/0159579 A1 | 5/2020 | Shear et al. |
| 2020/0160179 A1 | 5/2020 | Chien et al. |
| 2020/0169637 A1 | 5/2020 | Sanghavi et al. |
| 2020/0175566 A1 | 6/2020 | Bender et al. |
| 2020/0184964 A1 | 6/2020 | Myers et al. |
| 2020/0184966 A1 | 6/2020 | Yavagal |
| 2020/0193997 A1 | 6/2020 | Piernot et al. |
| 2020/0210142 A1 | 7/2020 | Mu et al. |
| 2020/0218780 A1 | 7/2020 | Jun et al. |
| 2020/0221155 A1 | 7/2020 | Hansen et al. |
| 2020/0227034 A1 | 7/2020 | Summa et al. |
| 2020/0227044 A1 | 7/2020 | Lindahl |
| 2020/0243069 A1 | 7/2020 | Amores et al. |
| 2020/0249985 A1 | 8/2020 | Zeitlin |
| 2020/0252508 A1 | 8/2020 | Gray |
| 2020/0258508 A1 | 8/2020 | Aggarwal et al. |
| 2020/0267222 A1 | 8/2020 | Phipps et al. |
| 2020/0272485 A1 | 8/2020 | Karashchuk et al. |
| 2020/0279556 A1 | 9/2020 | Gruber et al. |
| 2020/0279576 A1 | 9/2020 | Binder et al. |
| 2020/0279627 A1 | 9/2020 | Nida et al. |
| 2020/0285327 A1 | 9/2020 | Hindi et al. |
| 2020/0286472 A1 | 9/2020 | Newendorp et al. |
| 2020/0286493 A1 | 9/2020 | Orr et al. |
| 2020/0294494 A1 | 9/2020 | Suyama et al. |
| 2020/0298394 A1 | 9/2020 | Han et al. |
| 2020/0301950 A1 | 9/2020 | Theo et al. |
| 2020/0302356 A1 | 9/2020 | Gruber et al. |
| 2020/0302919 A1 | 9/2020 | Greborio et al. |
| 2020/0302925 A1 | 9/2020 | Shah et al. |
| 2020/0302930 A1 | 9/2020 | Chen et al. |
| 2020/0302932 A1 | 9/2020 | Schramm et al. |
| 2020/0304955 A1 | 9/2020 | Gross et al. |
| 2020/0304972 A1 | 9/2020 | Gross et al. |
| 2020/0305084 A1 | 9/2020 | Freeman et al. |
| 2020/0310513 A1 | 10/2020 | Nicholson et al. |
| 2020/0312317 A1 | 10/2020 | Kothari et al. |
| 2020/0314191 A1 | 10/2020 | Madhavan et al. |
| 2020/0319850 A1 | 10/2020 | Stasior et al. |
| 2020/0327895 A1 | 10/2020 | Gruber et al. |
| 2020/0334492 A1 | 10/2020 | Zheng et al. |
| 2020/0342849 A1 | 10/2020 | Yu et al. |
| 2020/0342863 A1 | 10/2020 | Aggarwal et al. |
| 2020/0356243 A1 | 11/2020 | Meyer et al. |
| 2020/0357391 A1 | 11/2020 | Ghoshal et al. |
| 2020/0357406 A1 | 11/2020 | York et al. |
| 2020/0357409 A1 | 11/2020 | Sun et al. |
| 2020/0364411 A1 | 11/2020 | Evermann |
| 2020/0365155 A1 | 11/2020 | Milden |
| 2020/0372633 A1 | 11/2020 | Lee, II et al. |
| 2020/0372904 A1 | 11/2020 | Vescovi et al. |
| 2020/0372905 A1 | 11/2020 | Wang et al. |
| 2020/0374243 A1 | 11/2020 | Jina et al. |
| 2020/0379610 A1 | 12/2020 | Ford et al. |
| 2020/0379640 A1 | 12/2020 | Bellegarda et al. |
| 2020/0379726 A1 | 12/2020 | Blatz et al. |
| 2020/0379727 A1 | 12/2020 | Blatz et al. |
| 2020/0379728 A1 | 12/2020 | Gada et al. |
| 2020/0380389 A1 | 12/2020 | Eldeeb et al. |
| 2020/0380956 A1 | 12/2020 | Rossi et al. |
| 2020/0380963 A1 | 12/2020 | Chappidi et al. |
| 2020/0380966 A1 | 12/2020 | Acero et al. |
| 2020/0380973 A1 | 12/2020 | Novitchenko et al. |
| 2020/0380980 A1 | 12/2020 | Shum et al. |
| 2020/0380985 A1 | 12/2020 | Gada et al. |
| 2020/0382616 A1 | 12/2020 | Vaishampayan et al. |
| 2020/0382635 A1 | 12/2020 | Vora et al. |
| 2021/0006943 A1 | 1/2021 | Gross et al. |
| 2021/0011557 A1 | 1/2021 | Lemay et al. |
| 2021/0012775 A1 | 1/2021 | Kang et al. |
| 2021/0012776 A1 | 1/2021 | Peterson et al. |
| 2021/0043190 A1 | 2/2021 | Wang et al. |
| 2021/0065698 A1 | 3/2021 | Topcu et al. |
| 2021/0067631 A1 | 3/2021 | Van Os et al. |
| 2021/0072953 A1 | 3/2021 | Amarilio et al. |
| 2021/0090314 A1 | 3/2021 | Hussen et al. |
| 2021/0097998 A1 | 4/2021 | Kim et al. |
| 2021/0105528 A1 | 4/2021 | Van Os et al. |
| 2021/0110106 A1 | 4/2021 | Vescovi et al. |
| 2021/0110115 A1 | 4/2021 | Moritz et al. |
| 2021/0110254 A1 | 4/2021 | Duy et al. |
| 2021/0124597 A1 | 4/2021 | Ramakrishnan et al. |
| 2021/0127220 A1 | 4/2021 | Mathieu et al. |
| 2021/0141839 A1 | 5/2021 | Tang et al. |
| 2021/0149629 A1 | 5/2021 | Martel et al. |
| 2021/0149996 A1 | 5/2021 | Bellegarda |
| 2021/0150151 A1 | 5/2021 | Jiaming et al. |
| 2021/0151041 A1 | 5/2021 | Gruber et al. |
| 2021/0151070 A1 | 5/2021 | Binder et al. |
| 2021/0152684 A1 | 5/2021 | Weinstein et al. |
| 2021/0165826 A1 | 6/2021 | Graham et al. |

(56) References Cited

U.S. PATENT DOCUMENTS

| | | | |
|---|---|---|---|
| 2021/0191603 A1 | 6/2021 | Napolitano et al. |
| 2021/0191968 A1 | 6/2021 | Orr et al. |
| 2021/0216760 A1 | 7/2021 | Dominic et al. |
| 2021/0224032 A1 | 7/2021 | Ryan et al. |
| 2021/0224474 A1 | 7/2021 | Jerome et al. |
| 2021/0233532 A1 | 7/2021 | Aram et al. |
| 2021/0248804 A1 | 8/2021 | Hussen Abdelaziz et al. |
| 2021/0249009 A1 | 8/2021 | Manjunath et al. |
| 2021/0258881 A1 | 8/2021 | Freeman et al. |
| 2021/0264913 A1 | 8/2021 | Schramm et al. |
| 2021/0271333 A1 | 9/2021 | Hindi et al. |
| 2021/0281965 A1 | 9/2021 | Malik et al. |
| 2021/0294569 A1 | 9/2021 | Piersol et al. |
| 2021/0294571 A1 | 9/2021 | Carson et al. |
| 2021/0306812 A1 | 9/2021 | Gross et al. |
| 2021/0312931 A1 | 10/2021 | Paulik et al. |
| 2021/0318901 A1 | 10/2021 | Gruber et al. |
| 2021/0327409 A1 | 10/2021 | Naik |
| 2021/0334528 A1 | 10/2021 | Bray et al. |

FOREIGN PATENT DOCUMENTS

| | | |
|---|---|---|
| AU | 2015101171 A4 | 10/2015 |
| AU | 2018100187 A4 | 3/2018 |
| AU | 2017222436 A1 | 10/2018 |
| CA | 2792412 A1 | 7/2011 |
| CA | 2666438 C | 6/2013 |
| CH | 709795 A1 | 12/2015 |
| CN | 1393092 A | 1/2003 |
| CN | 1898721 A | 1/2007 |
| CN | 101939740 A | 1/2011 |
| CN | 101951553 A | 1/2011 |
| CN | 101958958 A | 1/2011 |
| CN | 101971250 A | 2/2011 |
| CN | 101983501 A | 3/2011 |
| CN | 101992779 A | 3/2011 |
| CN | 102056026 A | 5/2011 |
| CN | 102074234 A | 5/2011 |
| CN | 102096717 A | 6/2011 |
| CN | 102122506 A | 7/2011 |
| CN | 102124515 A | 7/2011 |
| CN | 102137085 A | 7/2011 |
| CN | 102137193 A | 7/2011 |
| CN | 102160043 A | 8/2011 |
| CN | 102201235 A | 9/2011 |
| CN | 102214187 A | 10/2011 |
| CN | 102237088 A | 11/2011 |
| CN | 102246136 A | 11/2011 |
| CN | 202035047 U | 11/2011 |
| CN | 102282609 A | 12/2011 |
| CN | 102298493 A | 12/2011 |
| CN | 202092650 U | 12/2011 |
| CN | 102324233 A | 1/2012 |
| CN | 102340590 A | 2/2012 |
| CN | 102346557 A | 2/2012 |
| CN | 102368256 A | 3/2012 |
| CN | 102402985 A | 4/2012 |
| CN | 102405463 A | 4/2012 |
| CN | 102449438 A | 5/2012 |
| CN | 102495406 A | 6/2012 |
| CN | 102498457 A | 6/2012 |
| CN | 102510426 A | 6/2012 |
| CN | 102520789 A | 6/2012 |
| CN | 101661754 B | 7/2012 |
| CN | 102629246 A | 8/2012 |
| CN | 102651217 A | 8/2012 |
| CN | 102663016 A | 9/2012 |
| CN | 102681896 A | 9/2012 |
| CN | 102682769 A | 9/2012 |
| CN | 102682771 A | 9/2012 |
| CN | 102685295 A | 9/2012 |
| CN | 102693725 A | 9/2012 |
| CN | 102694909 A | 9/2012 |
| CN | 202453859 U | 9/2012 |
| CN | 102722478 A | 10/2012 |
| CN | 102737104 A | 10/2012 |
| CN | 102750087 A | 10/2012 |
| CN | 102792320 A | 11/2012 |
| CN | 102801853 A | 11/2012 |
| CN | 102820033 A | 12/2012 |
| CN | 102844738 A | 12/2012 |
| CN | 102866828 A | 1/2013 |
| CN | 102870065 A | 1/2013 |
| CN | 102882752 A | 1/2013 |
| CN | 102890936 A | 1/2013 |
| CN | 102893327 A | 1/2013 |
| CN | 102915731 A | 2/2013 |
| CN | 102917004 A | 2/2013 |
| CN | 102917271 A | 2/2013 |
| CN | 102918493 A | 2/2013 |
| CN | 102939515 A | 2/2013 |
| CN | 102955652 A | 3/2013 |
| CN | 103035240 A | 4/2013 |
| CN | 103035251 A | 4/2013 |
| CN | 103038728 A | 4/2013 |
| CN | 103064956 A | 4/2013 |
| CN | 103093334 A | 5/2013 |
| CN | 103093755 A | 5/2013 |
| CN | 103109249 A | 5/2013 |
| CN | 103135916 A | 6/2013 |
| CN | 103198831 A | 7/2013 |
| CN | 103209369 A | 7/2013 |
| CN | 103226949 A | 7/2013 |
| CN | 103236260 A | 8/2013 |
| CN | 103246638 A | 8/2013 |
| CN | 103268315 A | 8/2013 |
| CN | 103280218 A | 9/2013 |
| CN | 103292437 A | 9/2013 |
| CN | 103327063 A | 9/2013 |
| CN | 103365279 A | 10/2013 |
| CN | 103366741 A | 10/2013 |
| CN | 203249629 U | 10/2013 |
| CN | 103390016 A | 11/2013 |
| CN | 103412789 A | 11/2013 |
| CN | 103414949 A | 11/2013 |
| CN | 103426428 A | 12/2013 |
| CN | 103455234 A | 12/2013 |
| CN | 103456303 A | 12/2013 |
| CN | 103456306 A | 12/2013 |
| CN | 103475551 A | 12/2013 |
| CN | 103477592 A | 12/2013 |
| CN | 103533143 A | 1/2014 |
| CN | 103533154 A | 1/2014 |
| CN | 103543902 A | 1/2014 |
| CN | 103562863 A | 2/2014 |
| CN | 103582896 A | 2/2014 |
| CN | 103593054 A | 2/2014 |
| CN | 103608859 A | 2/2014 |
| CN | 103620605 A | 3/2014 |
| CN | 103645876 A | 3/2014 |
| CN | 103677261 A | 3/2014 |
| CN | 103714816 A | 4/2014 |
| CN | 103716454 A | 4/2014 |
| CN | 103727948 A | 4/2014 |
| CN | 103744761 A | 4/2014 |
| CN | 103760984 A | 4/2014 |
| CN | 103765385 A | 4/2014 |
| CN | 103778527 A | 5/2014 |
| CN | 103792985 A | 5/2014 |
| CN | 103794212 A | 5/2014 |
| CN | 103795850 A | 5/2014 |
| CN | 103809548 A | 5/2014 |
| CN | 103841268 A | 6/2014 |
| CN | 103885663 A | 6/2014 |
| CN | 103902373 A | 7/2014 |
| CN | 103930945 A | 7/2014 |
| CN | 103942932 A | 7/2014 |
| CN | 103959751 A | 7/2014 |
| CN | 203721183 U | 7/2014 |
| CN | 103971680 A | 8/2014 |
| CN | 104007832 A | 8/2014 |
| CN | 104036774 A | 9/2014 |
| CN | 104038621 A | 9/2014 |
| CN | 104050153 A | 9/2014 |

(56) References Cited

FOREIGN PATENT DOCUMENTS

| | | |
|---|---|---|
| CN | 104090652 A | 10/2014 |
| CN | 104113471 A | 10/2014 |
| CN | 104125322 A | 10/2014 |
| CN | 104144377 A | 11/2014 |
| CN | 104145304 A | 11/2014 |
| CN | 104169837 A | 11/2014 |
| CN | 104180815 A | 12/2014 |
| CN | 104243699 A | 12/2014 |
| CN | 104281259 A | 1/2015 |
| CN | 104281390 A | 1/2015 |
| CN | 104284257 A | 1/2015 |
| CN | 104335205 A | 2/2015 |
| CN | 104335207 A | 2/2015 |
| CN | 104335234 A | 2/2015 |
| CN | 104350454 A | 2/2015 |
| CN | 104360990 A | 2/2015 |
| CN | 104374399 A | 2/2015 |
| CN | 104423625 A | 3/2015 |
| CN | 104423780 A | 3/2015 |
| CN | 104427104 A | 3/2015 |
| CN | 104463552 A | 3/2015 |
| CN | 104464733 A | 3/2015 |
| CN | 104487929 A | 4/2015 |
| CN | 104516522 A | 4/2015 |
| CN | 104520849 A | 4/2015 |
| CN | 104573472 A | 4/2015 |
| CN | 104575493 A | 4/2015 |
| CN | 104575501 A | 4/2015 |
| CN | 104584010 A | 4/2015 |
| CN | 104584601 A | 4/2015 |
| CN | 104604274 A | 5/2015 |
| CN | 104679472 A | 6/2015 |
| CN | 104699746 A | 6/2015 |
| CN | 104769584 A | 7/2015 |
| CN | 104821167 A | 8/2015 |
| CN | 104821934 A | 8/2015 |
| CN | 104836909 A | 8/2015 |
| CN | 104854583 A | 8/2015 |
| CN | 104867492 A | 8/2015 |
| CN | 104869342 A | 8/2015 |
| CN | 104951077 A | 9/2015 |
| CN | 104967748 A | 10/2015 |
| CN | 104969289 A | 10/2015 |
| CN | 104978963 A | 10/2015 |
| CN | 105025051 A | 11/2015 |
| CN | 105027197 A | 11/2015 |
| CN | 105093526 A | 11/2015 |
| CN | 105100356 A | 11/2015 |
| CN | 105164719 A | 12/2015 |
| CN | 105190607 A | 12/2015 |
| CN | 105247511 A | 1/2016 |
| CN | 105247551 A | 1/2016 |
| CN | 105264524 A | 1/2016 |
| CN | 105265005 A | 1/2016 |
| CN | 105278681 A | 1/2016 |
| CN | 105320251 A | 2/2016 |
| CN | 105320726 A | 2/2016 |
| CN | 105379234 A | 3/2016 |
| CN | 105427122 A | 3/2016 |
| CN | 105430186 A | 3/2016 |
| CN | 105468137 A | 4/2016 |
| CN | 105471705 A | 4/2016 |
| CN | 105472587 A | 4/2016 |
| CN | 105556592 A | 5/2016 |
| CN | 105808200 A | 7/2016 |
| CN | 105830048 A | 8/2016 |
| CN | 105869641 A | 8/2016 |
| CN | 105872222 A | 8/2016 |
| CN | 105917311 A | 8/2016 |
| CN | 106030699 A | 10/2016 |
| CN | 106062734 A | 10/2016 |
| CN | 106415412 A | 2/2017 |
| CN | 106462383 A | 2/2017 |
| CN | 106463114 A | 2/2017 |
| CN | 106465074 A | 2/2017 |
| CN | 106534469 A | 3/2017 |
| CN | 106558310 A | 4/2017 |
| CN | 106773742 A | 5/2017 |
| CN | 106776581 A | 5/2017 |
| CN | 107004412 A | 8/2017 |
| CN | 107450800 A | 12/2017 |
| CN | 107480161 A | 12/2017 |
| CN | 107491285 A | 12/2017 |
| CN | 107491468 A | 12/2017 |
| CN | 107506037 A | 12/2017 |
| CN | 107545262 A | 1/2018 |
| CN | 107608998 A | 1/2018 |
| CN | 107615378 A | 1/2018 |
| CN | 107623616 A | 1/2018 |
| CN | 107786730 A | 3/2018 |
| CN | 107852436 A | 3/2018 |
| CN | 107871500 A | 4/2018 |
| CN | 107919123 A | 4/2018 |
| CN | 107924313 A | 4/2018 |
| CN | 107978313 A | 5/2018 |
| CN | 108647681 A | 10/2018 |
| CN | 109447234 A | 3/2019 |
| CN | 109657629 A | 4/2019 |
| CN | 110135411 A | 8/2019 |
| CN | 110263144 A | 9/2019 |
| CN | 105164719 B | 11/2019 |
| CN | 110531860 A | 12/2019 |
| CN | 110598671 A | 12/2019 |
| CN | 110647274 A | 1/2020 |
| CN | 110825469 A | 2/2020 |
| CN | 111316203 A | 6/2020 |
| DE | 202016008226 U1 | 5/2017 |
| EP | 1345360 A2 | 9/2003 |
| EP | 1699042 A1 | 9/2006 |
| EP | 2309491 A1 | 4/2011 |
| EP | 2329348 A1 | 6/2011 |
| EP | 2339576 A2 | 6/2011 |
| EP | 2355093 A2 | 8/2011 |
| EP | 2393056 A1 | 12/2011 |
| EP | 2400373 A1 | 12/2011 |
| EP | 2431842 A2 | 3/2012 |
| EP | 2523109 A1 | 11/2012 |
| EP | 2523188 A1 | 11/2012 |
| EP | 2551784 A1 | 1/2013 |
| EP | 2555536 A1 | 2/2013 |
| EP | 2575128 A2 | 4/2013 |
| EP | 2632129 A1 | 8/2013 |
| EP | 2639792 A1 | 9/2013 |
| EP | 2669889 A2 | 12/2013 |
| EP | 2672229 A2 | 12/2013 |
| EP | 2672231 A2 | 12/2013 |
| EP | 2675147 A1 | 12/2013 |
| EP | 2680257 A1 | 1/2014 |
| EP | 2683147 A1 | 1/2014 |
| EP | 2683175 A1 | 1/2014 |
| EP | 2672231 A3 | 4/2014 |
| EP | 2717259 A2 | 4/2014 |
| EP | 2725577 A2 | 4/2014 |
| EP | 2733598 A2 | 5/2014 |
| EP | 2733896 A1 | 5/2014 |
| EP | 2743846 A2 | 6/2014 |
| EP | 2760015 A1 | 7/2014 |
| EP | 2779160 A1 | 9/2014 |
| EP | 2781883 A2 | 9/2014 |
| EP | 2787683 A1 | 10/2014 |
| EP | 2801890 A1 | 11/2014 |
| EP | 2801972 A1 | 11/2014 |
| EP | 2801974 A2 | 11/2014 |
| EP | 2824564 A1 | 1/2015 |
| EP | 2849177 A1 | 3/2015 |
| EP | 2879402 A1 | 6/2015 |
| EP | 2881939 A1 | 6/2015 |
| EP | 2891049 A1 | 7/2015 |
| EP | 2915021 A2 | 9/2015 |
| EP | 2930715 A1 | 10/2015 |
| EP | 2938022 A1 | 10/2015 |
| EP | 2940556 A1 | 11/2015 |
| EP | 2947859 A1 | 11/2015 |
| EP | 2950307 A1 | 12/2015 |

(56) References Cited

FOREIGN PATENT DOCUMENTS

| | | |
|---|---|---|
| EP | 2957986 A1 | 12/2015 |
| EP | 2973380 A2 | 1/2016 |
| EP | 2985984 A2 | 2/2016 |
| EP | 2891049 A4 | 3/2016 |
| EP | 3032532 A1 | 6/2016 |
| EP | 3035329 A1 | 6/2016 |
| EP | 3038333 A1 | 6/2016 |
| EP | 3115905 A1 | 1/2017 |
| EP | 3125097 A2 | 2/2017 |
| EP | 2672231 B1 | 5/2017 |
| EP | 3161612 A1 | 5/2017 |
| EP | 3224708 A1 | 11/2017 |
| EP | 3246916 A1 | 11/2017 |
| EP | 3270658 A1 | 1/2018 |
| EP | 3300074 A1 | 3/2018 |
| EP | 2973380 B1 | 8/2018 |
| EP | 2983065 B1 | 8/2018 |
| EP | 3392876 A1 | 10/2018 |
| EP | 3401773 A1 | 11/2018 |
| EP | 2973002 B1 | 6/2019 |
| EP | 3506151 A1 | 7/2019 |
| EP | 3323058 B1 | 2/2020 |
| GB | 2367399 A | 4/2002 |
| IN | 2011MU01369 A | 7/2011 |
| IN | 2011MU01537 A | 7/2011 |
| IN | 2011MU01120 A | 8/2011 |
| IN | 2011MU01174 A | 8/2011 |
| IN | 2011MU00868 A | 9/2011 |
| IN | 2011MU03716 A | 2/2012 |
| IN | 2012MU01227 A | 6/2012 |
| JP | 2011-33874 A | 2/2011 |
| JP | 2011-41026 A | 2/2011 |
| JP | 2011-45005 A | 3/2011 |
| JP | 2011-59659 A | 3/2011 |
| JP | 2011-81541 A | 4/2011 |
| JP | 2011-525045 A | 9/2011 |
| JP | 2011-209787 A | 10/2011 |
| JP | 2011-237621 A | 11/2011 |
| JP | 2011-238022 A | 11/2011 |
| JP | 2011-250027 A | 12/2011 |
| JP | 2012-14394 A | 1/2012 |
| JP | 2012-502377 A | 1/2012 |
| JP | 2012-22478 A | 2/2012 |
| JP | 2012-33997 A | 2/2012 |
| JP | 2012-37619 A | 2/2012 |
| JP | 2012-40655 A | 3/2012 |
| JP | 2012-63536 A | 3/2012 |
| JP | 2012-508530 A | 4/2012 |
| JP | 2012-89020 A | 5/2012 |
| JP | 2012-511774 A | 5/2012 |
| JP | 2012-116442 A | 6/2012 |
| JP | 2012-142744 A | 7/2012 |
| JP | 2012-147063 A | 8/2012 |
| JP | 2012-150804 A | 8/2012 |
| JP | 2012-164070 A | 8/2012 |
| JP | 2012-518847 A | 8/2012 |
| JP | 2012-211932 A | 11/2012 |
| JP | 2012-220959 A | 11/2012 |
| JP | 2013-37688 A | 2/2013 |
| JP | 2013-46171 A | 3/2013 |
| JP | 2013-511214 A | 3/2013 |
| JP | 2013-65284 A | 4/2013 |
| JP | 2013-73240 A | 4/2013 |
| JP | 2013-513315 A | 4/2013 |
| JP | 2013-80476 A | 5/2013 |
| JP | 2013-517566 A | 5/2013 |
| JP | 2013-131087 A | 7/2013 |
| JP | 2013-134430 A | 7/2013 |
| JP | 2013-134729 A | 7/2013 |
| JP | 2013-140520 A | 7/2013 |
| JP | 2013-527947 A | 7/2013 |
| JP | 2013-528012 A | 7/2013 |
| JP | 2013-148419 A | 8/2013 |
| JP | 2013-156349 A | 8/2013 |
| JP | 2013-174987 A | 9/2013 |
| JP | 2013-535059 A | 9/2013 |
| JP | 2013-200423 A | 10/2013 |
| JP | 2013-205999 A | 10/2013 |
| JP | 2013-238935 A | 11/2013 |
| JP | 2013-238936 A | 11/2013 |
| JP | 2013-257694 A | 12/2013 |
| JP | 2013-258600 A | 12/2013 |
| JP | 2014-2586 A | 1/2014 |
| JP | 2014-10688 A | 1/2014 |
| JP | 2014-502445 A | 1/2014 |
| JP | 2014-26629 A | 2/2014 |
| JP | 2014-45449 A | 3/2014 |
| JP | 2014-507903 A | 3/2014 |
| JP | 2014-60600 A | 4/2014 |
| JP | 2014-72586 A | 4/2014 |
| JP | 2014-77969 A | 5/2014 |
| JP | 2014-89711 A | 5/2014 |
| JP | 2014-109889 A | 6/2014 |
| JP | 2014-124332 A | 7/2014 |
| JP | 2014-126600 A | 7/2014 |
| JP | 2014-140121 A | 7/2014 |
| JP | 2014-518409 A | 7/2014 |
| JP | 2014-142566 A | 8/2014 |
| JP | 2014-145842 A | 8/2014 |
| JP | 2014-146940 A | 8/2014 |
| JP | 2014-150323 A | 8/2014 |
| JP | 2014-519648 A | 8/2014 |
| JP | 2014-524627 A | 9/2014 |
| JP | 2014-191272 A | 10/2014 |
| JP | 2014-219614 A | 11/2014 |
| JP | 2014-222514 A | 11/2014 |
| JP | 2015-4928 A | 1/2015 |
| JP | 2015-8001 A | 1/2015 |
| JP | 2015-12301 A | 1/2015 |
| JP | 2015-18365 A | 1/2015 |
| JP | 2015-501022 A | 1/2015 |
| JP | 2015-501034 A | 1/2015 |
| JP | 2015-504619 A | 2/2015 |
| JP | 2015-41845 A | 3/2015 |
| JP | 2015-52500 A | 3/2015 |
| JP | 2015-60423 A | 3/2015 |
| JP | 2015-81971 A | 4/2015 |
| JP | 2015-83938 A | 4/2015 |
| JP | 2015-94848 A | 5/2015 |
| JP | 2015-514254 A | 5/2015 |
| JP | 2015-519675 A | 7/2015 |
| JP | 2015-524974 A | 8/2015 |
| JP | 2015-526776 A | 9/2015 |
| JP | 2015-527683 A | 9/2015 |
| JP | 2015-528140 A | 9/2015 |
| JP | 2015-528918 A | 10/2015 |
| JP | 2015-531909 A | 11/2015 |
| JP | 2016-504651 A | 2/2016 |
| JP | 2016-35614 A | 3/2016 |
| JP | 2016-508007 A | 3/2016 |
| JP | 2016-71247 A | 5/2016 |
| JP | 2016-119615 A | 6/2016 |
| JP | 2016-151928 A | 8/2016 |
| JP | 2016-524193 A | 8/2016 |
| JP | 2016-536648 A | 11/2016 |
| JP | 2017-19331 A | 1/2017 |
| JP | 2017-516153 A | 6/2017 |
| JP | 2017-123187 A | 7/2017 |
| JP | 2017-211608 A | 11/2017 |
| JP | 2017-537361 A | 12/2017 |
| JP | 6291147 B1 | 2/2018 |
| JP | 2018-101242 A | 6/2018 |
| JP | 2018-113035 A | 7/2018 |
| JP | 2018-525950 A | 9/2018 |
| JP | 2018-536889 A | 12/2018 |
| KR | 10-2011-0005937 A | 1/2011 |
| KR | 10-2011-0013625 A | 2/2011 |
| KR | 10-2011-0043644 A | 4/2011 |
| KR | 10-1032792 B1 | 5/2011 |
| KR | 10-2011-0068490 A | 6/2011 |
| KR | 10-2011-0072847 A | 6/2011 |
| KR | 10-2011-0086492 A | 7/2011 |
| KR | 10-2011-0100620 A | 9/2011 |
| KR | 10-2011-0113414 A | 10/2011 |

(56) References Cited

FOREIGN PATENT DOCUMENTS

| | | |
|---|---|---|
| KR | 10-2011-0115134 A | 10/2011 |
| KR | 10-2012-0020164 A | 3/2012 |
| KR | 10-2012-0031722 A | 4/2012 |
| KR | 10-2012-0066523 A | 6/2012 |
| KR | 10-2012-0082371 A | 7/2012 |
| KR | 10-2012-0084472 A | 7/2012 |
| KR | 10-1178310 B1 | 8/2012 |
| KR | 10-2012-0120316 A | 11/2012 |
| KR | 10-2012-0137424 A | 12/2012 |
| KR | 10-2012-0137435 A | 12/2012 |
| KR | 10-2012-0137440 A | 12/2012 |
| KR | 10-2012-0138826 A | 12/2012 |
| KR | 10-2012-0139827 A | 12/2012 |
| KR | 10-1193668 B1 | 12/2012 |
| KR | 10-2013-0035983 A | 4/2013 |
| KR | 10-2013-0086750 A | 8/2013 |
| KR | 10-2013-0090947 A | 8/2013 |
| KR | 10-2013-0108563 A | 10/2013 |
| KR | 10-1334342 B1 | 11/2013 |
| KR | 10-2013-0131252 A | 12/2013 |
| KR | 10-2013-0133629 A | 12/2013 |
| KR | 10-2014-0007282 A | 1/2014 |
| KR | 10-2014-0024271 A | 2/2014 |
| KR | 10-2014-0025996 A | 3/2014 |
| KR | 10-2014-0031283 A | 3/2014 |
| KR | 10-2014-0033574 A | 3/2014 |
| KR | 10-2014-0042994 A | 4/2014 |
| KR | 10-2014-0055204 A | 5/2014 |
| KR | 10-2014-0059697 A | 5/2014 |
| KR | 10-2014-0068752 A | 6/2014 |
| KR | 10-2014-0088449 A | 7/2014 |
| KR | 10-2014-0093949 A | 7/2014 |
| KR | 10-2014-0106715 A | 9/2014 |
| KR | 10-2014-0107253 A | 9/2014 |
| KR | 10-2014-0147557 A | 12/2014 |
| KR | 10-2015-0013631 A | 2/2015 |
| KR | 10-1506510 B1 | 3/2015 |
| KR | 10-2015-0038375 A | 4/2015 |
| KR | 10-2015-0039380 A | 4/2015 |
| KR | 10-2015-0041974 A | 4/2015 |
| KR | 10-2015-0043512 A | 4/2015 |
| KR | 10-2015-0062811 A | 6/2015 |
| KR | 10-2015-0095624 A | 8/2015 |
| KR | 10-1555742 B1 | 9/2015 |
| KR | 10-2015-0113127 A | 10/2015 |
| KR | 10-2015-0131262 A | 11/2015 |
| KR | 10-2015-0138109 A | 12/2015 |
| KR | 10-2016-0004351 A | 1/2016 |
| KR | 10-2016-0010523 A | 1/2016 |
| KR | 10-2016-0040279 A | 4/2016 |
| KR | 10-2016-0055839 A | 5/2016 |
| KR | 10-2016-0065503 A | 6/2016 |
| KR | 10-2016-0101079 A | 8/2016 |
| KR | 10-2016-0101198 A | 8/2016 |
| KR | 10-2016-0105847 A | 9/2016 |
| KR | 10-2016-0121585 A | 10/2016 |
| KR | 10-2016-0140694 A | 12/2016 |
| KR | 10-2016-0147854 A | 12/2016 |
| KR | 10-2017-0036805 A | 4/2017 |
| KR | 10-2017-0104006 A | 9/2017 |
| KR | 10-2017-0107058 A | 9/2017 |
| KR | 10-1776673 B1 | 9/2017 |
| KR | 10-2018-0032632 A | 3/2018 |
| KR | 10-2018-0034637 A | 4/2018 |
| KR | 10-2018-0135877 A | 12/2018 |
| KR | 10-1959328 B1 | 3/2019 |
| KR | 10-2020-0105519 A | 9/2020 |
| TW | 201110108 A | 3/2011 |
| TW | 201142823 A1 | 12/2011 |
| TW | 201227715 A | 7/2012 |
| TW | 201245989 A | 11/2012 |
| TW | 201312548 A | 3/2013 |
| TW | 201407184 A | 2/2014 |
| TW | 201610982 A | 3/2016 |
| TW | 201629750 A | 8/2016 |
| WO | 2010/054373 A2 | 5/2010 |
| WO | 2010/109358 A1 | 9/2010 |
| WO | 2011/028842 A2 | 3/2011 |
| WO | 2011/057346 A1 | 5/2011 |
| WO | 2011/060106 A1 | 5/2011 |
| WO | 2011/082521 A1 | 7/2011 |
| WO | 2011/084156 A2 | 7/2011 |
| WO | 2011/088053 A2 | 7/2011 |
| WO | 2011/093025 A1 | 8/2011 |
| WO | 2011/100142 A2 | 8/2011 |
| WO | 2011/116309 A1 | 9/2011 |
| WO | 2011/123122 A1 | 10/2011 |
| WO | 2011/133543 A1 | 10/2011 |
| WO | 2011/133573 A2 | 10/2011 |
| WO | 2011/097309 A3 | 12/2011 |
| WO | 2011/150730 A1 | 12/2011 |
| WO | 2011/163350 A1 | 12/2011 |
| WO | 2011/088053 A3 | 1/2012 |
| WO | 2012/008434 A1 | 1/2012 |
| WO | 2012/019020 A1 | 2/2012 |
| WO | 2012/019637 A1 | 2/2012 |
| WO | 2012/033312 A1 | 3/2012 |
| WO | 2012/063260 A2 | 5/2012 |
| WO | 2012/084965 A1 | 6/2012 |
| WO | 2012/092562 A1 | 7/2012 |
| WO | 2012/112331 A2 | 8/2012 |
| WO | 2012/129231 A1 | 9/2012 |
| WO | 2012/063260 A3 | 10/2012 |
| WO | 2012/135157 A2 | 10/2012 |
| WO | 2012/154317 A1 | 11/2012 |
| WO | 2012/154748 A1 | 11/2012 |
| WO | 2012/155079 A2 | 11/2012 |
| WO | 2012/160567 A1 | 11/2012 |
| WO | 2012/167168 A2 | 12/2012 |
| WO | 2012/173902 A2 | 12/2012 |
| WO | 2013/009578 A2 | 1/2013 |
| WO | 2013/022135 A1 | 2/2013 |
| WO | 2013/022223 A2 | 2/2013 |
| WO | 2013/048880 A1 | 4/2013 |
| WO | 2013/049358 A1 | 4/2013 |
| WO | 2013/057153 A1 | 4/2013 |
| WO | 2013/101489 A1 | 7/2013 |
| WO | 2013/118988 A1 | 8/2013 |
| WO | 2013/122310 A1 | 8/2013 |
| WO | 2013/128999 A1 | 9/2013 |
| WO | 2013/133533 A1 | 9/2013 |
| WO | 2013/137660 A1 | 9/2013 |
| WO | 2013/163113 A1 | 10/2013 |
| WO | 2013/163857 A1 | 11/2013 |
| WO | 2013/169842 A2 | 11/2013 |
| WO | 2013/173504 A1 | 11/2013 |
| WO | 2013/173511 A2 | 11/2013 |
| WO | 2013/176847 A1 | 11/2013 |
| WO | 2013/184953 A1 | 12/2013 |
| WO | 2013/184990 A1 | 12/2013 |
| WO | 2014/003138 A1 | 1/2014 |
| WO | 2014/004544 A2 | 1/2014 |
| WO | 2014/021967 A1 | 2/2014 |
| WO | 2014/022148 A1 | 2/2014 |
| WO | 2014/028735 A2 | 2/2014 |
| WO | 2014/028797 A1 | 2/2014 |
| WO | 2014/031505 A1 | 2/2014 |
| WO | 2014/032461 A1 | 3/2014 |
| WO | 2014/046475 A1 | 3/2014 |
| WO | 2014/047047 A1 | 3/2014 |
| WO | 2014/048855 A1 | 4/2014 |
| WO | 2014/066352 A1 | 5/2014 |
| WO | 2014/070872 A2 | 5/2014 |
| WO | 2014/078965 A1 | 5/2014 |
| WO | 2014/093339 A1 | 6/2014 |
| WO | 2014/096506 A1 | 6/2014 |
| WO | 2014/124332 A2 | 8/2014 |
| WO | 2014/137074 A1 | 9/2014 |
| WO | 2014/138604 A1 | 9/2014 |
| WO | 2014/143959 A2 | 9/2014 |
| WO | 2014/144395 A2 | 9/2014 |
| WO | 2014/144579 A1 | 9/2014 |
| WO | 2014/144949 A2 | 9/2014 |
| WO | 2014/149473 A1 | 9/2014 |

(56) References Cited

FOREIGN PATENT DOCUMENTS

| | | |
|---|---|---|
| WO | 2014/151153 A2 | 9/2014 |
| WO | 2014/124332 A3 | 10/2014 |
| WO | 2014/159578 A1 | 10/2014 |
| WO | 2014/159581 A1 | 10/2014 |
| WO | 2014/162570 A1 | 10/2014 |
| WO | 2014/169269 A1 | 10/2014 |
| WO | 2014/173189 A1 | 10/2014 |
| WO | 2013/173504 A8 | 12/2014 |
| WO | 2014/197336 A1 | 12/2014 |
| WO | 2014/197635 A2 | 12/2014 |
| WO | 2014/197730 A1 | 12/2014 |
| WO | 2014/200728 A1 | 12/2014 |
| WO | 2014/200731 A1 | 12/2014 |
| WO | 2014/204659 A2 | 12/2014 |
| WO | 2014/210392 A2 | 12/2014 |
| WO | 2015/018440 A1 | 2/2015 |
| WO | 2015/020942 A1 | 2/2015 |
| WO | 2015/029379 A1 | 3/2015 |
| WO | 2015/030796 A1 | 3/2015 |
| WO | 2015/036817 A1 | 3/2015 |
| WO | 2015/041882 A1 | 3/2015 |
| WO | 2015/041892 A1 | 3/2015 |
| WO | 2015/047932 A1 | 4/2015 |
| WO | 2015/053485 A1 | 4/2015 |
| WO | 2015/080530 A1 | 6/2015 |
| WO | 2015/084659 A1 | 6/2015 |
| WO | 2015/092943 A1 | 6/2015 |
| WO | 2015/094169 A1 | 6/2015 |
| WO | 2015/094369 A1 | 6/2015 |
| WO | 2015/098306 A1 | 7/2015 |
| WO | 2015/099939 A1 | 7/2015 |
| WO | 2015/112625 A1 | 7/2015 |
| WO | 2015/116151 A1 | 8/2015 |
| WO | 2015/151133 A1 | 10/2015 |
| WO | 2015/153310 A1 | 10/2015 |
| WO | 2015/157013 A1 | 10/2015 |
| WO | 2015/183401 A1 | 12/2015 |
| WO | 2015/183699 A1 | 12/2015 |
| WO | 2015/184186 A1 | 12/2015 |
| WO | 2015/184387 A1 | 12/2015 |
| WO | 2015/200207 A1 | 12/2015 |
| WO | 2016/027933 A1 | 2/2016 |
| WO | 2016/028946 A1 | 2/2016 |
| WO | 2016/033257 A1 | 3/2016 |
| WO | 2016/039992 A1 | 3/2016 |
| WO | 2016/040721 A1 | 3/2016 |
| WO | 2016/051519 A1 | 4/2016 |
| WO | 2016/052164 A1 | 4/2016 |
| WO | 2016/054230 A1 | 4/2016 |
| WO | 2016/057268 A1 | 4/2016 |
| WO | 2016/075081 A1 | 5/2016 |
| WO | 2016/085775 A2 | 6/2016 |
| WO | 2016/085776 A1 | 6/2016 |
| WO | 2016/089029 A1 | 6/2016 |
| WO | 2016/100139 A1 | 6/2016 |
| WO | 2016/111881 A1 | 7/2016 |
| WO | 2016/144840 A1 | 9/2016 |
| WO | 2016/144982 A1 | 9/2016 |
| WO | 2016/144983 A1 | 9/2016 |
| WO | 2016/175354 A1 | 11/2016 |
| WO | 2016/187149 A1 | 11/2016 |
| WO | 2016/190950 A1 | 12/2016 |
| WO | 2016/209444 A1 | 12/2016 |
| WO | 2016/209924 A1 | 12/2016 |
| WO | 2017/044160 A1 | 3/2017 |
| WO | 2017/044257 A1 | 3/2017 |
| WO | 2017/044260 A1 | 3/2017 |
| WO | 2017/044629 A1 | 3/2017 |
| WO | 2017/053311 A1 | 3/2017 |
| WO | 2017/058293 A1 | 4/2017 |
| WO | 2017/059388 A1 | 4/2017 |
| WO | 2017/071420 A1 | 5/2017 |
| WO | 2017/142116 A1 | 8/2017 |
| WO | 2017/160487 A1 | 9/2017 |
| WO | 2017/200777 A1 | 11/2017 |
| WO | 2017/213678 A1 | 12/2017 |
| WO | 2017/213682 A1 | 12/2017 |
| WO | 2017/218194 A1 | 12/2017 |
| WO | 2018/009397 A1 | 1/2018 |
| WO | 2018/044633 A1 | 3/2018 |
| WO | 2018/067528 A1 | 4/2018 |
| WO | 2018/209152 A1 | 11/2018 |
| WO | 2018/213401 A1 | 11/2018 |
| WO | 2018/213415 A1 | 11/2018 |
| WO | 2019/067930 A1 | 4/2019 |
| WO | 2019/078576 A1 | 4/2019 |
| WO | 2019/079017 A1 | 4/2019 |
| WO | 2019/143397 A1 | 7/2019 |
| WO | 2019/147429 A1 | 8/2019 |
| WO | 2019/236217 A1 | 12/2019 |
| WO | 2020/010530 A1 | 1/2020 |

OTHER PUBLICATIONS

Decision to Refuse received for European Patent Application No. 16904827.9, mailed on Jun. 22, 2022, 18 pages.
Adium, "AboutAdium—Adium X—Trac", Online available at:—<http://web.archive.org/web/20070819113247/http://trac.adiumx.com/wiki/AboutAdium>, retrieved on Nov. 25, 2011, 2 pages.
"Alexa, Turn Up the Heat!, Smartthings Samsung [online]", Online available at:—<https://web.archive.org/web/20160329142041/https://blog.smartthings.com/news/smartthingsupdates/alexa-turn-up-the-heat/>, Mar. 3, 2016, 3 pages.
Alfred App, "Alfred", Online available at:—<http://www.alfredapp.com/>, retrieved on Feb. 8, 2012, 5 pages.
Anania Peter, "Amazon Echo with Home Automation (Smartthings)", Online available at:—<https://www.youtube.com/watch?v=LMW6aXmsWNE>, Dec. 20, 2015, 1 page.
API.AI, "Android App Review—Speaktoit Assistant", Online available at:—<https://www.youtube.com/watch?v=myE498nyfGw>, Mar. 30, 2011, 3 pages.
Apple, "VoiceOver for OS X", Online available at:—<http://www.apple.com/accessibility/voiceover/>, May 19, 2014, pp. 1-3.
Asakura et al., "What LG thinks; How the TV should be in the Living Room", HiVi, vol. 31, No. 7, Stereo Sound Publishing, Inc., Jun. 17, 2013, pp. 68-71.
"Ask Alexa—Things That Are Smart Wiki", Online available at:—<http://thingsthataresmart.wiki/index.php?title=Ask_Alexa&oldid=4283>, Jun. 8, 2016, pp. 1-31.
Berry et al., "PTIME: Personalized Assistance for Calendaring", ACM Transactions on Intelligent Systems and Technology, vol. 2, No. 4, Article 40, Jul. 2011, pp. 1-22.
Bertolucci, Jeff, "Google Adds Voice Search to Chrome Browser", PC World, Jun. 14, 2011, 5 pages.
Butcher, Mike, "EVI Arrives in Town to go Toe-to-Toe with Siri", TechCrunch, Jan. 23, 2012, pp. 1-2.
Cambria et al., "Jumping NLP curves: A Review of Natural Language Processing Research.", IEEE Computational Intelligence magazine, 2014, vol. 9, May 2014, pp. 48-57.
Caraballo et al., "Language Identification Based on a Discriminative Text Categorization Technique", Iberspeech 2012—VII Jornadas En Tecnologia Del Habla and III Iberian Sltech Workshop, Nov. 21, 2012, pp. 1-10.
Castleos, "Whole House Voice Control Demonstration", Online available at:—<https://www.youtube.com/watch?v=9SRCoxrZ_W4>, Jun. 2, 2012, 1 page.
Certificate of Examination received for Australian Patent Application No. 2017100585, mailed on Jan. 18, 2018, 2 pages.
Chen et al., "Progressive Joint Modeling in Unsupervised Single-Channel Overlapped Speech Recognition", IEEE/ACM Transactions on Audio, Speech, and Language Processing, vol. 26, No. 1, Jan. 2018, pp. 184-196.
Cheyer, Adam, "Adam Cheyer—About", Online available at:—<http://www.adam.cheyer.com/about.html>, retrieved on Sep. 17, 2012, pp. 1-2.
Choi et al., "Acoustic and Visual Signal based Context Awareness System for Mobile Application", IEEE Transactions on Consumer Electronics, vol. 57, No. 2, May 2011, pp. 738-746.

(56) References Cited

OTHER PUBLICATIONS

Colt, Sam, "Here's One Way Apple's Smartwatch Could Be Better Than Anything Else", Business Insider, Aug. 21, 2014, pp. 1-4.
Corrected Notice of Allowance received for U.S. Appl. No. 15/274,859, mailed on May 14, 2019, 5 pages.
Decision on Appeal received for U.S. Appl. No. 15/994,795, mailed on Aug. 11, 2021, 11 pages.
Decision to Grant received for Danish Patent Application No. PA201670577, mailed on Feb. 27, 2018, 2 pages.
Deedeevuu, "Amazon Echo Alarm Feature", Online available at:—<https://www.youtube.com/watch?v=fdjU8eRLk7c>, Feb. 16, 2015, 1 page.
"Directv™ Voice", Now Part of the DIRECTTV Mobile App for Phones, Sep. 18, 2013, 5 pages.
Evans, G., "Solving Home Automation Problems Using Artificial Intelligence Techniques", IEEE Transactions on Consumer Electronics, IEEE Service Center, New York, NY, US; vol. 37, No. 3, Aug. 1, 1991, pp. 395-400.
Evi, "Meet Evi: The One Mobile Application that Provides Solutions for your Everyday Problems", Feb. 2012, 3 pages.
Examiner's Answer to Appeal Brief received for U.S. Appl. No. 15/994,795, mailed on Jan. 15, 2021, 53 pages.
Extended European Search Report received for European Patent Application No. 16904827.9, mailed on Jul. 25, 2019, 10 pages.
Filipowicz, Luke, "How to use the QuickType keyboard in iOS 8", Online available at:—<https://www.imore.com/comment/568232>, Oct. 11, 2014, pp. 1-17.
Final Office Action received for U.S. Appl. No. 15/274,859, mailed on Jan. 2, 2019, 15 pages.
Final Office Action received for U.S. Appl. No. 15/994,795, mailed on Mar. 1, 2019, 16 pages.
Final Office Action received for U.S. Appl. No. 15/994,795, mailed on Apr. 20, 2020, 13 pages.
Findlater et al., "Beyond QWERTY: Augmenting Touch-Screen Keyboards with Multi-Touch Gestures for Non-Alphanumeric Input", CHI '12, May 5-10, 2012, 4 pages.
Gannes, Liz, "Alfred App Gives Personalized Restaurant Recommendations", AllThingsD, Jul. 18, 2011, pp. 1-3.
Guay, Matthew, "Location-Driven Productivity with Task Ave", Online available at:—<http://iphone.appstorm.net/reviews/productivity/location-driven-productivity-with-task-ave/>, Feb. 19, 2011, 7 pages.
Guim, Mark, "How to Set a Person-Based Reminder with Cortana", Online available at:—<http://www.wpcentral.com/how-to-person-based-reminder-cortana>, Apr. 26, 2014, 15 pages.
Hardawar, Devindra, "Driving App Waze Builds its own Siri for Hands-Free Voice Control", Online available at:—<http://venturebeat.com/2012/02/09/driving-app-waze-builds-its-own-siri-for-hands-free-voice-control/>, retrieved on Feb. 9, 2012, 4 pages.
Hashimoto, Yoshiyuki, "Simple Guide for iPhone Siri, which can be Operated with your Voice", Shuwa System Co., Ltd., vol. 1, Jul. 5, 2012, pp. 8, 130, 131.
"Headset Button Controller v7.3 APK Full APP Download for Andriod, Blackberry, iPhone", Online available at:—<http://fullappdownload.com/headset-button-controller-v7-3-apk/>, Jan. 27, 2014, 11 pages.
"Hear Voice from Google Translate", Online available at:—<https://www.youtube.com/watch?v=18AvMhFqD28>, Jan. 28, 2011, 1 page.
ID3.org, "id3v2.4.0-Frames", Online available at:—<http://id3.org/id3v2.4.0-frames?action=print>, retrieved on Jan. 22, 2015, pp. 1-41.
Intention to Grant received for Danish Patent Application No. PA201670577, mailed on Dec. 6, 2017, 2 pages.
Intention to Grant received for Danish Patent Application No. PA201670578 mailed on Apr. 30, 2018, 2 pages.
"Interactive Voice", Online available at:—<http://www.helloivee.com/company/>, retrieved on Feb. 10, 2014, 2 pages.
International Preliminary Report on Patentability received for PCT Patent Application No. PCT/US2016/055914, mailed on Mar. 23, 2017, 9 pages.
International Preliminary Report on Patentability received for PCT Patent Application No. PCT/US2016/055914, mailed on Dec. 20, 2018, 9 pages.
International Search Report and Written Opinion received for PCT Patent Application No. PCT/US2016/055914, mailed on Jan. 17, 2017, 10 pages.
Jawaid et al., "Machine Translation with Significant Word Reordering and Rich Target-Side Morphology", WDS'11 Proceedings of Contributed Papers, Part I, 2011, pp. 161-166.
Jonsson et al., "Proximity-based Reminders Using Bluetooth", 2014 IEEE International Conference on Pervasive Computing and Communications Demonstrations, 2014, pp. 151-153.
Jouvet et al., "Evaluating Grapheme-to-phoneme Converters in Automatic Speech Recognition Context", IEEE, 2012, pp. 4821-4824.
Kazmucha Allyson, "How to Send Map Locations Using iMessage", iMore.com, Online available at:—<http://www.imore.com/how-use-imessage-share-your-location-your-iphone>, Aug. 2, 2012, 6 pages.
Kickstarter, "Ivee Sleek: Wi-Fi Voice-Activated Assistant", Online available at:—<https://www.kickstarter.com/projects/ivee/ivee-sleek-wi-fi-voice-activated-assistant>, retrieved on Feb. 10, 2014, pp. 1-13.
Lewis Cameron, "Task Ave for iPhone Review", Mac Life, Online available at:—<http://www.maclife.com/article/reviews/task_ave_iphone_review>, Mar. 3, 2011, 5 pages.
"Meet Ivee, Your Wi-Fi Voice Activated Assistant", Availale Online at:—<http://www.helloivee.com/>, retrieved on Feb. 10, 2014, 8 pages.
Mhatre et al., "Donna Interactive Chat-bot acting as a Personal Assistant", International Journal of Computer Applications (0975-8887), vol. 140, No. 10, Apr. 2016, 6 pages.
Miller Chance, "Google Keyboard Updated with New Personalized Suggestions Feature", Online available at:—<http://9to5google.com/2014/03/19/google-keyboard-updated-with-new-personalized-suggestions-feature/>, Mar. 19, 2014, 4 pages.
"Mobile Speech Solutions, Mobile Accessibility", SVOX AG Product Information Sheet, Online available at:—<http://www.svox.com/site/bra840604/con782768/mob965831936.aSQ?osLang=1>, Sep. 27, 2012, 1 page.
Morrison Jonathan, "iPhone 5 Siri Demo", Online Available at:—<https://www.youtube.com/watch?v=_wHWwG5lhWc>, Sep. 21, 2012, 3 pages.
My Cool Aids, "What's New", Online available at :—<http://www.mycoolaids.com/>, 2012, 1 page.
Myers, Brad A., "Shortcutter for Palm", available at <http://www.cs.cmu.edu/~pebbles/v5/shortcutter/palm/index.html>, retrieved on Jun. 18, 2014, 10 pages.
Nakazawa et al., "Detection and Labeling of Significant Scenes from TV program based on Twitter Analysis", Proceedings of the 3rd Forum on Data Engineering and Information Management (deim 2011 proceedings), IEICE Data Engineering Technical Group, Feb. 28, 2011, 11 pages.
"Natural Language Interface Using Constrained Intermediate Dictionary of Results", List of Publications Manually reviewed for the Search of U.S. Pat. No. 7,177,798, Mar. 22, 2013, 1 page.
NDTV, "Sony SmartWatch 2 Launched in India for Rs. 14,990", available at <http://gadgets.ndtv.com/others/news/sony-smartwatch-2-launched-in-india-for-rs-14990-420319>, Sep. 18, 2013, 4 pages.
Non-Final Office Action received for U.S. Appl. No. 15/274,859, mailed on Jun. 20, 2018, 14 pages.
Non-Final Office Action received for U.S. Appl. No. 15/994,795, mailed on Aug. 6, 2018, 11 pages.
Non-Final Office Action received for U.S. Appl. No. 15/994,795, mailed on Nov. 5, 2019, 10 pages.
Notice of Acceptance received for Australian Patent Application No. 2016409887, mailed on May 8, 2019, 3 pages.
Notice of Allowance received for Chinese Patent Application No. 201710393185.0, mailed on Apr. 17, 2019, 6 pages.
Notice of Allowance received for Danish Patent Application No. PA201670578 mailed on Sep. 6, 2018, 2 pages.
Notice of Allowance received for U.S. Appl. No. 15/274,859, mailed on Apr. 2, 2019, 8 pages.

(56) References Cited

OTHER PUBLICATIONS

Nozawa et al., "iPhone 4S Perfect Manual", vol. 1, First Edition, Nov. 11, 2011, 4 pages.
Office Action received for Australian Patent Application No. 2016409887, mailed on Aug. 24, 2018, 4 pages.
Office Action received for Australian Patent Application No. 2017100585, mailed on Aug. 12, 2017, 5 pages.
Office Action received for Chinese Patent Application No. 201710393185.0, mailed on Dec. 10, 2018, 12 pages.
Office Action received for Chinese Patent Application No. 201710393185.0, mailed on Jul. 6, 2018, 16 pages.
Office Action received for Danish Patent Application No. PA201670577, mailed on Feb. 23, 2017, 7 pages.
Office Action received for Danish Patent Application No. PA201670577, mailed on Jul. 3, 2017, 4 pages.
Office Action received for Danish Patent Application No. PA201670578, mailed on Feb. 24, 2017, 6 pages.
Office Action received for Danish Patent Application No. PA201670578, mailed on Jan. 2, 2018, 4 pages.
Office Action received for Danish Patent Application No. PA201670578, mailed on Jul. 4, 2017, 6 pages.
OSXdaily, "Get a List of Siri Commands Directly from Siri", Online available at:—<http://osxdaily.com/2013/02/05/list-siri-commands/>, Feb. 5, 2013, 15 pages.
Pathak et al., "Privacy-preserving Speech Processing: Cryptographic and String-matching Frameworks Show Promise", In: IEEE signal processing magazine, Online available at:—<http://www.merl.com/publications/docs/TR2013-063.pdf>,, Feb. 13, 2013, 16 pages.
Patra et al., "A Kernel-Based Approach for Biomedical Named Entity Recognition", Scientific World Journal, vol. 2013, 2013, pp. 1-7.
Record of Oral Hearing received for U.S. Appl. No. 15/994,795, mailed on Aug. 9, 2021, 17 pages.
Rios Mafe, "New Bar Search for Facebook", YouTube, available at:—<https://www.youtube.com/watch?v=vwgN1WbvCas>, Jul. 19, 2013, 2 pages.
Routines, "SmartThings Support", Online available at:—<https://web.archive.org/web/20151207165701/https://support.smartthings.com/hc/en-us/articles/205380034-Routines>, 2015, 3 pages.
Sarawagi Sunita, "CRF Package Page", Online available at:—<http://crf.sourceforge.net/>, retrieved on Apr. 6, 2011, 2 pages.
Search Report and Opinion received for Danish Patent Application No. PA201670577, mailed on Oct. 17, 2016, 11 pages.
Search Report and Opinion received for Danish Patent Application No. PA201670578, mailed on Oct. 26, 2016, 11 pages.
Selfridge et al., "Interact: Tightly-coupling Multimodal Dialog with an Interactive Virtual Assistant", International Conference on Multimodal Interaction, ACM, Nov. 9, 2015, pp. 381-382.
Simonite, Tom, "One Easy Way to Make Siri Smarter", Technology Review, Oct. 18, 2011, 2 pages.
"SmartThings +Amazon Echo", Smartthings Samsung [online], Online available at:—<https://web.archive.org/web/20160509231428/https://blog.smartthings.com/featured/alexa-turn-on-my-smartthings/>, Aug. 21, 2015, 3 pages.
SRI, "SRI Speech: Products: Software Development Kits: EduSpeak", Online available at:—<http://web.archive.org/web/20090828084033/http://www.speechatsri.com/products/eduspeak>shtml, retrieved on Jun. 20, 2013, pp. 1-2.
Sullivan Danny, "How Google Instant's Autocomplete Suggestions Work", Online available at:—<http://searchengineland.com/how-google-instant-autocomplete-suggestions-work-62592>, Apr. 6, 2011, 12 pages.
Sundaram et al., "Latent Perceptual Mapping with Data-Driven Variable-Length Acoustic Units for Template-Based Speech Recognition", ICASSP 2012, Mar. 2012, pp. 4125-4128.
Sundermeyer et al., "From Feedforward to Recurrent LSTM Neural Networks for Language Modeling.", IEEE Transactions to Audio, Speech, and Language Processing, vol. 23, No. 3, Mar. 2015, pp. 517-529.
Tofel et al., "SpeakToit: A Personal Assistant for Older iPhones, iPads", Apple News, Tips and Reviews, Feb. 9, 2012, 7 pages.
Tucker Joshua, "Too Lazy to Grab Your TV Remote? Use Siri Instead", Engadget, Nov. 30, 2011, pp. 1-8.
Wikipedia, "Acoustic Model", Online available at:—<http://en.wikipedia.org/wiki/AcousticModel>, retrieved on Sep. 14, 2011, pp. 1-2.
Wikipedia, "Language Model", Online available at:—<http://en.wikipedia.org/wiki/Language_model>, retrieved on Sep. 14, 2011, 4 pages.
Wikipedia, "Speech Recognition", Online available at:—<http://en.wikipedia.org/wiki/Speech_recognition>, retrieved on Sep. 14, 2011, 12 pages.
X.AI, "How it Works", Online available at:—<https://web.archive.org/web/20160531201426/https://x.ai/how-it-works/>, May 31, 2016, 6 pages.
Xiang et al., "Correcting Phoneme Recognition Errors in Learning Word Pronunciation through Speech Interaction", Speech Communication, vol. 55, No. 1, Jan. 1, 2013, pp. 190-203.
Yan et al., "A Scalable Approach to Using DNN-derived Features in GMM-HMM Based Acoustic Modeling for LVCSR", 14th Annual Conference of the International Speech Communication Association, InterSpeech 2013, Aug. 2013, pp. 104-108.
Zainab, "Google Input Tools Shows Onscreen Keyboard in Multiple Languages [Chrome]", Online available at:—<http://www.addictivetips.com/internet-tips/google- input-tools-shows-multiple-language-onscreen-keyboards-chrome/>, Jan. 3, 2012, 3 pages.
Zangerle et al., "Recommending #-Tags in Twitter", proceedings of the Workshop on Semantic Adaptive Socail Web, 2011, pp. 1-12.
Zhong et al., "JustSpeak: Enabling Universal Voice Control on Android", W4A'14, Proceedings of the 11th Web for All Conference, No. 36, Apr. 7-9, 2014, 8 pages.
Minutes of the Oral Proceedings received for European Patent Application No. 16904827.9, mailed on May 30, 2022, 7 pages.
Brief Communication Regarding Oral Proceedings received for European Patent Application No. 16904827.9, mailed on May 6, 2022, 12 pages.
Result of Consultation received for European Patent Application No. 16904827.9, mailed on May 9, 2022, 3 pages.
Office Action received for Chinese Patent Application No. 201680082355.7, mailed on Oct. 27, 2021, 26 pages (13 pages of English Translation and 13 pages of Official Copy).
AAAAPLAY, "Sony Media Remote for iOS and Android", Online available at: <https://www.youtube.com/watch?v=W8QoeQhlGok>, Feb. 4, 2012, 3 pages.
Abdelaziz et al., "Speaker-Independent Speech-Driven Visual Speech Synthesis using Domain-Adapted Acoustic Models", May 15, 2019, 9 pages.
Accessibility on iOS, Apple Inc., Online available at: https://developer.apple.com/accessibility/ios/, Retrieved on Jul. 26, 2021, 2 pages.
Alsharif et al., "Long Short-Term Memory Neural Network for Keyboard Gesture Decoding", IEEE International Conference on Acoustics, Speech and Signal Processing (ICASSP), Brisbane, Australia, Sep. 2015, 5 pages.
Android Authority, "How to use Tasker: A Beginner's Guide", Online available at: https://youtube.com/watch?v= rDpdS_YWzFc>, May 1, 2013, 1 page.
Apple Differential Privacy Team, "Learning with Privacy at Scale", Apple Machine Learning Blog, vol. 1, No. 8, Online available at: <https://machinelearning.apple.com/2017/12/06/learning-with-privacy-at-scale.html>, Dec. 2017, 9 pages.
ASHINGTONDCTECH & GAMING, "SwipeStatusBar—Reveal the Status Bar in a Fullscreen App", Online Available at: <https://www.youtube.com/watch?v=wA_tT9IAreQ>, Jul. 1, 2013, 3 pages.
Automate Your Life, "How to Setup Google Home Routines—A Google Home Routines Walkthrough", Online Available at: <https://www.youtube.com/watch?v=pXokZHP9kZg>, Aug. 12, 2018, 1 page.
Bell, Jason, "Machine Learning Hands-On for Developers and Technical Professionals", Wiley, 2014, 82 pages.

(56) References Cited

OTHER PUBLICATIONS

Bellegarda, Jeromer, "Chapter 1: Spoken Language Understanding for Natural Interaction: The Siri Experience", Natural Interaction with Robots, Knowbots and Smartphones, 2014, pp. 3-14.
Bellegarda, Jeromer, "Spoken Language Understanding for Natural Interaction: The Siri Experience", Slideshow retrieved from : <https://www.uni-ulm.de/fileadmin/website_uni_ulm/iui.iwsds2012/files/Bellegarda.pdf>, International Workshop on Spoken Dialog Systems (IWSDS), May 2012, pp. 1-43.
Beointegration.com, "BeoLink Gateway- Programming Example", Online Available at: <https://www.youtube.com/watch?v=TXDaJFm5UH4>, Mar. 4, 2015, 3 pages.
Blum et al., "What's around Me? Spatialized Audio Augmented Reality for Blind Users with a Smartphone", In International Conference on Mobile and Ubiquitous Systems: Computing, Networking, and Services. Springer, Online available at: https://eudl.eu/pdf/10.1007/978-3-642-30973-1_5, 2011, pp. 49-62.
Bodapati et al., "Neural Word Decomposition Models for Abusive Language Detection", Proceedings of the Third Workshop on Abusive Language Online, Aug. 1, 2019, pp. 135-145.
Brief Communication received for European Patent Application No. 16904827.9, mailed on Jun. 24, 2020, 5 pages.
Burgess, Brian, "Amazon Echo Tip: Enable the Wake Up Sound", Online available at:—<https://www.groovypost.com/howto/amazon-echo-tip-enable-wake-up-sound/>, Jun. 30, 2015, 4 pages.
Büttner et al., "The Design Space of Augmented and Virtual Reality Applications for Assistive Environments in Manufacturing: A Visual Approach", In Proceedings of the 10th International Conference on PErvasive Technologies Related to Assistive Environments (PETRA '17), Island of Rhodes, Greece, Online available at: https://dl.acm.org/doi/pdf/10.1145/3056540.3076193, Jun. 21-23, 2017, pp. 433-440.
Chang et al., "Monaural Multi-Talker Speech Recognition with Attention Mechanism and Gated Convolutional Networks", Interspeech 2018, Sep. 2-6, 2018, pp. 1586-1590.
Chen et al., "A Convolutional Neural Network with Dynamic Correlation Pooling", 13th International Conference on Computational Intelligence and Security, IEEE, 2017, pp. 496-499.
Chen, Angela, "Amazon's Alexa now handles patient health information", Available online at: <https://www.theverge.com/2019/4/4/18295260/amazon-hipaa-alexa-echo-patient-health-information-privacy-voice-assistant>, Apr. 4, 2019, 2 pages.
Chenghao, Yuan, "MacroDroid", Online available at: https://www.ifanr.com/weizhizao/612531, Jan. 25, 2016, 7 pages (Official Copy Only). {See communication under 37 CFR § 1.98(a) (3)}.
Conneau et al., "Supervised Learning of Universal Sentence Representations from Natural Language Inference Data", Proceedings of the 2017 Conference on Empirical Methods in Natural Language Processing, Copenhagen, Denmark, Sep. 7-11, 2017, pp. 670-680.
Coulouris et al., "Distributed Systems: Concepts and Design (Fifth Edition)", Addison-Wesley, 2012, 391 pages.
Czech Lucas, "A System for Recognizing Natural Spelling of English Words", Diploma Thesis, Karlsruhe Institute of Technology, May 7, 2014, 107 pages.
Dai, et al., "Transformer-XL: Attentive Language Models Beyond a Fixed-Length Context", Online available at: arXiv:1901.02860v3, Jun. 2, 2019, 20 pages.
Delcroix et al., "Context Adaptive Deep Neural Networks for Fast Acoustic Model Adaptation", ICASSP, 2015, pp. 4535-4539.
Delcroix et al., "Context Adaptive Neural Network for Rapid Adaptation of Deep CNN Based Acoustic Models", Interspeech 2016, Sep. 8-12, 2016, pp. 1573-1577.
Derrick, Amanda, "How to Set Up Google Home for Multiple Users", Lifewire, Online available at: —<https://www.lifewire.com/set-up-google-home-multiple-users-4685691>, Jun. 8, 2020, 9 pages.
Dighe et al., "Lattice-Based Improvements for Voice Triggering Using Graph Neural Networks", in 2020 IEEE International Conference on Acoustics, Speech and Signal Processing (ICASSP), Jan. 25, 2020, 5 pages.
Dihelson, "How Can I Use Voice or Phrases as Triggers to Macrodroid?", Macrodroid Forums, Online Available at: —<https://www.tapatalk.com/groups/macrodroid/how-can-i-use-voice-or-phrases-as-triggers-to-macr-t4845.html>, May 9, 2018, 5 pages.
Dwork et al., "The Algorithmic Foundations of Differential Privacy", Foundations and Trends in Theoretical Computer Science: vol. 9: No. 3-4, 211-407, 2014, 281 pages.
Earthling1984, "Samsung Galaxy Smart Stay Feature Explained", Online available at:—<https://www.youtube.com/watch?v=RpjBNtSjupl>, May 29, 2013, 1 page.
Eder et al., "At the Lower End of Language—Exploring the Vulgar and Obscene Side of German", Proceedings of the Third Workshop on Abusive Language Online, Florence, Italy, Aug. 1, 2019, pp. 119-128.
Edim, et al., "A Multi-Agent Based Virtual Personal Assistant for E-Health Service", Journal of Information Engineering and Applications, vol. 3, No. 11, 2013, 9 pages.
Gadget Hacks, "Tasker Too Complicated? Give MacroDroid a Try [How-To]", Online available at: <https://www.youtube.com/watch?v=8YL9cWCykKc>, May 27, 2016, 1 page.
"Galaxy S7: How to Adjust Screen Timeout & Lock Screen Timeout", Online available at:—<https://www.youtube.com/watch?v=n6e1WKUS2ww>, Jun. 9, 2016, 1 page.
Ganin et al., "Unsupervised Domain Adaptation by Backpropagation", in Proceedings of the 32nd International Conference on Machine Learning, vol. 37, Jul. 2015, 10 pages.
Gasic et al., "Effective Handling of Dialogue State in the Hidden Information State POMDP-based Dialogue Manager", ACM Transactions on Speech and Language Processing, May 2011, pp. 1-25.
Gatys et al., "Image Style Transfer Using Convolutional Neural Networks", Proceedings of IEEE International Conference on Acoustics, Speech and Signal Processing (ICASSP), 2016, pp. 2414-2423.
Geyer et al., "Differentially Private Federated Learning: A Client Level Perspective", arXiv:1712.07557v2, Mar. 2018, 7 pages.
Ghauth et al., "Text Censoring System for Filtering Malicious Content Using Approximate String Matching and Bayesian Filtering", Proc. 4th INNS Symposia Series on Computational Intelligence in Information Systems, Bandar Seri Begawan, Brunei, 2015, pp. 149-158.
Goodfellow et al., "Generative Adversarial Networks", Proceedings of the Neural Information Processing Systems, Dec. 2014, 9 pages.
Google Developers, "Voice search in your app", Online available at:—<https://www.youtube.com/watch?v=PS1FbB5qWEI>, Nov. 12, 2014, 1 page.
Graves, Alex, "Sequence Transduction with Recurrent Neural Networks", Proceeding of International Conference of Machine Learning (ICML) Representation Learning Workshop, Nov. 14, 2012, 9 pages.
Gu et al., "BadNets: Evaluating Backdooring Attacks on Deep Neural Networks", IEEE Access, vol. 7, Mar. 21, 2019, pp. 47230-47244.
Guo et al., "StateLens: A Reverse Engineering Solution for Making Existing Dynamic Touchscreens Accessible", In Proceedings of the 32nd Annual Symposium on User. Interface Software and Technology (UIST '19), New Orleans, LA, USA, Online available at: https://dl.acm.org/doi/pdf/10.1145/3332165.3347873, Oct. 20-23, 2019, pp. 371-385.
Guo et al., "Time-Delayed Bottleneck Highway Networks Using a DFT Feature for Keyword Spotting", IEEE International Conference on Acoustics, Speech and Signal Processing (ICASSP). IEEE, 2018, 5 pages.
Guo et al., "VizLens: A Robust and Interactive Screen Reader for Interfaces in the Real World", In Proceedings of the 29th Annual Symposium on User Interface Software and Technology (UIST '16), Tokyo, Japan, Online available at: https://dl.acm.org/doi/pdf/10.1145/2984511.2984518, Oct. 16-19, 2016, pp. 651-664.
Gupta et al., "I-vector-based Speaker Adaptation of Deep Neural Networks for French Broadcast Audio Transcription", ICASSP, 2014, 2014, pp. 6334-6338.
Gupta, Naresh, "Inside Bluetooth Low Energy", Artech House, 2013, 274 pages.

(56) References Cited

OTHER PUBLICATIONS

Haung et al., "A Study for Improving Device-Directed Speech Detection Toward Frictionless Human-Machine Interaction", in Proc. Interspeech, 2019, 5 pages.
Heller et al., "AudioScope: Smartphones as Directional Microphones in Mobile Audio Augmented Reality Systems", In Proceedings of the 33rd Annual ACM Conference on Human Factors in Computing Systems (CHI '15), Crossings, Seoul, Korea, Online available at: https://dl.acm.org/doi/pdf/10.1145/2702123.2702159, Apr. 18-23, 2015, pp. 949-952.
Henderson et al., "Efficient Natural Language Response Suggestion for Smart Reply", Available Online at: https://static.googleusercontent.com/media/research.google.com/en//pubs/archive/1846e8a466c079eae7e90727e27caf5f98f10e0c.pdf, 2017, 15 pages.
Hershey et al., "Deep Clustering: Discriminative Embeddings for Segmentation and Separation", Proc. ICASSP, Mar. 2016, 6 pages.
"Hey Google: How to Create a Shopping List with Your Google Assistant", Online available at:—<https://www.youtube.com/watch?v=w9NCsElax1Y>, May 25, 2018, 1 page.
Hinton et al., "Distilling the Knowledge in a Neural Network", arXiv preprintarXiv:1503.02531, Mar. 2, 2015, 9 pages.
"How to Enable Google Assistant on Galaxy S7 and Other Android Phones (No Root)", Online available at:—<https://www.youtube.com/watch?v=HeklQbWyksE>, Mar. 20, 2017, 1 page.
"How to Use Ok Google Assistant Even Phone is Locked", Online available at:—<https://www.youtube.com/watch?v=9B_gP4j_SP8>, Mar. 12, 2018, 1 page.
Hutsko et al., "iPhone All-in-One for Dummies", 3rd Edition, 2013, 98 pages.
Idasallinen, "What's The 'Like' Meter Based on?", Online Available at: —<https://community.spotify.com/t5/Content-Questions/What-s-the-like-meter-based-on/td-p/1209974>, Sep. 22, 2015, 6 pages.
Ikeda, Masaru, "beGLOBAL SEOUL 2015 Startup Battle: Talkey", YouTube. Publisher, Online Available at: —<https://www.youtube.com/watch?v=4Wkp7sAAldg>, May 14, 2015, 1 page.
Inews and Tech, "How to Use the QuickType Keyboard in IOS 8", Online available at:—<http://www.inewsandtech.com/how-to-use-the-quicktype-keyboard-in-ios-8/>, Sep. 17, 2014, 6 pages.
Internet Services and Social Net, "How to Search for Similar Websites", Online available at:—<https://www.youtube.com/watch?v=nLf2uirpt5s>, see from 0:17 to 1:06, Jul. 4, 2013, 1 page.
"iPhone 6 Smart Guide Full Version for SoftBank", Gijutsu-Hyohron Co., Ltd., vol. 1, Dec. 1, 2014, 4 pages (Official Copy Only). {See communication under 37 CFR § 1.98(a) (3)}.
Isik et al., "Single-Channel Multi-Speaker Separation using Deep Clustering", Interspeech 2016, Sep. 8-12, 2016, pp. 545-549.
Jayant et al., "Supporting Blind Photography", In Proceedings of the 13th International ACM SIGACCESS Conference on Computers and Accessibility, ASSETS'11, Dundee, Scotland, UK, Online available at: https://dl.acm.org/doi/pdf/10.1145/2049536.2049573, Oct. 24-26, 2011, pp. 203-210.
Jeon et al., "Voice Trigger Detection from LVCSR Hypothesis Lattices Using Bidirectional Lattice Recurrent Neural Networks", International Conference on Acoustics, Speech and Signal Processing (ICASSP). IEEE, Feb. 29, 2020, 5 pages.
Jiangwei606, "[Zhuan] Play "Zhuan" Siri-Siri Function Excavation", Available online at: https://www.feng.com/post/3255659, Nov. 12, 2011, 30 pages (17 pages of English Translation and 13 pages of Official Copy).
Kannan et al., "Smart Reply: Automated Response Suggestion for Email", Available Online at: https://arxiv.org/pdf/1606.04870.pdf, Jun. 15, 2016, 10 pages.
Karn, Ujjwal, "An Intuitive Explanation of Convolutional Neural Networks", The Data Science Blog, Aug. 11, 2016, 23 pages.
Kastrenakes, Jacob, "Siri's creators will unveil their new AI bot on Monday", The Verge, Online available at:—<https://web.archive.org/web/20160505090418/https://www.theverge.com/2016/5/4/11593564/viv-labs-unveiling-monday-new-ai-from-siri-creators>, May 4, 2016, 3 pages.

King et al., "Robust Speech Recognition Via Anchor Word Representations", Interspeech 2017, Aug. 20-24, 2017, pp. 2471-2475.
Kondrat, Tomek, "Automation for Everyone with MacroDroid", Online available at: https://www.xda-developers.com/automation-for-everyone-with-macrodroid/, Nov. 17, 2013, 6 pages.
Kruger et al., "Virtual World Accessibility with the Perspective Viewer", Proceedings of ICEAPVI, Athens, Greece, Feb. 12-14, 2015, 6 pages.
Kumar, Shiu, "Ubiquitous Smart Home System Using Android Application", International Journal of Computer Networks & Communications (IJCNC) vol. 6, No. 1, Jan. 2014, pp. 33-43.
Kumatani et al., "Direct Modeling of Raw Audio with DNNS for Wake Word Detection", in 2017 IEEE Automatic Speech Recognition and Understanding Workshop (ASRU), 2017, 6 pages.
Lee, Sungjin, "Structured Discriminative Model for Dialog State Tracking", Proceedings of the SIGDIAL 2013 Conference, Aug. 22-24, 2013, pp. 442-451.
Lin, Luyuan, "An Assistive Handwashing System with Emotional Intelligence", Using Emotional Intelligence in Cognitive Intelligent Assistant Systems, 2014, 101 pages.
"Link Your Voice to Your Devices with Voice Match, Google Assistant Help", Online available at: <https://support.google.com/assistant/answer/9071681?co=GENIE.Platform%3DAndroid&hl=en>, Retrieved on Jul. 1, 2020, 2 pages.
Liou et al., "Autoencoder for Words", Neurocomputing, vol. 139, Sep. 2014, pp. 84-96.
Liu et al., "Accurate Endpointing with Expected Pause Duration", Sep. 6-10, 2015, pp. 2912-2916.
Loukides et al., "What Is the Internet of Things?", O'Reilly Media, Inc., Online Available at: <https://www.oreilly.com/library/view/what-is-the/9781491975633/>, 2015, 31 pages.
Luo et al., "Speaker-Independent Speech Separation With Deep Attractor Network", IEEE/ACM Transactions on Audio, Speech, and Language Processing, vol. 26, No. 4, Apr. 2018, pp. 787-796.
Maas et al., "Combining Acoustic Embeddings and Decoding Features for End-of-Utterance Detection in Real-Time Far-Field Speech Recognition Systems", in 2018 IEEE International Conference on Acoustics, Speech and Signal Processing (ICASSP). IEEE, 2018, 5 pages.
Mallidi et al., "Device-Directed Utterance Detection", Proc. Interspeech, Aug. 7, 2018, 4 pages.
Marketing Land, "Amazon Echo: Play music", Online Available at: —<https://www.youtube.com/watch?v=A7V5NPbsXi4>, Apr. 27, 2015, 3 pages.
"Method to Provide Remote Voice Navigation Capability on the Device", ip.com, Jul. 21, 2016, 4 pages.
Microsoft Soundscape—A map delivered in 3D sound, Microsoft Research, Online available at: https://www.microsoft.com/en-us/research/product/soundscape/, Retrieved on Jul. 26, 2021, 5 pages.
Mikolov et al., "Linguistic Regularities in Continuous Space Word Representations", Proceedings of NAACL-HLT, Jun. 9-14, 2013, pp. 746-751.
Mnih et al., "Human-Level Control Through Deep Reinforcement Learning", Nature, vol. 518, Feb. 26, 2015, pp. 529-533.
Modern Techies, "Braina-Artificial Personal Assistant for PC(like Cortana, Siri)!!!!", Online available at: <https://www.youtube.com/watch?v=_Coo2P8ilqQ>, Feb. 24, 2017, 3 pages.
Müuller et al., "A Taxonomy for Information Linking in Augmented Reality", AVR 2016, Part I, LNCS 9768, 2016, pp. 368-387.
Muller et al., "Control Theoretic Models of Pointing", ACM Transactions on Computer-Human Interaction, Aug. 2017, 36 pages.
Nakamura et al., "Study of Information Clouding Methods to Prevent Spoilers of Sports Match", Proceedings of the International Working Conference on Advanced Visual Interfaces (AVI' 12), ISBN: 978- 1- 4503- 1287- 5, May 2012, pp. 661-664.
Nakamura et al., "Study of Methods to Diminish Spoilers of Sports Match: Potential of a Novel Concept "Information Clouding"", vol. 54, No. 4, ISSN: 1882- 7764. Online available at: <https://ipsj.ixsq.nii.ac.jp/ej/index.php?active_action=repository_view_main_item_detail &page_id=13&block_id=8&item_id=91589&item_no=1>, Apr. 2013, pp. 1402-1412 (Official Copy Only). {See communication under 37 CFR § 1.98(a) (3)}.

(56) References Cited

OTHER PUBLICATIONS

Norouzian et al., "Exploring Attention Mechanism for Acoustic based Classification of Speech Utterances into System-Directed and Non-System-Directed", International Conference on Acoustics, Speech and Signal Processing (ICASSP). IEEE, Feb. 1, 2019, 5 pages.
Office Action received for European Patent Application No. 16904827.9, mailed on Apr. 7, 2021, 6 pages.
Office Action received for European Patent Application No. 16904827.9, mailed on Sep. 23, 2020, 12 pages.
Pak, Gamerz, "Braina: Artificially Intelligent Assistant Software for Windows PC in (urdu / hindhi)", Online available at: <https://www.youtube.com/watch?v=JH_rMjw8lqc>, Jul. 24, 2018, 3 pages.
Pavlopoulos et al., "ConvAI at SemEval-2019 Task 6: Offensive Language Identification and Categorization with Perspective and BERT", Proceedings of the 13th International Workshop on Semantic Evaluation (SemEval-2019), Jun. 6-7, 2019, pp. 571-576.
PC Mag, "How to Voice Train Your Google Home Smart Speaker", Online available at: <https://in.pcmag.com/google-home/126520/how-to-voice-train-your-google-home-smart-speaker>, Oct. 25, 2018, 12 pages.
Pennington et al., "GloVe: Global Vectors for Word Representation", Proceedings of the Conference on Empirical Methods Natural Language Processing (EMNLP), Doha, Qatar, Oct. 25-29, 2014, pp. 1532-1543.
Perlow, Jason, "Alexa Loop Mode with Playlist for Sleep Noise", Online Available at: <https://www.youtube.com/watch?v=nSkSuXziJSg>, Apr. 11, 2016, 3 pages.
Philips, Chris, "Thumbprint Radio: A Uniquely Personal Station Inspired by All of Your Thumbs Up", Pandora News, Online Available at: —<https://blog.pandora.com/author/chris-phillips/>, Dec. 14, 2015, 7 pages.
Ping, et al., "Deep Voice 3: Scaling Text to Speech with Convolutional Sequence Learning", Available online at: https://arxiv.org/abs/1710.07654, Feb. 22, 2018, 16 pages.
Pocketables.com, "AutoRemote example profile", Online available at: https://www.youtube.com/watch?v=kC_zhUnNZj8, Jun. 25, 2013, 1 page.
"Pose, Cambridge Dictionary Definition of Pose", Available online at: <https://dictionary.cambridge.org/dictionary/english/pose>, 4 pages.
Qian et al., "Single-channel Multi-talker Speech Recognition With Permutation Invariant Training", Speech Communication, Issue 104, 2018, pp. 1-11.
"Quick Type Keyboard on iOS 8 Makes Typing Easier", Online available at: —<https://www.youtube.com/watch?v=0CldLR4fhVU>, Jun. 3, 2014, 3 pages.
"Radio Stations Tailored to You Based on the Music You Listen to on iTunes", Apple Announces iTunes Radio, Press Release, Jun. 10, 2013, 3 pages.
Rasch, Katharina, "Smart Assistants for Smart Homes", Doctoral Thesis in Electronic and Computer Systems, 2013, 150 pages.
Raux, Antoine, "High-Density Dialog Management the Topic Stack", Adventures in High Density, Online available at: https://medium.com/adventures-in-high-density/high-density-dialog-management-23efcf91db1e, Aug. 1, 2018, 10 pages.
Ravi, Sujith, "Google AI Blog: On-device Machine Intelligence", Available Online at: https://ai.googleblog.com/2017/02/on-device-machine-intelligence.html, Feb. 9, 2017, 4 pages.
Ritchie, Rene, "QuickType keyboard in iOS 8: Explained", Online Available at: —<https://www.imore.com/quicktype-keyboards-ios-8-explained>, Jun. 21, 2014, pp. 1-19.
Robbins, F Mike, "Automatically place an Android Phone on Vibrate at Work", Available online at: https://mikefrobbins.com/2016/07/21/automatically-place-an-android-phone-on-vibrate-at-work/, Jul. 21, 2016, pp. 1-11.
Rodrigues et al., "Exploring Mixed Reality in Specialized Surgical Environments", In Proceedings of the 2017 CHI Conference Extended Abstracts on Human Factors in Computing Systems (CHI EA '17), Denver, CO, USA, Online available at: https://dl.acm.org/doi/pdf/10.1145/3027063.3053273, May 6-11, 2017, pp. 2591-2598.
Ross et al., "Epidemiology as a Framework for Large-Scale Mobile Application Accessibility Assessment", In Proceedings of the 19th International ACM SIGACCESS Conference on Computers and Accessibility (ASSETS '17), Baltimore, MD, USA, Online available at: https://dl.acm.org/doi/pdf/10.1145/3132525.3132547, Oct. 29-Nov. 1, 2017, pp. 2-11.
Rowland et al., "Designing Connected Products: UX for the Consumer Internet of Things", O'Reilly, May 2015, 452 pages.
Samsung Support, "Create a Quick Command in Bixby to Launch Custom Settings by at Your Command", Online Available at: —<https://www.facebook.com/samsungsupport/videos/10154746303151213>, Nov. 13, 2017, 1 page.
Santos et al., "Fighting Offensive Language on Social Media with Unsupervised Text Style Transfer", Proceedings of the 56th Annual Meeting of the Association for Computational Linguistics (vol. 2: Short Papers), May 20, 2018, 6 pages.
Seehafer Brent, "Activate Google Assistant on Galaxy S7 with Screen off", Online available at:—<https://productforums.google.com/forum/#!topic/websearch/Ip3qIGBHLVI>, Mar. 8, 2017, 4 pages.
Senior et al., "Improving DNN Speaker Independence With I-Vector Inputs", ICASSP, 2014, pp. 225-229.
Seroter et al., "SOA Patterns with BizTalk Server 2013 and Microsoft Azure", Packt Publishing, Jun. 2015, 454 pages.
Settle et al., "End-to-End Multi-Speaker Speech Recognition", Proc. ICASSP, Apr. 2018, 6 pages.
Shen et al., "Style Transfer from Non-Parallel Text by Cross-Alignment", 31st Conference on Neural Information Processing Systems (NIPS 2017), 2017, 12 pages.
Sigtia et al., "Efficient Voice Trigger Detection for Low Resource Hardware", in Proc. Interspeech 2018, Sep. 2-6, 2018, pp. 2092-2096.
Sigtia et al., "Multi-Task Learning for Voice Trigger Detection", in IEEE International Conference on Acoustics, Speech and Signal Processing (ICASSP), 2020, Apr. 20, 2020, 5 pages.
Simonite, Tom, "Confronting Siri: Microsoft Launches Digital Assistant Cortana", 2014, 2 pages (Official Copy Only). {See communication under 37 CFR § 1.98(a) (3)}.
Siou, Serge, "How to Control Apple TV 3rd Generation Using Remote app", Online available at: <https://www.youtube.com/watch?v=PhyKftZ0S9M>, May 12, 2014, 3 pages.
"Skilled at Playing my iPhone 5", Beijing Hope Electronic Press, Jan. 2013, 6 pages (Official Copy Only). {See communication under 37 CFR § 1.98(a) (3)}.
Smith, Jake, "Amazon Alexa Calling: How to Set it up and Use it on Your Echo", iGeneration, May 30, 2017, 5 pages.
Song, Yang, "Research of Chinese Continuous Digital Speech Input System Based on HTK", Computer and Digital Engineering, vol. 40, No. 4, Dec. 31, 2012, 5 pages (Official Copy Only). {See communication under 37 CFR § 1.98(a) (3)}.
Speicher et al., "What is Mixed Reality?", In Proceedings of the 2019 CHI Conference on Human Factors in Computing Systems (CHI '19). ACM, Article 537, Glasgow, Scotland, UK, Online available at: https://dl.acm.org/doi/pdf/10.1145/3290605.3300767, May 4-9, 2019, 15 pages.
Sperber et al., "Self-Attentional Models for Lattice Inputs", in Proceedings of the 57th Annual Meeting of the Association for Computational Linguistics, Florence, Italy, Association for Computational Linguistics., Jun. 4, 2019, 13 pages.
Summons to Attend Oral Proceedings received for European Patent Application No. 16904827.9, mailed on Nov. 2, 2021, 12 pages.
Sundermeyer et al., "LSTM Neural Networks for Language Modeling", Interspeech 2012, Sep. 9-13, 2012, pp. 194-197.
Sutskever et al., "Sequence to Sequence Learning with Neural Networks", Proceedings of the 27th International Conference on Neural Information Processing Systems, 2014, 9 pages.
Tamar et al., "Value Iteration Networks", Advances in Neural Information Processing Systems, vol. 29, 2016, 16 pages.
Tan et al., "Knowledge Transfer in Permutation Invariant Training for Single-channel Multi-talker Speech Recognition", ICASSP 2018, 2018, pp. 5714-5718.
Tech Target Contributor, "AI Accelerator", Available online at: https://searchenterpriseai.techtarget.com/definition/AI-accelerator, Apr. 2018, 3 pages.

(56) References Cited

OTHER PUBLICATIONS

Tkachenko, Sergey, "Chrome will automatically create Tab Groups", Available online at : https://winaero.com/chrome-will-automatically-create-tab-groups/, Sep. 18, 2020, 5 pages.
Tkachenko, Sergey, "Enable Tab Groups Auto Create in Google Chrome", Available online at : https://winaero.com/enable-tab-groups-auto-create-in-google-chrome/, Nov. 30, 2020, 5 pages.
"Use Macrodroid skillfully to automatically clock in with Ding Talk", Online available at: https://blog.csdn.net/qq_26614295/article/details/84304541, Nov. 20, 2018, 11 pages (Official Copy Only). {See communication under 37 CFR § 1.98(a) (3)}.
Vaswani et al., "Attention Is All You Need", 31st Conference on Neural Information Processing Systems (NIPS 2017), 2017, pp. 1-11.
Vazquez et al., "An Assisted Photography Framework to Help Visually Impaired Users Properly Aim a Camera", ACM Transactions on Computer-Human Interaction, vol. 21, No. 5, Article 25, Online available at: https://dl.acm.org/doi/pdf/10.1145/2651380, Nov. 2014, 29 pages.
Velian Speaks Tech, "10 Google Assistant Tips!", Available online at: https://www.youtube.com/watch?v=3RNWA3NK9fs, Feb. 24, 2020, 3 pages.
Villemure et al., "The Dragon Drive Innovation Showcase: Advancing the State-of-the-art in Automotive Assistants", 2018, 7 pages.
Vodafone Deutschland, "Samsung Galaxy S3 Tastatur Spracheingabe", Online available at—<https://www.youtube.com/watch?v=6kOd6Gr8uFE>, Aug. 22, 2012, 1 page.
Walker, Amy, "NHS Gives Amazon Free Use of Health Data Under Alexa Advice Deal", Available online at: <https://www.theguardian.com/society/2019/dec/08/nhs-gives-amazon-free-use-of-health-data-under-alexa-advice-deal>, 3 pages.
Wang et al., "End-to-end Anchored Speech Recognition", Proc. ICASSP2019, May 12-17, 2019, 5 pages.
Wang, et al., "Tacotron: Towards End to End Speech Synthesis", Available online at: https://arxiv.org/abs/1703.10135, Apr. 6, 2017, 10 pages.
Wang, et al., "Training Deep Neural Networks with 8-bit Floating Point Numbers", 32nd Conference on Neural Information Processing Systems (NeurIPS 2018), 2018, 10 pages.
Wei et al., "Design and Implement on Smart Home System", 2013 Fourth International Conference on Intelligent Systems Design and Engineering Applications, Available online at: https://ieeexplore.ieee.org/document/6843433, 2013, pp. 229-231.
Weng et al., "Deep Neural Networks for Single-Channel Multi-Talker Speech Recognition", IEEE/ACM Transactions on Audio, Speech, and Language Processing, vol. 23, No. 10, Oct. 2015, pp. 1670-1679.
Wentz et al., "Retrofitting accessibility: The legal inequality of after-the-fact online access for persons with disabilities in the United States", First Monday, vol. 16, No. 11, Online available at: https://firstmonday.org/ojs/index.php/fm/article/download/3666/3077#author, Nov. 7, 2011, 29 pages.
"What's on Spotify?", Music for everyone, Online Available at: —<https://web.archive.org/web/20160428115328/https://www.spotify.com/us/>, Apr. 28, 2016, 6 pages.
Wikipedia, "Home Automation", Online Available at: —<https://en.wikipedia.org/w/index.php?title=Home_automation&oldid=686569068>, Oct. 19, 2015, 9 pages.
Wikipedia, "Siri", Online Available at: —<https://en.wikipedia.org/w/index.php?title=Siri&oldid=689697795>, Nov. 8, 2015, 13 Pages.
Wikipedia, "Virtual Assistant", Wikipedia, Online Available at: —<https://en.wikipedia.org/w/index.php?title=Virtual_assistant&oldid=679330666>, Sep. 3, 2015, 4 pages.
Win, et al., "Myanmar Text to Speech System based on Tacotron-2", International Conference on Information and Communication Tehcnology Convergence (ICTC), Oct. 21-23, 2020, pp. 578-583.
Wu et al., "Monophone-Based Background Modeling for Two-Stage On-device Wake Word Detection", in 2018 IEEE International Conference on Acoustics, Speech and Signal Processing (ICASSP), Apr. 2018, 5 pages.

Xu et al., "Policy Optimization of Dialogue Management in Spoken Dialogue System for Out-of-Domain Utterances", 2016 International Conference on Asian Language Processing (IALP), IEEE, Nov. 21, 2016, pp. 10-13.
Xu et al., "Show, Attend and Tell: Neural Image Caption Generation with Visual Attention", Proceedings of the 32nd International Conference on Machine Learning, Lille, France, 2015, 10 pages.
Yang Astor, "Control Android TV via Mobile Phone APP RKRemoteControl", Online Available at : <https://www.youtube.com/watch?v=zpmUeOX_xro>, Mar. 31, 2015, 4 pages.
Yates Michaelc., "How Can I Exit Google Assistant After I'm Finished with it", Online available at: —<https://productforums.google.com/forum/#!msg/phone-by-google/faECnR2RJwA/gKNtOkQgAQAJ>, Jan. 11, 2016, 2 pages.
Ye et al., "iPhone 4S Native Secret", Jun. 30, 2012, 1 page (Official Copy Only). {See communication under 37 CFR § 1.98(a) (3)}.
Yeh Jui-Feng, "Speech Act Identification Using Semantic Dependency Graphs With Probabilistic Context-free Grammars", ACM Transactions on Asian and Low-Resource Language Information Processing, vol. 15, No. 1, Dec. 2015, pp. 5.1-5.28.
Young et al., "POMDP-Based Statistical Spoken Dialog Systems: A Review", Proceedings of the IEEE, vol. 101, No. 5, 2013, 18 pages.
Yousef, Zulfikara., "Braina (A.I) Artificial Intelligence Virtual Personal Assistant", Online available at: —<https://www.youtube.com/watch?v=2h6xpB8bPSA>, Feb. 7, 2017, 3 pages.
Yu et al., "Permutation Invariant Training of Deep Models for Speaker-Independent Multi-talker Speech Separation", Proc. ICASSP, 2017, 5 pages.
Yu et al., "Recognizing Multi-talker Speech with Permutation Invariant Training", Interspeech 2017, Aug. 20-24, 2017, pp. 2456-2460.
Zhan et al., "Play with Android Phones", Feb. 29, 2012, 1 page (Official Copy Only). {See communication under 37 CFR § 1.98(a) (3)}.
Zhang et al., "Interaction Proxies for Runtime Repair and Enhancement of Mobile Application Accessibility", In Proceedings of the 2017 CHI Conference on Human Factors in Computing Systems (CHI '17). ACM, Denver, CO, USA, Online available at: https://dl.acm.org/doi/pdf/10.1145/3025453.3025846, May 6-11, 2017, pp. 6024-6037.
Zhang et al., "Very Deep Convolutional Networks for End-To-End Speech Recognition", IEEE International Conference on Acoustics, Speech and Signal Processing (ICASSP), 2017, 5 pages.
Zhao et al., "Big Data Analysis and Application", Aviation Industry Press, Dec. 2015, pp. 236-241 (Official Copy Only). {See communication under 37 CFR § 1.98(a) (3)}.
Zhao et al., "CueSee: Exploring Visual Cues for People with Low Vision to Facilitate a Visual Search Task", In Proceedings of the 2016 ACM International Joint Conference on Pervasive and Ubiquitous Computing. ACM, UbiComp '16, Heidelberg, Germany, Online available at: https://dl.acm.org/doi/pdf/10.1145/2971648.2971730, Sep. 12-16, 2016, pp. 73-84.
Zhao et al., "Enabling People with Visual Impairments to Navigate Virtual Reality with a Haptic and Auditory Cane Simulation", In Proceedings of the 2018 CHI Conference on Human Factors in Computing Systems (CHI '18). ACM, Article 116, Montréal, QC, Canada, Online available at: https://dl.acm.org/doi/pdf/10.1145/3173574.3173690, Apr. 21-26, 2018, 14 pages.
Zhao et al., "SeeingVR: A Set of Tools to Make Virtual Reality More Accessible to People with Low Vision", In Proceedings of the 2019 CHI Conference on Human Factors in Computing Systems (CHI '19). ACM, Article 111, Glasgow, Scotland, UK, Online available at: https://dl.acm.org/doi/pdf/10.1145/3290605.3300341, May 4-9, 2019, 14 pages.
Zheng, et al., "Intent Detection and Semantic Parsing for Navigation Dialogue Language Processing", 2017 IEEE 20th International Conference on Intelligent Transportation Systems (ITSC), 2017, 6 pages.
Zhou et al., "Learning Dense Correspondence via 3D-guided Cycle Consistency", Proceedings of the IEEE Conference on Computer Vision and Pattern Recognition (CVPR), 2016, 10 pages.

(56) References Cited

OTHER PUBLICATIONS

Zmolikova et al., "Speaker-Aware Neural Network Based Beamformer for Speaker Extraction in Speech Mixtures", Interspeech 2017, Aug. 20-24, 2017, pp. 2655-2659.
Office Action received for Chinese Patent Application No. 201680082355.7, mailed on Aug. 15, 2022, 30 pages (16 pages of English Translation and 14 pages of Official Copy).
Office Action received for Chinese Patent Application No. 201680082355.7, mailed on Nov. 15, 2022, 17 pages (9 pages of English Translation and 8 pages of Official Copy).
Extended European Search Report received for European Patent Application No. 22192787.4, mailed on Dec. 8, 2022, 8 pages.
Extended European Search Report received for European Patent Application No. 22192812.0, mailed on Dec. 9, 2022, 9 pages.
Notice of Allowance received for Chinese Patent Application No. 201680082355.7, mailed on Apr. 20, 2023, 5 pages (1 page of English Translation and 4 pages of Official Copy).
Office Action received for Chinese Patent Application No. 201680082355.7, mailed on Mar. 21, 2023, 2 pages (1 page of English Translation and 1 page of Official Copy).

\* cited by examiner

INTELLIGENT AUTOMATED ASSISTANT IN A HOME ENVIRONMENT

CROSS-REFERENCE TO RELATED APPLICATIONS

This application is a continuation of U.S. patent application Ser. No. 15/994,795 filed May 31, 2018, entitled INTELLIGENT AUTOMATED ASSISTANT IN A HOME ENVIRONMENT, which is a continuation of U.S. patent application Ser. No. 15/274,859, filed Sep. 23, 2016, entitled INTELLIGENT AUTOMATED ASSISTANT IN A HOME ENVIRONMENT, which claims priority to U.S. Provisional Ser. No. 62/348,015, filed on Jun. 9, 2016, entitled INTELLIGENT AUTOMATED ASSISTANT IN A HOME ENVIRONMENT, which are hereby incorporated by reference in their entirety for all purposes.

This application also relates to the following applications: U.S. Non-Provisional patent application Ser. No. 14/503,105, "INTELLIGENT ASSISTANT FOR HOME AUTOMATION," filed Sep. 30, 2014, which is hereby incorporated by reference in its entirety for all purposes.

FIELD

This relates generally to intelligent automated assistants and, more specifically, to intelligent automated assistants in a home environment.

BACKGROUND

Intelligent automated assistants (or digital assistants) can provide a beneficial interface between human users and electronic devices. Such assistants can allow users to interact with devices or systems using natural language in spoken and/or text forms. For example, a user can provide a speech input containing a user request to a digital assistant operating on an electronic device. The digital assistant can interpret the user's intent from the speech input and operationalize the user's intent into tasks. The tasks can then be performed by executing one or more services of the electronic device, and a relevant output responsive to the user request can be returned to the user.

Devices (e.g., electronic device) of an established location (e.g., home, office, business, public institution) can be controlled remotely using software applications running on a computing device, such as a mobile phone, tablet computer, laptop computer, desktop computer, or the like. For example, numerous manufacturers create light bulbs that can be controlled by a software application running on a mobile phone to adjust the brightness and/or color of the bulb. Other devices, such as door locks, thermostats, and the like, having similar controls are also available.

While these devices can provide users with a greater level of control and convenience, it can become exceedingly difficult to manage these devices as the number of remotely controlled devices and the number of types of remotely controlled devices in the home increase. For example, a typical home can include 40-50 light bulbs placed throughout the various rooms of the home. Using conventional software applications, each light bulb is given a unique identifier, and a user attempting to control one of these devices must select the appropriate identifier from a list of available devices within a graphical user interface. Remembering the correct identifier for a particular light bulb and finding that identifier from a list of 40-50 identifiers can be a difficult and time-consuming process. For example, the user can confuse the identifier of one device with that of another and thus be unable to control the desired device. To add to the difficulty of managing and controlling a large number of remotely controlled devices, different manufactures typically provide different software applications that must be used to control their respective devices. As a result, a user must locate and open one software application to turn on/off their light bulbs, and must then locate and open another software application to set the temperature of their thermostat.

SUMMARY

Systems and processes for operating an intelligent automated assistant are provided. In one example process, discourse input representing a user request is received. The process determines one or more possible device characteristics corresponding to the discourse input. A data structure representing a set of devices of an established location is retrieved. The process determines, based on the data structure, one or more candidate devices from the set of devices. The one or more candidate devices correspond to the discourse input. The process determines, based on the one or more possible device characteristics and one or more actual device characteristics of the one or more candidate devices, a user intent corresponding to the discourse input. Instructions that cause a device of the one or more candidate devices to perform an action corresponding to the user intent are provided.

In another example process, discourse input representing a user request is received. The process determines whether the discourse input relates to a device of an established location. In response to determining that the discourse input relates to a device of an established location, a data structure representing a set of devices of the established location is retrieved. The process determines, using the data structure, a user intent corresponding to the discourse input, the user intent associated with an action to be performed by a device of the set of devices, and a criterion to be satisfied prior to performing the action. The action and the device are stored in association with the criterion, where, in accordance with a determination that the criterion is satisfied, the action is performed by the device.

DETAILED DESCRIPTION

Figure 1:
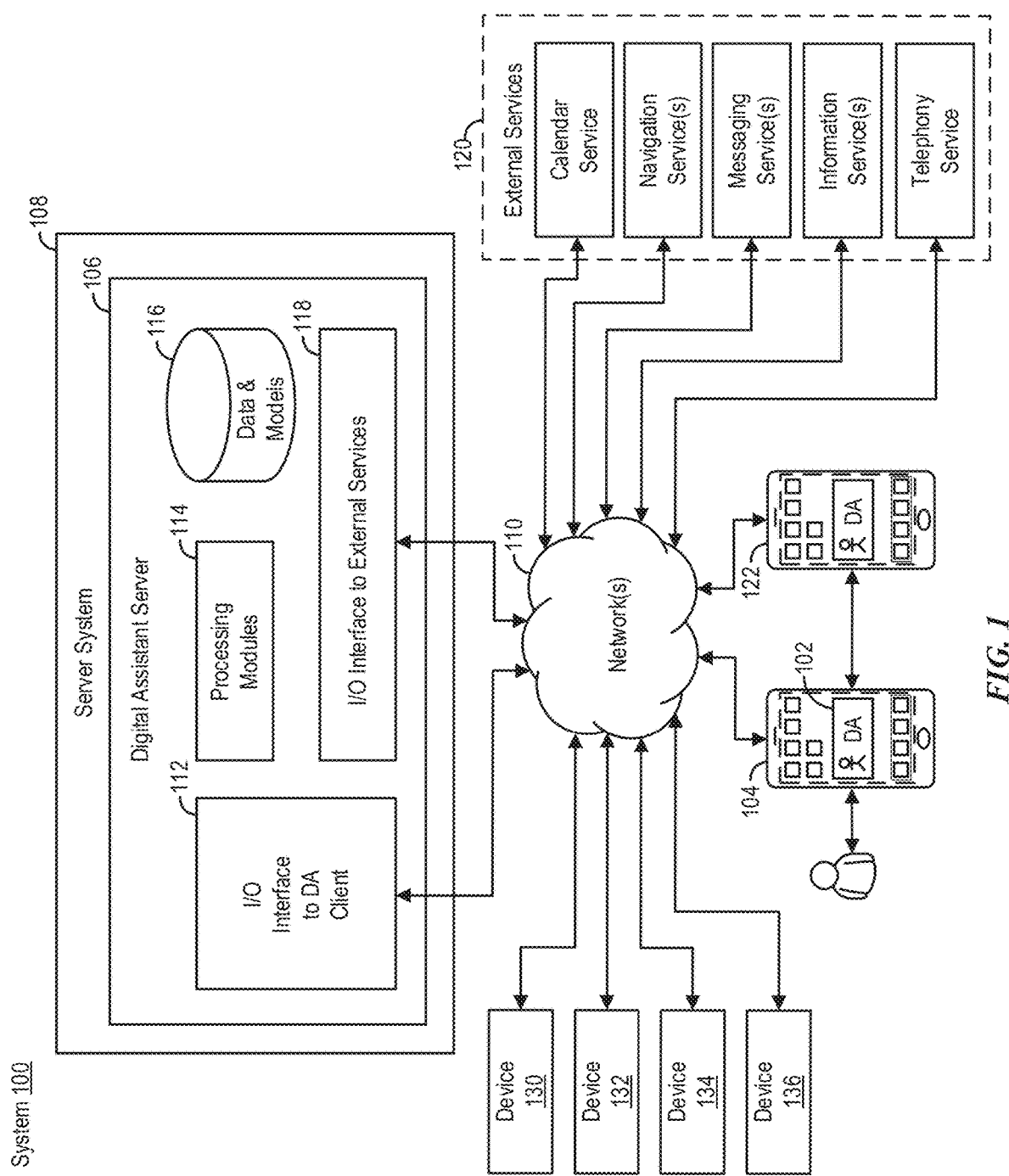
FIG. 1 is a block diagram illustrating a system and environment for implementing a digital assistant according to various examples.

In the following description of examples, reference is made to the accompanying drawings in which it is shown by way of illustration specific examples that can be practiced. It is to be understood that other examples can be used and structural changes can be made without departing from the scope of the various examples.

As discussed above, utilizing a digital assistant to control devices of an established location, such as devices in a user's home, can be convenient and beneficial to the user. Preferably, the user employs natural language to convey to the digital assistant the intended action and the intended device for performing the action without having to refer to pre-defined commands or predefined device identifiers. For example, if the user provides the natural language command "Open the door," it can be desirable for the digital assistant to understand exactly which door the user is referring to and whether the intended action is to open the door or unlock the door. The user thus would not need to remember a myriad of predefined commands and device identifiers in order to convey the user's intent to the digital assistant. This improves the user experience and allow for a more natural and personable interaction with the digital assistant.

Although natural language interactions are desirable to improve user experience, natural language often includes ambiguous terms which are difficult for the digital assistant to disambiguate. For example, for the natural language command "Open the door," the user's home could have several doors which can be opened or unlocked. The digital assistant therefore needs to rely on other information to supplement the natural language command in order to accurately determine the intended action and the intended device for performing the action. In accordance with some exemplary systems and processes described herein, a data structure defining the devices of an established location is utilized to assist with determining the user's intent from the user's natural language command. In one example process, discourse input representing a user request is received. The process determines one or more possible device characteristics corresponding to the discourse input. A data structure representing a set of devices of an established location is retrieved. The process determines, based on the data structure, one or more candidate devices from the set of devices. The one or more candidate devices correspond to the discourse input. The process determines, based on the one or more possible device characteristics and one or more actual device characteristics of the one or more candidate devices, a user intent corresponding to the discourse input. Instructions that cause a device of the one or more candidate devices to perform an action corresponding to the user intent are provided.

A digital assistant can also process user commands for performing a future action in response to a specified condition. The action or the condition is with respect to one or more devices in an established location. For example, the user provides the natural language command "Close the blinds when it reaches 80 degrees." In this example, the digital assistant determines that the user wishes to perform the action of closing the blinds in response to the condition of detecting a temperature equal to or greater than 80 degrees. In particular, the digital assistant would need to determine which "blinds" the user wishes to close and which thermometer the user wishes to monitor with respect to the "80 degrees" criterion. The data structure referred to above is also utilized to assist with making such a determination. For instance, in one example process, discourse input representing a user request is received. The process determines whether the discourse input relates to a device of an established location. In response to determining that the discourse input relates to a device of an established location, a data structure representing a set of devices of the established location is retrieved. The process determines, using the data structure, a user intent corresponding to the discourse input, the user intent associated with an action to be performed by a device of the set of devices and a criterion to be satisfied prior to performing the action. The action and the device are stored in association with the criterion where, in accordance with a determination that the criterion is satisfied, the action is performed by the device.

Although the following description uses terms "first," "second," etc. to describe various elements, these elements should not be limited by the terms. These terms are only used to distinguish one element from another. For example, a first device could be termed a second device, and, similarly, a second device could be termed a first device, without departing from the scope of the various described examples. The first device and the second device, in some examples, are both devices and, in some cases, are separate and different devices.

The terminology used in the description of the various described examples herein is for the purpose of describing particular examples only and is not intended to be limiting. As used in the description of the various described examples and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

1. System and Environment

FIG. 1 illustrates a block diagram of system 100 according to various examples. In some examples, system 100 implements a digital assistant. The terms "digital assistant," "virtual assistant," "intelligent automated assistant," or "automatic digital assistant" refer to any information processing system that interprets natural language input in spoken and/or textual form to infer user intent, and performs actions based on the inferred user intent. For example, to act on an inferred user intent, the system performs one or more of the following: identifying a task flow with steps and parameters designed to accomplish the inferred user intent, inputting specific requirements from the inferred user intent into the task flow; executing the task flow by invoking programs, methods, services, APIs, or the like; and generating output responses to the user in an audible (e.g., speech) and/or visual form.

Specifically, a digital assistant is capable of accepting a user request at least partially in the form of a natural language command, request, statement, narrative, and/or inquiry. Typically, the user request seeks either an informational answer or performance of a task by the digital assistant. A satisfactory response to the user request includes a provision of the requested informational answer, a performance of the requested task, or a combination of the two. For example, a user asks the digital assistant a question, such as "Where am I right now?" Based on the user's current location, the digital assistant answers, "You are in Central Park near the west gate." The user also requests the performance of a task, for example, "Please invite my friends to my girlfriend's birthday party next week." In response, the digital assistant can acknowledge the request by saying "Yes, right away," and then send a suitable calendar invite on behalf of the user to each of the user's friends listed in the user's electronic address book. During performance of a requested task, the digital assistant sometimes interacts with the user in a continuous dialogue involving multiple exchanges of information over an extended period of time. There are numerous other ways of interacting with a digital assistant to request information or performance of various tasks. In addition to providing verbal responses and taking programmed actions, the digital assistant also provides responses in other visual or audio forms, e.g., as text, alerts, music, videos, animations, etc.

As shown in FIG. 1, in some examples, a digital assistant is implemented according to a client-server model. The digital assistant includes client-side portion 102 (hereafter "DA client 102") executed on user device 104 and server-side portion 106 (hereafter "DA server 106") executed on server system 108. DA client 102 communicates with DA server 106 through one or more networks 110. DA client 102 provides client-side functionalities such as user-facing input and output processing and communication with DA server 106. DA server 106 provides server-side functionalities for any number of DA clients 102 each residing on a respective user device 104.

In some examples, DA server 106 includes client-facing I/O interface 112, one or more processing modules 114, data and models 116, and I/O interface to external services 118. The client-facing I/O interface 112 facilitates the client-facing input and output processing for DA server 106. One or more processing modules 114 utilize data and models 116 to process speech input and determine the user's intent based on natural language input. In some examples, data and model storage 116 stores a data structure (e.g., data structure 900) and any other relevant information associated with one or more of devices (e.g., devices 130, 132, 134, and 136) that are configured to be controlled by user device 104 and/or server system 108. Further, one or more processing modules 114 perform task execution based on inferred user intent. In some examples, DA server 106 communicates with external services 120 through network(s) 110 for task completion or information acquisition. I/O interface to external services 118 facilitates such communications.

User device 104 can be any suitable electronic device. In some examples, user device is a portable multifunctional device (e.g., device 200, described below with reference to FIG. 2A), a multifunctional device (e.g., device 400, described below with reference to FIG. 4), or a personal electronic device (e.g., device 600, described below with reference to FIG. 6A-B.) A portable multifunctional device is, for example, a mobile telephone that also contains other functions, such as PDA and/or music player functions. Specific examples of portable multifunction devices include the iPhone®, iPod Touch®, and iPad® devices from Apple Inc. of Cupertino, California. Other examples of portable multifunction devices include, without limitation, laptop or tablet computers. Further, in some examples, user device 104 is a non-portable multifunctional device. In particular, user device 104 is a desktop computer, a game console, a television, or a television set-top box. In some examples, user device 104 includes a touch-sensitive surface (e.g., touch screen displays and/or touchpads). Further, user device 104 optionally includes one or more other physical user-interface devices, such as a physical keyboard, a mouse, and/or a joystick. Various examples of electronic devices, such as multifunctional devices, are described below in greater detail.

Examples of communication network(s) 110 include local area networks (LAN) and wide area networks (WAN), e.g., the Internet. Communication network(s) 110 is implemented using any known network protocol, including various wired or wireless protocols, such as, for example, Ethernet, Universal Serial Bus (USB), FIREWIRE, Global System for Mobile Communications (GSM), Enhanced Data GSM Environment (EDGE), code division multiple access (CDMA), time division multiple access (TDMA), Bluetooth, Wi-Fi, voice over Internet Protocol (VoIP), Wi-MAX, or any other suitable communication protocol.

Server system 108 is implemented on one or more stand-alone data processing apparatus or a distributed network of computers. In some examples, server system 108 also employs various virtual devices and/or services of third-party service providers (e.g., third-party cloud service providers) to provide the underlying computing resources and/or infrastructure resources of server system 108.

In some examples, user device 104 communicates with DA server 106 via second user device 122. Second user device 122 is similar or identical to user device 104. For example, second user device 122 is similar to devices 200, 400, or 600 described below with reference to FIGS. 2A, 4, and 6A-B. User device 104 is configured to communicatively couple to second user device 122 via a direct communication connection, such as Bluetooth, NFC, BTLE, or the like, or via a wired or wireless network, such as a local Wi-Fi network. In some examples, second user device 122 is configured to act as a proxy between user device 104 and DA server 106. For example, DA client 102 of user device 104 is configured to transmit information (e.g., a user request received at user device 104) to DA server 106 via second user device 122. DA server 106 processes the information and return relevant data (e.g., data content responsive to the user request) to user device 104 via second user device 122.

In some examples, user device 104 is configured to communicate abbreviated requests for data to second user device 122 to reduce the amount of information transmitted from user device 104. Second user device 122 is configured to determine supplemental information to add to the abbreviated request to generate a complete request to transmit to DA server 106. This system architecture can advantageously allow user device 104 having limited communication capabilities and/or limited battery power (e.g., a watch or a similar compact electronic device) to access services provided by DA server 106 by using second user device 122, having greater communication capabilities and/or battery power (e.g., a mobile phone, laptop computer, tablet computer, or the like), as a proxy to DA server 106. While only two user devices 104 and 122 are shown in FIG. 1, it should be appreciated that system 100, in some examples, includes any number and type of user devices configured in this proxy configuration to communicate with DA server system 106.

User device 104 and/or server system 108 are further coupled to devices 130, 132, 134, and 136 via network(s) 110. Devices 130, 132, 134, and 136 can include any type of remotely controlled device, such as a light bulb (e.g., having binary on/off operating states, numerical dimmable operating states, color operating state, etc.), garage door (e.g., having a binary open/closed operating state), door lock (e.g., having binary locked/unlocked operating state), thermostat (e.g., having one or more numerical temperature setpoint operating states, such as a high temperature, low temperature, time-based temperatures, etc.), electrical outlet (e.g., having a binary on/off operating state), switch (e.g., having a binary on/off operating state), a music player, a television set, or the like. Devices 130-136 are configured to receive instructions from server system 108 and/or user device 104. As discussed in greater detail below with respect to FIGS. 8-11, user device 104 can issue commands (or cause DA server 106 to issue commands) to control any of one of devices 130-136 in response to a natural language dialogue input provided by a user to user device 104.

While only four devices 130, 132, 134, and 136 are shown in FIG. 1, it should be appreciated that system 100 can include any number of devices. Additionally, although the digital assistant shown in FIG. 1 includes both a client-side portion (e.g., DA client 102) and a server-side portion (e.g., DA server 106), in some examples, the functions of a digital assistant are implemented as a standalone application installed on a user device. In addition, the divisions of functionalities between the client and server portions of the digital assistant can vary in different implementations. For instance, in some examples, the DA client is a thin-client that provides only user-facing input and output processing functions, and delegates all other functionalities of the digital assistant to a backend server.

2. Electronic Devices

Figure 2A:
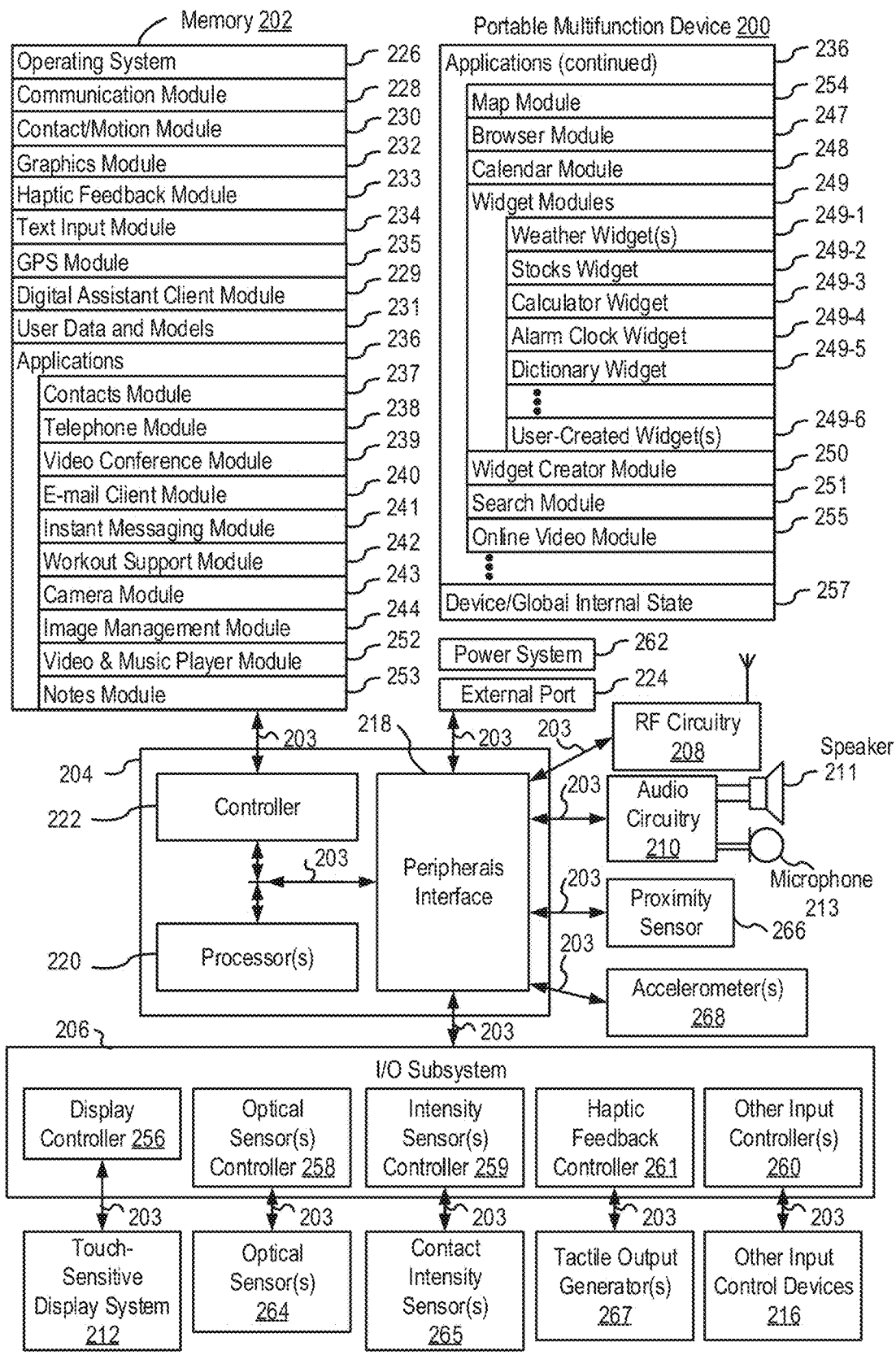
FIG. 2A is a block diagram illustrating a portable multifunction device implementing the client-side portion of a digital assistant according to various examples.

Attention is now directed toward embodiments of electronic devices for implementing the client-side portion of a digital assistant. FIG. 2A is a block diagram illustrating portable multifunction device 200 with touch-sensitive display system 212 in accordance with some embodiments. Touch-sensitive display 212 is sometimes called a "touch screen" for convenience and is sometimes known as or called a "touch-sensitive display system." Device 200 includes memory 202 (which optionally includes one or more computer-readable storage mediums), memory controller 222, one or more processing units (CPUs) 220, peripherals interface 218, RF circuitry 208, audio circuitry 210, speaker 211, microphone 213, input/output (I/O) subsystem 206, other input control devices 216, and external port 224. Device 200 optionally includes one or more optical sensors 264. Device 200 optionally includes one or more contact intensity sensors 265 for detecting intensity of contacts on device 200 (e.g., a touch-sensitive surface such as touch-sensitive display system 212 of device 200). Device 200 optionally includes one or more tactile output generators 267 for generating tactile outputs on device 200 (e.g., generating tactile outputs on a touch-sensitive surface such as touch-sensitive display system 212 of device 200 or touchpad 455 of device 400). These components optionally communicate over one or more communication buses or signal lines 203.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 200 is only one example of a portable multifunction device, and that device 200 optionally has more or fewer components than shown, optionally combines two or more components, or optionally has a different configuration or arrangement of the components. The various components shown in FIG. 2A are implemented in hardware, software, or a combination of both hardware and software, including one or more signal processing and/or application-specific integrated circuits.

Memory 202 includes one or more computer-readable storage mediums. The computer-readable storage mediums are, for example, tangible and non-transitory. Memory 202 includes high-speed random access memory and also includes non-volatile memory, such as one or more magnetic disk storage devices, flash memory devices, or other non-volatile solid-state memory devices. Memory controller 222 controls access to memory 202 by other components of device 200.

In some examples, a non-transitory computer-readable storage medium of memory 202 is used to store instructions (e.g., for performing aspects of processes described below) for use by or in connection with an instruction execution system, apparatus, or device, such as a computer-based system, processor-containing system, or other system that can fetch the instructions from the instruction execution system, apparatus, or device and execute the instructions. In other examples, the instructions (e.g., for performing aspects of the processes described below) are stored on a non-transitory computer-readable storage medium (not shown) of the server system 108 or are divided between the non-transitory computer-readable storage medium of memory 202 and the non-transitory computer-readable storage medium of server system 108.

Peripherals interface 218 is used to couple input and output peripherals of the device to CPU 220 and memory 202. The one or more processors 220 run or execute various software programs and/or sets of instructions stored in memory 202 to perform various functions for device 200 and to process data. In some embodiments, peripherals interface 218, CPU 220, and memory controller 222 are implemented on a single chip, such as chip 204. In some other embodiments, they are implemented on separate chips.

RF (radio frequency) circuitry 208 receives and sends RF signals, also called electromagnetic signals. RF circuitry 208 converts electrical signals to/from electromagnetic signals and communicates with communications networks and other communications devices via the electromagnetic signals. RF circuitry 208 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 208 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 208 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 210, speaker 211, and microphone 213 provide an audio interface between a user and device 200. Audio circuitry 210 receives audio data from peripherals interface 218, converts the audio data to an electrical signal, and transmits the electrical signal to speaker 211. Speaker 211 converts the electrical signal to human-audible sound waves. Audio circuitry 210 also receives electrical signals converted by microphone 213 from sound waves. Audio circuitry 210 converts the electrical signal to audio data and transmits the audio data to peripherals interface 218 for processing. Audio data are retrieved from and/or transmitted to memory 202 and/or RF circuitry 208 by peripherals interface 218. In some embodiments, audio circuitry 210 also includes a headset jack (e.g., 312, FIG. 3). The headset jack provides an interface between audio circuitry 210 and removable audio input/output peripherals, such as output-only headphones or a headset with both output (e.g., a headphone for one or both ears) and input (e.g., a microphone).

I/O subsystem 206 couples input/output peripherals on device 200, such as touch screen 212 and other input control devices 216, to peripherals interface 218. I/O subsystem 206 optionally includes display controller 256, optical sensor controller 258, intensity sensor controller 259, haptic feedback controller 261, and one or more input controllers 260 for other input or control devices. The one or more input controllers 260 receive/send electrical signals from/to other input control devices 216. The other input control devices 216 optionally include physical buttons (e.g., push buttons, rocker buttons, etc.), dials, slider switches, joysticks, click wheels, and so forth. In some alternate embodiments, input controller(s) 260 are, optionally, coupled to any (or none) of the following: a keyboard, an infrared port, a USB port, and a pointer device such as a mouse. The one or more buttons (e.g., 308, FIG. 3) optionally include an up/down button for volume control of speaker 211 and/or microphone 213. The one or more buttons optionally include a push button (e.g., 306, FIG. 3).

A quick press of the push button disengages a lock of touch screen 212 or begin a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 306) turns power to device 200 on or off. The user is able to customize a functionality of one or more of the buttons. Touch screen 212 is used to implement virtual or soft buttons and one or more soft keyboards.

Touch-sensitive display 212 provides an input interface and an output interface between the device and a user. Display controller 256 receives and/or sends electrical signals from/to touch screen 212. Touch screen 212 displays visual output to the user. The visual output includes graphics, text, icons, video, and any combination thereof (collectively termed "graphics"). In some embodiments, some or all of the visual output correspond to user-interface objects.

Touch screen 212 has a touch-sensitive surface, sensor, or set of sensors that accepts input from the user based on haptic and/or tactile contact. Touch screen 212 and display controller 256 (along with any associated modules and/or sets of instructions in memory 202) detect contact (and any movement or breaking of the contact) on touch screen 212 and convert the detected contact into interaction with user-interface objects (e.g., one or more soft keys, icons, web pages, or images) that are displayed on touch screen 212. In an exemplary embodiment, a point of contact between touch screen 212 and the user corresponds to a finger of the user.

Touch screen 212 uses LCD (liquid crystal display) technology, LPD (light emitting polymer display) technology, or LED (light emitting diode) technology, although other display technologies may be used in other embodiments. Touch screen 212 and display controller 256 detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 212. In an exemplary embodiment, projected mutual capacitance sensing technology is used, such as that found in the iPhone® and iPod Touch® from Apple Inc. of Cupertino, California.

A touch-sensitive display in some embodiments of touch screen 212 is analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 212 displays visual output from device 200, whereas touch-sensitive touchpads do not provide visual output.

A touch-sensitive display in some embodiments of touch screen 212 is as described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 212 has, for example, a video resolution in excess of 100 dpi. In some embodiments, the touch screen has a video resolution of approximately 160 dpi. The user makes contact with touch screen 212 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 200 includes a touchpad (not shown) for activating or deactivating particular functions. In some embodiments, the touchpad is a touch-sensitive area of the device that, unlike the touch screen, does not display visual output. The touchpad is a touch-sensitive surface that is separate from touch screen 212 or an extension of the touch-sensitive surface formed by the touch screen.

Device 200 also includes power system 262 for powering the various components. Power system 262 includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 200 also includes one or more optical sensors 264. FIG. 2A shows an optical sensor coupled to optical sensor controller 258 in I/O subsystem 206. Optical sensor 264 includes charge-coupled device (CCD) or complementary metal-oxide semiconductor (CMOS) phototransistors. Optical sensor 264 receives light from the environment, projected through one or more lenses, and converts the light to data representing an image. In conjunction with imaging module 243 (also called a camera module), optical sensor 264 captures still images or video. In some embodiments, an optical sensor is located on the back of device 200, opposite touch screen display 212 on the front of the device so that the touch screen display is used as a viewfinder for still and/or video image acquisition. In some embodiments, an optical sensor is located on the front of the device so that the user's image is obtained for video conferencing while the user views the other video conference participants on the touch screen display. In some embodiments, the position of optical sensor 264 can be changed by the user (e.g., by rotating the lens and the sensor in the device housing) so that a single optical sensor 264 is used along with the touch screen display for both video conferencing and still and/or video image acquisition.

Device 200 optionally also includes one or more contact intensity sensors 265. FIG. 2A shows a contact intensity sensor coupled to intensity sensor controller 259 in I/O subsystem 206. Contact intensity sensor 265 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 265 receives contact intensity information (e.g., pressure information or a proxy for pressure information) from the environment. In some embodiments, at least one contact intensity sensor is collocated with, or proximate to, a touch-sensitive surface (e.g., touch-sensitive display system 212). In some embodiments, at least one contact intensity sensor is located on the back of device 200, opposite touch screen display 212, which is located on the front of device 200.

Device 200 also includes one or more proximity sensors 266. FIG. 2A shows proximity sensor 266 coupled to peripherals interface 218. Alternately, proximity sensor 266 is coupled to input controller 260 in I/O subsystem 206. Proximity sensor 266 is performed as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 212 when the multifunction device is placed near the user's ear (e.g., when the user is making a phone call).

Device 200 optionally also includes one or more tactile output generators 267. FIG. 2A shows a tactile output generator coupled to haptic feedback controller 261 in I/O subsystem 206. Tactile output generator 267 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 265 receives tactile feedback generation instructions from haptic feedback module 233 and generates tactile outputs on device 200 that are capable of being sensed by a user of device 200. In some embodiments, at least one tactile output generator is collocated with, or proximate to, a touch-sensitive surface (e.g., touch-sensitive display system 212) and, optionally, generates a tactile output by moving the touch-sensitive surface vertically (e.g., in/out of a surface of device 200) or laterally (e.g., back and forth in the same plane as a surface of device 200). In some embodiments, at least one tactile output generator sensor is located on the back of device 200, opposite touch screen display 212, which is located on the front of device 200.

Device 200 also includes one or more accelerometers 268. FIG. 2A shows accelerometer 268 coupled to peripherals interface 218. Alternately, accelerometer 268 is coupled to an input controller 260 in I/O subsystem 206. Accelerometer 268 performs, for example, as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 200 optionally includes, in addition to accelerometer(s) 268, a magnetometer (not shown) and a GPS (or GLONASS or other global navigation system) receiver (not shown) for obtaining information concerning the location and orientation (e.g., portrait or landscape) of device 200.

Figure 4:
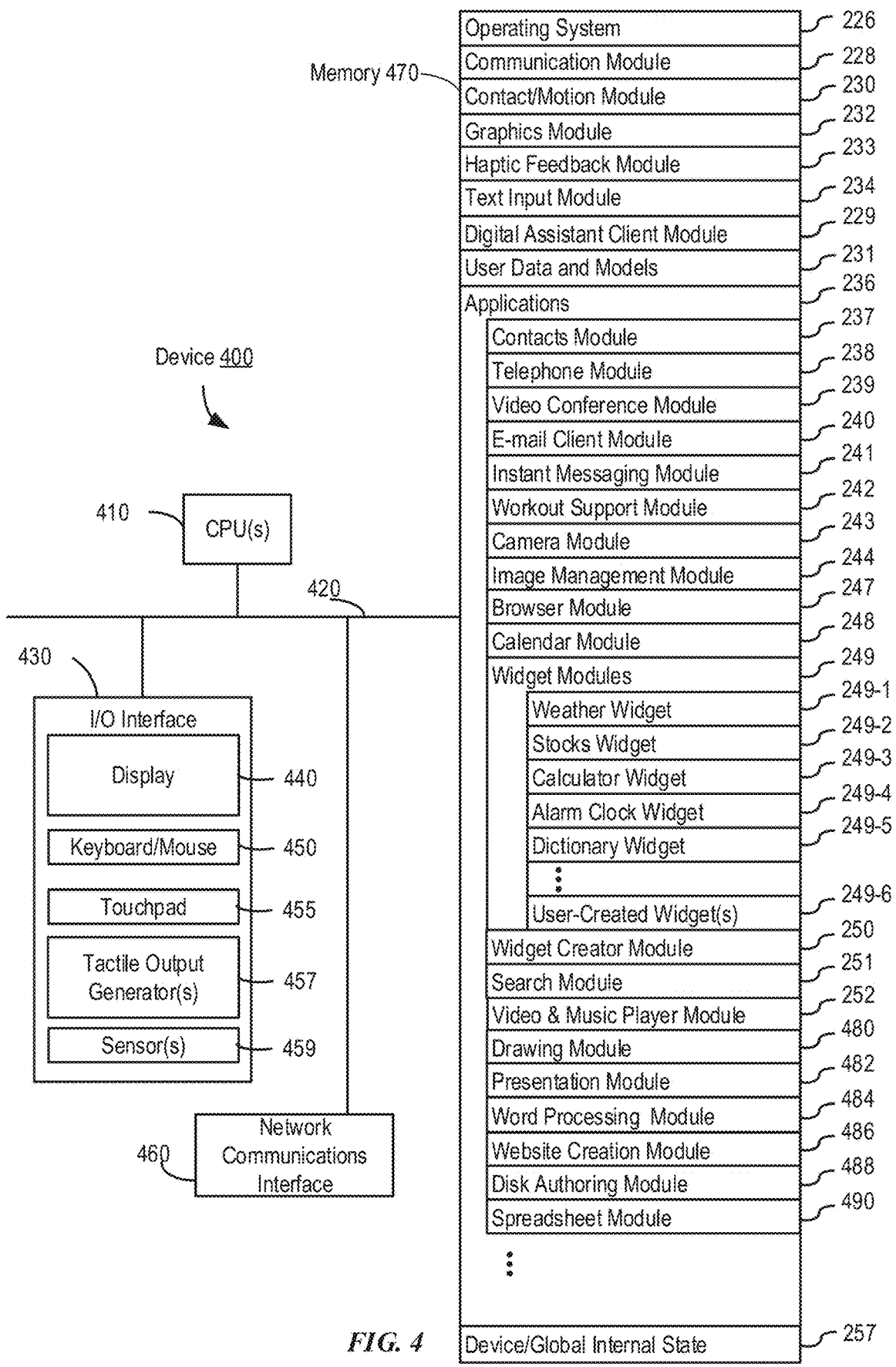
FIG. 4 is a block diagram of an exemplary multifunction device with a display and a touch-sensitive surface according to various examples.

In some embodiments, the software components stored in memory 202 include operating system 226, communication module (or set of instructions) 228, contact/motion module (or set of instructions) 230, graphics module (or set of instructions) 232, text input module (or set of instructions) 234, Global Positioning System (GPS) module (or set of instructions) 235, Digital Assistant Client Module 229, and applications (or sets of instructions) 236. Further, memory 202 stores data and models, such as user data and models 231. Furthermore, in some embodiments, memory 202 (FIG. 2A) or 470 (FIG. 4) stores device/global internal state 257, as shown in FIGS. 2A and 4. Device/global internal state 257 includes one or more of: active application state, indicating which applications, if any, are currently active; display state, indicating what applications, views or other information occupy various regions of touch screen display 212; sensor state, including information obtained from the device's various sensors and input control devices 216; and location information concerning the device's location and/or attitude.

Operating system 226 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 228 facilitates communication with other devices over one or more external ports 224 and also includes various software components for handling data received by RF circuitry 208 and/or external port 224. External port 224 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 230 optionally detects contact with touch screen 212 (in conjunction with display controller 256) and other touch-sensitive devices (e.g., a touchpad or physical click wheel). Contact/motion module 230 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 230 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 230 and display controller 256 detect contact on a touchpad.

In some embodiments, contact/motion module 230 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 200). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 230 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 232 includes various known software components for rendering and displaying graphics on touch screen 212 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 232 stores data representing graphics to be used. Each graphic is, optionally, assigned a corresponding code. Graphics module 232 receives, from applications etc., one or more codes specifying graphics to be displayed along with, if necessary, coordinate data and other graphic property data, and then generates screen image data to output to display controller 256.

Haptic feedback module 233 includes various software components for generating instructions used by tactile output generator(s) 267 to produce tactile outputs at one or more locations on device 200 in response to user interactions with device 200.

Text input module 234, which is, in some examples, a component of graphics module 232, provides soft keyboards for entering text in various applications (e.g., contacts 237, email 240, IM 241, browser 247, and any other application that needs text input).

GPS module 235 determines the location of the device and provides this information for use in various applications (e.g., to telephone 238 for use in location-based dialing; to camera 243 as picture/video metadata; and to applications that provide location-based services such as weather widgets, local yellow page widgets, and map/navigation widgets).

Digital assistant client module 229 includes various client-side digital assistant instructions to provide the client-side functionalities of the digital assistant. For example, digital assistant client module 229 is capable of accepting voice input (e.g., speech input), text input, touch input, and/or gestural input through various user interfaces (e.g., microphone 213, accelerometer(s) 268, touch-sensitive display system 212, optical sensor(s) 264, other input control devices 216, etc.) of portable multifunction device 200. Digital assistant client module 229 is also capable of providing output in audio (e.g., speech output), visual, and/or tactile forms through various output interfaces (e.g., speaker 211, touch-sensitive display system 212, tactile output generator(s) 267, etc.) of portable multifunction device 200. For example, output is provided as voice, sound, alerts, text messages, menus, graphics, videos, animations, vibrations, and/or combinations of two or more of the above. During operation, digital assistant client module 229 communicates with DA server 106 using RF circuitry 208.

User data and models 231 include various data associated with the user (e.g., user-specific vocabulary data, user preference data, user-specified name pronunciations, data from the user's electronic address book, to-do lists, shopping lists, etc.) to provide the client-side functionalities of the digital assistant. Further, user data and models 231 include various models (e.g., speech recognition models, statistical language models, natural language processing models, ontology, task flow models, service models, etc.) for processing user input and determining user intent.

In some examples, digital assistant client module 229 utilizes the various sensors, subsystems, and peripheral devices of portable multifunction device 200 to gather additional information from the surrounding environment of the portable multifunction device 200 to establish a context associated with a user, the current user interaction, and/or the current user input. In some examples, digital assistant client module 229 provides the contextual information or a subset thereof with the user input to DA server 106 to help infer the user's intent. In some examples, the digital assistant also uses the contextual information to determine how to prepare and deliver outputs to the user. Contextual information is referred to as context data.

In some examples, the contextual information that accompanies the user input includes sensor information, e.g., lighting, ambient noise, ambient temperature, images or videos of the surrounding environment, etc. In some examples, the contextual information can also includes the physical state of the device, e.g., device orientation, device location, device temperature, power level, speed, acceleration, motion patterns, cellular signals strength, etc. In some examples, information related to the software state of DA server 106, e.g., running processes, installed programs, past and present network activities, background services, error logs, resources usage, etc., and of portable multifunction device 200 is provided to DA server 106 as contextual information associated with a user input.

In some examples, the digital assistant client module 229 selectively provides information (e.g., user data 231) stored on the portable multifunction device 200 in response to requests from DA server 106. In some examples, digital assistant client module 229 also elicits additional input from the user via a natural language dialogue or other user interfaces upon request by DA server 106. Digital assistant client module 229 passes the additional input to DA server 106 to help DA server 106 in intent deduction and/or fulfillment of the user's intent expressed in the user request.

A more detailed description of a digital assistant is described below with reference to FIGS. 7A-C. It should be recognized that digital assistant client module 229 can include any number of the sub-modules of digital assistant module 726 described below.

Applications 236 include the following modules (or sets of instructions), or a subset or superset thereof:
  Contacts module 237 (sometimes called an address book or contact list);
  Telephone module 238;
  Video conference module 239;
  E-mail client module 240;
  Instant messaging (IM) module 241;
  Workout support module 242;
  Camera module 243 for still and/or video images;
  Image management module 244;
  Video player module;
  Music player module;
  Browser module 247;
  Calendar module 248;
  Widget modules 249, which includes, in some examples, one or more of: weather widget 249-1, stocks widget 249-2, calculator widget 249-3, alarm clock widget 249-4, dictionary widget 249-5, and other widgets obtained by the user, as well as user-created widgets 249-6;
  Widget creator module 250 for making user-created widgets 249-6;
  Search module 251;
  Video and music player module 252, which merges video player module and music player module;
  Notes module 253;
  Map module 254; and/or
  Online video module 255.

Examples of other applications 236 that are stored in memory 202 include other word processing applications, other image editing applications, drawing applications, presentation applications, JAVA-enabled applications, encryption, digital rights management, voice recognition, and voice replication.

In conjunction with touch screen 212, display controller 256, contact/motion module 230, graphics module 232, and text input module 234, contacts module 237 are used to manage an address book or contact list (e.g., stored in application internal state 292 of contacts module 237 in memory 202 or memory 470), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 238, video conference module 239, e-mail 240, or IM 241; and so forth.

In conjunction with RF circuitry 208, audio circuitry 210, speaker 211, microphone 213, touch screen 212, display controller 256, contact/motion module 230, graphics module 232, and text input module 234, telephone module 238 are used to enter a sequence of characters corresponding to a telephone number, access one or more telephone numbers in contacts module 237, modify a telephone number that has been entered, dial a respective telephone number, conduct a conversation, and disconnect or hang up when the conversation is completed. As noted above, the wireless communication uses any of a plurality of communications standards, protocols, and technologies.

In conjunction with RF circuitry 208, audio circuitry 210, speaker 211, microphone 213, touch screen 212, display controller 256, optical sensor 264, optical sensor controller 258, contact/motion module 230, graphics module 232, text input module 234, contacts module 237, and telephone module 238, video conference module 239 includes executable instructions to initiate, conduct, and terminate a video conference between a user and one or more other participants in accordance with user instructions.

In conjunction with RF circuitry 208, touch screen 212, display controller 256, contact/motion module 230, graphics module 232, and text input module 234, e-mail client module 240 includes executable instructions to create, send, receive, and manage e-mail in response to user instructions. In conjunction with image management module 244, e-mail client module 240 makes it very easy to create and send e-mails with still or video images taken with camera module 243.

In conjunction with RF circuitry 208, touch screen 212, display controller 256, contact/motion module 230, graphics module 232, and text input module 234, the instant messaging module 241 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 208, touch screen 212, display controller 256, contact/motion module 230, graphics module 232, text input module 234, GPS module 235, map module 254, and music player module, workout support module 242 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 212, display controller 256, optical sensor(s) 264, optical sensor controller 258, contact/motion module 230, graphics module 232, and image management module 244, camera module 243 includes executable instructions to capture still images or video (including a video stream) and store them into memory 202, modify characteristics of a still image or video, or delete a still image or video from memory 202.

In conjunction with touch screen 212, display controller 256, contact/motion module 230, graphics module 232, text input module 234, and camera module 243, image management module 244 includes executable instructions to arrange, modify (e.g., edit), or otherwise manipulate, label, delete, present (e.g., in a digital slide show or album), and store still and/or video images.

In conjunction with RF circuitry 208, touch screen 212, display controller 256, contact/motion module 230, graphics module 232, and text input module 234, browser module 247 includes executable instructions to browse the Internet in accordance with user instructions, including searching, linking to, receiving, and displaying web pages or portions thereof, as well as attachments and other files linked to web pages.

In conjunction with RF circuitry 208, touch screen 212, display controller 256, contact/motion module 230, graphics module 232, text input module 234, e-mail client module 240, and browser module 247, calendar module 248 includes executable instructions to create, display, modify, and store calendars and data associated with calendars (e.g., calendar entries, to-do lists, etc.) in accordance with user instructions.

In conjunction with RF circuitry 208, touch screen 212, display controller 256, contact/motion module 230, graphics module 232, text input module 234, and browser module 247, widget modules 249 are mini-applications that can be downloaded and used by a user (e.g., weather widget 249-1, stocks widget 249-2, calculator widget 249-3, alarm clock widget 249-4, and dictionary widget 249-5) or created by the user (e.g., user-created widget 249-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 208, touch screen 212, display controller 256, contact/motion module 230, graphics module 232, text input module 234, and browser module 247, the widget creator module 250 are used by a user to create widgets (e.g., turning a user-specified portion of a web page into a widget).

In conjunction with touch screen 212, display controller 256, contact/motion module 230, graphics module 232, and text input module 234, search module 251 includes executable instructions to search for text, music, sound, image, video, and/or other files in memory 202 that match one or more search criteria (e.g., one or more user-specified search terms) in accordance with user instructions.

In conjunction with touch screen 212, display controller 256, contact/motion module 230, graphics module 232, audio circuitry 210, speaker 211, RF circuitry 208, and browser module 247, video and music player module 252 includes executable instructions that allow the user to download and play back recorded music and other sound files stored in one or more file formats, such as MP3 or AAC files, and executable instructions to display, present, or otherwise play back videos (e.g., on touch screen 212 or on an external, connected display via external port 224). In some embodiments, device 200 optionally includes the functionality of an MP3 player, such as an iPod (trademark of Apple Inc.).

In conjunction with touch screen 212, display controller 256, contact/motion module 230, graphics module 232, and text input module 234, notes module 253 includes executable instructions to create and manage notes, to-do lists, and the like in accordance with user instructions.

In conjunction with RF circuitry 208, touch screen 212, display controller 256, contact/motion module 230, graphics module 232, text input module 234, GPS module 235, and browser module 247, map module 254 are used to receive, display, modify, and store maps and data associated with maps (e.g., driving directions, data on stores and other points of interest at or near a particular location, and other location-based data) in accordance with user instructions.

In conjunction with touch screen 212, display controller 256, contact/motion module 230, graphics module 232, audio circuitry 210, speaker 211, RF circuitry 208, text input module 234, e-mail client module 240, and browser module 247, online video module 255 includes instructions that allow the user to access, browse, receive (e.g., by streaming and/or download), play back (e.g., on the touch screen or on an external, connected display via external port 224), send an e-mail with a link to a particular online video, and otherwise manage online videos in one or more file formats, such as H.264. In some embodiments, instant messaging module 241, rather than e-mail client module 240, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules can be combined or otherwise rearranged in various embodiments. For example, video player module can be combined with music player module into a single module (e.g., video and music player module 252, FIG. 2A). In some embodiments, memory 202 stores a subset of the modules and data structures identified above. Furthermore, memory 202 stores additional modules and data structures not described above.

In some embodiments, device 200 is a device where operation of a predefined set of functions on the device is performed exclusively through a touch screen and/or a touchpad. By using a touch screen and/or a touchpad as the primary input control device for operation of device 200, the number of physical input control devices (such as push buttons, dials, and the like) on device 200 is reduced.

The predefined set of functions that are performed exclusively through a touch screen and/or a touchpad optionally include navigation between user interfaces. In some embodiments, the touchpad, when touched by the user, navigates device 200 to a main, home, or root menu from any user interface that is displayed on device 200. In such embodiments, a "menu button" is implemented using a touchpad. In some other embodiments, the menu button is a physical push button or other physical input control device instead of a touchpad.

Figure 2B:
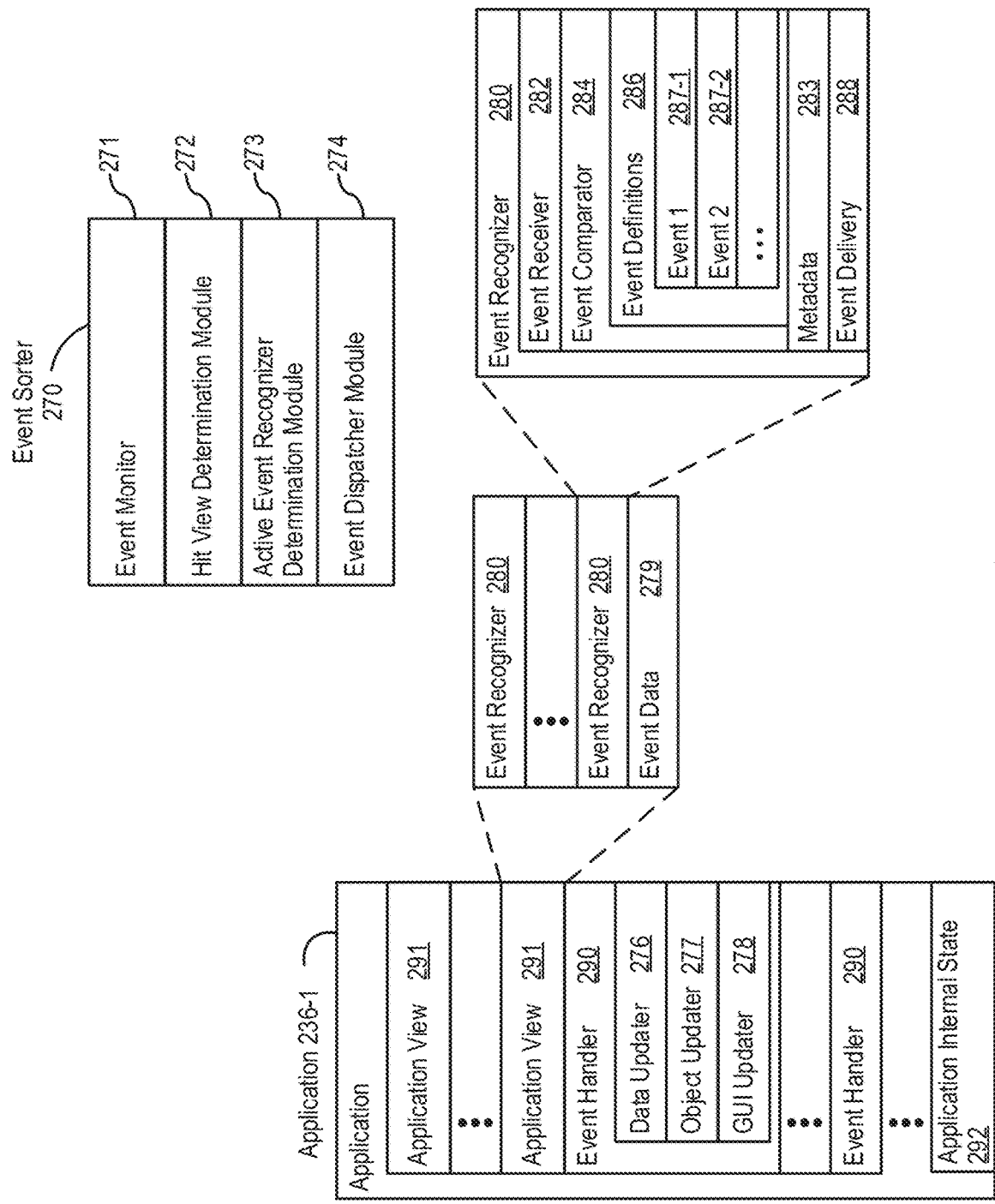
FIG. 2B is a block diagram illustrating exemplary components for event handling according to various examples.

FIG. 2B is a block diagram illustrating exemplary components for event handling in accordance with some embodiments. In some embodiments, memory 202 (FIG. 2A) or 470 (FIG. 4) includes event sorter 270 (e.g., in operating system 226) and a respective application 236-1 (e.g., any of the aforementioned applications 237-251, 255, 480-490).

Event sorter 270 receives event information and determines the application 236-1 and application view 291 of application 236-1 to which to deliver the event information. Event sorter 270 includes event monitor 271 and event dispatcher module 274. In some embodiments, application 236-1 includes application internal state 292, which indicates the current application view(s) displayed on touch-sensitive display 212 when the application is active or executing. In some embodiments, device/global internal state 257 is used by event sorter 270 to determine which application(s) is (are) currently active, and application internal state 292 is used by event sorter 270 to determine application views 291 to which to deliver event information.

In some embodiments, application internal state 292 includes additional information, such as one or more of: resume information to be used when application 236-1 resumes execution, user interface state information that indicates information being displayed or that is ready for display by application 236-1, a state queue for enabling the user to go back to a prior state or view of application 236-1, and a redo/undo queue of previous actions taken by the user.

Event monitor 271 receives event information from peripherals interface 218. Event information includes information about a sub-event (e.g., a user touch on touch-sensitive display 212, as part of a multi-touch gesture). Peripherals interface 218 transmits information it receives from I/O subsystem 206 or a sensor, such as proximity sensor 266, accelerometer(s) 268, and/or microphone 213 (through audio circuitry 210). Information that peripherals interface 218 receives from I/O subsystem 206 includes information from touch-sensitive display 212 or a touch-sensitive surface.

In some embodiments, event monitor 271 sends requests to the peripherals interface 218 at predetermined intervals. In response, peripherals interface 218 transmits event information. In other embodiments, peripherals interface 218 transmits event information only when there is a significant event (e.g., receiving an input above a predetermined noise threshold and/or for more than a predetermined duration).

In some embodiments, event sorter 270 also includes a hit view determination module 272 and/or an active event recognizer determination module 273.

Hit view determination module 272 provides software procedures for determining where a sub-event has taken place within one or more views when touch-sensitive display 212 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected correspond to programmatic levels within a programmatic or view hierarchy of the application. For example, the lowest level view in which a touch is detected is called the hit view, and the set of events that are recognized as proper inputs is determined based, at least in part, on the hit view of the initial touch that begins a touch-based gesture.

Hit view determination module 272 receives information related to sub events of a touch-based gesture. When an application has multiple views organized in a hierarchy, hit view determination module 272 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 272, the hit view typically receives all sub-events related to the same touch or input source for which it was identified as the hit view.

Active event recognizer determination module 273 determines which view or views within a view hierarchy should receive a particular sequence of sub-events. In some embodiments, active event recognizer determination module 273 determines that only the hit view should receive a particular sequence of sub-events. In other embodiments, active event recognizer determination module 273 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 274 dispatches the event information to an event recognizer (e.g., event recognizer 280). In embodiments including active event recognizer determination module 273, event dispatcher module 274 delivers the event information to an event recognizer determined by active event recognizer determination module 273. In some embodiments, event dispatcher module 274 stores in an event queue the event information, which is retrieved by a respective event receiver 282.

In some embodiments, operating system 226 includes event sorter 270. Alternatively, application 236-1 includes event sorter 270. In yet other embodiments, event sorter 270 is a stand-alone module, or a part of another module stored in memory 202, such as contact/motion module 230.

In some embodiments, application 236-1 includes a plurality of event handlers 290 and one or more application views 291, each of which includes instructions for handling touch events that occur within a respective view of the application's user interface. Each application view 291 of the application 236-1 includes one or more event recognizers 280. Typically, a respective application view 291 includes a plurality of event recognizers 280. In other embodiments, one or more of event recognizers 280 are part of a separate module, such as a user interface kit (not shown) or a higher level object from which application 236-1 inherits methods and other properties. In some embodiments, a respective event handler 290 includes one or more of: data updater 276, object updater 277, GUI updater 278, and/or event data 279 received from event sorter 270. Event handler 290 utilizes or calls data updater 276, object updater 277, or GUI updater 278 to update the application internal state 292. Alternatively, one or more of the application views 291 include one or more respective event handlers 290. Also, in some embodiments, one or more of data updater 276, object updater 277, and GUI updater 278 are included in a respective application view 291.

A respective event recognizer 280 receives event information (e.g., event data 279) from event sorter 270 and identifies an event from the event information. Event recognizer 280 includes event receiver 282 and event comparator 284. In some embodiments, event recognizer 280 also includes at least a subset of: metadata 283, and event delivery instructions 288 (which include sub-event delivery instructions).

Event receiver 282 receives event information from event sorter 270. The event information includes information about a sub-event, for example, a touch or a touch movement. Depending on the sub-event, the event information also includes additional information, such as location of the sub-event. When the sub-event concerns motion of a touch, the event information also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 284 compares the event information to predefined event or sub-event definitions and, based on the comparison, determines an event or sub event, or determines or updates the state of an event or sub-event. In some embodiments, event comparator 284 includes event definitions 286. Event definitions 286 contain definitions of events (e.g., predefined sequences of sub-events), for example, event 1 (287-1), event 2 (287-2), and others. In some embodiments, sub-events in an event (287) include, for example, touch begin, touch end, touch movement, touch cancellation, and multiple touching. In one example, the definition for event 1 (287-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (287-2) is a dragging on a displayed object. The dragging, for example, comprises a touch (or contact) on the displayed object for a predetermined phase, a movement of the touch across touch-sensitive display 212, and liftoff of the touch (touch end). In some embodiments, the event also includes information for one or more associated event handlers 290.

In some embodiments, event definition 287 includes a definition of an event for a respective user-interface object. In some embodiments, event comparator 284 performs a hit test to determine which user-interface object is associated with a sub-event. For example, in an application view in which three user-interface objects are displayed on touch-sensitive display 212, when a touch is detected on touch-sensitive display 212, event comparator 284 performs a hit test to determine which of the three user-interface objects is associated with the touch (sub-event). If each displayed object is associated with a respective event handler 290, the event comparator uses the result of the hit test to determine which event handler 290 should be activated. For example, event comparator 284 selects an event handler associated with the sub-event and the object triggering the hit test.

In some embodiments, the definition for a respective event (287) also includes delayed actions that delay delivery of the event information until after it has been determined whether the sequence of sub-events does or does not correspond to the event recognizer's event type.

When a respective event recognizer 280 determines that the series of sub-events do not match any of the events in event definitions 286, the respective event recognizer 280 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 280 includes metadata 283 with configurable properties, flags, and/or lists that indicate how the event delivery system should perform sub-event delivery to actively involved event recognizers. In some embodiments, metadata 283 includes configurable properties, flags, and/or lists that indicate how event recognizers interact, or are enabled to interact, with one another. In some embodiments, metadata 283 includes configurable properties, flags, and/or lists that indicate whether sub-events are delivered to varying levels in the view or programmatic hierarchy.

In some embodiments, a respective event recognizer 280 activates event handler 290 associated with an event when one or more particular sub-events of an event are recognized. In some embodiments, a respective event recognizer 280 delivers event information associated with the event to event handler 290. Activating an event handler 290 is distinct from sending (and deferred sending) sub-events to a respective hit view. In some embodiments, event recognizer 280 throws a flag associated with the recognized event, and event handler 290 associated with the flag catches the flag and performs a predefined process.

In some embodiments, event delivery instructions 288 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 276 creates and updates data used in application 236-1. For example, data updater 276 updates the telephone number used in contacts module 237, or stores a video file used in video player module. In some embodiments, object updater 277 creates and updates objects used in application 236-1. For example, object updater 277 creates a new user-interface object or updates the position of a user-interface object. GUI updater 278 updates the GUI. For example, GUI updater 278 prepares display information and sends it to graphics module 232 for display on a touch-sensitive display.

In some embodiments, event handler(s) 290 includes or has access to data updater 276, object updater 277, and GUI updater 278. In some embodiments, data updater 276, object updater 277, and GUI updater 278 are included in a single module of a respective application 236-1 or application view 291. In other embodiments, they are included in two or more software modules.

It shall be understood that the foregoing discussion regarding event handling of user touches on touch-sensitive displays also applies to other forms of user inputs to operate multifunction devices 200 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 3:
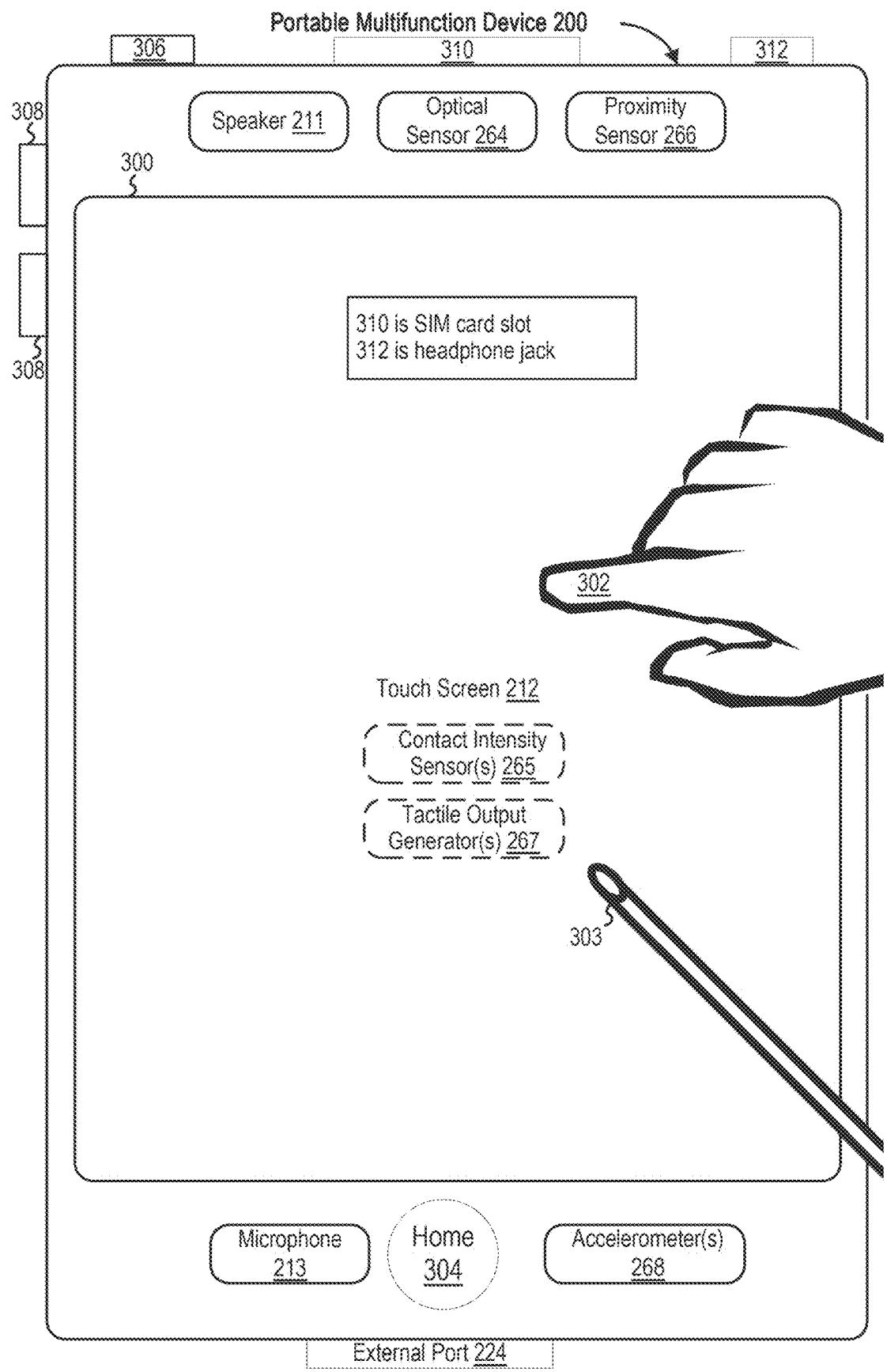
FIG. 3 illustrates a portable multifunction device implementing the client-side portion of a digital assistant according to various examples.

FIG. 3 illustrates a portable multifunction device 200 having a touch screen 212 in accordance with some embodiments. The touch screen optionally displays one or more graphics within user interface (UI) 300. In this embodiment, as well as others described below, a user is enabled to select one or more of the graphics by making a gesture on the graphics, for example, with one or more fingers 302 (not drawn to scale in the figure) or one or more styluses 303 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 200. In some implementations or circumstances, inadvertent contact with a graphic does not select the graphic. For example, a swipe gesture that sweeps over an application icon optionally does not select the corresponding application when the gesture corresponding to selection is a tap.

Device 200 also includes one or more physical buttons, such as "home" or menu button 304. As described previously, menu button 304 is used to navigate to any application 236 in a set of applications that is executed on device 200. Alternatively, in some embodiments, the menu button is implemented as a soft key in a GUI displayed on touch screen 212.

In one embodiment, device 200 includes touch screen 212, menu button 304, push button 306 for powering the device on/off and locking the device, volume adjustment button(s) 308, subscriber identity module (SIM) card slot 310, headset jack 312, and docking/charging external port 224. Push button 306 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 200 also accepts verbal input for activation or deactivation of some functions through microphone 213. Device 200 also, optionally, includes one or more contact intensity sensors 265 for detecting intensity of contacts on touch screen 212 and/or one or more tactile output generators 267 for generating tactile outputs for a user of device 200.

FIG. 4 is a block diagram of an exemplary multifunction device with a display and a touch-sensitive surface in accordance with some embodiments. Device 400 need not be portable. In some embodiments, device 400 is a laptop computer, a desktop computer, a tablet computer, a multimedia player device, a navigation device, an educational device (such as a child's learning toy), a gaming system, or a control device (e.g., a home or industrial controller). Device 400 typically includes one or more processing units (CPUs) 410, one or more network or other communications interfaces 460, memory 470, and one or more communication buses 420 for interconnecting these components. Communication buses 420 optionally include circuitry (sometimes called a chipset) that interconnects and controls communications between system components. Device 400 includes input/output (I/O) interface 430 comprising display 440, which is typically a touch screen display. I/O interface 430 also optionally includes a keyboard and/or mouse (or other pointing device) 450 and touchpad 455, tactile output generator 457 for generating tactile outputs on device 400 (e.g., similar to tactile output generator(s) 267 described above with reference to FIG. 2A), sensors 459 (e.g., optical, acceleration, proximity, touch-sensitive, and/or contact intensity sensors similar to contact intensity sensor(s) 265 described above with reference to FIG. 2A). Memory 470 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 470 optionally includes one or more storage devices remotely located from CPU(s) 410. In some embodiments, memory 470 stores programs, modules, and data structures analogous to the programs, modules, and data structures stored in memory 202 of portable multifunction device 200 (FIG. 2A), or a subset thereof. Furthermore, memory 470 optionally stores additional programs, modules, and data structures not present in memory 202 of portable multifunction device 200. For example, memory 470 of device 400 optionally stores drawing module 480, presentation module 482, word processing module 484, website creation module 486, disk authoring module 488, and/or spreadsheet module 490, while memory 202 of portable multifunction device 200 (FIG. 2A) optionally does not store these modules.

Each of the above-identified elements in FIG. 4 is, in some examples, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are combined or otherwise rearranged in various embodiments. In some embodiments, memory 470 stores a subset of the modules and data structures identified above. Furthermore, memory 470 stores additional modules and data structures not described above.

Attention is now directed towards embodiments of user interfaces that can be implemented on, for example, portable multifunction device 200.

Figure 5A:
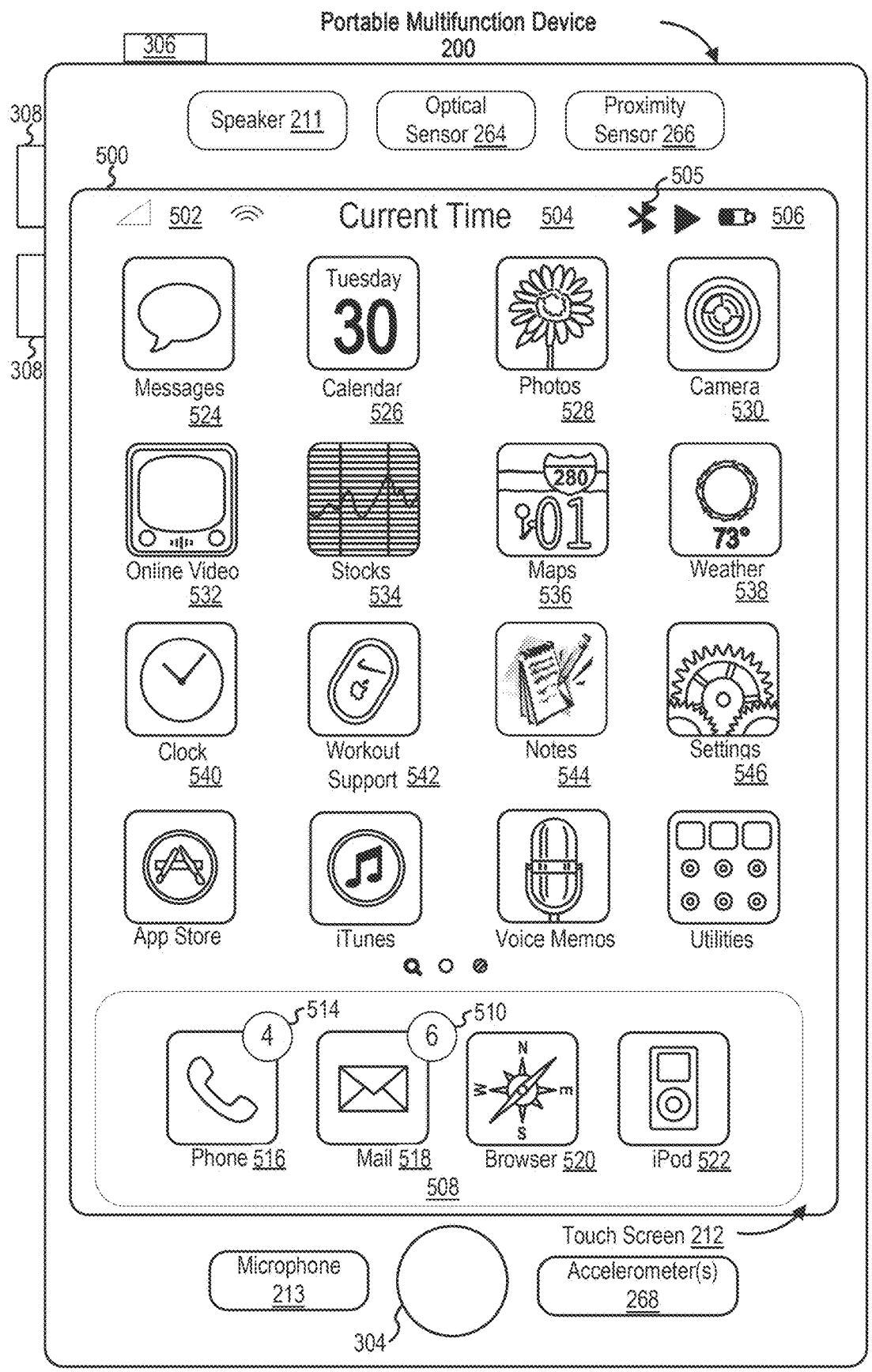
FIG. 5A illustrates an exemplary user interface for a menu of applications on a portable multifunction device according to various examples.

FIG. 5A illustrates an exemplary user interface for a menu of applications on portable multifunction device 200 in accordance with some embodiments. Similar user interfaces are implemented on device 400. In some embodiments, user interface 500 includes the following elements, or a subset or superset thereof:

Signal strength indicator(s) 502 for wireless communication(s), such as cellular and Wi-Fi signals;
Time 504;
Bluetooth indicator 505;
Battery status indicator 506;
Tray 508 with icons for frequently used applications, such as:
  Icon 516 for telephone module 238, labeled "Phone," which optionally includes an indicator 514 of the number of missed calls or voicemail messages,
  Icon 518 for e-mail client module 240, labeled "Mail," which optionally includes an indicator 510 of the number of unread e-mails;
  Icon 520 for browser module 247, labeled "Browser;" and Icon 522 for video and music player module 252, also referred to as iPod (trademark of Apple Inc.) module 252, labeled "iPod;" and Icons for other applications, such as:
- Icon 524 for IM module 241, labeled "Messages;"
- Icon 526 for calendar module 248, labeled "Calendar;"
- Icon 528 for image management module 244, labeled "Photos;"
- Icon 530 for camera module 243, labeled "Camera;"
- Icon 532 for online video module 255, labeled "Online Video;"
- Icon 534 for stocks widget 249-2, labeled "Stocks;"
- Icon 536 for map module 254, labeled "Maps;"
- Icon 538 for weather widget 249-1, labeled "Weather;"
- Icon 540 for alarm clock widget 249-4, labeled "Clock;"
- Icon 542 for workout support module 242, labeled "Workout Support;"
- Icon 544 for notes module 253, labeled "Notes;" and
- Icon 546 for a settings application or module, labeled "Settings," which provides access to settings for device 200 and its various applications 236.

It should be noted that the icon labels illustrated in FIG. 5A are merely exemplary. For example, icon 522 for video and music player module 252 is optionally labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 5B:
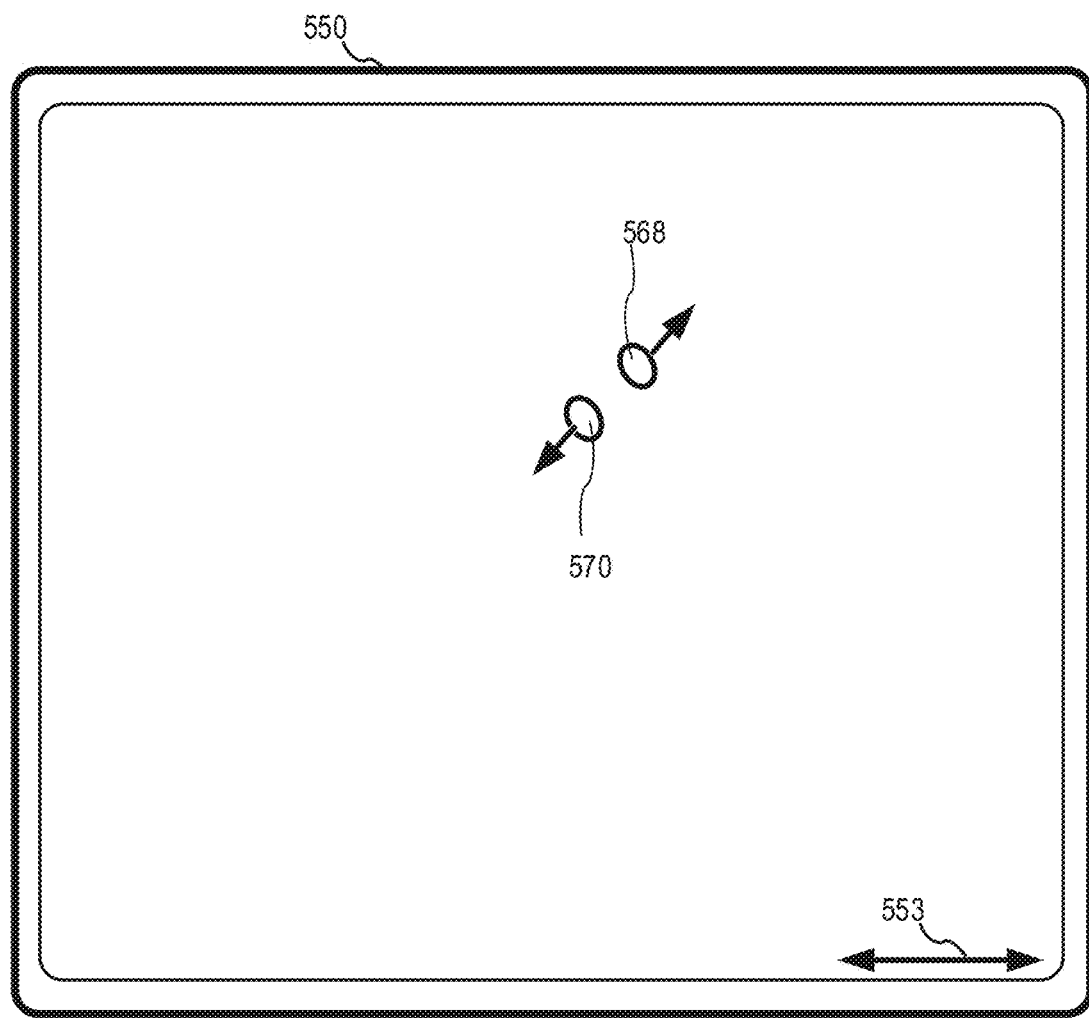
FIG. 5B illustrates an exemplary user interface for a multifunction device with a touch-sensitive surface that is separate from the display according to various examples.
Figure 5B:
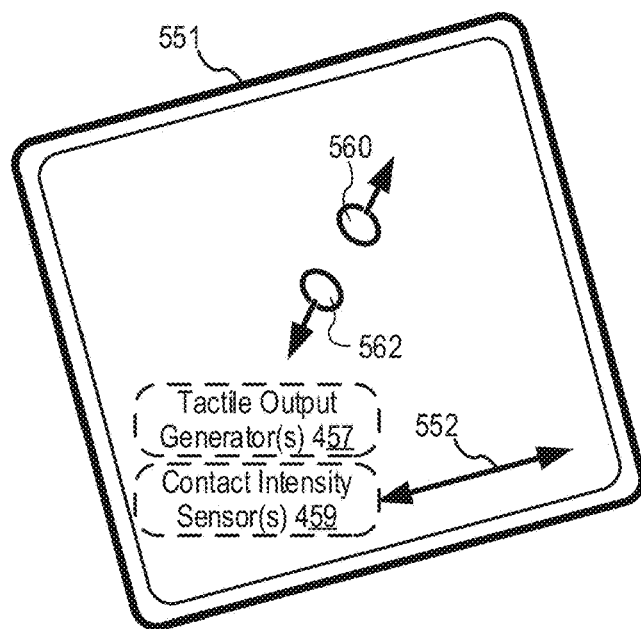

FIG. 5B illustrates an exemplary user interface on a device (e.g., device 400, FIG. 4) with a touch-sensitive surface 551 (e.g., a tablet or touchpad 455, FIG. 4) that is separate from the display 550 (e.g., touch screen display 212). Device 400 also, optionally, includes one or more contact intensity sensors (e.g., one or more of sensors 457) for detecting intensity of contacts on touch-sensitive surface 551 and/or one or more tactile output generators 459 for generating tactile outputs for a user of device 400.

Although some of the examples which follow will be given with reference to inputs on touch screen display 212 (where the touch-sensitive surface and the display are combined), in some embodiments, the device detects inputs on a touch-sensitive surface that is separate from the display, as shown in FIG. 5B. In some embodiments, the touch-sensitive surface (e.g., 551 in FIG. 5B) has a primary axis (e.g., 552 in FIG. 5B) that corresponds to a primary axis (e.g., 553 in FIG. 5B) on the display (e.g., 550). In accordance with these embodiments, the device detects contacts (e.g., 560 and 562 in FIG. 5B) with the touch-sensitive surface 551 at locations that correspond to respective locations on the display (e.g., in FIG. 5B, 560 corresponds to 568 and 562 corresponds to 570). In this way, user inputs (e.g., contacts 560 and 562, and movements thereof) detected by the device on the touch-sensitive surface (e.g., 551 in FIG. 5B) are used by the device to manipulate the user interface on the display (e.g., 550 in FIG. 5B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 6A:
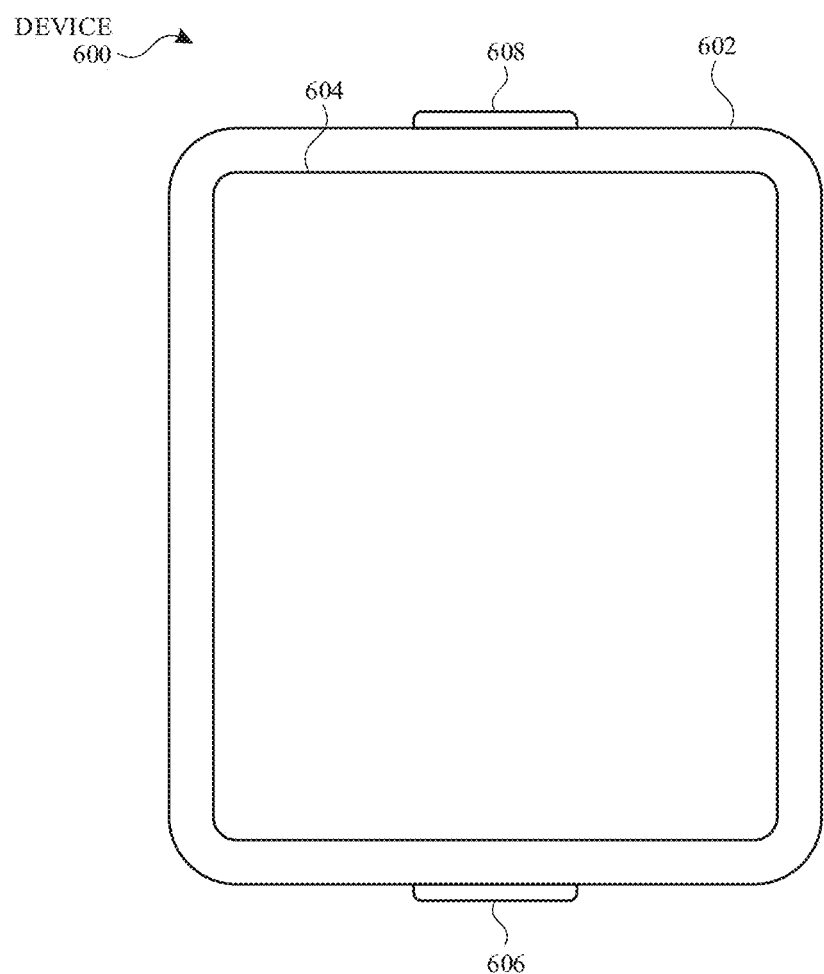
FIG. 6A illustrates a personal electronic device according to various examples.

FIG. 6A illustrates exemplary personal electronic device 600. Device 600 includes body 602. In some embodiments, device 600 includes some or all of the features described with respect to devices 200 and 400 (e.g., FIGS. 2A-4B). In some embodiments, device 600 has touch-sensitive display screen 604, hereafter touch screen 604. Alternatively, or in addition to touch screen 604, device 600 has a display and a touch-sensitive surface. As with devices 200 and 400, in some embodiments, touch screen 604 (or the touch-sensitive surface) has one or more intensity sensors for detecting intensity of contacts (e.g., touches) being applied. The one or more intensity sensors of touch screen 604 (or the touch-sensitive surface) provide output data that represents the intensity of touches. The user interface of device 600 responds to touches based on their intensity, meaning that touches of different intensities can invoke different user interface operations on device 600.

Techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, and International Patent Application Serial No. PCT/US2013/069483, titled "Device, Method, and Graphical User Interface for Transitioning Between Touch Input to Display Output Relationships," filed Nov. 11, 2013, each of which is hereby incorporated by reference in their entirety.

In some embodiments, device 600 has one or more input mechanisms 606 and 608. Input mechanisms 606 and 608, if included, are physical. Examples of physical input mechanisms include push buttons and rotatable mechanisms. In some embodiments, device 600 has one or more attachment mechanisms. Such attachment mechanisms, if included, can permit attachment of device 600 with, for example, hats, eyewear, earrings, necklaces, shirts, jackets, bracelets, watch straps, chains, trousers, belts, shoes, purses, backpacks, and so forth. These attachment mechanisms permit device 600 to be worn by a user.

Figure 6B:
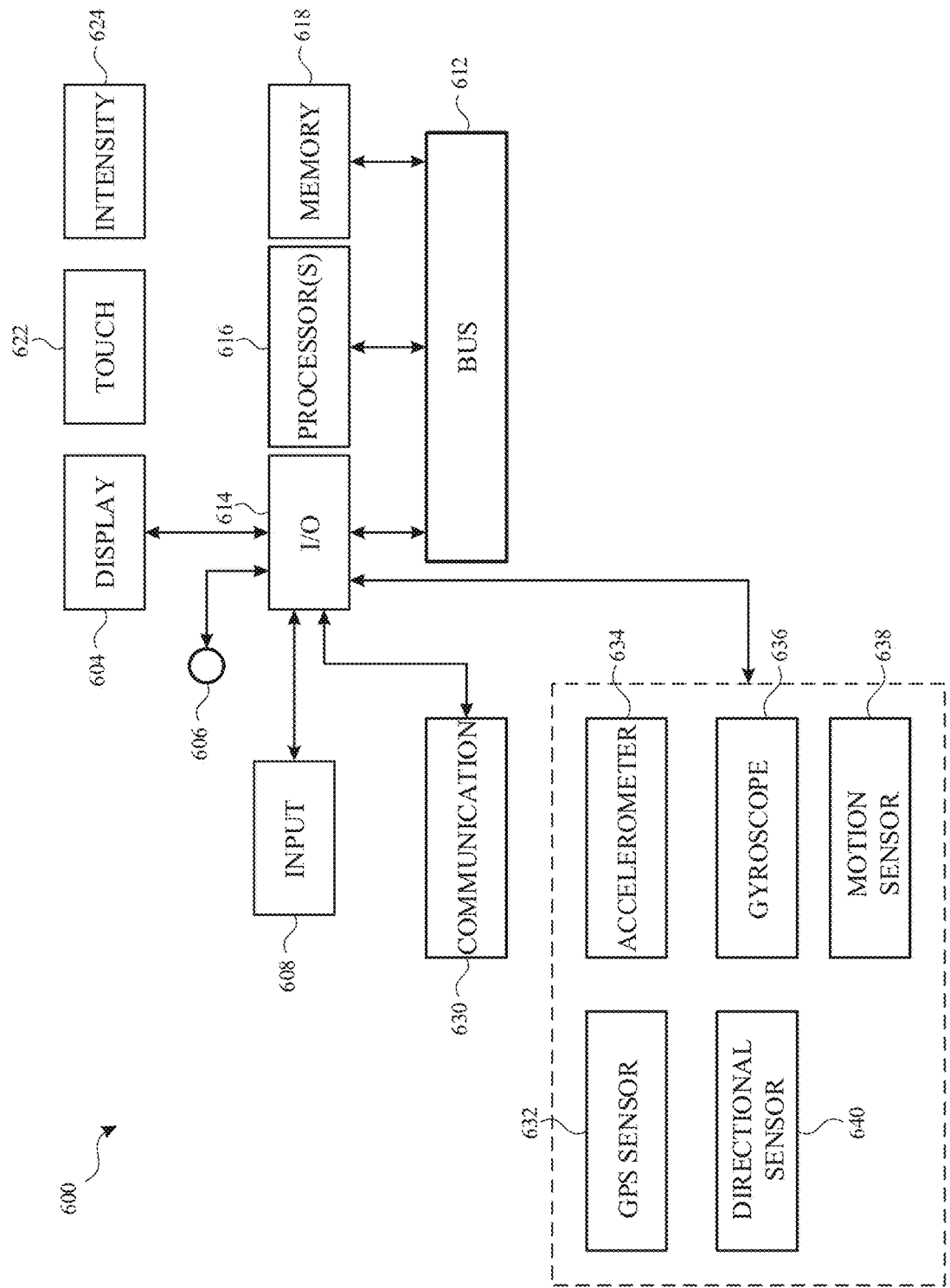
FIG. 6B is a block diagram illustrating a personal electronic device according to various examples.

FIG. 6B depicts exemplary personal electronic device 600. In some embodiments, device 600 includes some or all of the components described with respect to FIGS. 2A, 2B, and 4. Device 600 has bus 612 that operatively couples I/O section 614 with one or more computer processors 616 and memory 618. I/O section 614 is connected to display 604, which can have touch-sensitive component 622 and, optionally, touch-intensity sensitive component 624. In addition, I/O section 614 is connected with communication unit 630 for receiving application and operating system data, using Wi-Fi, Bluetooth, near field communication (NFC), cellular, and/or other wireless communication techniques. Device 600 includes input mechanisms 606 and/or 608. Input mechanism 606 is a rotatable input device or a depressible and rotatable input device, for example. Input mechanism 608 is a button, in some examples.

Input mechanism 608 is a microphone, in some examples. Personal electronic device 600 includes, for example, various sensors, such as GPS sensor 632, accelerometer 634, directional sensor 640 (e.g., compass), gyroscope 636, motion sensor 638, and/or a combination thereof, all of which are operatively connected to I/O section 614.

Memory 618 of personal electronic device 600 is a non-transitory computer-readable storage medium, for storing computer-executable instructions, which, when executed by one or more computer processors 616, for example, cause the computer processors to perform the techniques and processes described below. The computer-executable instructions, for example, are also stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. Personal electronic device 600 is not limited to the components and configuration of FIG. 6B, but can include other or additional components in multiple configurations.

As used here, the term "affordance" refers to a user-interactive graphical user interface object that is, for example, displayed on the display screen of devices 200, 400, and/or 600 (FIGS. 2, 4, and 6). For example, an image (e.g., icon), a button, and text (e.g., hyperlink) each constitutes an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 455 in FIG. 4 or touch-sensitive surface 551 in FIG. 5B) while the cursor is over a particular user interface element (e.g., a button, window, slider or other user interface element), the particular user interface element is adjusted in accordance with the detected input. In some implementations that include a touch screen display (e.g., touch-sensitive display system 212 in FIG. 2A or touch screen 212 in FIG. 5A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation) rather than being used to determine whether to perform a first operation or a second operation.

In some embodiments, a portion of a gesture is identified for purposes of determining a characteristic intensity. For example, a touch-sensitive surface receives a continuous swipe contact transitioning from a start location and reaching an end location, at which point the intensity of the contact increases. In this example, the characteristic intensity of the contact at the end location is based on only a portion of the continuous swipe contact, and not the entire swipe contact (e.g., only the portion of the swipe contact at the end location). In some embodiments, a smoothing algorithm is applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

3. Digital Assistant System

Figure 7A:
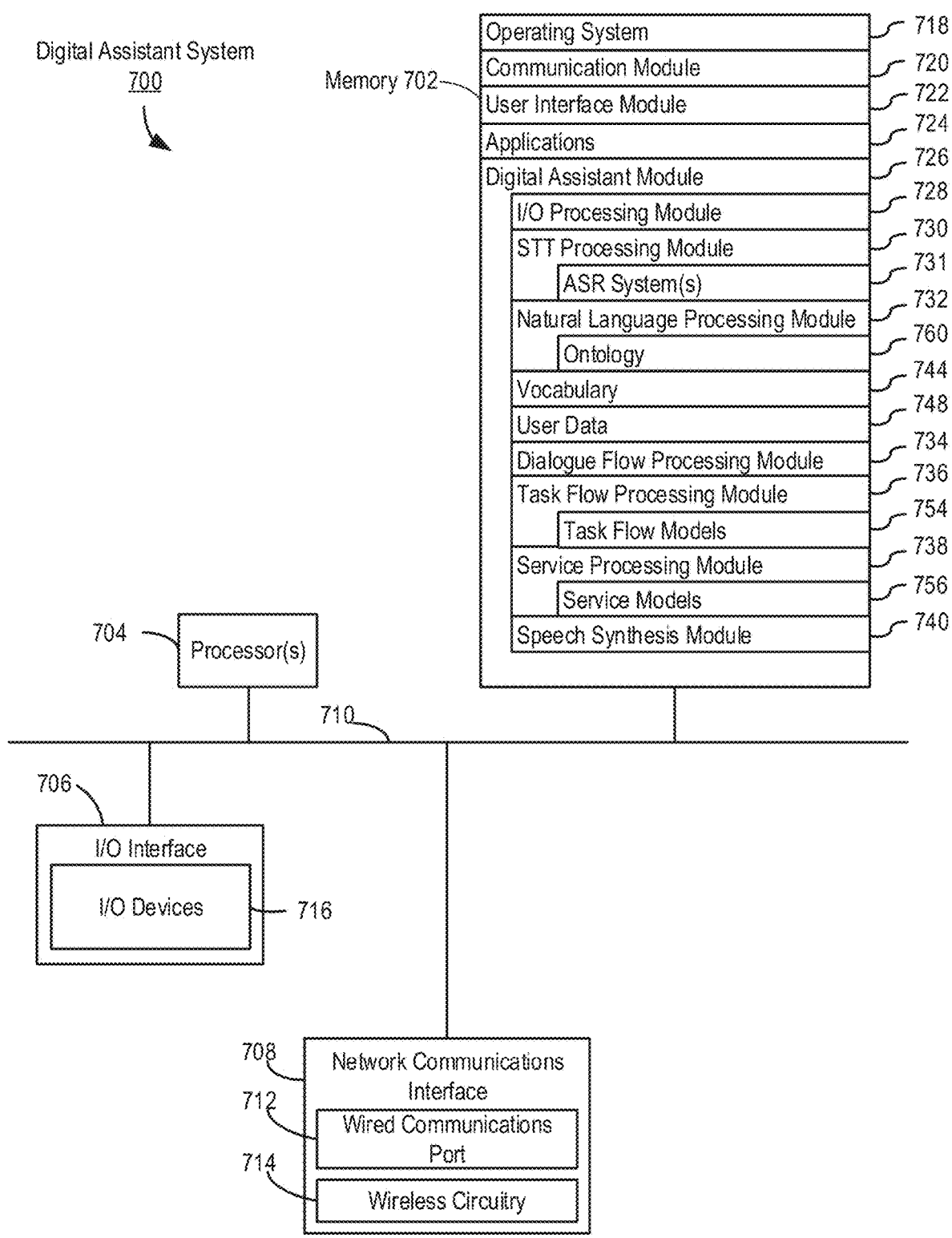
FIG. 7A is a block diagram illustrating a digital assistant system or a server portion thereof according to various examples.

FIG. 7A illustrates a block diagram of digital assistant system 700 in accordance with various examples. In some examples, digital assistant system 700 is implemented on a standalone computer system. In some examples, digital assistant system 700 is distributed across multiple computers. In some examples, some of the modules and functions of the digital assistant are divided into a server portion and a client portion, where the client portion resides on one or more user devices (e.g., devices 104, 122, 200, 400, or 600) and communicates with the server portion (e.g., server system 108) through one or more networks, e.g., as shown in FIG. 1. In some examples, digital assistant system 700 is an implementation of server system 108 (and/or DA server 106) shown in FIG. 1. It should be noted that digital assistant system 700 is only one example of a digital assistant system, and that digital assistant system 700 can have more or fewer components than shown, can combine two or more components, or can have a different configuration or arrangement of the components. The various components shown in FIG. 7A are implemented in hardware, software instructions for execution by one or more processors, firmware, including one or more signal processing and/or application specific integrated circuits, or a combination thereof.

Digital assistant system 700 includes memory 702, one or more processors 704, input/output (I/O) interface 706, and network communications interface 708. These components can communicate with one another over one or more communication buses or signal lines 710.

In some examples, memory 702 includes a non-transitory computer-readable medium, such as high-speed random access memory and/or a non-volatile computer-readable storage medium (e.g., one or more magnetic disk storage devices, flash memory devices, or other non-volatile solid-state memory devices).

In some examples, I/O interface 706 couples input/output devices 716 of digital assistant system 700, such as displays, keyboards, touch screens, and microphones, to user interface module 722. I/O interface 706, in conjunction with user interface module 722, receives user inputs (e.g., voice input, keyboard inputs, touch inputs, etc.) and processes them accordingly. In some examples, e.g., when the digital assistant is implemented on a standalone user device, digital assistant system 700 includes any of the components and I/O communication interfaces described with respect to devices 200, 400, or 600 in FIGS. 2A, 4, 6A-B, respectively. In some examples, digital assistant system 700 represents the server portion of a digital assistant implementation, and can interact with the user through a client-side portion residing on a user device (e.g., devices 104, 200, 400, or 600).

In some examples, the network communications interface 708 includes wired communication port(s) 712 and/or wireless transmission and reception circuitry 714. The wired communication port(s) receives and send communication signals via one or more wired interfaces, e.g., Ethernet, Universal Serial Bus (USB), FIREWIRE, etc. The wireless circuitry 714 receives and sends RF signals and/or optical signals from/to communications networks and other communications devices. The wireless communications use any of a plurality of communications standards, protocols, and technologies, such as GSM, EDGE, CDMA, TDMA, Bluetooth, Wi-Fi, VoIP, Wi-MAX, or any other suitable communication protocol. Network communications interface 708 enables communication between digital assistant system 700 with networks, such as the Internet, an intranet, and/or a wireless network, such as a cellular telephone network, a wireless local area network (LAN), and/or a metropolitan area network (MAN), and other devices.

In some examples, memory 702, or the computer-readable storage media of memory 702, stores programs, modules, instructions, and data structures including all or a subset of: operating system 718, communications module 720, user interface module 722, one or more applications 724, and digital assistant module 726. In particular, memory 702, or the computer-readable storage media of memory 702, stores instructions for performing the processes described below. One or more processors 704 execute these programs, modules, and instructions, and reads/writes from/to the data structures.

Operating system 718 (e.g., Darwin, RTXC, LINUX, UNIX, iOS, OS X, WINDOWS, or an embedded operating system such as VxWorks) includes various software components and/or drivers for controlling and managing general system tasks (e.g., memory management, storage device control, power management, etc.) and facilitates communications between various hardware, firmware, and software components.

Communications module 720 facilitates communications between digital assistant system 700 with other devices over network communications interface 708. For example, communications module 720 communicates with RF circuitry 208 of electronic devices such as devices 200, 400, and 600 shown in FIG. 2A, 4, 6A-B, respectively. Communications module 720 also includes various components for handling data received by wireless circuitry 714 and/or wired communications port 712.

User interface module 722 receives commands and/or inputs from a user via I/O interface 706 (e.g., from a keyboard, touch screen, pointing device, controller, and/or microphone), and generate user interface objects on a display. User interface module 722 also prepares and delivers outputs (e.g., speech, sound, animation, text, icons, vibrations, haptic feedback, light, etc.) to the user via the I/O interface 706 (e.g., through displays, audio channels, speakers, touch-pads, etc.).

Applications 724 include programs and/or modules that are configured to be executed by one or more processors 704. For example, if the digital assistant system is implemented on a standalone user device, applications 724 include user applications, such as games, a calendar application, a navigation application, or an email application. If digital assistant system 700 is implemented on a server, applications 724 include resource management applications, diagnostic applications, or scheduling applications, for example.

Memory 702 also stores digital assistant module 726 (or the server portion of a digital assistant). In some examples, digital assistant module 726 includes the following sub-modules, or a subset or superset thereof: input/output processing module 728, speech-to-text (STT) processing module 730, natural language processing module 732, dialogue flow processing module 734, task flow processing module 736, service processing module 738, and speech synthesis module 740. Each of these modules has access to one or more of the following systems or data and models of the digital assistant module 726, or a subset or superset thereof: ontology 760, vocabulary index 744, user data 748, task flow models 754, service models 756, and ASR systems.

In some examples, using the processing modules, data, and models implemented in digital assistant module 726, the digital assistant can perform at least some of the following: converting speech input into text; identifying a user's intent expressed in a natural language input received from the user; actively eliciting and obtaining information needed to fully infer the user's intent (e.g., by disambiguating words, games, intentions, etc.); determining the task flow for fulfilling the inferred intent; and executing the task flow to fulfill the inferred intent.

Figure 7B:
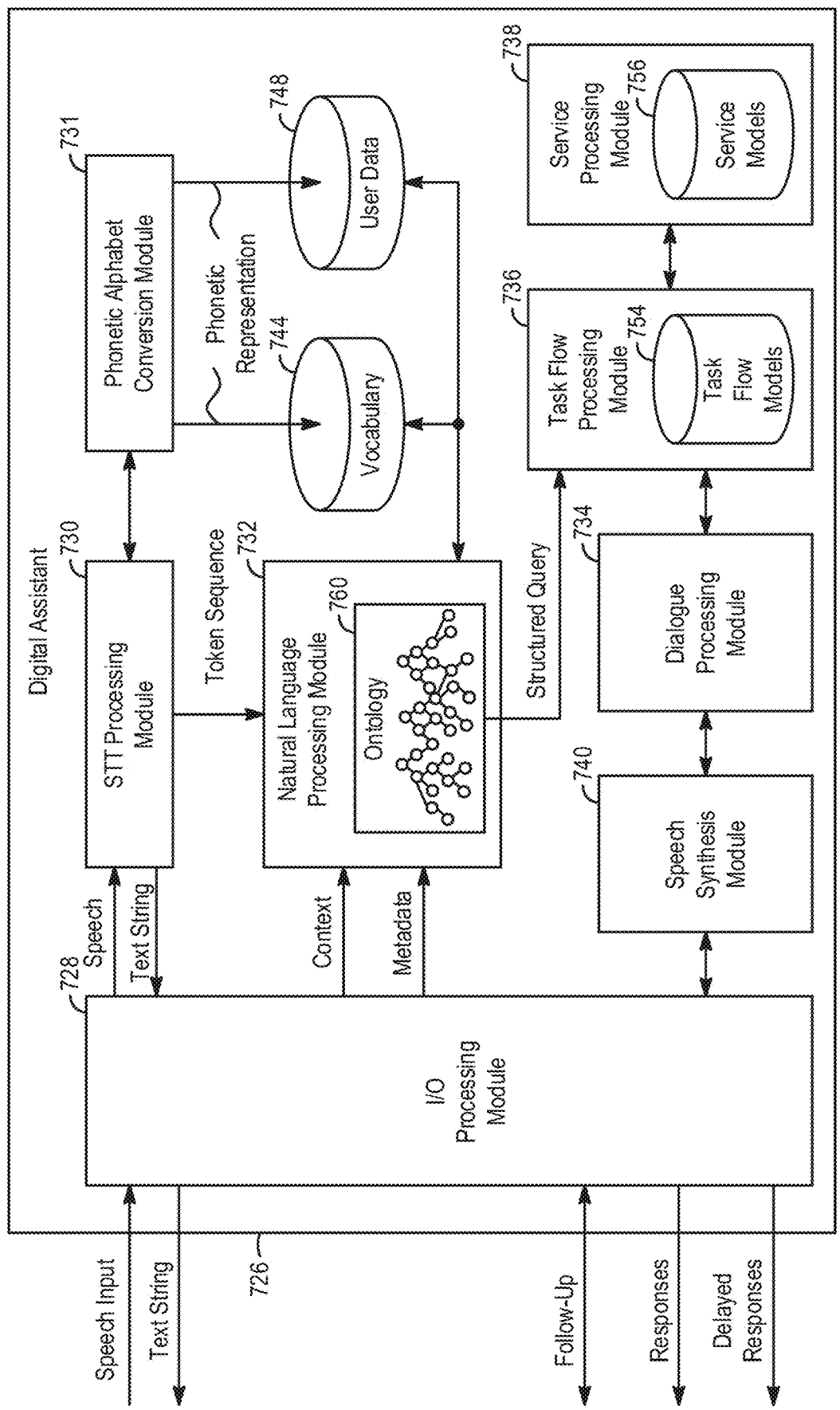
FIG. 7B illustrates the functions of the digital assistant shown in FIG. 7A according to various examples.

In some examples, as shown in FIG. 7B, I/O processing module 728 interacts with the user through I/O devices 716 in FIG. 7A or with a user device (e.g., devices 104, 200, 400, or 600) through network communications interface 708 in FIG. 7A to obtain user input (e.g., a speech input) and to provide responses (e.g., as speech outputs) to the user input. I/O processing module 728 optionally obtains contextual information associated with the user input from the user device, along with or shortly after the receipt of the user input. The contextual information includes user-specific data, vocabulary, and/or preferences relevant to the user input. In some examples, the contextual information also includes software and hardware states of the user device at the time the user request is received, and/or information related to the surrounding environment of the user at the time that the user request was received. In some examples, I/O processing module 728 also sends follow-up questions to, and receive answers from, the user regarding the user request. When a user request is received by I/O processing module 728 and the user request includes speech input, I/O processing module 728 forwards the speech input to STT processing module 730 (or speech recognizer) for speech-to-text conversions.

STT processing module 730 includes one or more ASR systems. The one or more ASR systems can process the speech input that is received through I/O processing module 728 to produce a recognition result. Each ASR system includes a front-end speech pre-processor. The front-end speech pre-processor extracts representative features from the speech input. For example, the front-end speech pre-processor performs a Fourier transform on the speech input to extract spectral features that characterize the speech input as a sequence of representative multi-dimensional vectors. Further, each ASR system includes one or more speech recognition models (e.g., acoustic models and/or language models) and implements one or more speech recognition engines. Examples of speech recognition models include Hidden Markov Models, Gaussian-Mixture Models, Deep Neural Network Models, n-gram language models, and other statistical models. Examples of speech recognition engines include the dynamic time warping based engines and weighted finite-state transducers (WFST) based engines. The one or more speech recognition models and the one or more speech recognition engines are used to process the extracted representative features of the front-end speech pre-processor to produce intermediate recognitions results (e.g., phonemes, phonemic strings, and sub-words), and ultimately, text recognition results (e.g., words, word strings, or sequence of tokens). In some examples, the speech input is processed at least partially by a third-party service or on the user's device (e.g., device 104, 200, 400, or 600) to produce the recognition result. Once STT processing module 730 produces recognition results containing a text string (e.g., words, or sequence of words, or sequence of tokens), the recognition result is passed to natural language processing module 732 for intent deduction.

More details on the speech-to-text processing are described in U.S. Utility application Ser. No. 13/236,942 for "Consolidating Speech Recognition Results," filed on Sep. 20, 2011, the entire disclosure of which is incorporated herein by reference.

In some examples, STT processing module 730 includes and/or accesses a vocabulary of recognizable words via phonetic alphabet conversion module 731. Each vocabulary word is associated with one or more candidate pronunciations of the word represented in a speech recognition phonetic alphabet. In particular, the vocabulary of recognizable words includes a word that is associated with a plurality of candidate pronunciations. For example, the vocabulary includes the word "tomato" that is associated with the candidate pronunciations of /təˈmeɪroʊ/ and /təˈmɑtoʊ/. Further, vocabulary words are associated with custom candidate pronunciations that are based on previous speech inputs from the user. Such custom candidate pronunciations are stored in STT processing module 730 and are associated with a particular user via the user's profile on the device. In some examples, the candidate pronunciations for words are determined based on the spelling of the word and one or more linguistic and/or phonetic rules. In some examples, the candidate pronunciations are manually generated, e.g., based on known canonical pronunciations.

In some examples, the candidate pronunciations are ranked based on the commonness of the candidate pronunciation. For example, the candidate pronunciation /təˈmeɪroʊ/ is ranked higher than /təˈmɑtoʊ/, because the former is a more commonly used pronunciation (e.g., among all users, for users in a particular geographical region, or for any other appropriate subset of users). In some examples, candidate pronunciations are ranked based on whether the candidate pronunciation is a custom candidate pronunciation associated with the user. For example, custom candidate pronunciations are ranked higher than canonical candidate pronunciations. This can be useful for recognizing proper nouns having a unique pronunciation that deviates from canonical pronunciation. In some examples, candidate pronunciations are associated with one or more speech characteristics, such as geographic origin, nationality, or ethnicity. For example, the candidate pronunciation /təˈmeɪroʊ/ is associated with the United States, whereas the candidate pronunciation /təˈmɑtoʊ/ is associated with Great Britain. Further, the rank of the candidate pronunciation is based on one or more characteristics (e.g., geographic origin, nationality, ethnicity, etc.) of the user stored in the user's profile on the device. For example, it can be determined from the user's profile that the user is associated with the United States. Based on the user being associated with the United States, the candidate pronunciation /təˈmeɪroʊ/ (associated with the United States) is ranked higher than the candidate pronunciation /təˈmɑtoʊ/ (associated with Great Britain). In some examples, one of the ranked candidate pronunciations is selected as a predicted pronunciation (e.g., the most likely pronunciation).

When a speech input is received, STT processing module 730 is used to determine the phonemes corresponding to the speech input (e.g., using an acoustic model), and then attempt to determine words that match the phonemes (e.g., using a language model). For example, if STT processing module 730 first identifies the sequence of phonemes /təˈmeɪroʊ/ corresponding to a portion of the speech input, it can then determine, based on vocabulary index 744, that this sequence corresponds to the word "tomato."

In some examples, STT processing module 730 uses approximate matching techniques to determine words in an utterance. Thus, for example, the STT processing module 730 can determine that the sequence of phonemes /təˈmeɪroʊ/ corresponds to the word "tomato," even if that particular sequence of phonemes is not one of the candidate sequence of phonemes for that word.

Natural language processing module 732 ("natural language processor") of the digital assistant can take the sequence of words or tokens ("token sequence") generated by STT processing module 730, and attempt to associate the token sequence with one or more "actionable intents" recognized by the digital assistant. An "actionable intent" represents a task that can be performed by the digital assistant, and can have an associated task flow implemented in task flow models 754. The associated task flow is a series of programmed actions and steps that the digital assistant takes in order to perform the task. The scope of a digital assistant's capabilities is dependent on the number and variety of task flows that have been implemented and stored in task flow models 754, or in other words, on the number and variety of "actionable intents" that the digital assistant recognizes. The effectiveness of the digital assistant, however, also dependents on the assistant's ability to infer the correct "actionable intent(s)" from the user request expressed in natural language.

In some examples, in addition to the sequence of words or tokens obtained from STT processing module 730, natural language processing module 732 also receives contextual information associated with the user request, e.g., from I/O processing module 728. The natural language processing module 732 optionally uses the contextual information to clarify, supplement, and/or further define the information contained in the token sequence received from STT processing module 730. The contextual information includes, for example, user preferences, hardware, and/or software states of the user device, sensor information collected before, during, or shortly after the user request, prior interactions (e.g., dialogue) between the digital assistant and the user, and the like. As described herein, contextual information is, in some examples, dynamic, and changes with time, location, content of the dialogue, and other factors.

In some examples, the natural language processing is based on, e.g., ontology 760. Ontology 760 is a hierarchical structure containing many nodes, each node representing either an "actionable intent" or a "property" relevant to one or more of the "actionable intents" or other "properties." As noted above, an "actionable intent" represents a task that the digital assistant is capable of performing, i.e., it is "actionable" or can be acted on. A "property" represents a parameter associated with an actionable intent or a sub-aspect of another property. A linkage between an actionable intent node and a property node in ontology 760 defines how a parameter represented by the property node pertains to the task represented by the actionable intent node.

In some examples, ontology 760 is made up of actionable intent nodes and property nodes. Within ontology 760, each actionable intent node is linked to one or more property nodes either directly or through one or more intermediate property nodes. Similarly, each property node is linked to one or more actionable intent nodes either directly or through one or more intermediate property nodes. For example, as shown in FIG. 7C, ontology 760 includes a "restaurant reservation" node (i.e., an actionable intent node). Property nodes "restaurant," "date/time" (for the reservation), and "party size" are each directly linked to the actionable intent node (i.e., the "restaurant reservation" node).

Figure 7C:
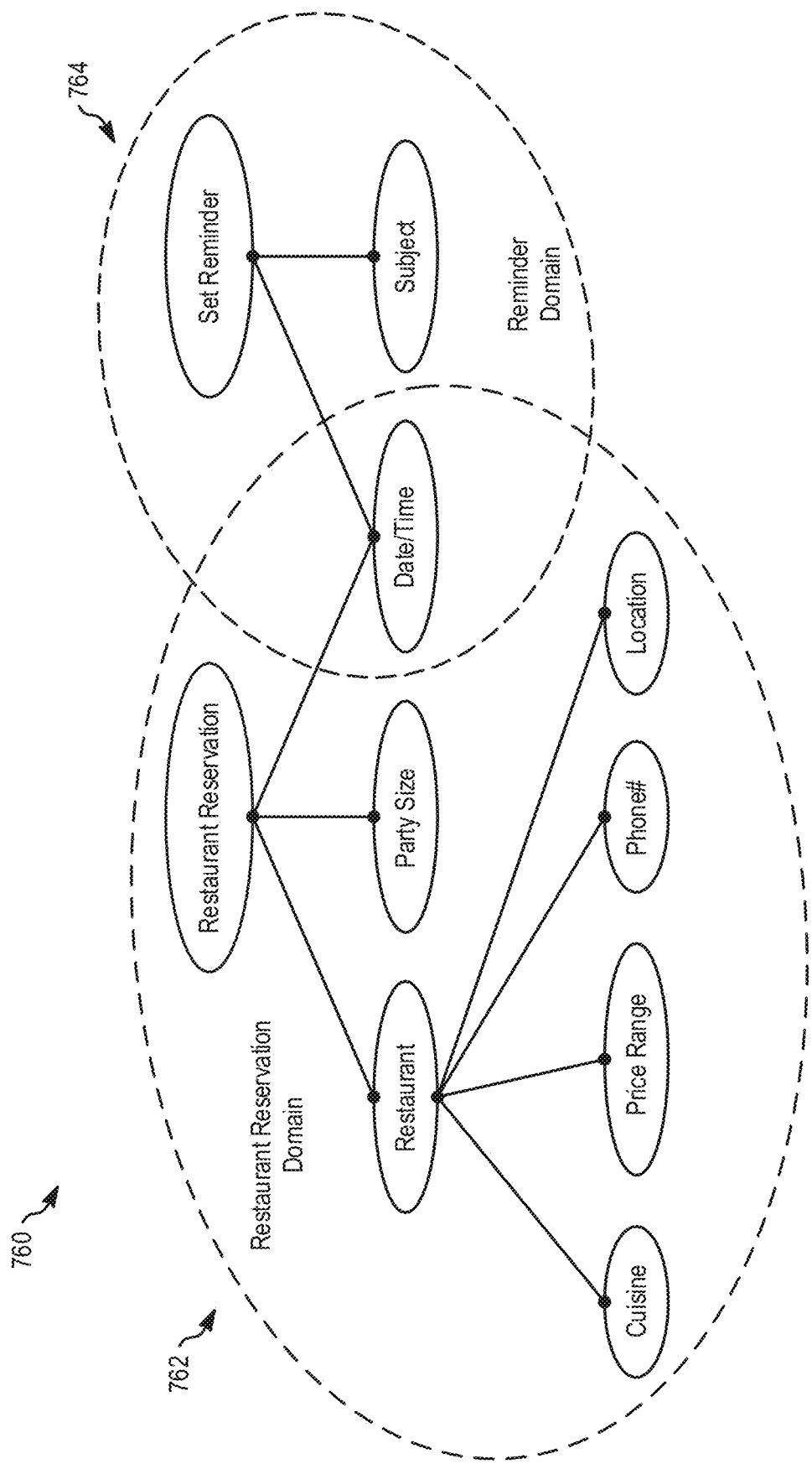
FIG. 7C illustrates a portion of an ontology according to various examples.

In addition, property nodes "cuisine," "price range," "phone number," and "location" are sub-nodes of the property node "restaurant," and are each linked to the "restaurant reservation" node (i.e., the actionable intent node) through the intermediate property node "restaurant." For another example, as shown in FIG. 7C, ontology 760 also includes a "set reminder" node (i.e., another actionable intent node). Property nodes "date/time" (for setting the reminder) and "subject" (for the reminder) are each linked to the "set reminder" node. Since the property "date/time" is relevant to both the task of making a restaurant reservation and the task of setting a reminder, the property node "date/time" is linked to both the "restaurant reservation" node and the "set reminder" node in ontology 760.

An actionable intent node, along with its linked concept nodes, is described as a "domain." In the present discussion, each domain is associated with a respective actionable intent, and refers to the group of nodes (and the relationships there between) associated with the particular actionable intent. For example, ontology 760 shown in FIG. 7C includes an example of restaurant reservation domain 762 and an example of reminder domain 764 within ontology 760. The restaurant reservation domain includes the actionable intent node "restaurant reservation," property nodes "restaurant," "date/time," and "party size," and sub-property nodes "cuisine," "price range," "phone number," and "location." Reminder domain 764 includes the actionable intent node "set reminder," and property nodes "subject" and "date/time." In some examples, ontology 760 is made up of many domains. Each domain shares one or more property nodes with one or more other domains. For example, the "date/time" property node is associated with many different domains (e.g., a scheduling domain, a travel reservation domain, a movie ticket domain, etc.), in addition to restaurant reservation domain 762 and reminder domain 764.

While FIG. 7C illustrates two example domains within ontology 760, other domains include, for example, "find a movie," "initiate a phone call," "find directions," "schedule a meeting," "send a message," and "provide an answer to a question," "read a list," "providing navigation instructions," "provide instructions for a task" and so on. A "send a message" domain is associated with a "send a message" actionable intent node, and further includes property nodes such as "recipient(s)," "message type," and "message body." The property node "recipient" is further defined, for example, by the sub-property nodes such as "recipient name" and "message address."

In some examples, ontology 760 includes all the domains (and hence actionable intents) that the digital assistant is capable of understanding and acting upon. In some examples, ontology 760 is modified, such as by adding or removing entire domains or nodes, or by modifying relationships between the nodes within the ontology 760.

In some examples, nodes associated with multiple related actionable intents are clustered under a "super domain" in ontology 760. For example, a "travel" super-domain includes a cluster of property nodes and actionable intent nodes related to travel. The actionable intent nodes related to travel includes "airline reservation," "hotel reservation," "car rental," "get directions," "find points of interest," and so on. The actionable intent nodes under the same super domain (e.g., the "travel" super domain) have many property nodes in common. For example, the actionable intent nodes for "airline reservation," "hotel reservation," "car rental," "get directions," and "find points of interest" share one or more of the property nodes "start location," "destination," "departure date/time," "arrival date/time," and "party size."

In some examples, each node in ontology 760 is associated with a set of words and/or phrases that are relevant to the property or actionable intent represented by the node. The respective set of words and/or phrases associated with each node are the so-called "vocabulary" associated with the node. The respective set of words and/or phrases associated with each node are stored in vocabulary index 744 in association with the property or actionable intent represented by the node. For example, returning to FIG. 7B, the vocabulary associated with the node for the property of "restaurant" includes words such as "food," "drinks," "cuisine," "hungry," "eat," "pizza," "fast food," "meal," and so on. For another example, the vocabulary associated with the node for the actionable intent of "initiate a phone call" includes words and phrases such as "call," "phone," "dial," "ring," "call this number," "make a call to," and so on. The vocabulary index 744 optionally includes words and phrases in different languages.

Natural language processing module 732 receives the token sequence (e.g., a text string) from STT processing module 730, and determines what nodes are implicated by the words in the token sequence. In some examples, if a word or phrase in the token sequence is found to be associated with one or more nodes in ontology 760 (via vocabulary index 744), the word or phrase "triggers" or "activates" those nodes. Based on the quantity and/or relative importance of the activated nodes, natural language processing module 732 selects one of the actionable intents as the task that the user intended the digital assistant to perform. In some examples, the domain that has the most "triggered" nodes is selected. In some examples, the domain having the highest confidence value (e.g., based on the relative importance of its various triggered nodes) is selected. In some examples, the domain is selected based on a combination of the number and the importance of the triggered nodes. In some examples, additional factors are considered in selecting the node as well, such as whether the digital assistant has previously correctly interpreted a similar request from a user.

User data 748 includes user-specific information, such as user-specific vocabulary, user preferences, user address, user's default and secondary languages, user's contact list, and other short-term or long-term information for each user. In some examples, natural language processing module 732 uses the user-specific information to supplement the information contained in the user input to further define the user intent. For example, for a user request "invite my friends to my birthday party," natural language processing module 732 is able to access user data 748 to determine who the "friends" are and when and where the "birthday party" would be held, rather than requiring the user to provide such information explicitly in his/her request.

Other details of searching an ontology based on a token string is described in U.S. Utility application Ser. No. 12/341,743 for "Method and Apparatus for Searching Using An Active Ontology," filed Dec. 22, 2008, the entire disclosure of which is incorporated herein by reference.

In some examples, once natural language processing module 732 identifies an actionable intent (or domain) based on the user request, natural language processing module 732 generates a structured query to represent the identified actionable intent. In some examples, the structured query includes parameters for one or more nodes within the domain for the actionable intent, and at least some of the parameters are populated with the specific information and requirements specified in the user request. For example, the user says "Make me a dinner reservation at a sushi place at 7." In this case, natural language processing module 732 is able to correctly identify the actionable intent to be "restaurant reservation" based on the user input. According to the ontology, a structured query for a "restaurant reservation" domain includes parameters such as {Cuisine}, {Time}, {Date}, {Party Size}, and the like. In some examples, based on the speech input and the text derived from the speech input using STT processing module 730, natural language processing module 732 generates a partial structured query for the restaurant reservation domain, where the partial structured query includes the parameters {Cuisine="Sushi"} and {Time="7 pm"}. However, in this example, the user's utterance contains insufficient information to complete the structured query associated with the domain. Therefore, other necessary parameters such as {Party Size} and {Date} is not specified in the structured query based on the information currently available. In some examples, natural language processing module 732 populates some parameters of the structured query with received contextual information. For example, in some examples, if the user requested a sushi restaurant "near me," natural language processing module 732 populates a (location) parameter in the structured query with GPS coordinates from the user device.

In some examples, natural language processing module 732 is configured to determine user intents (e.g., actionable intents) associated with performing a task using a device of an established location. In particular, ontology 760 includes domains or nodes related to performing a task using a device of an established location. For example, ontology 760 includes a "home" domain related to controlling a device associated with the user's home, or an "office" domain related to controlling a device associated with the user's office. Vocabulary index 744 includes words and phrases associated with devices in one or more established locations (e.g., homes, offices, businesses, and public institutions). For example, the words and phrases include command words such as "set," "open," "lock," "activate," "print," "turn on," or the like. Additionally, the words and phrases include device-related words such as "door," "thermostat," "toaster," "humidifier," or the like. In some examples, vocabulary index includes look-up tables, models, or classifiers that enable natural language process module 732 to determine one or more alternative terms for a given term. For example, vocabulary index 744 maps the term "thermostat" to one or more alternative terms such as "heater," "air conditioning," "A/C," "HVAC" and "climate control." User data 748 includes one or more data structures (e.g., data structure 900) that each represents a set of devices of a respective established location.

To determine an actionable intent associated with performing a task using a device of an established location, natural language processing module 732 is configured to determine one or more possible device characteristics and one or more candidate devices corresponding to user speech input. Natural language processing module 732 is further configured to determine overlapping device characteristics common to the one or more possible device characteristics and the actual device characteristics of the one or more candidate devices.

In some examples, natural language process module 732 is configured to determine one or more criteria defined in the user speech input. The one or more criteria are identified based on recognizing conditional terms (e.g., "when," "if," "once," "upon," etc.) in the user speech input. In some examples, determining the one or more criteria includes determining quantitative criteria corresponding to ambiguous qualitative phrases in the user speech input. For example, natural language process module 732 is configured to access one or more knowledge sources to determine that the ambiguous qualitative phrase "too hot" in the user speech input corresponds to the quantitative criteria of "greater than 90 degrees Fahrenheit." The one or more knowledge sources can, for example, include look-up tables that map qualitative terms (e.g., adjectives) to specific values or ranges of measurable characteristics. The one or more knowledges sources are stored on the digital assistant system (e.g., in memory 702) or on a remote system. In some examples, the one or more criteria are associated with a device of an established location. Natural language process module 732 is configured to determine the device associated with the one or more criteria using ontology 760, vocabulary index 744, and one or more data structures stored in user data 748.

In some examples, natural language processing module 732 passes the generated structured query (including any completed parameters) to task flow processing module 736 ("task flow processor"). Task flow processing module 736 is configured to receive the structured query from natural language processing module 732, complete the structured query, if necessary, and perform the actions required to "complete" the user's ultimate request. In some examples, the various procedures necessary to complete these tasks are provided in task flow models 754. In some examples, task flow models 754 include procedures for obtaining additional information from the user and task flows for performing actions associated with the actionable intent.

As described above, in order to complete a structured query, task flow processing module 736 needs to initiate additional dialogue with the user in order to obtain additional information, and/or disambiguate potentially ambiguous utterances. When such interactions are necessary, task flow processing module 736 invokes dialogue flow processing module 734 to engage in a dialogue with the user. In some examples, dialogue flow processing module 734 determines how (and/or when) to ask the user for the additional information and receives and processes the user responses. The questions are provided to and answers are received from the users through I/O processing module 728. In some examples, dialogue flow processing module 734 presents dialogue output to the user via audio and/or visual output, and receives input from the user via spoken or physical (e.g., clicking) responses. Continuing with the example above, when task flow processing module 736 invokes dialogue flow processing module 734 to determine the "party size" and "date" information for the structured query associated with the domain "restaurant reservation," dialogue flow processing module 734 generates questions such as "For how many people?" and "On which day?" to pass to the user. Once answers are received from the user, dialogue flow processing module 734 then populates the structured query with the missing information, or pass the information to task flow processing module 736 to complete the missing information from the structured query.

Once task flow processing module 736 has completed the structured query for an actionable intent, task flow processing module 736 proceeds to perform the ultimate task associated with the actionable intent. Accordingly, task flow processing module 736 executes the steps and instructions in the task flow model according to the specific parameters contained in the structured query. For example, the task flow model for the actionable intent of "restaurant reservation" includes steps and instructions for contacting a restaurant and actually requesting a reservation for a particular party size at a particular time. For example, using a structured query such as: {restaurant reservation, restaurant=ABC Café, date=3/12/2012, time=7 pm, party size=5}, task flow processing module 736 performs the steps of: (1) logging onto a server of the ABC Café or a restaurant reservation system such as OPENTABLE®, (2) entering the date, time, and party size information in a form on the website, (3) submitting the form, and (4) making a calendar entry for the reservation in the user's calendar.

In some examples, task flow processing module 736 employs the assistance of service processing module 738 ("service processing module") to complete a task requested in the user input or to provide an informational answer requested in the user input. For example, service processing module 738 acts on behalf of task flow processing module 736 to make a phone call, set a calendar entry, invoke a map search, invoke or interact with other user applications installed on the user device, and invoke or interact with third-party services (e.g., a restaurant reservation portal, a social networking website, a banking portal, etc.). In some examples, the protocols and application programming interfaces (API) required by each service are specified by a respective service model among service models 756. Service processing module 738 accesses the appropriate service model for a service and generate requests for the service in accordance with the protocols and APIs required by the service according to the service model.

For example, if a restaurant has enabled an online reservation service, the restaurant submits a service model specifying the necessary parameters for making a reservation and the APIs for communicating the values of the necessary parameter to the online reservation service. When requested by task flow processing module 736, service processing module 738 establishes a network connection with the online reservation service using the web address stored in the service model, and send the necessary parameters of the reservation (e.g., time, date, party size) to the online reservation interface in a format according to the API of the online reservation service.

In some examples, natural language processing module 732, dialogue flow processing module 734, and task flow processing module 736 are used collectively and iteratively to infer and define the user's intent, obtain information to further clarify and refine the user intent, and finally generate a response (i.e., an output to the user, or the completion of a task) to fulfill the user's intent. The generated response is a dialogue response to the speech input that at least partially fulfills the user's intent. Further, in some examples, the generated response is output as a speech output. In these examples, the generated response is sent to speech synthesis module 740 (e.g., speech synthesizer) where it can be processed to synthesize the dialogue response in speech form. In yet other examples, the generated response is data content relevant to satisfying a user request in the speech input.

For actionable intents and structured queries associated with performing one or more tasks using one or more devices of an established location, service processing module 738 is configured to cause the one or more tasks to be performed by the one or more devices of the established location. For example, service processing module 738 is configured to provide instructions or commands (e.g., via network(s) 110) to the one or more devices of the established location to cause the one or more devices to perform the one or more tasks.

Speech synthesis module 740 is configured to synthesize speech outputs for presentation to the user. Speech synthesis module 740 synthesizes speech outputs based on text provided by the digital assistant. For example, the generated dialogue response is in the form of a text string. Speech synthesis module 740 converts the text string to an audible speech output. Speech synthesis module 740 uses any appropriate speech synthesis technique in order to generate speech outputs from text, including, but not limited to concatenative synthesis, unit selection synthesis, diphone synthesis, domain-specific synthesis, formant synthesis, articulatory synthesis, hidden Markov model (HMM) based synthesis, and sinewave synthesis. In some examples, speech synthesis module 740 is configured to synthesize individual words based on phonemic strings corresponding to the words. For example, a phonemic string is associated with a word in the generated dialogue response. The phonemic string is stored in metadata associated with the word. Speech synthesis model 740 is configured to directly process the phonemic string in the metadata to synthesize the word in speech form.

In some examples, instead of (or in addition to) using speech synthesis module 740, speech synthesis is performed on a remote device (e.g., the server system 108), and the synthesized speech is sent to the user device for output to the user. For example, this can occur in some implementations where outputs for a digital assistant are generated at a server system. And because server systems generally have more processing power or resources than a user device, it is possible to obtain higher quality speech outputs than would be practical with client-side synthesis.

Additional details on digital assistants can be found in the U.S. Utility application Ser. No. 12/987,982, entitled "Intelligent Automated Assistant," filed Jan. 10, 2011, and U.S. Utility application Ser. No. 13/251,088, entitled "Generating and Processing Task Items That Represent Tasks to Perform," filed Sep. 30, 2011, the entire disclosures of which are incorporated herein by reference.

4. Processes for Operating a Digital Assistant

Figure 8:
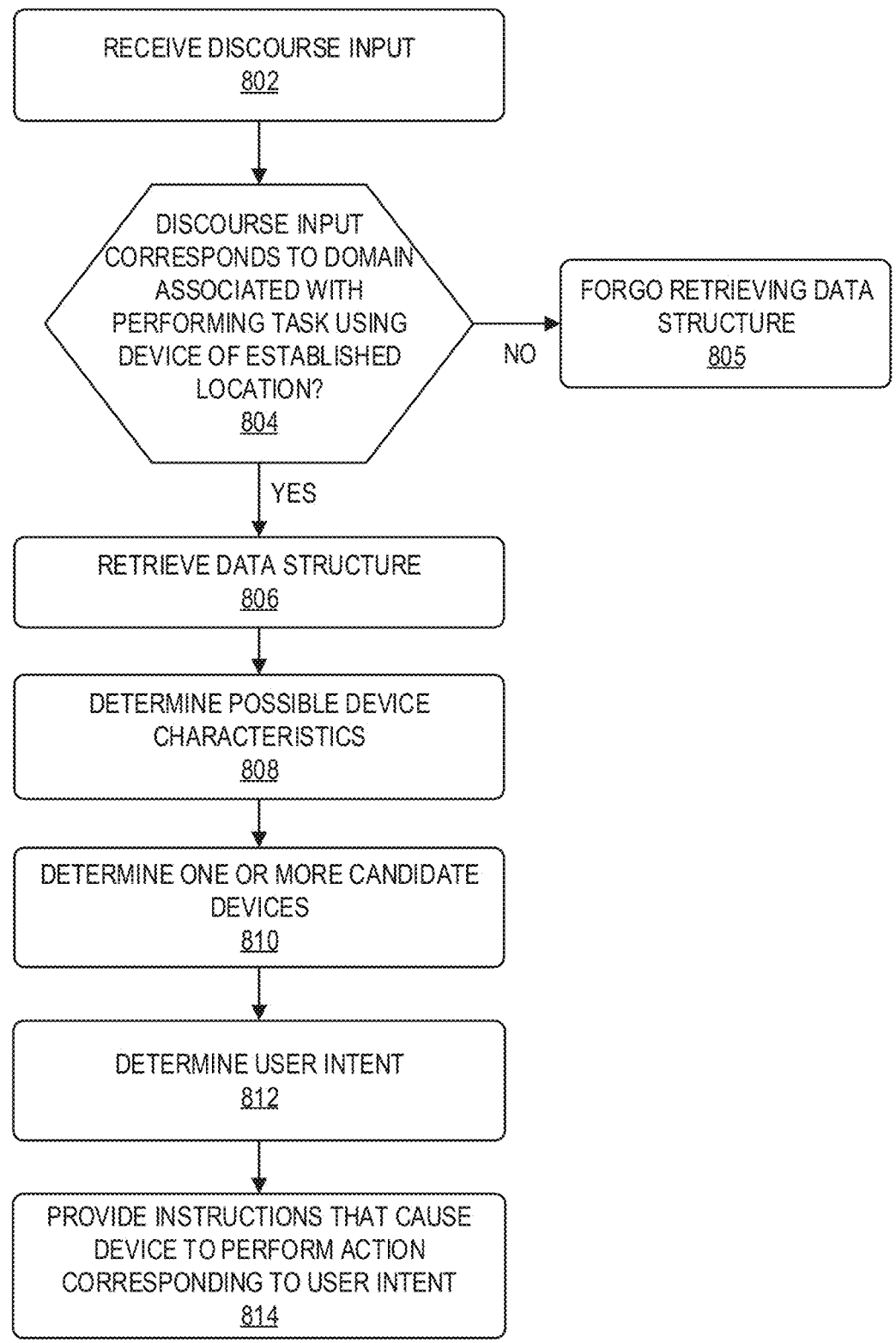
FIG. 8 illustrates a process for operating a digital assistant according to various examples.

FIG. 8 illustrates process 800 for operating a digital assistant according to various examples. Process 800 is performed, for example, using one or more electronic devices (e.g., devices 104, 106, 200, 400, or 600) implementing a digital assistant. In some examples, the processes is performed at a client-server system (e.g., system 100) implementing a digital assistant. The blocks of the processes can be divided up in any manner between the server (e.g., DA server 106) and the client (e.g., user device 104). In process 800, some blocks are, optionally, combined, the order of some blocks is, optionally, changed, and some blocks are, optionally, omitted. In some examples, only a subset of the features or blocks described below with reference to FIG. 8 is performed.

At block 802, discourse input representing a user request is received (e.g., at microphone 213 or at I/O processing module 728). The discourse input is, for example, speech input or text input. In addition, the discourse input is, for example, in natural language form. In some examples, the user request is a request for a device (e.g., devices 130, 132, 134, or 136) to perform an action. The device is a separate and different device from the electronic device (e.g., devices 104, 106, 200, 400, or 600) receiving or processing the discourse input. In some examples, the discourse input contains one or more ambiguous terms by virtue of being in natural language form. The one or more ambiguous terms, for example, each has more than one possible interpretation. For example, the discourse input is "Set the thermostat to sixty." In this example, the discourse input is ambiguous with respect to defining the device for performing the requested action. Specifically, in the context of an established location, such as the user's home, there can be several devices associated with the term "thermostat," such as a central heating unit, a bedroom space heater, or a living room air conditioning unit. It is thus ambiguous as to which device the user is referring to in the discourse input. Additionally, in the same example, the discourse input is ambiguous with respect to defining the specific action being requested. For example, one or more devices in the established location are capable of adjusting the temperature as well as the humidity. The discourse input is thus ambiguous as to whether the user wishes to adjust the temperature of a device to sixty degrees Fahrenheit or to adjust the humidity of a device to sixty percent relative humidity.

At block 804, a determination is made as to whether the discourse input corresponds to a domain that is associated with an actionable intent of performing a task using a device of an established location (e.g., the user's primary home, the user's office, the user's vacation home, etc.). The domain is a domain of an ontology (e.g., ontology 760). In one example, the domain is an "automation" domain corresponding to the actionable intent of controlling one or more devices in an established location. The determination at block 804 is, for example, performed using natural language processing (e.g., with natural language processing module 732, vocabulary 744, and user data 748). For instance, in the example "Set the thermostat to sixty," it can be determined based on the words "set," "thermostat," and "sixty" that the discourse input likely corresponds to the actionable intent of controlling a device (e.g., a thermostat) in the user's home. In this example, the actionable intent is thus associated with the "automation" domain.

As shown in FIG. 8, in response to determining that the discourse input corresponds to a domain that is associated with an actionable intent of performing a task with a device of an established location, block 806 is performed. In particular, block 806 is performed automatically without further input from the user in response to determining that the discourse input corresponds to a domain that is associated with an actionable intent of performing a task with a device of an established location. Alternatively, in response to determining that the discourse input does not correspond to a domain that is associated with an actionable intent of performing a task with a device of an established location, block 805 is performed. Specifically, at block 805, process 800 forgoes retrieving a data structure representing a set of devices of the established location.

At block 806, a data structure representing a set of devices of an established location is retrieved. In some examples, the data structure is retrieved from the user device (e.g., user data and models 231 of user device 200). In other examples, the data structure is retrieved from the server (e.g., data & models 116 of DA server 106). The data structure defines, for example, a hierarchical relationship between a plurality of regions in the established location. The data structure further defines the relationship of each device of the set of devices with respect to the plurality of regions.

The established location is a location associated with an establishment, such as a business organization, a household, or a public institution. For example, the established location is associated with the user who provided the discourse input (e.g., user's home, user's workplace, or user's vacation home). In other examples, the established location is associated with a public institution (e.g., a church, a school, or a library). In yet other examples, the established location is associated with a business (e.g., store, company office, restaurant, etc.).

In some examples, process 800 determines which data structure from among a plurality of data structures to retrieve. Each data structure of the plurality of data structures is associated with a respective established location. Process 800 determines a location corresponding to the discourse input. For example, process 800 determines a location of the user device (e.g., using GPS module 235) at the time the discourse input is received. An established location is then identified based on the location of the user device. For instance, in one example, it is determined that the location of the user device corresponds to the location of the user's home. Based on the determined established location, the corresponding data structure is identified and retrieved from the plurality of data structures. For example, the data structure representing the devices in the user's home is identified and retrieved.

Figure 9:
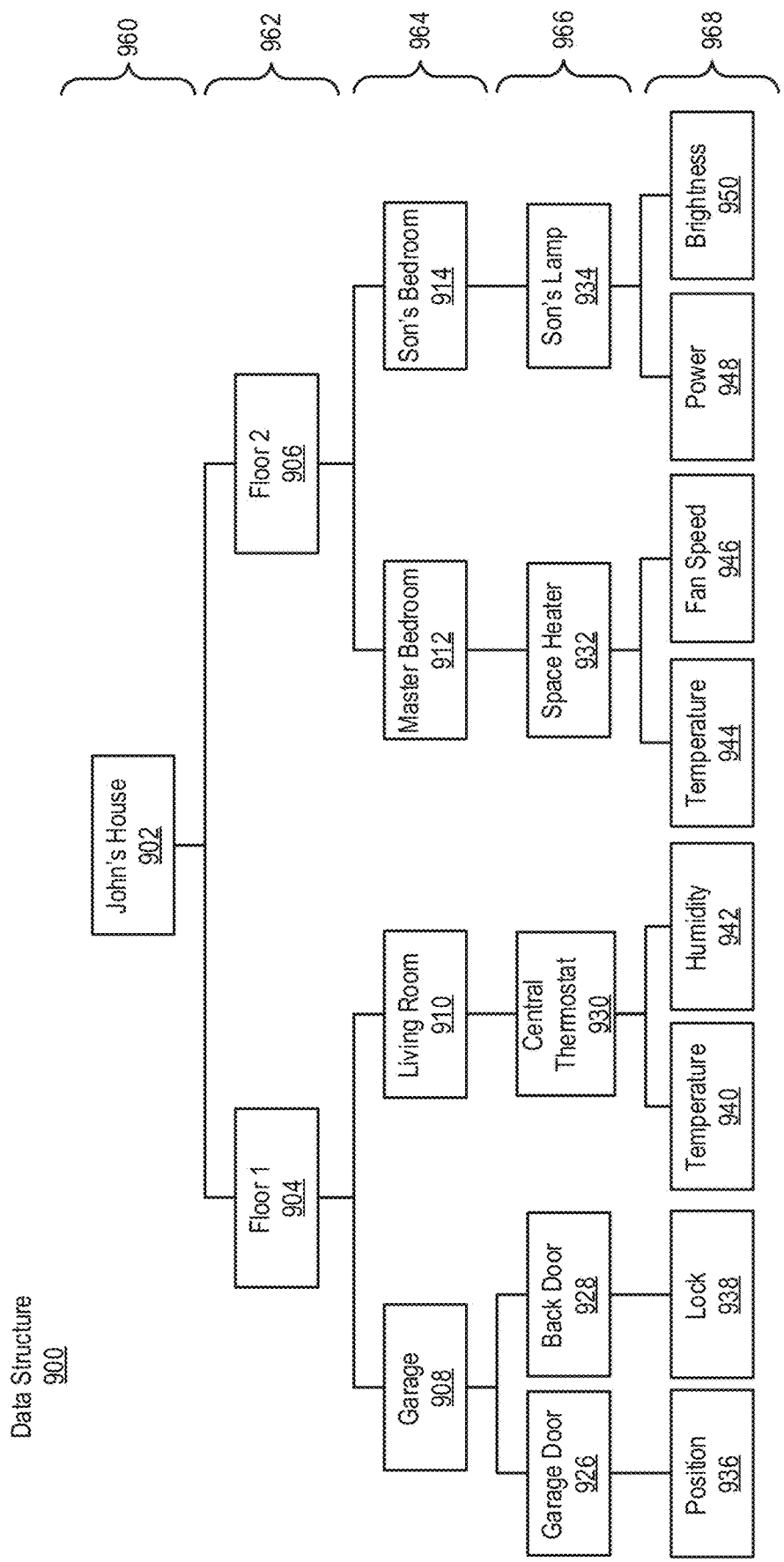
FIG. 9 is a hierarchical chart illustrating a data structure that represents a set of devices of an established location according to various examples.

FIG. 9 is a hierarchical chart illustrating exemplary data structure 900 that represents a set of devices of an established location, according to various examples. As shown, data structure 900 includes a plurality of nodes 902-950 organized in a hierarchical structure across levels 960-968. The organization of nodes 902-950 defines how the various devices (e.g., garage door, back door, central thermostat, space heater, and son's lamp) of the established location relate to the various regions (e.g., floor 1, floor 2, garage, living room, mater bedroom, and son's bedroom) of the established location. Specifically, the nodes of levels 960-

964 define how the various regions of the established location are organized. The root node of level 960 represents the established location (e.g., John's house) and the nodes of level 962 represent the major regions (e.g., floor 1 and floor 2) of the established location. The nodes of level 964 represent the sub-regions within each of the major regions. In the present example, the sub-regions include the separate rooms or living areas (garage, living room, master bedroom, and son's bedroom) in John's house. Although in the present example, data structure 900 includes one level (level 960) for the major regions and one level (level 964) for the sub-regions, it should be recognized that in other examples, the data structure includes any number of levels for organizing the various regions of an established location.

The nodes of level 966 define the device(s) associated with each region of level 964. For example, nodes 926 and 928 indicate that there is a garage door device and a back door device associated with the garage of John's house. Similarly, node 930 indicates that a thermostat is associated with the living room of John's house. The devices represented by nodes 908-914 are similar or identical to devices 130-136 of FIG. 1. For example, the devices represented by nodes 908-914 are communicatively coupled to an electronic device (e.g., user device 104) or server (e.g., DA server 106) via one or more networks (e.g., network(s) 110). The electronic device provides commands via the one or more networks that cause one or more of the devices of nodes 908-914 to perform an action defined by the user.

The nodes of level 968 define the actual device characteristics associated with each device of level 966. For example, node 936 indicates that the garage door device has the actual device characteristic of "position." Similarly, node 938 indicates that the back door device has the actual device characteristic of "lock." An actual device characteristic describes, for example, an actual function or characteristic of the device that can be controlled using the electronic device (e.g., devices 104, 200, 400, or 600). For example, the "position" of the garage door can be changed by controlling the garage door device or the back door can be "locked" or "unlocked" by controlling the back door device.

Each node of data structure 900 includes one or more stored attributes. For example, as shown in FIG. 9, user-defined identifiers (IDs) are stored in association with each node of levels 960-966. Specifically, node 902 includes the user-defined ID "John's house" that describes the established location. Similarly, each of nodes 904-914 includes a user-defined ID describing the respective region of the established location. For example, node 912 includes the user-defined ID "master bedroom" and node 914 includes the user-defined ID "son's bedroom." Further, each of nodes 926-934 includes a user-defined ID describing the respective device. For example, node 930 includes the user-defined ID "central thermostat" and node 934 includes the user-defined ID "son's lamp." In some examples, only data structures stored on the user device (e.g., user device 104) include user-defined IDs. Data structures stored on the server (e.g., DA server 106) include, for example, generic IDs such as "region 1" or "region 2" for nodes representing regions in the established location and "device 1" or "device 2" for nodes representing devices. In other examples, each device and each region in the data structure is identified with respect to a temporary session key associated with the received discourse input. This is desirable to preserve the user's privacy when data structure is stored on the server.

Each of nodes 902-934 further includes stored attributes (not shown) that define, for example, the region type for each region in the established location or the device type for each device in the established location. For example, "master bedroom" (node 912) and "son's bedroom" (node 914) each has a region type of "bedroom." Similarly, "central thermostat" (node 930) has a device type of "thermostat" and "son's lamp" (node 934) has a device type of "light." The region type and device type are standardized descriptions based on a list of standard region types and device types. Other examples of region types include "basement," "store room," "attic," "kitchen," or the like. Further examples of device types include "door lock," "humidifier," "music player," "toaster," or the like.

Nodes 926-934 further include additional stored attributes that indicate the operating states of each device with respect to the relevant device characteristic. For example, the "garage door" (node 936) has an operating status "open" or "closed" for the device characteristic "position." In another example, the "central thermostat" (node 930) has an operating status "73 degrees Fahrenheit" for the device characteristic "temperature" and "60%" with respect to the device characteristic "humidity." Additional examples of operating status include "locked" or "unlocked" with respect to the device characteristic "lock" (e.g., for a door lock device), "on" or "off" with respect to the device characteristic "power" (e.g., for a music player device), and "75%" with respect to the device characteristic "brightness" (e.g., for a dimmable lighting device).

The data structure is created (e.g., using devices 104 or 200 or server system 108) based on user input and/or data received from the devices of the established location. For example, a user device provides a user interface that enables the user to enter information for creating the data structure. Specifically, the user device receives, via the user interface, information regarding the various regions in the established location and the various devices of the established location. Further, the user device receives information that associates a particular device of the established location to one or more regions of the established location. For example, user input received via the user interface defines a region named "master bedroom" (e.g., node 912) and a device named "space heater" in the established location. The user input further associates the "space heater" device to the "master bedroom" region. In some examples, information in the data structure is auto-populated based on data received from the devices of the established location. For example, each device of the established location transmits various attributes associated with the device of the established location to the user device. Specifically, device IDs, device characteristics, operating statuses, or device types are transmitted to the user device. The user device then auto-populates this data into the respective data structure.

In some examples, the digital assistant of the user device automatically proposes additions or modifications to the data structure based on information received regarding the various devices of the established location. The received information includes, for example, device information defining a first device of the established location having a device ID "bedroom1_light" and a second device of the established location having a device ID "bedroom1_radio." Based on the common phrase "bedroom1" in each of the device IDs of the first and second devices, process 800 determines that both devices are likely associated with a common region "bedroom1" in the established location. Additionally or alternatively, the received information includes location information of the first and second devices. For example, the location information indicates that the first and second devices are disposed within a common region of the established location. In another example, the location information indicates that the first device and the second device are positioned within a threshold distance apart in the established location. Based on the location information, a relationship between the first device and the second device is determined with respect to one or more regions of the established location. For example, it is determined that the first and second devices are associated with the "bedroom1" region of the established location. Based on the determined relationship between the first and second devices, a prompt is provided to the user suggesting a modification to the data structure. For example, a prompt is provided asking the user "Would you like to create the room 'bedroom' that includes the devices 'bedroom1_light' and 'bedroom1_radio'?" A user input (e.g., selection of a user interface button) is received responsive to the provided prompt. The user input confirms the modification proposed by the prompt. In response to receiving the user input, the data structure is modified to define the determined relationship between the first device and the second device with respect to the established location. For example, a node representing the region "bedroom1" in the established location is created in the data structure. Additionally, the nodes representing the devices "bedroom1_light" and "bedroom1_radio" are associated with the node representing the region "bedroom1."

It should be appreciated that data structure 900, described above, is a non-limiting example of a data structure representing a set of devices of an established location and that various modifications and variations of data structure 900 are possible in view of the above description. For example, the data structure can include any number of nested levels of nodes. In some examples, one or more of the levels of nodes in data structure 900 are optionally removed, and/or additional levels of nodes are optionally added. In one example, the nodes of level 962 are optionally removed in data structure 900 and the nodes of level 964 are nested directly under the root node 902. In other examples, one or more additional levels of nodes representing sub-regions are optionally added to data structure 900. Specifically, one or more additional levels of nodes representing sub-regions are optionally included between levels 962 and 964, or between levels 964 and 966 of data structure 900. Further, it should be recognized that that in some examples, the nodes representing devices need not be nested under a node representing a major region or a sub region. For instance, in some examples, any one of nodes 926-934 in data structure 900 is optionally nested directly under root node 960 or a node of level 962.

At block 808, one or more possible device characteristics corresponding to the discourse input are determined. In particular, the words of the discourse input are parsed and analyzed to identify possible device characteristics related to the words and/or phrases in the discourse input. Block 808 is performed, for example, using a natural language processing module (e.g., natural language processing module 732) utilizing suitable models and vocabulary (e.g., vocabulary 744). In particular, a machine learning classifier of the natural language processing module, for example, processes the words of the discourse input and determine possible device characteristics associated with the words. In one example, the discourse input is "Open the door." In this example, the terms "open" and "door" are determined to each correspond to the possible device characteristics of "position" and "lock/unlock."

In some examples, each term of the discourse input is initially analyzed individually. For example, with reference to FIG. 10A, discourse input 1002 is "Set the thermostat to sixty percent." In this example, the term "set" is determined to correspond to a first set of possible device characteristics 1004 that includes "temperature," "humidity," "brightness," "volume," and "speed." The term "thermostat" is determined to correspond to a second set of possible device characteristics 1006 that include "temperature" and "humidity." The term "sixty" is determined to correspond to a third set of possible device characteristics 1008 that include "temperature," "humidity," and "brightness." The term "percent" is determined to correspond to a fourth set of possible device characteristics 1010 that include "brightness" and "humidity."

The one or more possible device characteristics are determined based on the sets of possible device characteristics (e.g., 1004, 1006, 1008, 1010) corresponding to the individual terms in the discourse input. For example, the one or more possible device characteristics determined at block 808 are a combination of the sets of possible device characteristics. In some examples, the one or more possible device characteristics are determined based on the frequency of each possible device characteristic among the sets of possible device characteristics. For example, the one or more possible device characteristics are determined to include the possible device characteristic "humidity," which has the greatest frequency across the sets of possible device characteristics 1004, 1006, 1008, 1010.

In some examples, the one or more possible device characteristics are determined based on the popularity of each possible device characteristic in the sets of possible device characteristics (e.g., 1004, 1006, 1008, 1010). The popularity refers to how frequently actions associated with a device characteristic are requested by a population of users. For example, if actions related to "temperature" are more frequently requested than actions related to the other device characteristics, the possible device characteristic "temperature" is weighted more heavily when determining the one or more possible device characteristics at block 808. In other examples, the one or more possible device characteristics are determined based on the salience of each term in the discourse input. For example, the term "thermostat" has the greatest salience among the terms in the discourse input and thus set of possible device characteristics 1006 is weighted more heavily than other sets of possible device characteristics when determining the one or more possible device characteristics at block 808. Thus, in this example, the one or more possible device characteristics more likely include the possible device characteristics of "temperature" and "humidity" from set of possible device characteristics 1006.

At block 810, one or more candidate devices from the set of devices are determined based on the data structure. The one or more candidate devices correspond to the discourse input. In some examples, block 808 is performed using a natural language processing module (e.g., natural language processing module 732) based on suitable models and vocabulary (e.g., vocabulary 744). In particular, a machine learning classifier of the natural language processing module, for example, processes the words of the discourse input and determine candidate devices from the set of devices in the data structure that most likely correspond to the discourse input. For example, in the discourse input "Set the thermostat to sixty percent," the word "thermostat" in the discourse input is recognized as being relevant and compared (e.g., based on semantic or syntactic similarity) to the various attributes and IDs of the nodes in the data structure to determine candidate devices corresponding to the discourse input. In particular, the devices "central thermostat" (e.g., node 930) and "space heater" (e.g., node 932) are determined as the one or more candidate devices based on the word "thermostat" in the discourse input.

In another example, the discourse input is "Set the living room to sixty percent." In this example, the word "living room" is recognized as being relevant and compared to the various attributes and IDs of the nodes in the data structure. In this example, "living room" in the discourse input is determined to correspond to the "living room" region (e.g., node 910) defined in data structure 900. Because "living room" region (e.g., node 910) is associated with the "central thermostat" device (e.g., node 930) in data structure 900, the one or more candidate devices are determined to include the "central thermostat device."

In some examples, the one or more candidate devices are determined based on one or more alternative terms derived from one or more terms in the discourse input. Returning to the example of the discourse input, "Set the thermostat to sixty percent," one or more alternative terms associated with "thermostat" are determined. In particular, "thermostat" is determined to be associated with the alternative terms "heater," "A/C," "radiator," "regulator," "thermometer," and "humidifier." In this example, the alternative terms are used to search the nodes of the data structure to determine the one or more candidate devices. For example, devices having user-defined device IDs "John's heater" and "office A/C" are identified based on the alternative terms, and the devices are included in the one or more candidate devices determined at block 808.

In some examples, the one or more alternative terms are based on phrases commonly used to refer to an action or device. For example, the discourse input "Open the door" can commonly be expressed as "Open the back," "Open the back door," "Open the back lock," "Open the lock," "Open the door lock," or "Open the bolt." In this example, the term "door" is determined to be associated with the alternative terms "back," "back door," "lock," "door lock," "back lock," "back door lock," and "bolt." Candidate devices are identified from the data structure using the alternative terms. For example, devices associated with user-defined IDs or other attributes containing the alternative terms "back," "lock," or "back door" in the data structure are identified and included in the one or more candidate devices.

The one or more alternative terms are determined using a look-up table, a model, or a classifier. In particular, the look-up table, model, or classifier associates a term with one or more alternative terms. The association is based on semantic mapping. In some examples, the association is user-defined. For example, prior to receiving the discourse input at block 802, a user input defining an alternative term is received. The user input can, for example, include speech stating "The 'television' can be called the 'telly.'" Based on the user input, the relevant look-up table, model, or classifier is updated such that "television" is associated with the alternative term "telly" and vice versa. Thus, the one or more alternative terms are based on the received user input.

In some examples, the one or more candidate devices are determined using retrieved context information. In one example, the discourse input is "Turn on John's lights." Process 800 determines that "lights" is associated with a lighting device represented in the data structure. However, there can be several lighting devices represented in the data structure. In this example, retrieved context information serves to reduce the number of identified candidate devices. Specifically, the term "John" is determined to be associated with contact information, and, in response, contact information on the user device is searched in accordance with the term "John." Through searching the contact information, information indicating that the user has a son named "John" is retrieved. The one or more candidate devices are thus determined based on this retrieved contact information. In particular, process 800 identifies from the data structure that the established location includes a region named "son's bedroom" (e.g., node 914 in FIG. 9), which is associated with the lighting device "son's lamp" (e.g., node 934). Thus, in this example, the one or more candidate devices are determined to include the device "son's lamp" in the son's bedroom.

It should be recognized that, in some examples, block 808 or 810 is integrated into block 812. For example, block 808 or 810 is performed as part of determining the user intent at block 812.

At block 812, a user intent corresponding to the discourse input is determined. The user intent refers to the inferred intent of the user in providing the discourse input. For example, the user intent is the actionable intent described above with reference to FIG. 7B. In a specific example, the inferred user intent corresponding to the discourse input "Open the door" is to have the back door of the user's house unlocked. The user intent is determined based on the one or more possible device characteristics of block 808 and one or more actual device characteristics of the one or more candidate devices of block 810.

In some examples, determining the user intent at block 812 includes determining a device from the one or more candidate devices. In particular, the candidate devices are narrowed down to the device that the user is most likely referring to. The determination is based on the one or more possible device characteristics and the one or more actual device characteristics of the one or more candidate devices of block 810. For example, one or more overlapping device characteristics that are common between one or more possible device characteristics and the one or more actual device characteristics are determined, and the device is determined based on the overlapping device characteristics.

Figure 10A:
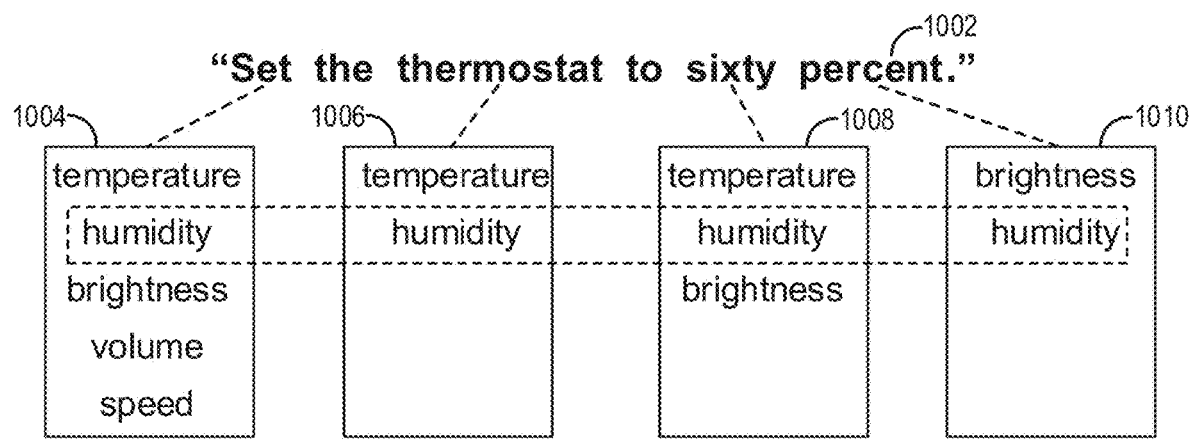
FIG. 10A illustrates possible device characteristics corresponding to an exemplary discourse input according to various examples.
Figure 10B:
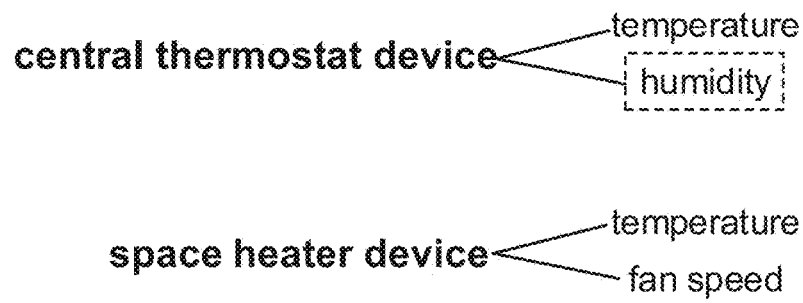
FIG. 10B illustrates actual device characteristics associated with devices represented in a data structure according to various examples.

In the example shown FIG. 10B, the one or more candidate devices are determined to include "central thermostat" (e.g., node 930) and "space heater" (e.g., node 932) based on the discourse input "Set the thermostat to sixty percent." According to data structure 900, the actual device characteristics of the candidate device "central thermostat" include "temperature" and "humidity" and the actual device characteristics of the candidate device "space heater" include "temperature" and "fan speed." Additionally, based on the most frequent device characteristic among the sets of possible device characteristics 1004-1010, the one or more possible device characteristic corresponding to the discourse input "Set the thermostat to sixty percent" are determined to be "humidity" (FIG. 10A). Thus, in this example, the one or more overlapping device characteristics that are common between one or more possible device characteristics and the one or more actual device characteristics are determined to be "humidity." Because the overlapping device characteristic "humidity" corresponds to a device characteristic of "central thermostat" (e.g., node 930) but not to any device characteristic of "space heater" (e.g., node 932), the one or more candidate devices are narrowed down to the device "central thermostat" (e.g., node 930) in the living room of the user's house. The user intent is thus determined based on the device "central thermostat" (e.g., node 930). Specifically, based on the device "central thermostat," the overlapping device characteristic "humidity," and the words "sixty percent" in the discourse input, it is determined that the user intent is to program the humidity setpoint of the central thermostat in the user's living room to the value of sixty percent.

In some examples, more than one candidate user intent is determined. For example, it may not be possible to narrow down the candidate devices to a single device based on the one or more overlapping characteristics. In one such example, based on the discourse input "Open the door," the one or more possible device characteristics are determined to include "position" and "lock." Additionally, based on data structure 900, the candidate devices "garage door" (e.g., node 926) and "back door" (e.g., node 928) having actual device characteristics "position" and "lock," respectively, are determined to correspond to the discourse input. In this example, the overlapping device characteristics that are common between the one or more possible device characteristics and the one or more actual device characteristics are determined to include "position" and "lock." It is thus not possible to narrow down the candidate devices "garage door" (e.g., node 926) and "back door" (e.g., node 928) based on these overlapping device characteristics. Specifically, two candidate user intents are determined based on the candidate devices "garage door" (e.g., node 926) and "back door" (e.g., node 928), the overlapping device characteristics "position" and "lock," and the word "open" in the discourse input. The first candidate user intent is to activate the garage door motor to lift open the garage door. The second candidate user intent is to unlock the back door entrance at the garage. In this example, additional information is required to disambiguate the user intent. In particular, the digital assistant retrieves additional information to determine a single user intent from the first and second candidate user intents. In some examples, the digital assistant automatically retrieves the additional information in response to determining more than one candidate user intent that cannot be disambiguated using the data structure.

In some examples, the user intent is disambiguated based on the position of the user at the time the discourse input was received. For example, a relative position of the user with respect to a region in the established location is determined. The user intent is then determined based on the determined relative position. For example, continuing with the discourse input of "Open the door," a determination is made that when the discourse input was received, the user was closer to the garage door (e.g., node 926) than the back door (e.g., node 928). The relative position of the user is determined based on location data (e.g., GPS data, etc.) from the user device or data from various sensors (e.g., proximity sensors, image sensors, infrared sensors, motion sensors, etc.) disposed in and around the established location. For example, a motion sensor in front of the garage door is triggered and thus it is determined based on data obtained from the motion sensor that that the user is outside of the house on the driveway in front of the garage door. Because the user is closer to the garage door than the back door, it is determined that the first candidate user intent is more likely than the second candidate user intent. As a result, the user intent is determined to be activating the garage door motor to lift open the garage door.

In other examples, the user intent is disambiguated based on the operating states of the candidate devices. In particular, the operating state of each of the one or more candidate devices is obtained. In some examples, the operating state is obtained from the data structure. In some examples, the devices of the established location transmit their operating states (e.g., periodically or when a change in operating state occurs) to the user device and the operating states is updated in the data structure. Referring back to the example where the discourse input is "Open the door," the operating states of the garage door (e.g., node 926) and the back door (e.g., node 928) are obtained from the data structure. The operating states indicate, for example, that the garage door is already open but the back door is locked. Because the garage door is already open, it is determined that the second candidate user intent of unlocking the back door entrance at the garage is more likely than the first candidate user intent of activating the garage door motor to lift open the garage door. Thus, based on the obtained operating states of the garage door and the back door, the user intent is determined to be unlocking the back door entrance at the garage.

In yet other examples, the user intent is disambiguated based on the salience of each action associated with the respective candidate user intent. For example, a first salience associated with opening the garage door and a second salience associated with unlocking the back door is determined. In the present example, the first salience is greater than the second salience because fewer users may request the back door to be unlocked than request the garage door to be opened. Also, the garage door is considered a more prominent feature of the garage than the back door. The candidate user intents are then ranked. In particular, based on the first salience being greater than the second salience, the first candidate user intent of activating the garage door motor to lift open the garage door is ranked higher than and the second candidate user intent of unlocking the back door entrance at the garage. As a result of the higher ranked first candidate user intent, the user intent is determined to be activating the garage door motor to lift open the garage door.

In some examples, the user intent is disambiguated based on additional information from the user. For example, dialogue (e.g., speech or text) is outputted on the user device. The dialogue requests clarification from the user regarding the user intent. For example, the dialogue asks the user whether the user wishes to "open the garage door" or "unlock the back door entrance." User input that is responsive to the output dialogue is received. For example, the user input is a selection of the user intent of "open the garage door" received via a user interface of the user device. Based on the user input, the user intent is disambiguated between the first and second candidate user intents. Specifically, consistent with the user's selection, the user intent is determined to be activating the garage door motor to lift open the garage door. It should be appreciated that disambiguating based on additional information from the user is disruptive to the user and can, in some cases, negatively impact user experience. Therefore, in some examples, prompting the user for additional information to disambiguate the user intent is performed as a last resort only when the user intent cannot be disambiguated based on other available sources of information (e.g., contextual information, operating state of the candidate device, salience of the action, position of the user, etc.). For example, a determination is made as to whether the two or more candidate user intents are disambiguated based on information accessible to the user device. Dialogue requesting for additional information is outputted only in response to determining that the two or more candidate user intents cannot be disambiguated based on information accessible to the user device.

At block 814, instructions that cause a device of the one or more candidate devices to perform an action corresponding to the user intent are provided. In particular, for the example discourse input of "Set the thermostat to sixty percent," the provided instructions cause the "central thermostat" (e.g., node 930) to change its humidity setpoint to sixty percent. For the other example discourse input of "Open the door," the provided instructions cause the garage door motor to lift open the garage door. In some examples, the instructions are transmitted directly to the respective device (e.g., the thermostat or the garage door motor) to cause the device to perform the relevant action. In other examples, the instructions are transmitted to the user device and the instructions cause the user device to transmit a command to the respective device to perform the relevant action.

In some examples, the instructions are provided in response to receiving a user confirmation. In particular, prior to providing the instructions, dialogue (e.g., speech or text) confirming the action to be performed and the device performing the action is outputted. For example, the dialogue asks the user "Would you like to set the humidity of the living room thermostat to sixty percent?" or "Open the garage door?" A user input that is responsive to the output dialogue is received. The user input confirms or rejects the output dialogue. In one example, the user input is the speech input "yes." In response to receiving user input confirming the output dialogue, the instructions are provided. Conversely, in response to receiving user input rejecting the output dialogue, process 800 forgoes providing the instructions.

In some examples, the user programs the user device to recognize a custom command that causes the operating states of a plurality of devices in the established location to be set in a predetermined manner. Such a set of predetermined operating states for the plurality of devices is referred to as a scene. For example, the user creates the custom scene command "party time" where in response to receiving this custom command, instructions are provided that cause the living room music player to turn on, the living room lights to dim to a brightness of 15%, and the living room disco ball to turn on. These predefined operating states of the living room music player, the living room lights, and the living room disco ball are stored in association with the custom scene command "party time."

In some examples, the digital assistant detects, in associated with an event, one or more user inputs for setting the operating states of a plurality of devices and then prompts the user to create a corresponding custom scene command. For example, the one or more user inputs are provided by the user to, for example, turn on the kitchen and living room lights, set the thermostat to 75 degrees, and turn on the living room television. In some examples, the one or more user inputs are detected by detecting one or more corresponding changes in the operating states of the devices. In addition, the one or more user inputs are associated with the event of the user arriving home. For example, the one or more user inputs are detected within a predetermined duration after detecting one or more events related to the user arriving home. The one or more events include, for example, detecting a proximity sensor being activated in the garage or detecting the back door entrance being opened. In response to detecting the one or more user inputs in associated with the event, a prompt is provided. The prompt asks whether the user wishes to store the respective operating states of the plurality of devices in association with a custom scene command. For example, the prompt is "I noticed that upon arriving home, you turned on the kitchen and living room lights, set the thermostat to 75 degrees, and turned on the living room television. Would you like to create an "arrive home" scene with these device settings?" User input responsive to the prompt is received. For example, the user confirms or rejects the prompt to create a custom scene command associated with a set of operating states of a plurality of devices. In response to receiving a user input that confirms the prompt, the respective operating states of the plurality of devices are stored in association with the custom scene command such that in response to receiving the custom scene command, the user device causes the plurality of devices to be set to the respective operating states. Conversely, in response to receiving a user input that rejects the prompt, process 800 forgoes storing the respective operating states of the plurality of devices in association with the custom scene command.

In some examples, the digital assistant detects, in association with an existing scene, user input that causes an additional device in the set of devices to be set to a particular operating state and then prompt the user to modify the existing scene to include setting the additional device to the particular operating state. For example, the scene command "party time" is received from the user and in response to receiving the scene command, instruction are provided to cause the living room music player to turn on, the living room lights to dim to a brightness of 15%, and the living room disco ball to turn on. Then, within a predetermined duration of receiving the "party time" scene command, user input that causes the living room air conditioning to be set to 70 degrees is detected. For example, a change in the setpoint of the living room air conditioning to 70 degrees is detected. In response to detecting the user input, a prompt is provided to the user. The prompt asks whether the user wishes to store the operating state "70 degrees" of the living room air conditioning device in association with the custom scene command "party time." For example, the prompt asks "Do you wish to add setting the living room air conditioning to 70 degrees to the 'party time' scene?" User input that is responsive to the prompt is received. The user input confirms or rejects the prompt. In response to receiving user input confirming the prompt, the operating state "70 degrees" of the living room air conditioning device is stored in association with the custom "scene" command. After the storing, in response to receiving the custom scene command "party time," instructions are provided (e.g., by the user device or server) to cause the living room music player to turn on, the living room lights to dim to a brightness of 15%, the living room disco ball to turn on, and the living room air conditioning to be set to 70 degrees. Conversely, in response to receiving user input rejecting the prompt, process 800 forgoes storing the operating state "70 degrees" of the living room air conditioning device in association with the custom "scene" command.

Figure 11:
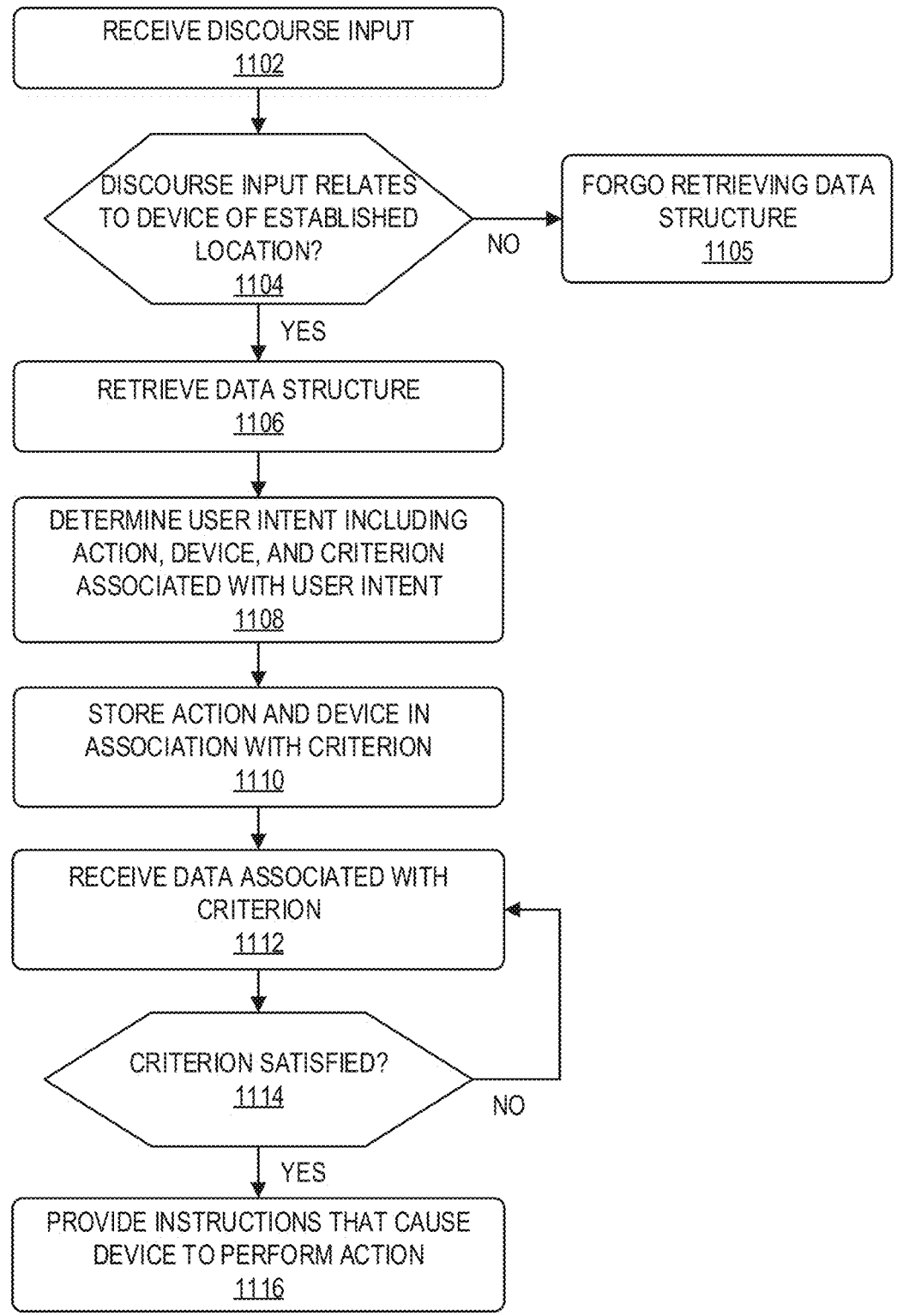
FIG. 11 illustrates a process for operating a digital assistant according to various examples.

FIG. 11 illustrates process 1100 for operating a digital assistant according to various examples. Process 1100 is performed, for example, using one or more electronic devices (e.g., devices 104, 106, 200, 400, or 600) implementing a digital assistant. In some examples, the processes is performed at a client-server system (e.g., system 100) implementing a digital assistant. The blocks of the processes can be divided up in any manner between the server (e.g., DA server 106) and the client (e.g., user device 104). In process 1100, some blocks are, optionally, combined, the order of some blocks is, optionally, changed, and some blocks are, optionally, omitted. In some examples, only a subset of the features or blocks described below with reference to FIG. 11 is performed. Further, one of ordinary skill would appreciate that the details of process 800 described above are also applicable in an analogous manner to process 1100 described below. For example, process 1100 optionally includes one or more of the characteristics of process 800 described above (and vice versa). For brevity, these details are not repeated below At block 1102, discourse input representing a user request is received. Block 1102 is similar or identical to block 802 described above. For example, the discourse input is speech input or text input and is in natural language form. In some examples, the user request defines a request for a device of an established location (e.g., devices 130, 132, 134, or 136) to perform an action. Additionally, the user request defines a criterion that is required to be satisfied prior to performing the action. In some examples, the criterion is associated with a second device of the established location. For example, the discourse input is "Close the blinds when it reaches 80 degrees."

At block 1104, a determination is made as to whether the discourse input relates to a device of an established location. Specifically, the determination includes determining whether the discourse input is requesting for a device of an established location to perform an action. Block 1104 is similar or identical to block 804, described above. For example, a determination is made as to whether the discourse input corresponds to a domain that is associated with an actionable intent of performing a task using a device of the established location. The discourse input is determined to relate to a device of the established location if the discourse input is determined to correspond to such a domain. In response to determining that the discourse input relates to a device of an established location, block 1106 is performed. Conversely, in response to determining that the discourse input does not relate to a device of an established location, block 1105 is performed. In particular, at block 1105, process 1100 forgoes retrieving a data structure representing a set of devices of the established location.

At block 1106, a data structure representing a set of devices of the established location is retrieved. Block 1106 is similar or identical to block 806, discussed above. In particular, the data structure is retrieved from the user device (e.g., user data and models 231 of user device 200) or from the server (e.g., data & models 116 of DA server 106). In some examples, the data structure defines a hierarchical relationship between a plurality of regions in the established location. The data structure further defines the relationship of each device of the set of devices with respect to the plurality of regions. The data structure is similar or identical to data structure 900 described with reference to FIG. 9.

At block 1108, a user intent corresponding to the discourse input is determined using the data structure retrieved at block 1106. Block 1108 is performed using natural language processing (e.g., with natural language processing module 732, vocabulary 744, and user data 748). The user intent is associated with an action to be performed by a device of the established location. Determining the user intent thus includes determining, based on the discourse input and the data structure, the action to be performed by the device (e.g., as described in block 812). For example, it is determined from the discourse input of "Close the blinds when it reaches 80 degrees" and based on the data structure that the action to be performed by the device is actuating the blinds to cause the blinds to close.

Determining the action to be performed by the device includes determining one or more possible device characteristics corresponding to the discourse input (e.g., as described in block 808). For example, based on the phrase "close the blinds" in the discourse input, the one or more possible device characteristics are determined to include "position." Determining the action to be performed by the device further includes determining, based on the data structure, one or more candidate devices of the established location (e.g., as described in block 810) that correspond to the discourse input. For example, based on the phrase "close the blinds" in the discourse input, the one or more candidate devices are determined to include one or more "blinds" represented in the data structure that have an operating status of "open." The device performing the action is then determined from the one or more candidate devices. For example, the device is determined from the one or more candidate devices based on one or more overlapping device characteristics that are common between the one or more possible device characteristics and one or more actual device characteristics of the one or more candidate devices (e.g., as described in block 812). In examples where disambiguation is required between multiple actions or devices, additional information (e.g., context information, operating state of the candidate devices, salience of the actions, position of the user, etc.) is retrieved. As discussed above in block 812, the additional information is used to disambiguate between the multiple actions or devices and determine an intended action to be performed by a device of the established location.

The action to be performed by the device of the established location includes causing at least a portion of the device to change positions. In particular, the action includes actuating the device to cause at least a portion of the device to change positions. For example, based on the discourse input of "Close the blinds when it reaches 80 degrees," the action is determined to include actuating the blinds to cause the blinds to change from an open position to a closed position. Similarly, for the discourse input "Close the garage door after I enter the house," the action is determined to include activating the garage motor to cause the garage door to change from an open position to a closed position.

In some examples, the action to be performed by the device causes a device to lock or unlock. For example, based on the discourse input of "Open the gate when the gardener arrives," the action is determined to include unlocking the side gate of the established location. Other example discourse inputs that correspond to an action that causes a device of the established location to lock or unlock include "Lock the safe when I leave the house" or "Lock all the doors and windows when I go to bed."

In some examples, the action to be performed by the device causes the device to be activated or deactivated. For example, based on the discourse input of "Turn on the alarm when I leave the house," the action is determined to include activating the house alarm. Other exemplary actions that cause the device to activate or deactivate include turning the power of a device on or off, placing a device in an "active" mode or a "sleep," or causing a device to "arm" or "disarm."

In some examples, the action to be performed by the device causes a setpoint of the device to change. For example, based on the discourse input of "Set the thermostat to 76 when I get home," the action is determined to include causing the temperature setpoint of the thermostat to change. Other exemplary actions that cause a setpoint of the device to change include setting the humidity of a humidifier or setting the temperature of an oven. In yet other examples, the action to be performed by the device causes a parameter value of the device to change. For example, the action causes the volume level of a music player to change to a particular value (e.g., 1-10), the fan speed of a fan to change to a particular setting (e.g., high, medium, low), the sprinkler duration of a sprinkler station to change to a particular duration, or a window to open by a certain percentage. In some examples, the action is defined in the discourse input using relative or ambiguous terms. For example, in the discourse input "Make the television louder when the train goes by," the term "louder" is a relative term that is ambiguous. Process 1100 can determine a definite action corresponding to such a discourse input having relative or ambiguous terms. Specifically, in the present example, process 1100 can determine that the action includes causing the volume level of the television to increase by a predetermined amount relative to the current volume level or relative to a detected ambient noise level.

In some examples, the user intent is associated with a criterion to be satisfied prior to performing the action. In these examples, determining the user intent further includes determining, based on the discourse input and the data structure, the criterion to be satisfied prior to performing the action. For example, returning to the discourse input of "Close the blinds when it reaches 80 degrees," it is determined based on the discourse input and the data structure that the criterion to be satisfied prior to closing the blinds is the detecting of a temperature value being equal to or greater than 80 degrees Fahrenheit at a particular temperature sensor in the established location.

The criterion is associated with a device characteristic of a second device of the established location. For example, the criterion of the discourse input "Close the blinds when it reaches 80 degrees," is associated with the device characteristic "temperature" of the temperature sensor in the established location. Determining the user intent includes determining, based on the discourse input and data structure, the device characteristic of the second device associated with the criterion. The second device is determined in a similar manner as discussed above in blocks 808-812. In particular, one or more second possible device characteristics and one or more second candidate devices are determined from the portion of the discourse input defining the criterion. The second device is then determined based on one or more second overlapping device characteristics that are common between the one or more second possible device characteristics and one or more actual device characteristics of the one or more candidate devices (e.g., as described in block 812). Further, in some examples, the relationship of the second device with respect to the device performing the action is considered when determining the second device. For example, if there are two thermostats that cannot be disambiguated based on the data structure, the second device is determined to be the thermostat that is positioned closer to the blinds or associated with the same region as the blinds.

In some examples, the criterion is associated with an operating state of the second device. In particular, the criterion includes the requirement that the operating state of the second device be equal to a reference operating state. For example, the discourse input is "Set the thermostat to 72 degrees when the garage door is open." In this example, the criterion is detecting the garage door having the operating status of "open." More specifically, the criterion includes the requirement that the operating state of the second device transitions from a second reference operating state to a third reference operating state. For example, the criterion includes detecting the operating state of the garage door transitioning from a "closed" operating state to an "open" operating state. In another example where the discourse input is "Turn on the living room lights when the television is turned on," the criterion includes detecting the operating state of the television transitioning from an "off" operating state to an "on" operating state.

In some examples, the criterion includes the requirement that an actual value representing the device characteristic be greater than, equal to, or less than a threshold value. For example, the discourse input is "Close the window when the temperature drops below 68 degrees." In this example, the criterion is associated with the device characteristic of "temperature" for a temperature sensor of the established location. Specifically, the criterion includes detecting that the actual value (e.g., the temperature reading) representing the device characteristic "temperature" of an electronic thermometer is less than the threshold value of 68 degrees.

In some examples, the criterion is defined in the discourse input using one or more relative or ambiguous terms. Examples of discourse input that define the criterion using one or more relative or ambiguous terms include "Close the blinds when it's sunny outside," "turn on the heater when it's cold," "turn up the volume of the television when it gets noisy." Specifically, in these examples, the criterion is defined in the discourse input using relative or ambiguous terms, such as "sunny," "cold," and "noisy." As discussed in greater detail below, process 1100 can determine a definite criterion from the discourse input despite the use of relative or ambiguous terms in the discourse input to define the criterion.

In some examples, determining the user intent includes determining, based on the discourse input, the threshold value associated with the criterion. In particular, the threshold value is ambiguous in the discourse input and thus a quantitative threshold value may need to be interpreted from the discourse input. For example, the discourse input is "Turn on the kitchen fan when it gets too hot." In this example, based on the words "when it gets too hot," the criterion is determined to be detecting the temperature of an electronic thermometer exceeding a threshold value. The threshold value is determined based on the phrase "too hot" and one or more knowledge sources. Specifically, information from the one or more knowledge sources is retrieved in accordance with the phrase "too hot." The knowledge sources can, for example, provide the historical temperature distribution of the established location and thus the threshold value is determined to be a predetermined percentile (e.g., $80^{th}$ percentile or $90^{th}$ percentile) of the temperature distribution. In another example, the knowledge source associates the term "hot" to a numeric threshold value of a corresponding device characteristic. For example, "hot" is associated with greater than 90 degrees measured at an electronic thermometer of the established location. Similarly, for other example discourse inputs where a criterion is defined based on an ambiguous adjective, the knowledge sources provide a corresponding threshold value for the respective device characteristic. For example, based on the knowledge sources, the criterion "when it's dark" is associated with less than 0.2 lux and the criterion "when it's noisy" is associated with greater than 90 decibels.

It should be recognized that the criterion can be associated with any device characteristic of any sensor of the established location. The sensor, for example, is a standalone sensor of the established location (e.g., standalone electronic thermometer, standalone light sensor, standalone motion sensor, etc.) or a sensor integrated in a device of the established location (e.g., thermometer of the thermostat for the central heater, photodiode of the nightlight, etc.) For example, the criterion is associated with the device characteristic of "humidity" for a humidity sensor of the established location. In particular, the discourse input is "Close the bathroom window when it starts raining," or "Turn on the humidifier when it gets too dry." As discussed above, corresponding quantitative values for the ambiguous criterion "too dry" or "starts raining" are determined based on the one or more knowledge sources. For example, "too dry" is determined to correspond to the criterion of detecting a relative humidity of less than a predetermined threshold value (e.g., 25%). Similarly, "starts raining" is determined to correspond to the criterion of detecting a relative humidity equal to 100% at a humidity sensor or detecting moisture content greater than a predetermined threshold value (e.g., 50%) at a moisture sensor of the established location.

In some examples, the criterion is associated with the device characteristic of "brightness" for a brightness sensor (e.g., light sensor, photodiode) of the established location. In particular, the discourse input is "Turn on the living room lights once it gets dark," "Close the blinds if there's direct sunlight," or "Bring down the shades half way when it gets too bright." In these examples, corresponding quantitative values for the ambiguous criteria "dark," "direct sunlight," or "too bright" are determined. For example, "dark" is determined to correspond to the criterion of detecting a brightness of less than a predetermined value (e.g., 0.2 lux) at a brightness sensor of the established location. Similarly, "direct sunlight" or "too bright" corresponds to the criterion of detecting a brightness of greater than a second predetermined value (e.g., 25000 lux).

In some examples, the criterion is associated with the device characteristic of "air quality" for an air quality sensor of the established location. The air quality sensor can, for example, be a particulate sensor that measures the size and concentration of particles in the air or a gas sensor for measuring the concentration of one or more specific gases (e.g., carbon monoxide, ozone, nitrogen dioxide, sulfur dioxide, acetone, alcohols, etc.). Exemplary discourse inputs having criteria associated with the device characteristic of "air quality" for an air quality sensor of the established location include "Turn on the air filter when the air quality is unsafe" or "Close the window when dangerous gases are detected." In these examples, the criterion is detecting (e.g., at an air quality sensor of the established location) a particulate level or a concentration level of a specific gas in the air that exceeds a predetermined threshold value.

In some examples, the criterion is associated with an authentication characteristic of an authentication device at the established location. The authentication characteristic is for example, a voiceprint, passcode, fingerprint, personal identification number, or the like. The authentication device is a device configured to obtain or receive authentication data (e.g., camera, capacitive touch sensor, microphone, keypad, security console, etc.). For example, the discourse input is "Open the door when the baby sitter arrives," or "Unlock the door when John arrives." In these examples, the criterion includes a requirement that a confidence value associated with the authentication characteristic of the authentication device be greater than or equal to a predetermined threshold value. For example, the baby sitter or John interacts with an authentication device at the front door of the established location to provide authentication data (e.g., voice sample, fingerprint, passcode, facial image, etc.). The authentication data is processed and compared with reference authentication data (e.g., reference voiceprint, reference fingerprint, reference passcode, etc.) to determine a confidence value. Specifically, the confidence value represents a probability that authentication data received from the authentication device matches reference authentication data. In these examples, the criterion for opening or unlocking the door is obtaining a confidence value that is greater than or equal to a predetermined threshold value.

In some examples, the criterion is determined using retrieved context information. In particular, the discourse input defines the criterion using one or more relative or ambiguous terms and determining the criterion requires, for example, utilizing context information to disambiguate the one or more relative or ambiguous terms. For instance, in one example, the discourse input is "Open the door when she arrives." In this example, the discourse input defines the criterion for opening the door using the ambiguous term "she." Determining the criterion thus requires disambiguating the term "she" using, for example, context information. In one example, prior to receiving the discourse input, a text message is received from the babysitter stating that she will be arriving in 15 minutes. Specifically, while the electronic device is displaying the text message from the babysitter, the discourse input "Open the front door when she arrives" is received from the user. In this example, the text message from the babysitter is context information that can be used to disambiguate the term "she" in the discourse input. In particular, based on the text message, a determination is made that "she" refers to the babysitter. Thus, in this example, based on the discourse input and the text message, the criterion is determined to include receiving authentication data corresponding to the babysitter at an authentication device associated with the front door of the user's house.

In some examples, the criterion includes the requirement that the action was performed less than a predetermined number of times within a predetermined period of time. For example, the discourse input is "Allow Owen access to the TV three times a week." In this example, the criterion requires the determination that access to the TV was provided less than three times to an individual identified as Owen within the current week. In another example, the discourse input is "Allow the babysitter in once a day from 3-4 pm." In this example, the criterion includes the determination that the front door was unlocked for less than one time from 3-4 pm that day for an individual identified as the baby sitter. It should be recognized that in these examples, the criterion further includes confirming the identity of the individual (e.g., "Owen" and "baby sitter"). In particular, the identity of the individual (e.g., Owen or the baby sitter) is confirmed based on authentication data received from the individual. For example, it is determined that authentication data received from an individual at the front door between 3-4 pm corresponds to the baby sitter. The front door is then unlocked if it is determined that the front door was unlocked for less than one time from 3-4 pm that day for the baby sitter.

In some examples, the criterion includes the requirement that a time indicated on the electronic device be equal to or after a reference time or within a range of reference times. The reference time is with respect to hours and minutes or with respect to a particular date. In some examples, the reference time is an absolute time. For example, the discourse input is "Turn on the porch light at 7 pm." In this example, the criterion includes detecting that the current time is equal to 7 pm. In another example, the discourse input is "Close the garage door after 7 pm." In this example, the criterion is detecting that the current time is after 7 pm. In yet another example, the discourse input is "Turn on the night light from 10 pm to 7 am." In this example, the criterion is detecting that the current time is within the range of times 10 pm to 7 am.

In some examples, determining the user intent includes determining the reference time from the discourse input. In particular, for the discourse input "Turn on the Christmas lighting on Christmas Eve," a database search is performed to determine that "Christmas Eve" refers to December $24^{th}$. Further, a determination is made that the action of turning on the lights is one that is typically performed in the evening.

Based on this determination, it is determined that the reference time is at dusk (e.g., 5 pm) on December 24th. In other examples, the discourse input is "Disable the sprinklers on Chinese New Year" or "Turn off the porch light during the next full moon." In these examples, the relevant date corresponding to "Chinese New Year" and "next full moon" is obtained and thus the reference time is determined based on the relevant date.

In some examples, the discourse input specifies a relative time rather than an absolute time. For example, the discourse input is "Turn on the Christmas lights two weeks before Christmas." In this example, process 1100 first determines an initial reference time corresponding to "Christmas" (December 25th) and then determine a duration associated with the initial reference time in the discourse input (e.g., two weeks). The reference time associated with the criterion is thus determined based on the initial reference date and the duration. Specifically, the reference time is determined to be December 11th, which is two weeks before Christmas (December 25th). In this example, the determined criterion in the discourse input is thus detecting that the current time is equal to the reference time of December 11th.

In some examples, the user intent is associated with more than one criterion to be satisfied prior to performing the action. For example, the discourse input "Allow John to turn on the television once a day between 3 to 5 pm" includes three criteria: an authentication criterion of successfully authenticating that the requestor is "John," a time criterion of being within the time range of 3 to 5 pm, and a frequency criterion of having turned on the television for John less than once within the time range of 3 to 5 pm that day. In another example, the discourse input "Let the house cleaner in between 9 to 10 am" includes multiple authentication criteria, which include detecting by a proximity sensor a person standing at the front door, successfully authenticating the person based on authentication data received at an authentication device by the front door, and receiving a text message from a device associated with the house cleaner.

In some examples, the user intent is associated with a first criterion and a second criterion and satisfying the second criterion requires the first criterion to be satisfied. For example, the discourse input is "Turn on the sprinklers 15 minutes after I leave the house." In this example, the discourse input defines two criteria. The first criterion requires detecting the user leaving the house (e.g., using motion sensors and/or based on the garage door opening and closing). The second criterion requires the current time be equal to a reference time that is 15 minutes after the time when the user is detected to leave the house. In this example, the second criterion cannot be satisfied without the first criterion being satisfied since the second criterion is based on a reference time that is relative to the first criterion being satisfied.

Although the examples described above are mainly directed to actions performed by devices of an established location, it should be recognized that, in some examples, the user intent is associated with an action performed by a device separate from the set of devices of the established location. In particular, the device may not be represented in the data structure. For example, the user intent is associated with an action performed by the user device (e.g., user device 104) or the server (e.g., DA server 106). In one such example, the action includes causing a notification associated with the criterion to be provided. For example, based on the discourse input "Tell me when the front door is open," the determined user intent is associated with the criterion of detecting the front door being opened. The action to be performed by the user device upon determining that the criterion is satisfied includes causing a notification (e.g., text or speech) to be provided at the user device. The notification indicates that the front door has been opened. Other examples of discourse inputs corresponding to actions performed by the user device include "Text the baby sitter the entry passcode when she arrives," "Alert me when the home alarm is triggered," "Tell me when someone turns on the television," "Call the fire department when the smoke detector goes off." In these examples, the criterion is associated with a device of the established location, whereas the action is to be performed by the user device.

At block 1110, the determined action and the determined device to perform the action are stored in association with the determined criterion. For example, instructions are stored based on the determined action, device, and criterion. In particular, the instructions cause the user device to continuously or periodically monitor data associated with the criterion to determine whether the criterion is satisfied. The data associated with the criterion is, for example, data of the user device, data from a sensor of the established location, or data indicating the operating state of a device at the established location. In some examples, the data associated with the criterion is actively retrieved by the device. In some examples, the device passively receives the data associated with the criterion and analyzes the data to determine whether the criterion is satisfied.

The stored instructions further cause the user device to perform a task in response to determining that the criterion is satisfied. For example, the instructions cause the user device to transmit a command that causes the action to be performed by the device. The action is thus performed by the device in accordance with a determination that the criterion is satisfied.

At block 1112, data associated with the criterion is received. As discussed above, the data is received from a device of the established location. In particular, returning to the example discourse input "Close the blinds when it reaches 80 degrees," the received data is temperature data from the thermostat of the established location. The temperature data is periodically transmitted by the thermostat and received by the user device. In some examples, the user device actively retrieves the temperature data from the thermostat. In other examples, the data is data generated or obtained from the user device (e.g., time data, email data, messages data, location data, sensors data, etc.). In yet other examples, the data is retrieved from the data structure (e.g., operating state, such as on/off, locked/unlocked, open/close, etc.)

At block 1114, a determination is made from the received data of block 1112 whether the criterion is satisfied. In particular, the received data is analyzed to determine whether the criterion is satisfied. For example, the received data indicates that the thermostat is detecting a temperature of 84 degrees. Based on the discourse input "Close the blinds when it reaches 80 degrees," the criterion is detecting a temperature of the thermostat that is equal to or greater than the reference temperature of 80 degrees. In this example, a determination is made from the received data that the criterion has been satisfied.

In response to determining that the criterion has been satisfied, block 1116 is performed. Conversely, in response to determining that the criterion is not satisfied, process 1100 returns to block 1112 where new or updated data associated with the criterion is received. Process 1100 thus forgoes performing block 1116 in response to determining that the criterion has not been satisfied.

At block 1116, instructions that cause the device of the set of devices to perform the action are provided. Returning to the example discourse input "Close the blinds when it reaches 80 degrees," instructions are provided that cause the blinds to close. Block 1116 is similar or identical to block 814, described above.

5. Electronic Devices

Figure 12:
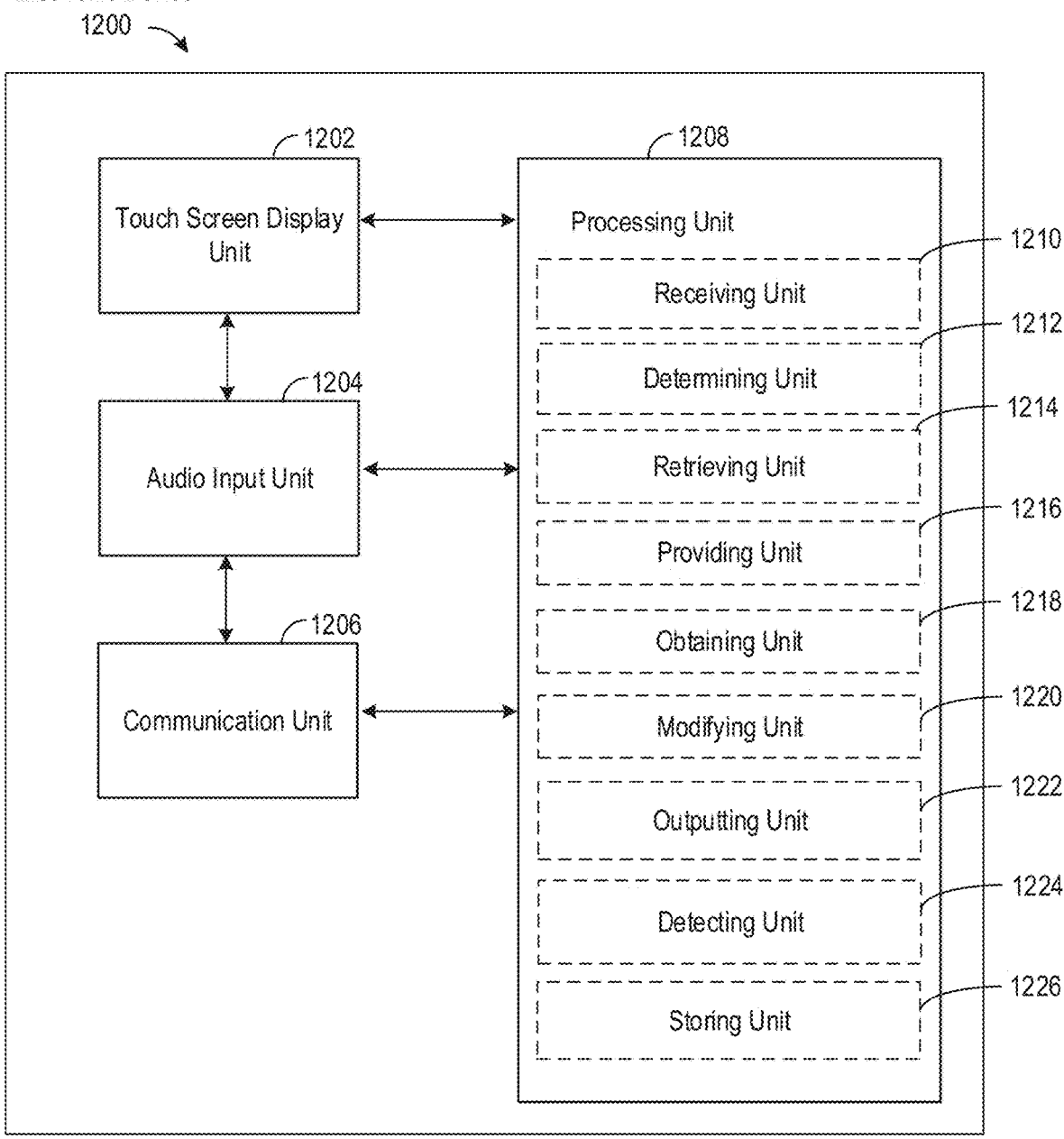
FIG. 12 illustrates a functional block diagram of an electronic device according to various examples.

FIG. 12 shows a functional block diagram of electronic device 1200 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 12 can be optionally combined or separated into sub-blocks to implement the principles of the various described examples. Therefore, the description herein optionally supports any possible combination, separation, or further definition of the functional blocks described herein.

As shown in FIG. 12, electronic device 1200 includes touch screen display unit 1202 configured to display a graphical user interface and to receive input (e.g., text input) from the user, audio input unit 1204 configured to receive audio input (e.g., speech input) from the user, and communication unit 1206 configured to transmit and receive information. Electronic device 1200 further includes processing unit 1208 coupled to touch screen display unit 1202, audio input unit 1204, and communication unit 1206. In some examples, processing unit 1208 includes receiving unit 1210, determining unit 1212, retrieving unit 1214, providing unit 1216, obtaining unit 1218, modifying unit 1220, outputting unit 1222, detecting unit 1224, and storing unit 1226.

In accordance with some embodiments, processing unit 1208 is configured to receive (e.g., with receiving unit 1212 and via touch screen display unit 1202 or audio input unit) discourse input (e.g., discourse input of block 802) representing a user request. Processing unit 1208 is further configured to determine (e.g., with determining unit 1212) one or more possible device characteristics (e.g., possible device characteristics of block 808) corresponding to the discourse input. Processing unit 1208 is further configured to retrieve (e.g., with retrieving unit 1214) a data structure (e.g., data structure of block 806) representing a set of devices of an established location. Processing unit 1208 is further configured to determine (e.g., with determining unit 1212), based on the data structure, one or more candidate devices (e.g., candidate devices of block 810) from the set of devices. The one or more candidate devices correspond to the discourse input. Processing unit 1208 is further configured to determine (e.g., with determining unit 1212), based on the one or more possible device characteristics and one or more actual device characteristics of the one or more candidate devices, a user intent (e.g., user intent of block 812) corresponding to the discourse input. Processing unit 1208 is further configured to provide (e.g., with providing unit 1216 and communication unit 1206) instructions (e.g., instructions of block 814) that cause a device of the one or more candidate devices to perform an action corresponding to the user intent.

In some examples, determining the user intent further comprises determining one or more candidate user intents (e.g., candidate user intents of block 812) corresponding to the discourse input, and determining the user intent from the one or more candidate user intents based on the one or more possible device characteristics and the one or more actual device characteristics.

In some examples, determining the user intent further comprises determining the device (e.g., device of block 812) from the one or more candidate devices based on the one or more possible device characteristics and the one or more actual device characteristics.

In some examples, processing unit 1208 is further configured to determine (e.g., with determining unit 1212) one or more overlapping device characteristics (e.g., overlapping device characteristics of block 812) that are common between one or more possible device characteristics and the one or more actual device characteristics. The user intent is determined based on the one or more overlapping device characteristics.

In some examples, processing unit 1208 is further configured to determine (e.g., with determining unit 1212) a relative position of a user with respect to a region in the established location (e.g., block 812). The discourse input is associated with the user and the user intent is determined based on the relative position.

In some examples, processing unit 1208 is further configured to obtain (e.g., with obtaining unit 1218) an operating state of each of the one or more candidate devices (e.g., block 812). The user intent is determined based on the operating state of each of the one or more candidate devices.

In some examples, determining the user intent further comprises determining, based on the one or more possible device characteristics and the one or more actual device characteristics, a first candidate user intent corresponding to the discourse input and a second candidate user intent corresponding to the discourse input, determining a first salience of a first action associated with the first candidate user intent and a second salience of a second action associated with the second candidate user intent, and ranking the first user intent and the second user intent based on the first salience and the second salience (e.g., block 812). The user intent is determined based on the ranking.

In some examples, determining the user intent further comprises determining, based on the one or more possible device characteristics and the one or more actual device characteristics, two or more candidate user intents corresponding to the discourse input and determining whether the two or more candidate user intents can be disambiguated (e.g., block 812). Determining the user intent further comprises, in response to determining that the two or more candidate user intents cannot be disambiguated, outputting dialogue that requests for additional information (e.g., block 812). Determining the user intent further comprises receiving user input responsive to the output dialogue, and disambiguating the two or more candidate user intents based on the user input to determine the user intent (e.g., block 812).

In some examples, determining the one or more possible device characteristics further comprises determining one or more second possible device characteristics corresponding to a first term in the discourse input, and determining one or more third possible device characteristics corresponding to a second term in the discourse input, wherein the one or more possible device characteristics is determined based on the one or more second possible device characteristics and the one or more third possible device characteristics (e.g., block 808).

In some examples, processing unit 1208 is further configured to determine (e.g., with determining unit 1212) whether the discourse input corresponds to a domain (e.g., block 804), the domain associated with an actionable intent of performing a task based on a device of the established location. Retrieving the data structure representing the set of devices of the established location is performed in response to determining that the discourse input corresponds to the domain.

In some examples, processing unit 1208 is further configured to retrieve (e.g., with retrieving unit 1214) contact information based on a term in the discourse input, wherein the one or more candidate devices of the set of devices is determined based on the retrieved contact information (e.g., block 810).

In some examples, determining the one or more candidate devices of the set of devices further comprises determining one or more alternative terms associated with a second term in the discourse input, wherein the one or more candidate devices is determined based on the one or more alternative terms (e.g., block 810).

In some examples, an alternative term of the one or more alternative terms is based on second user input received at the electronic device prior to receiving the discourse input (e.g., block 810).

In some examples, processing unit 1208 is further configured to determine (e.g., with determining unit 1212) a location corresponding to the discourse input. Processing unit 1208 is further configured to determine (e.g., with determining unit 1212), based on the location, the established location from a plurality of established locations (e.g., block 806).

In some examples, the data structure defines a hierarchical relationship between a plurality of regions in the established location, and a relationship between each device of the set of devices and the plurality of regions (e.g., block 806).

In some examples, each device in the set of devices and each region in the plurality of regions are identified in the data structure with respect to a temporary session key associated with the received discourse input (e.g., block 806).

In some examples, the data structure defines one or more actual device characteristics associated with each device in the set of devices (e.g., block 806). In some examples, the data structure defines an operating state of each device in the set of devices (e.g., block 806).

In some examples, processing unit 1208 is further configured to receive (e.g., with receiving unit 1210) a first attribute of a first device in the established location and a second attribute of a second device in the established location. Processing unit 1208 is further configured to determine (e.g., with determining unit 1212), based on the first attribute and the second attribute, a relationship between the first device and the second device with respect to the established location. Processing unit 1208 is further configured to provide (e.g., with providing unit 1216) a prompt to modify the data structure based on the determined relationship. Processing unit 1208 is further configured to receive (e.g., with receiving unit 1210 and via touch screen display unit 1202 or audio input unit 1204) a third user input responsive to the prompt. Processing unit 1208 is further configured to, in response to receiving the third user input, modify (e.g., with modifying unit 1220) the data structure to define the determined relationship between the first device and the second device with respect to the established location (e.g., block 806).

In some examples, the discourse input is in natural language form, and the discourse input is ambiguous with respect to defining the action (e.g., block 802). In some examples, the discourse input is in natural language form, and the discourse input is ambiguous with respect to defining the device for performing the action (e.g., block 802).

In some examples, processing unit 1208 is further configured to, prior to providing the instructions, output (e.g., outputting unit 1222) second dialogue confirming the action to be performed and the device performing the action (e.g., block 814). Processing unit 1208 is further configured to, prior to providing the instructions, receive (e.g., with receiving unit 1210 and via touch screen display unit 1202 or audio input unit 1204) a fourth user input responsive to the second output dialogue (e.g., block 814). The instructions are provide in response to receiving the fourth user input.

In some examples, processing unit 1208 is further configured to detect (e.g., with detecting unit 1224), in association with an event, one or more user inputs that cause a plurality of devices in the set of devices to be set to respective operating states. Processing unit 1208 is further configured to, in response to detecting the one or more user inputs, provide (e.g., with providing unit 1216) a second prompt to store the respective operating states of the plurality of devices in association with a custom command. Processing unit 1208 is further configured to, receive (e.g., with receiving unit 1210 and via touch screen display unit 1202 or audio input unit 1204) a user input responsive to the second prompt. Processing unit 1208 is further configured to, in response to receiving the fifth user input, store (e.g., with storing unit) the respective operating states of the plurality of devices in association with the custom command, wherein in response to receiving the custom command, the electronic device causes the plurality of devices to be set to the respective operating states (e.g., block 814).

In some examples, processing unit 1208 is further configured to detect (e.g., with detecting unit 1224), in association with a second plurality of devices in the set of devices being set to second respective operating states, a sixth user input that causes a third device in the set of devices to be set to a third operating state, wherein the second respective operating states of the second plurality of devices are stored in association with a second custom command. Processing unit 1208 is further configured to, in response to detecting the sixth user input, provide (e.g., with providing unit 1216) a third prompt to store the third operating state of the third device in association with the second custom command. Processing unit 1208 is further configured to receive (e.g., with receiving unit 1210 and via touch screen display unit 1202 or audio input unit 1204) a seventh user input responsive to the third prompt. Processing unit 1208 is further configured to, in response to receiving the seventh user input, store storing the third operating state of the third device in association with the second custom command, wherein in response to receiving the second custom command after storing the third operating state of the third device in association with the second custom command, the electronic device causes the second plurality of devices to be set to the second respective operating states and the third device to be set to the third operating state (e.g., block 814).

The operations described above with reference to FIG. 8 are optionally implemented by components depicted in FIGS. 1-4, 6A-B, 7A, and 12. For example, the operations of process 800 may be implemented by one or more of operating system 718, applications module 724, U/O processing module 728, STT processing module 730, natural language processing module 732, task flow processing module 736, service processing module 738, or processor(s) 220, 410, 704. It would be clear to a person having ordinary skill in the art how other processes are implemented based on the components depicted in FIGS. 1-4, 6A-B, and 7A.

Figure 13:
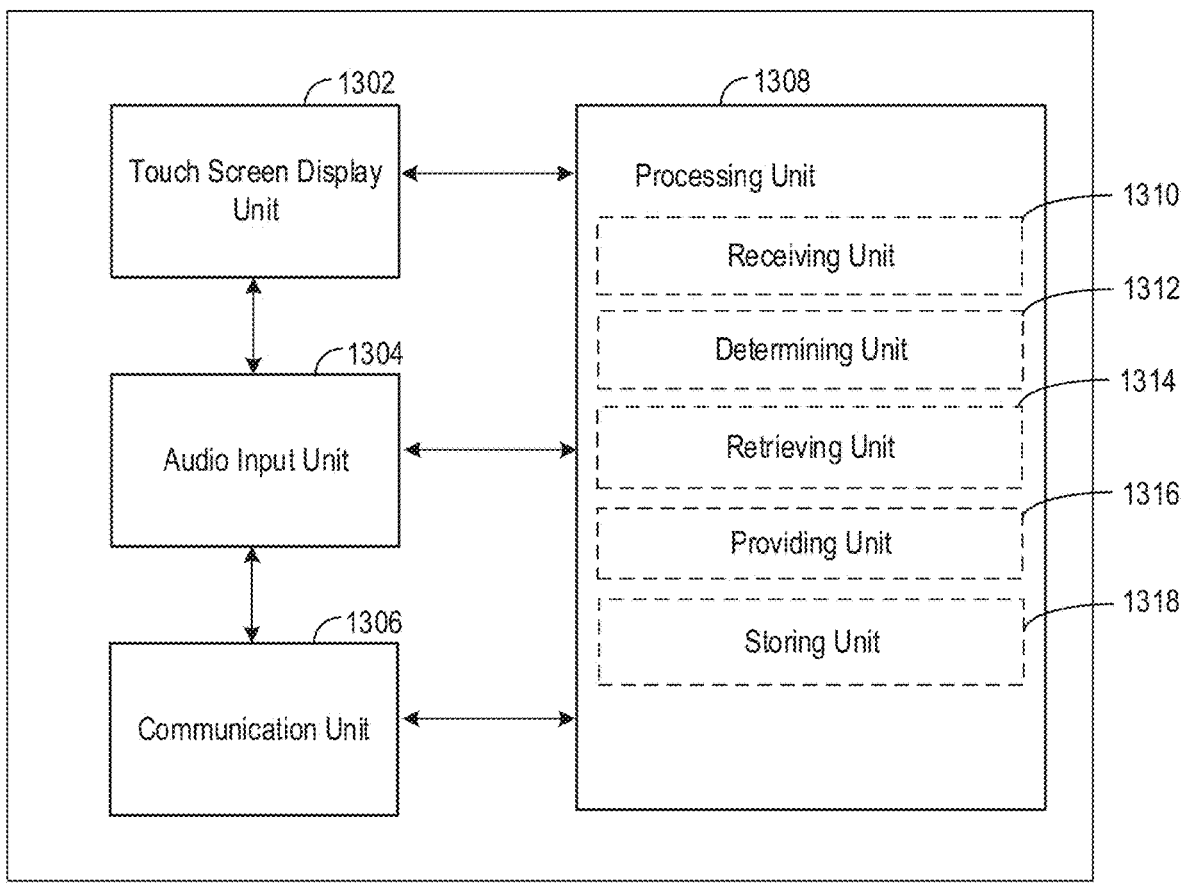
FIG. 13 illustrates a functional block diagram of an electronic device according to various examples.

FIG. 13 shows a functional block diagram of electronic device 13200 configured in accordance with the principles of the various described examples. The functional blocks of the device can be optionally implemented by hardware, software, or a combination of hardware and software to carry out the principles of the various described examples. It is understood by persons of skill in the art that the functional blocks described in FIG. 13 can be optionally combined or separated into sub-blocks to implement the principles of the various described examples. Therefore, the description herein optionally supports any possible combination, separation, or further definition of the functional blocks described herein.

As shown in FIG. 13, electronic device 1300 includes touch screen display unit 1302 configured to display a graphical user interface and to receive input (e.g., text input) from the user, audio input unit 1304 configured to receive audio input (e.g., speech input) from the user, and communication unit 1306 configured to transmit and receive information. Electronic device 1300 further includes processing unit 1308 coupled to touch screen display unit 1302, audio input unit 1304, and communication unit 1306. In some examples, processing unit 1308 includes receiving unit 1310, determining unit 1312, retrieving unit 1314, providing unit 1316, and storing unit 1318.

In accordance with some embodiments, processing unit 1308 is configured to receive (e.g., with receiving unit 1310 and via touch screen display unit 1302 or audio input unit 1304) discourse input (e.g., discourse input of block 1102) representing a user request. Processing unit 1708 is further configured to determine (e.g., with determining unit 1312) whether the discourse input relates to a device of an established location (e.g., block 1104). Processing unit 1308 is further configured to, in response to determining that the discourse input relates to a device of an established location, retrieve (e.g., with retrieving 1314) a data structure (e.g., data structure of block 1106) representing a set of devices of the established location. Processing unit 1308 is further configured to determine (e.g., with determining unit 1312), using the data structure, a user intent (e.g., user intent of block 1108) corresponding to the discourse input. The user intent is associated with an action to be performed by a device of the set of devices and a criterion to be satisfied prior to performing the action. Processing unit 1308 is further configured to store (e.g., with storing unit 1318) the action and the device in association with the criterion, wherein the action is performed by the device in accordance with a determination that the criterion is satisfied (e.g., block 1110).

In some examples, the criterion is associated with an actual device characteristic of a second device of the set of devices (e.g., block 1108).

In some examples, determining the user intent further comprises 1) determining, based on the discourse input and data structure, the actual device characteristic of the second device (e.g., block 1108), and 2) determining, based on the data structure and the discourse input, the second device from the set of devices (e.g., block 1108).

In some examples, the criterion comprises a requirement that an actual value representing the actual device characteristic is greater than, equal to, or less than a threshold value (e.g., threshold value of block 1108).

In some examples, determining the user intent further comprises determining, based on the discourse input, the threshold value (e.g., block 1108).

In some examples, the actual device characteristic is humidity, and the second device includes a humidity sensor (e.g., block 1108). In some examples, the actual device characteristic is temperature, and the second device includes a temperature sensor (e.g., block 1108). In some examples, the actual device characteristic is brightness, and the second device includes a brightness sensor (e.g., block 1108). In some examples, the actual device characteristic is air quality, and wherein the second device includes an air quality sensor (e.g., block 1108). In some examples, the actual device characteristic is an authentication characteristic, and the second device includes an authentication device (e.g., block 1108).

In some examples, the criterion comprises a requirement that a confidence value is greater than or equal to a threshold value (e.g., block 1108). The confidence value represents a probability that authentication data received from the authentication device matches reference authentication data.

In some examples, the criterion is associated with an operating state of a third device of the set of devices (e.g., block 1108). In some examples, the criterion comprises a requirement that the operating state of the third device is equal to a reference operating state (e.g., block 1108). In some examples, the criterion comprises a requirement that the operating state of the third device transitions from a second reference operating state to a third reference operating state (e.g., block 1108). In some examples, the criterion comprises a requirement that the action was performed less than a predetermined number of times within a predetermined period of time (e.g., block 1108).

In some examples, the criterion comprises a requirement that a time of electronic device 1300 is equal to or greater than a reference time (e.g., block 1108). In some examples, determining the user intent further comprises determining the reference time from the discourse input (e.g., block 1108). In some examples, determining the reference time further comprises 1) determining a second reference time from the discourse input (e.g., block 1108), and 2) determining a duration associated with the reference time, wherein the reference time is determined based on the second reference time and the duration (e.g., block 1108).

In some examples, processing unit 1308 is further configured to receive (e.g., with receiving unit 1310 and via communication unit 1306) data (e.g., data of block 1112) associated with the criterion. Processing unit 1308 is further configured to determine (e.g., with determining unit 1312) from the received data whether the criterion is satisfied (e.g., block 1114). Processing unit 1308 is further configured to, in response to determining that the criterion is satisfied, provide (e.g., with providing unit 1316) instructions (e.g., instructions of block 1116) that cause the device of the set of devices to perform the action.

In some examples, the user intent is associated with a second criterion to be satisfied prior to performing the action (e.g., block 1108). In some examples, satisfying the second criterion requires the criterion to be satisfied (e.g., block 1108).

In some examples, processing unit 1308 is further configured to receive (e.g., with receiving unit 1310 and via communication unit 1306) second data associated with the second criterion (e.g., block 1112). Processing unit 1308 is further configured to determine (e.g., with determining unit 1312) from the received second data whether the second criterion is satisfied (e.g., block 1114), where the instructions are provided in response to determining that the second criterion is satisfied (e.g., block 1116).

In some examples, the action includes providing a notification associated with the criterion (e.g., block 1108). In some examples, performing the action by the device causes a portion of the device to change positions (e.g., block 1108). In some examples, performing the action by the device causes a device to lock or unlock (e.g., block 1108). In some examples, performing the action by the device causes the device to be activated or deactivated (e.g., block 1108). In some examples, performing the action by the device causes a setpoint of the device to change (e.g., block 1108).

In some examples, processing unit 1308 is further configured to, in response to determining that the criterion is satisfied, provide (e.g., with providing unit 1316) a prompt to perform the action using the device (e.g., block 1116). Processing unit 1308 is further configured to receive (e.g., with receiving unit 1310) a user input responsive to the prompt (e.g., block 1116). Processing unit 1308 is further configured to, in response to receiving the user input, provide (e.g., with providing unit 1316) instructions that cause the device to perform the action (e.g., block 1116).

The operations described above with reference to FIG. 11 are optionally implemented by components depicted in FIGS. 1-4, 6A-B, 7A, and 13. For example, the operations of process 1100 are implemented by one or more of operating system 718, applications module 724, I/O processing module 728, STT processing module 730, natural language processing module 732, task flow processing module 736, service processing module 738, or processor(s) 220, 410, 704. It would be clear to a person having ordinary skill in the art how other processes are implemented based on the components depicted in FIGS. 1-4, 6A-B, and 7A.

In accordance with some implementations, a computer-readable storage medium (e.g., a non-transitory computer readable storage medium) is provided, the computer-readable storage medium storing one or more programs for execution by one or more processors of an electronic device, the one or more programs including instructions for performing any of the methods or processes described herein.

In accordance with some implementations, an electronic device (e.g., a portable electronic device) is provided that comprises means for performing any of the methods or processes described herein.

In accordance with some implementations, an electronic device (e.g., a portable electronic device) is provided that comprises a processing unit configured to perform any of the methods or processes described herein.

In accordance with some implementations, an electronic device (e.g., a portable electronic device) is provided that comprises one or more processors and memory storing one or more programs for execution by the one or more processors, the one or more programs including instructions for performing any of the methods or processes described herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, home addresses, device characteristics of personal devices, or any other identifying information.

The present disclosure recognizes that the use of such personal information data, in the present technology, can be used to the benefit of users. For example, the personal information data can be used to deliver targeted content that is of greater interest to the user. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services. In another example, users can select not to provide location information for targeted content delivery services. In yet another example, users can select to not provide precise location information, but permit the transfer of location zone information.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publically available information.

What is claimed is:

1. An electronic device, comprising:
   one or more processors; and
   memory storing one or more programs configured to be executed by the one or more processors, the one or more programs including instructions for:
   receiving a user request defining a request for a first device of an established location to perform an action and a condition that is required to be satisfied prior to performing the action, wherein the condition is defined using a relative term in the user request;
   determining, based on the user request and the relative term, an actionable intent of performing the action with the first device of the established location when an actual value of a characteristic of a second device of the established location satisfies the condition, wherein determining the actionable intent includes:
   responsive to receiving the user request, retrieving a historical distribution of values for the characteristic of the second device of the established location,
   determining, based on the historical distribution of values for the characteristic of the second device of the established location, a quantitative threshold value corresponding to the relative term defining the condition, wherein the quantitative threshold value is a predetermined percentile of the historical distribution;
   receiving data associated with the characteristic of the second device of the established location;
   determining, based on the received data, that the actual value of the characteristic of the second device satisfies the condition as defined by the quantitative threshold value; and
   in accordance with a determination that the actual value of the characteristic of the second device satisfies the condition as defined by the quantitative threshold value, causing the first device to perform the action.

2. The electronic device of claim 1, wherein the characteristic of the second device of the established location is a device characteristic of a sensor of the second device of the established location.

3. The electronic device of claim 1, wherein determining, based on the received data, that the actual value of the characteristic of the second device satisfies the condition as defined by the quantitative threshold value includes:
   determining whether the actual value of the characteristic of the second device is greater than the quantitative threshold value.

4. The electronic device of claim 1, wherein determining, based on the received data, that the actual value of the characteristic of the second device satisfies the condition as defined by the quantitative threshold value includes:
   determining whether the actual value of the characteristic of the second device is less than the quantitative threshold value.

5. The electronic device of claim 1, wherein causing the first device to perform the action further comprises:
   providing instructions that cause the first device of the established location to perform the action.

6. The electronic device of claim 1, wherein the actionable intent is associated with a second condition, and wherein causing the first device to perform the action is further performed in accordance with a determination that the second condition is satisfied.

7. The electronic device of claim 6, wherein satisfying the second condition requires that a current time be equal to a reference time.

8. The electronic device of claim 6, wherein the one or more programs further include instructions for:
   receiving second data associated with the second condition; and
   determining from the received second data whether the second condition is satisfied.

9. The electronic device of claim 1, wherein determining the actionable intent of performing the action with the first device of the established location when the actual value of the characteristic of the second device of the established location satisfies the condition includes:
   retrieving a data structure representing a plurality of devices of the established location.

10. The electronic device of claim 9, wherein the one or more programs further include instructions for:
    determining one or more possible device characteristics corresponding to the user request;
    determining, based on the data structure, one or more candidate devices of the established location; and
    selecting, based on the data structure and on the possible device characteristics, the first device from the one or more candidate devices.

11. The electronic device of claim 9, wherein the one or more programs further include instructions for:
    determining, based on the data structure, the second device based on a relationship between the second device and the first device.

12. The electronic device of claim 1, wherein the characteristic of the second device is a temperature characteristic.

13. The electronic device of claim 1, wherein the characteristic of the second device is a time characteristic.

14. The electronic device of claim 1, wherein the characteristic of the second device is an illuminance characteristic.

15. The electronic device of claim 1, wherein the characteristic of the second device is a sound intensity characteristic.

16. A non-transitory computer-readable storage medium storing one or more programs, the one or more programs comprising instructions which, when executed by one or more processors of an electronic device, cause the electronic device to:
    receive a user request defining a request for a first device of an established location to perform an action and a condition that is required to be satisfied prior to performing the action, wherein the condition is defined using a relative term in the user request;
    determine, based on the user request and the relative term, an actionable intent of performing the action with the first device of the established location when an actual value of a characteristic of a second device of the established location satisfies the condition, wherein determining the actionable intent includes:
    responsive to receiving the user request, retrieve a historical distribution of values for the characteristic of the second device of the established location;
    determine, based on the historical distribution of values for the characteristic of the second device of the established location, a quantitative threshold value corresponding to the relative term defining the condition, wherein the quantitative threshold value is a predetermined percentile of the historical distribution;

receive data associated with the characteristic of the second device of the established location;

determine, based on the received data, that the actual value of the characteristic of the second device satisfies the condition as defined by the quantitative threshold value; and in accordance with a determination that the actual value of the characteristic of the second device satisfies the condition as defined by the quantitative threshold value, cause the first device to perform the action.

17. A method for operating a digital assistant, the method comprising:

at an electronic device with a processor and memory:

receiving a user request defining a request for a first device of an established location to perform an action and a condition that is required to be satisfied prior to performing the action, wherein the condition is defined using a relative term in the user request;

determining, based on the user request and the relative term, an actionable intent of performing the action with the first device of the established location when an actual value of a characteristic of a second device of the established location satisfies the condition, wherein determining the actionable intent includes:

responsive to receiving the user request, retrieving a historical distribution of values for the characteristic of the second device of the established location;

determining, based on the historical distribution of values for the characteristic of the second device of the established location, a quantitative threshold value corresponding to the relative term defining the condition, wherein the quantitative threshold value is a predetermined percentile of the historical distribution;

receiving data associated with the characteristic of the second device of the established location;

determining, based on the received data, that the actual value of the characteristic of the second device satisfies the condition as defined by the quantitative threshold value; and in accordance with a determination that the actual value of the characteristic of the second device satisfies the condition as defined by the quantitative threshold value, causing the first device to perform the action.

18. The non-transitory computer-readable storage medium of claim 16, wherein the characteristic of the second device of the established location is a device characteristic of a sensor of the second device of the established location.

19. The non-transitory computer-readable storage medium of claim 16, wherein determining, based on the received data, that the actual value of the characteristic of the second device satisfies the condition as defined by the quantitative threshold value includes:

determining whether the actual value of the characteristic of the second device is greater than the quantitative threshold value.

20. The non-transitory computer-readable storage medium of claim 16, wherein determining, based on the received data, that the actual value of the characteristic of the second device satisfies the condition as defined by the quantitative threshold value includes:

determining whether the actual value of the characteristic of the second device is less than the quantitative threshold value.

21. The non-transitory computer-readable storage medium of claim 16, wherein causing the first device to perform the action further comprises:

providing instructions that cause the first device of the established location to perform the action.

22. The non-transitory computer-readable storage medium of claim 16, wherein the actionable intent is associated with a second condition, and wherein causing the first device to perform the action is further performed in accordance with a determination that the second condition is satisfied.

23. The non-transitory computer-readable storage medium of claim 22, wherein satisfying the second condition requires that a current time be equal to a reference time.

24. The non-transitory computer-readable storage medium of claim 22, wherein the one or more programs further comprise instructions which, when executed by one or more processors of an electronic device, cause the electronic device to:

receive second data associated with the second condition; and determine from the received second data whether the second condition is satisfied.

25. The non-transitory computer-readable storage medium of claim 16, wherein determining the actionable intent of performing the action with the first device of the established location when the actual value of the characteristic of the second device of the established location satisfies the condition includes:

retrieving a data structure representing a plurality of devices of the established location.

26. The non-transitory computer-readable storage medium of claim 25, wherein the one or more programs further comprise instructions which, when executed by one or more processors of an electronic device, cause the electronic device to:

determine one or more possible device characteristics corresponding to the user request;

determine, based on the data structure, one or more candidate devices of the established location; and select, based on the data structure and on the possible device characteristics, the first device from the one or more candidate devices.

27. The non-transitory computer-readable storage medium of claim 25, wherein the one or more programs further comprise instructions which, when executed by one or more processors of an electronic device, cause the electronic device to:

determine, based on the data structure, the second device based on a relationship between the second device and the first device.

28. The non-transitory computer-readable storage medium of claim 16, wherein the characteristic of the second device is a temperature characteristic.

29. The non-transitory computer-readable storage medium of claim 16, wherein the characteristic of the second device is a time characteristic.

30. The non-transitory computer-readable storage medium of claim 16, wherein the characteristic of the second device is an illuminance characteristic.

31. The non-transitory computer-readable storage medium of claim 16, wherein the characteristic of the second device is a sound intensity characteristic.

32. The method of claim 17, wherein the characteristic of the second device of the established location is a device characteristic of a sensor of the second device of the established location.

33. The method of claim 17, wherein determining, based on the received data, that the actual value of the characteristic of the second device satisfies the condition as defined by the quantitative threshold value includes:
determining whether the actual value of the characteristic of the second device is greater than the quantitative threshold value.

34. The method of claim 17, wherein determining, based on the received data, that the actual value of the characteristic of the second device satisfies the condition as defined by the quantitative threshold value includes:
determining whether the actual value of the characteristic of the second device is less than the quantitative threshold value.

35. The method of claim 17, wherein causing the first device to perform the action further comprises:
providing instructions that cause the first device of the established location to perform the action.

36. The method of claim 17, wherein the actionable intent is associated with a second condition, and wherein causing the first device to perform the action is further performed in accordance with a determination that the second condition is satisfied.

37. The method of claim 36, wherein satisfying the second condition requires that a current time be equal to a reference time.

38. The method of claim 36, further comprising:
receiving second data associated with the second condition; and
determining from the received second data whether the second condition is satisfied.

39. The method of claim 17, wherein determining the actionable intent of performing the action with the first device of the established location when the actual value of the characteristic of the second device of the established location satisfies the condition includes:
retrieving a data structure representing a plurality of devices of the established location.

40. The method of claim 39, further comprising:
determining one or more possible device characteristics corresponding to the user request;
determining, based on the data structure, one or more candidate devices of the established location; and
selecting, based on the data structure and on the possible device characteristics, the first device from the one or more candidate devices.

41. The method of claim 39, further comprising:
determining, based on the data structure, the second device based on a relationship between the second device and the first device.

42. The method of claim 17, wherein the characteristic of the second device is a temperature characteristic.

43. The method of claim 17, wherein the characteristic of the second device is a time characteristic.

44. The method of claim 17, wherein the characteristic of the second device is an illuminance characteristic.

45. The method of claim 17, wherein the characteristic of the second device is a sound intensity characteristic.

* * * * *

UNITED STATES PATENT AND TRADEMARK OFFICE
CERTIFICATE OF CORRECTION

PATENT NO. : 12,223,282 B2
APPLICATION NO. : 17/497797
DATED : February 11, 2025
INVENTOR(S) : Garett R. Nell et al.

Page 1 of 1

It is certified that error appears in the above-identified patent and that said Letters Patent is hereby corrected as shown below:

On the Title Page

Column 1, item (72) Inventors, Line 4, delete "Benjamin L" and insert -- Benjamin L. --.

Column 2, item (56) Other Publications, Line 2, delete "Ernesta" and insert -- Ernestina --, therefor.

In the Claims

In Column 71, Lines 25-26, Claim 1, delete "location," and insert -- location; --, therefor.

Signed and Sealed this
Twenty-fifth Day of March, 2025

Coke Morgan Stewart
*Acting Director of the United States Patent and Trademark Office*